June 7, 1932.   J. R. PEIRCE   1,862,032
RECORD ANALYZING AND POSTING MACHINE
Filed Oct. 28, 1926   73 Sheets-Sheet 1

Inventor
JOHN ROYDEN PEIRCE
By his Attorney

June 7, 1932.                J. R. PEIRCE                1,862,032
              RECORD ANALYZING AND POSTING MACHINE
                    Filed Oct. 28, 1926      73 Sheets-Sheet 3

Inventor
JOHN ROYDEN PEIRCE
By his Attorney
A. C. Mabry

June 7, 1932.   J. R. PEIRCE   1,862,032

RECORD ANALYZING AND POSTING MACHINE

Filed Oct. 28, 1926    73 Sheets-Sheet 4

Fig. 5.

| | | | | | |
|---|---|---|---|---|---|
| 3 | 10 | | 2,198,765 | C 2 | 1,9 87.6 5 |
| 6 | 8 | * | 2,187,654 | C 2 | 1,8 7 6.5 4 |
| 3 | 8 | | 2,187,654 | C 2 | 1,8 7 6.5 4 |
| 9 | 15 | * | 2,176,543 | C 2 | 1,7 6 5.4 3 |
| 6 | 15 | * | 2,176,543 | C 2 | 1,7 6 5.4 3 |
| 3 | 15 | | 2,176,543 | C 2 | 1,7 6 5.4 3 |
| 12 | 21 | * | 2,165,432 | A 9 | 1,6 5 4.3 2 |
| 9 | 21 | * | 2,165,432 | A 9 | 1,6 5 4.3 2 |
| 6 | 21 | * | 2,165,432 | A 9 | 1,6 5 4.3 2 |
| 3 | 21 | | 2,165,432 | A 9 | 1,6 5 4.3 2 |
| 12 | 10 | * | 2,154,321 | O 8 | 1,5 4 3.2 1 |
| 9 | 10 | * | 2,154,321 | O 8 | 1,5 4 3.2 1 |
| 6 | 10 | * | 2,154,321 | O 8 | 1,5 4 3.2 1 |
| 3 | 10 | * | 2,154,321 | O 8 | 1,5 4 3.2 1 |
| 12 | 10 | * | 2,154,321 | O 8 | 1,5 4 3.2 1 |
| 9 | 10 | * | 2,154,321 | O 8 | 1,5 4 3.2 1 |
| 6 | 10 | | 2,154,321 | O 8 | 1,5 4 3.2 1 |

Fig. 6.                                                                 995

| | | | | | |
|---|---|---|---|---|---|
| 6 | 10 | | 2,198765 | C 2 | 1,9 87.6 5 |
| 6 | 8 | * | 2,187654 | C 2 | 1,8 7 6.5 4 |
| 6 | 15 | * | 2,176543 | C 2 | 1,7 6 5.4 3 |
| 6 | 21 | * | 2,165432 | A 9 | 1,6 5 4.3 2 |
| 6 | 10 | * | 2,154321 | O 8 | 1,5 4 3.2 1 |

Fig. 7.

Inventor
JOHN ROYDEN PEIRCE
By his Attorney

June 7, 1932.  J. R. PEIRCE  1,862,032
RECORD ANALYZING AND POSTING MACHINE
Filed Oct. 28, 1926  73 Sheets-Sheet 5
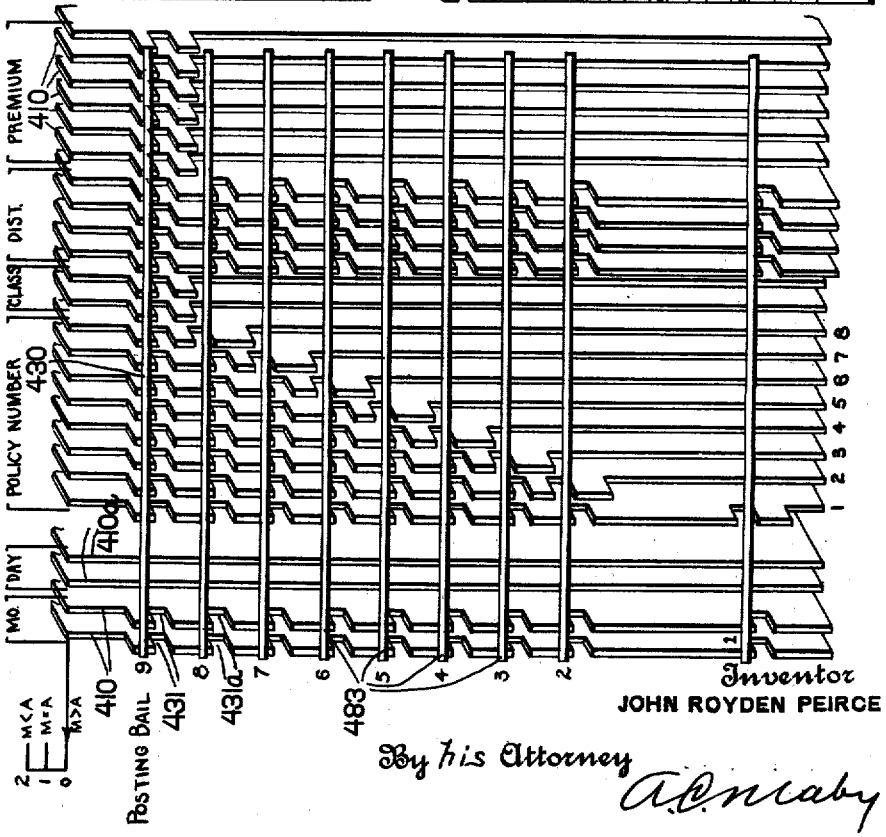
Inventor
JOHN ROYDEN PEIRCE
By his Attorney

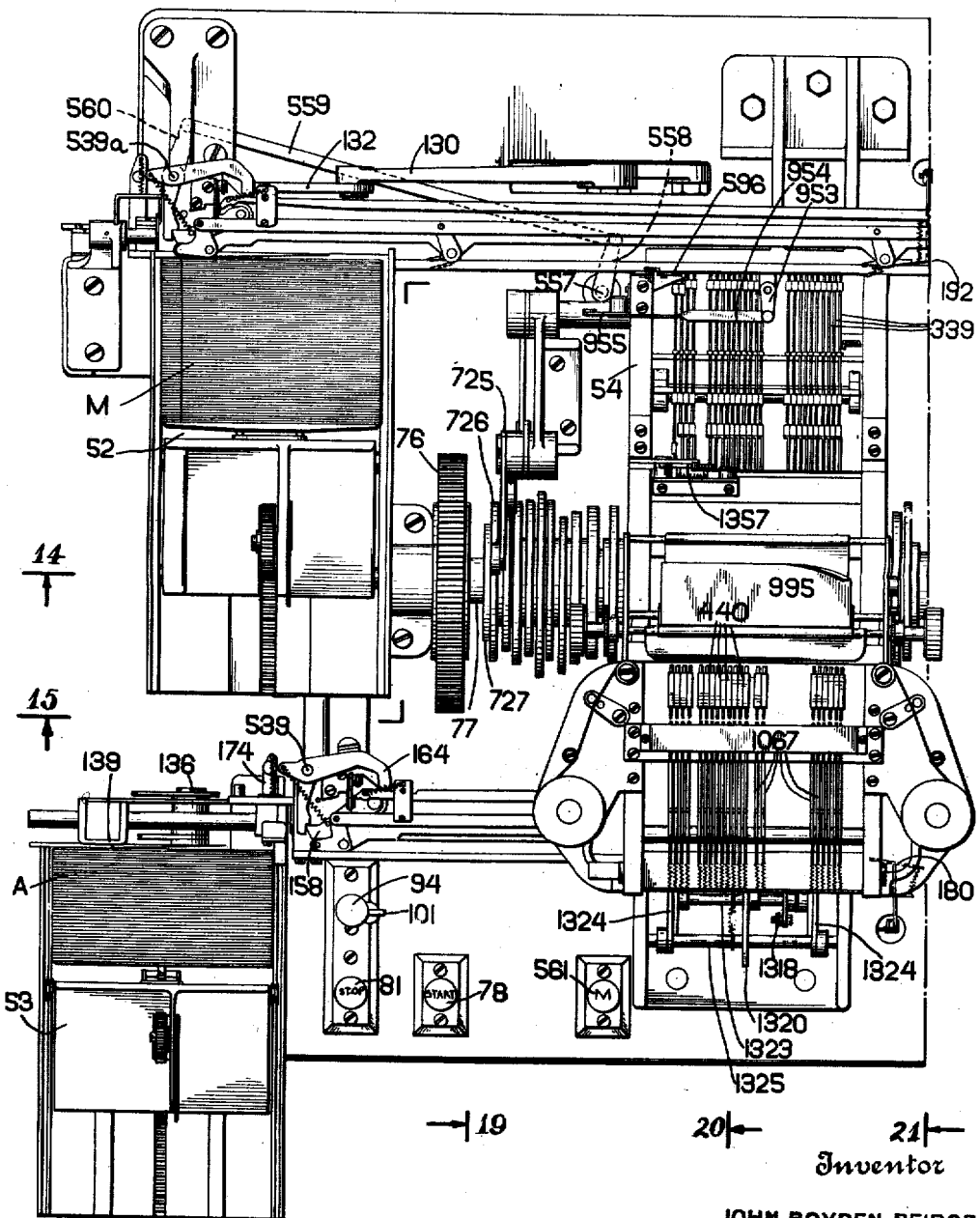

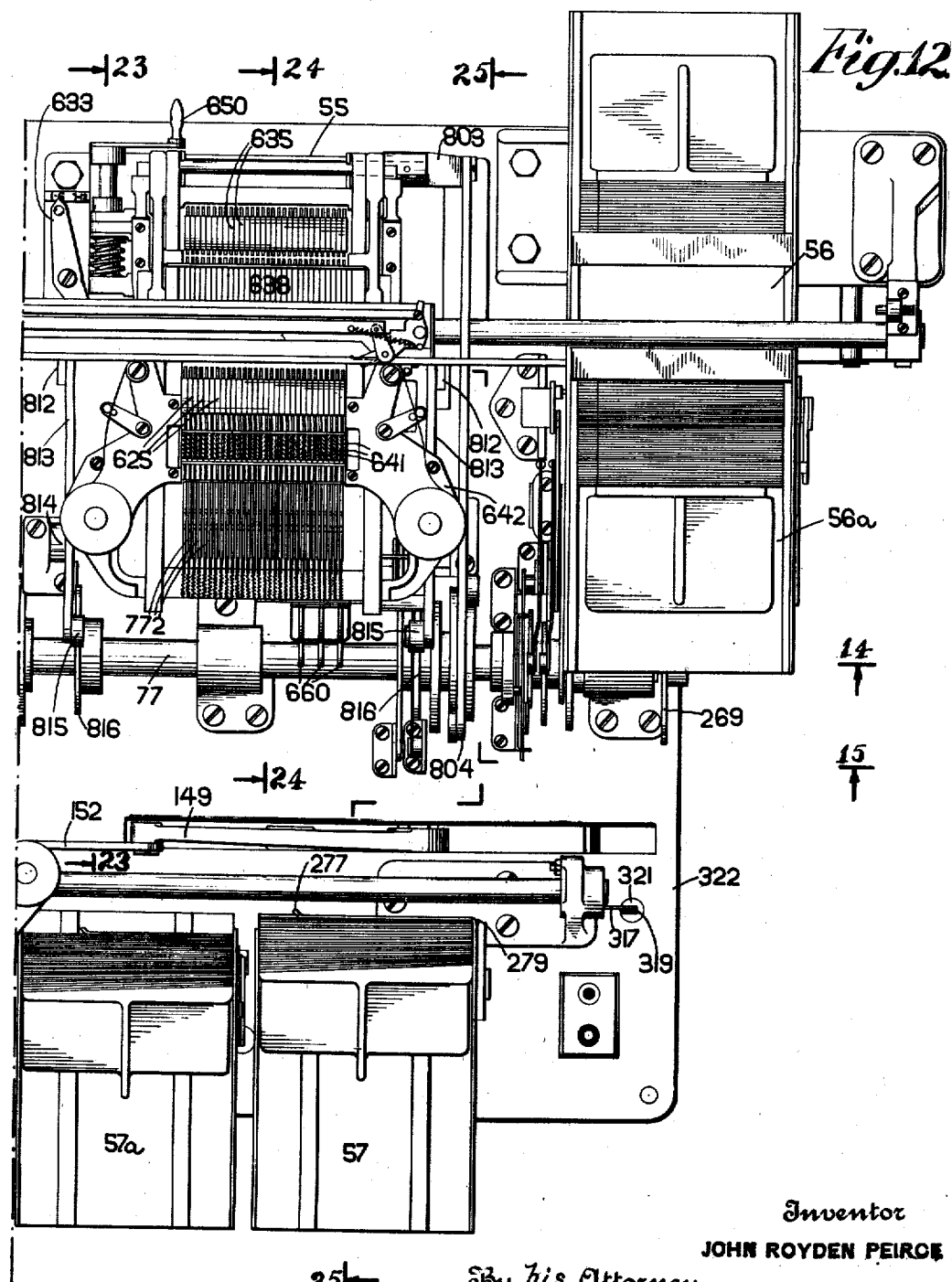

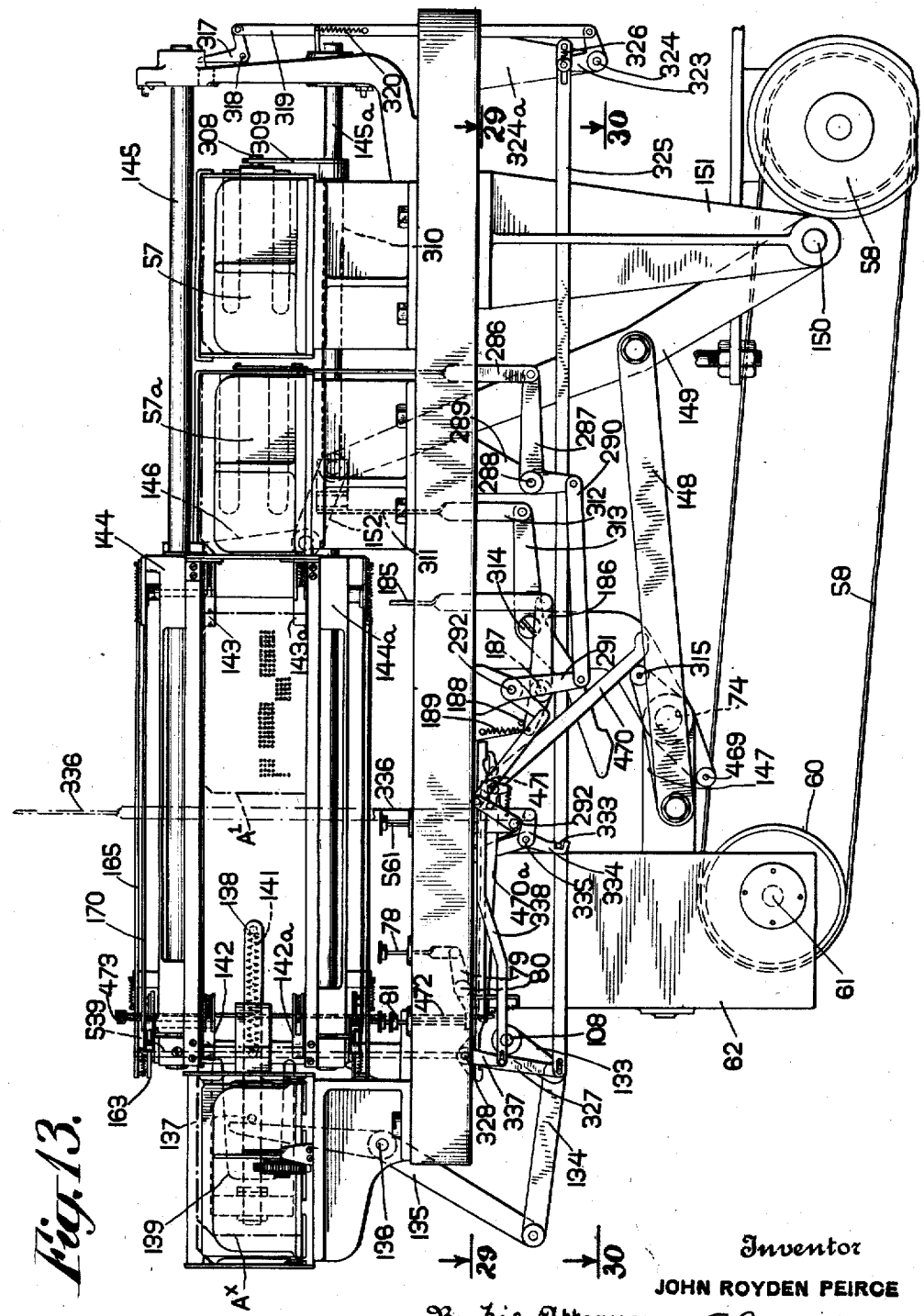

June 7, 1932. J. R. PEIRCE 1,862,032
RECORD ANALYZING AND POSTING MACHINE
Filed Oct. 28, 1926 73 Sheets-Sheet 9

Inventor
JOHN ROYDEN PEIRCE
By his Attorney
A.C.Maby

Inventor
JOHN ROYDEN PEIRCE
By his Attorney
A. C. Maby

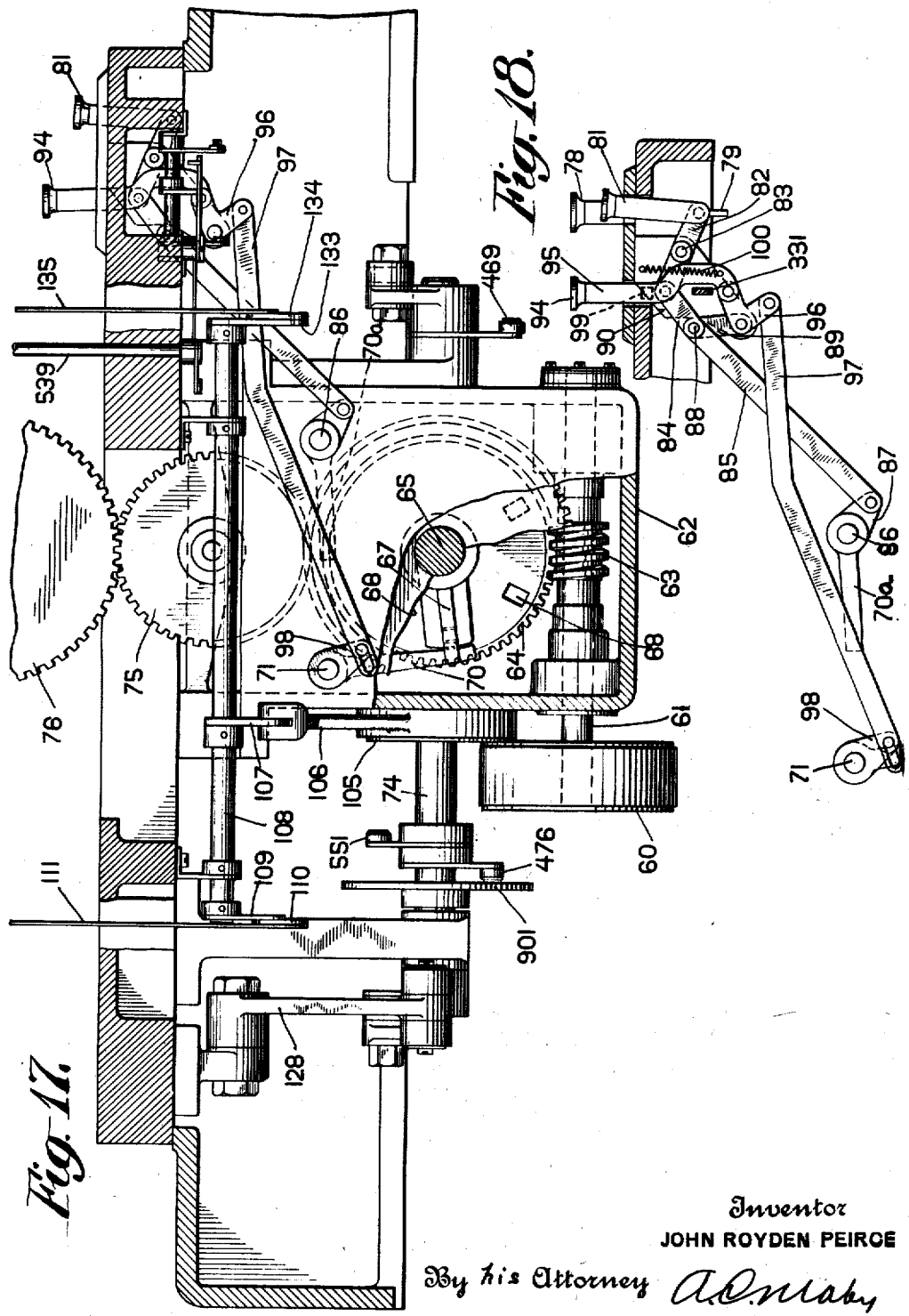

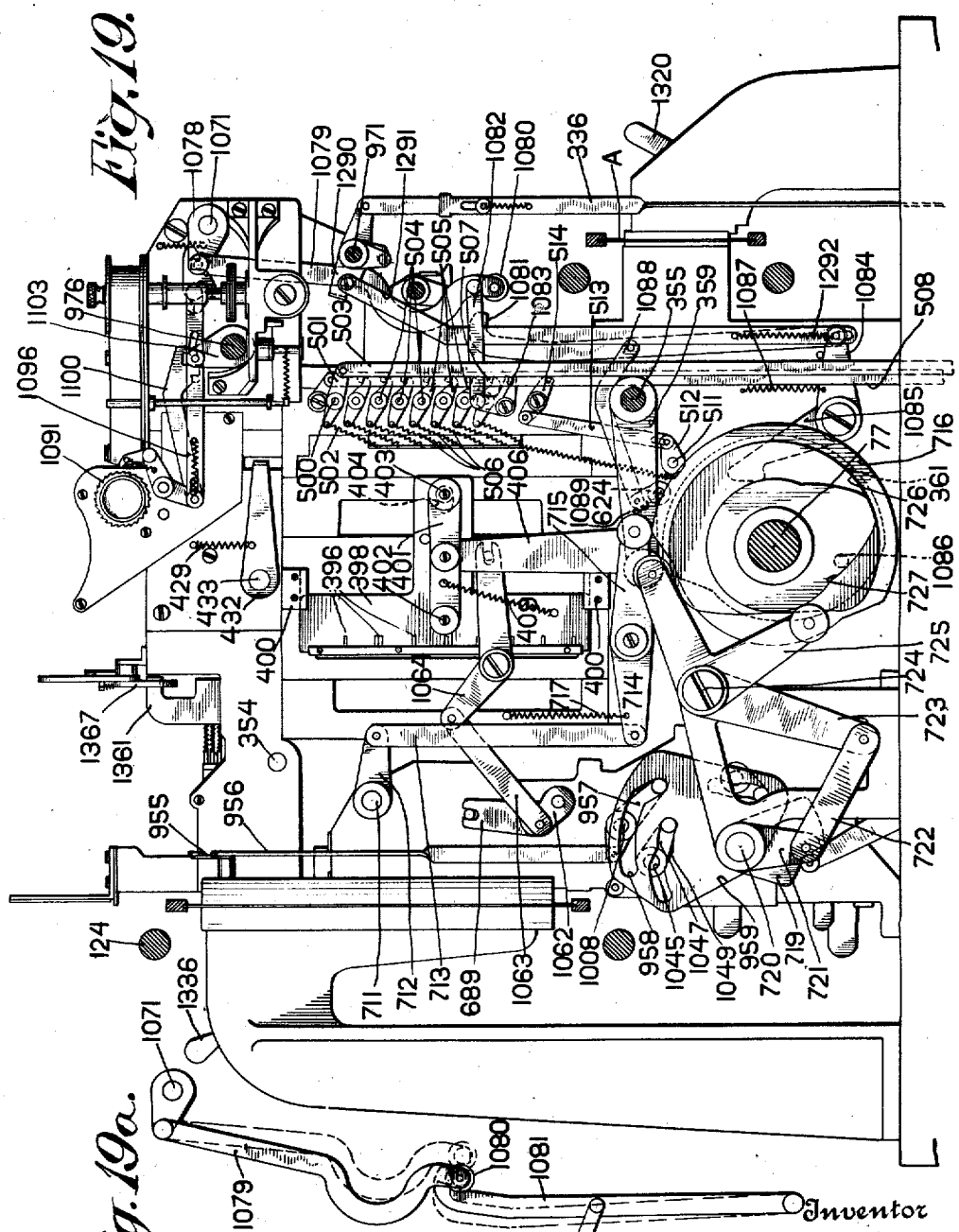

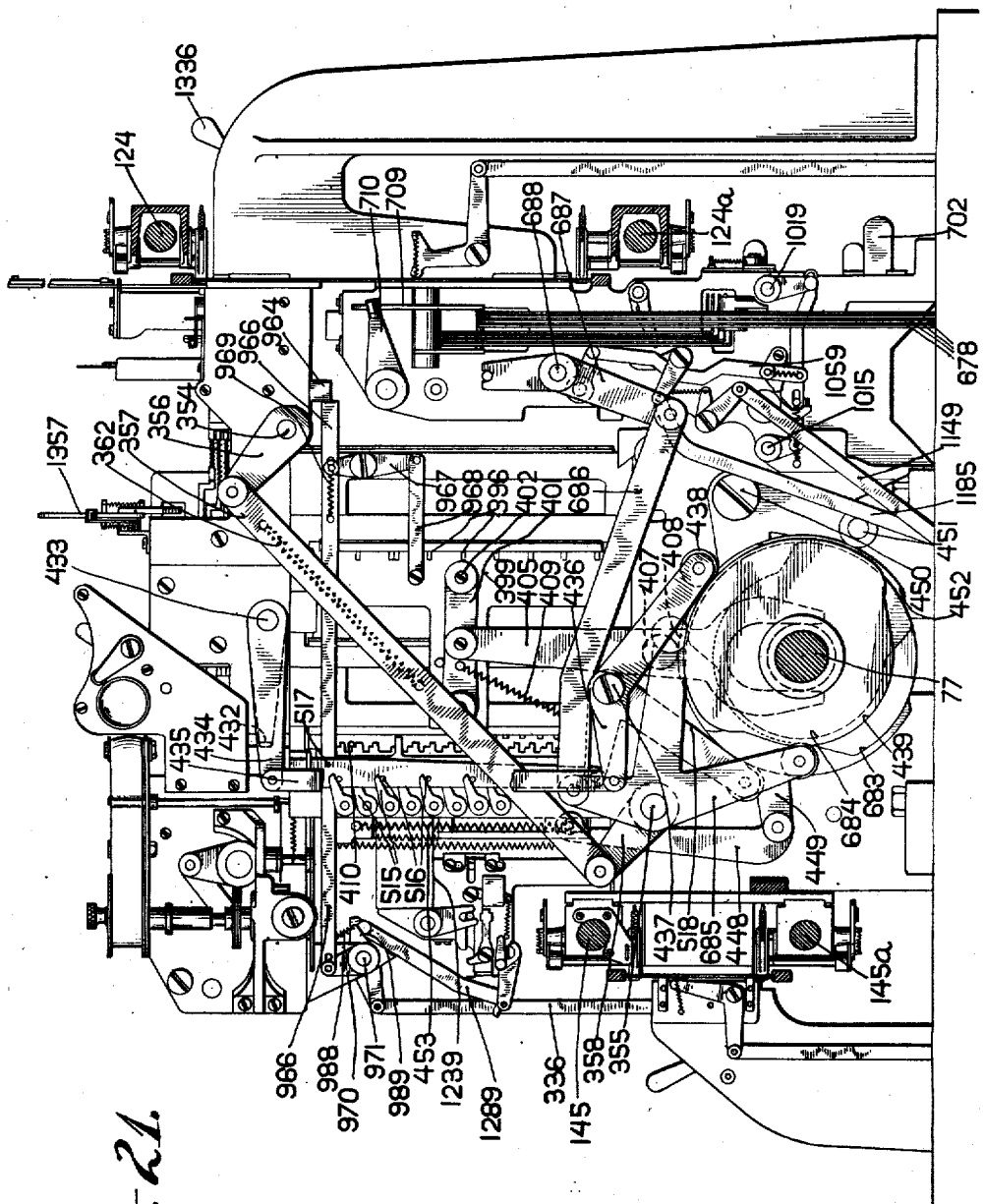

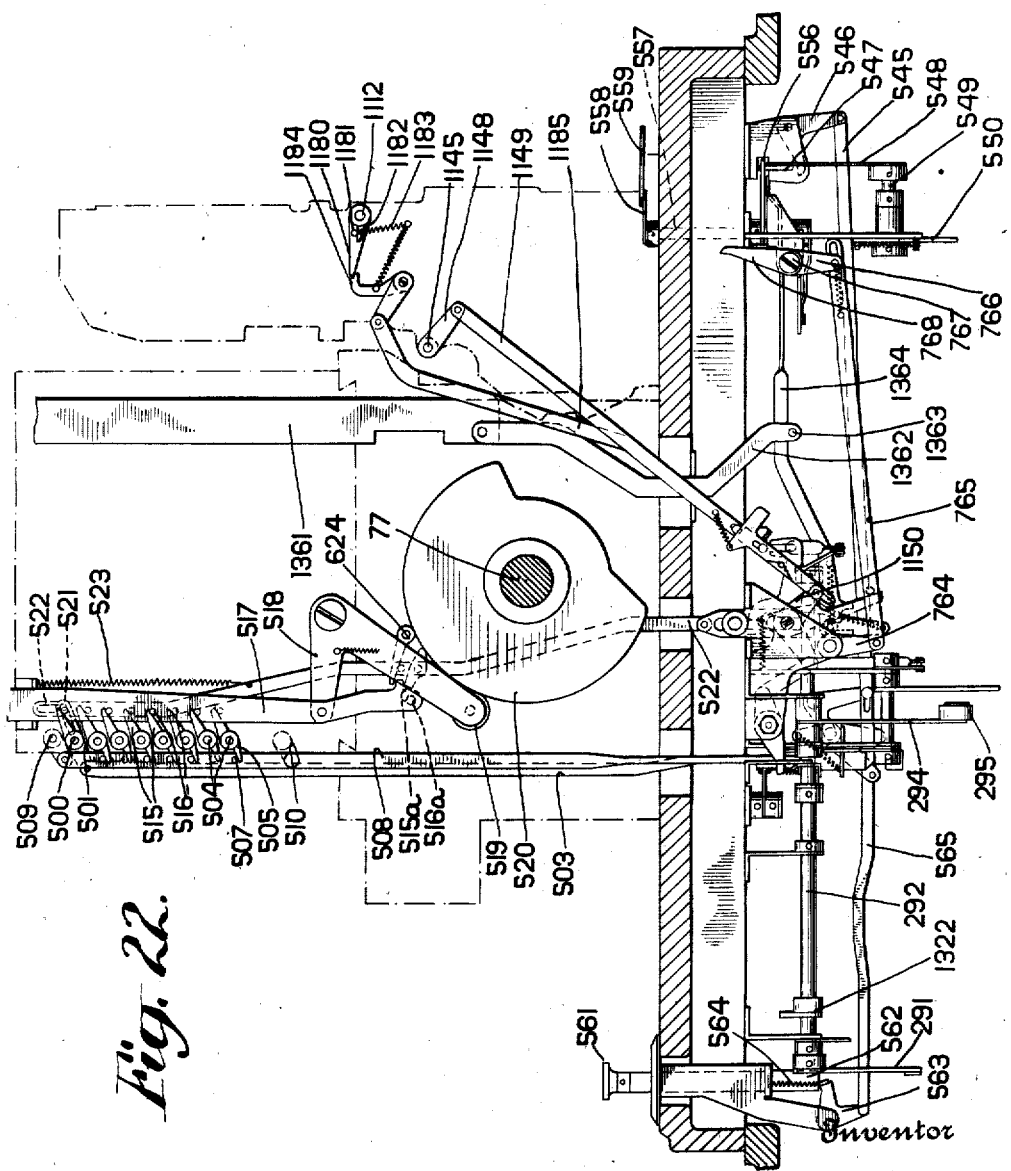

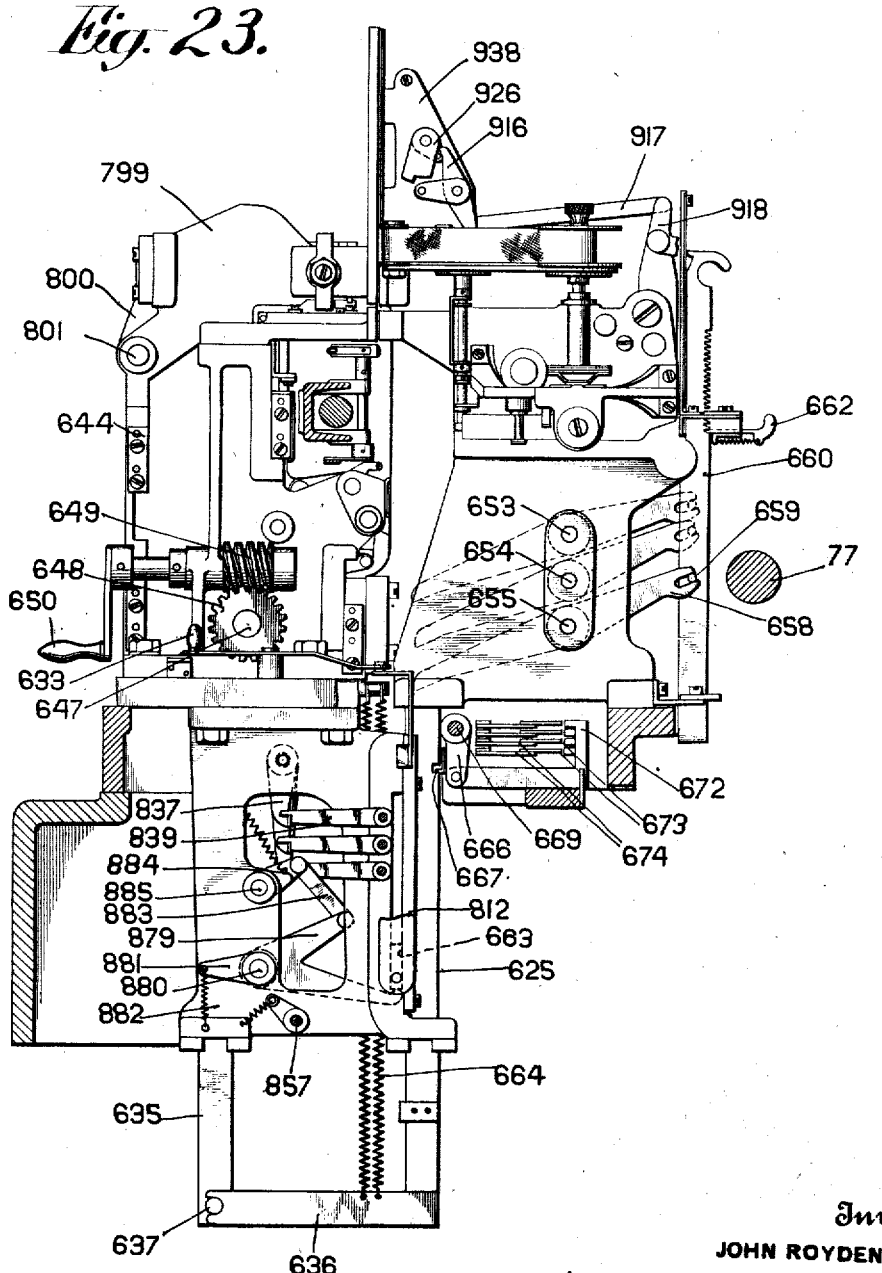

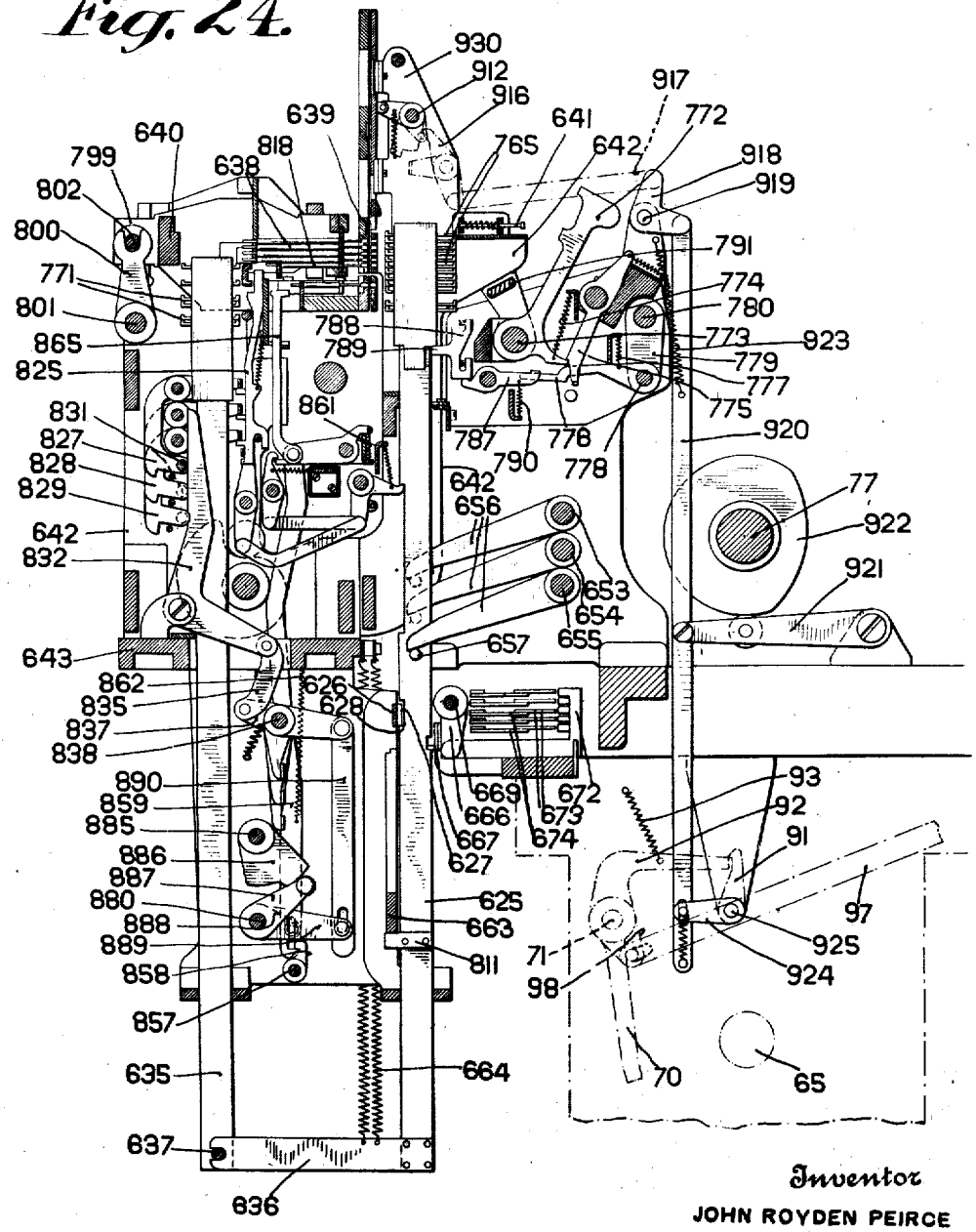

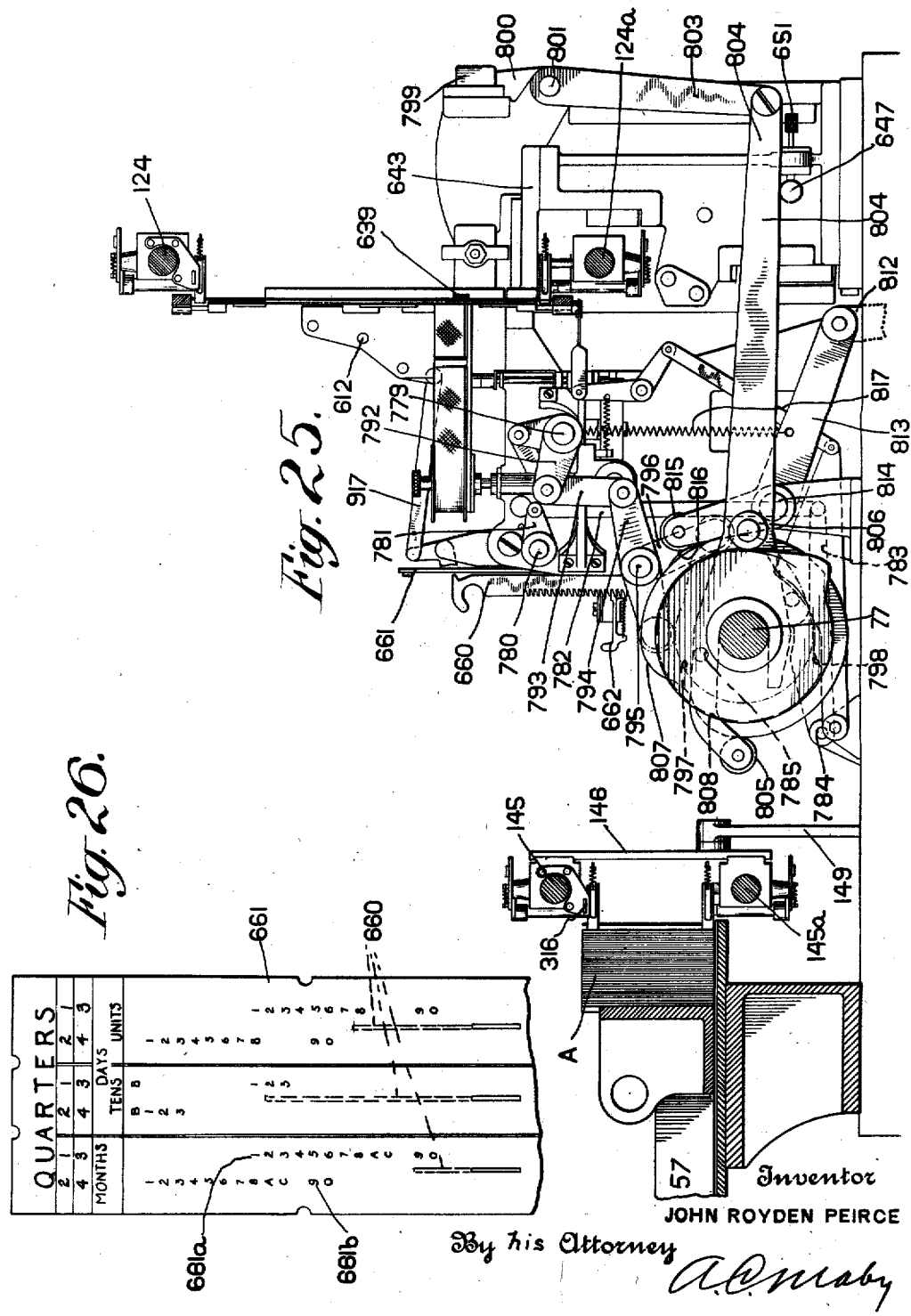

Inventor
JOHN ROYDEN PEIRCE
By his Attorney

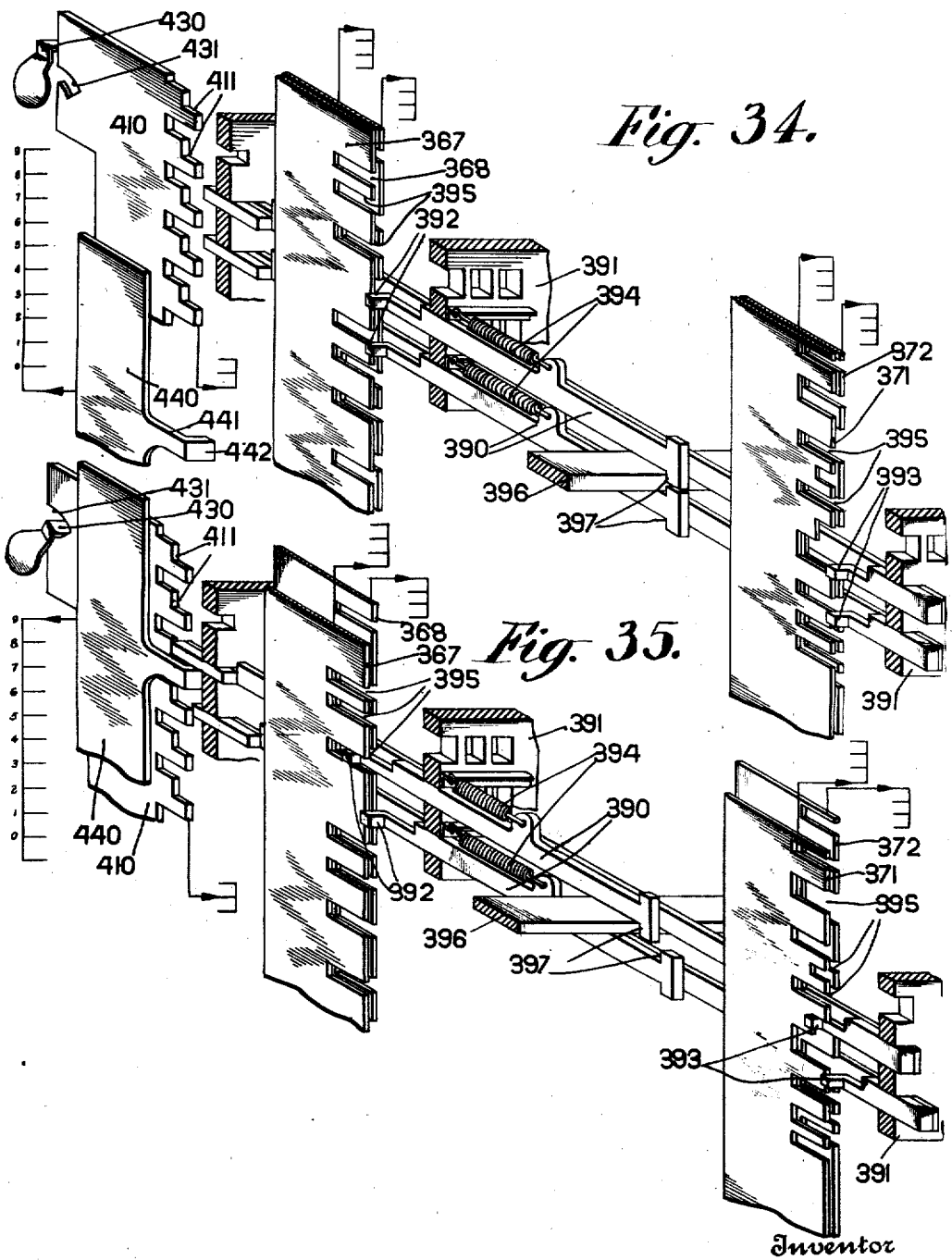

June 7, 1932.   J. R. PEIRCE   1,862,032
RECORD ANALYZING AND POSTING MACHINE
Filed Oct. 28, 1926   73 Sheets-Sheet 27
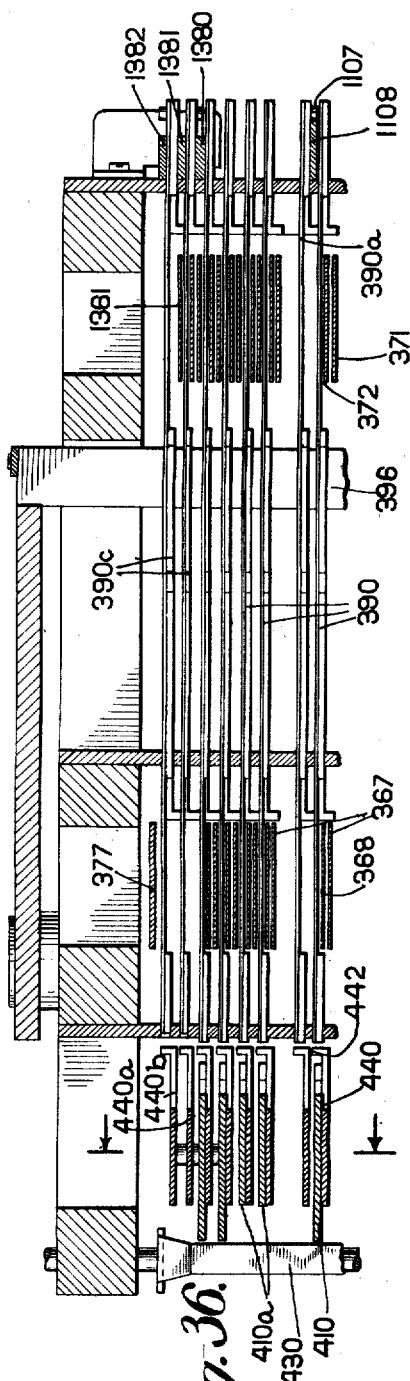
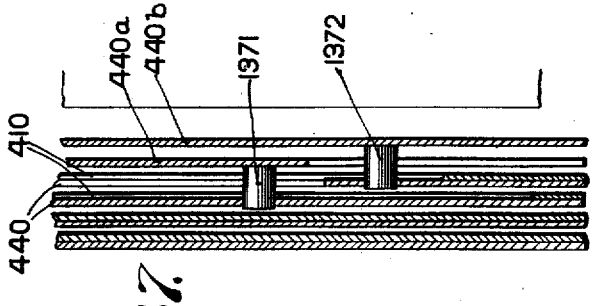
Inventor
JOHN ROYDEN PEIRCE
By his Attorney June 7, 1932.   J. R. PEIRCE   1,862,032
RECORD ANALYZING AND POSTING MACHINE
Filed Oct. 28, 1926   73 Sheets-Sheet 28
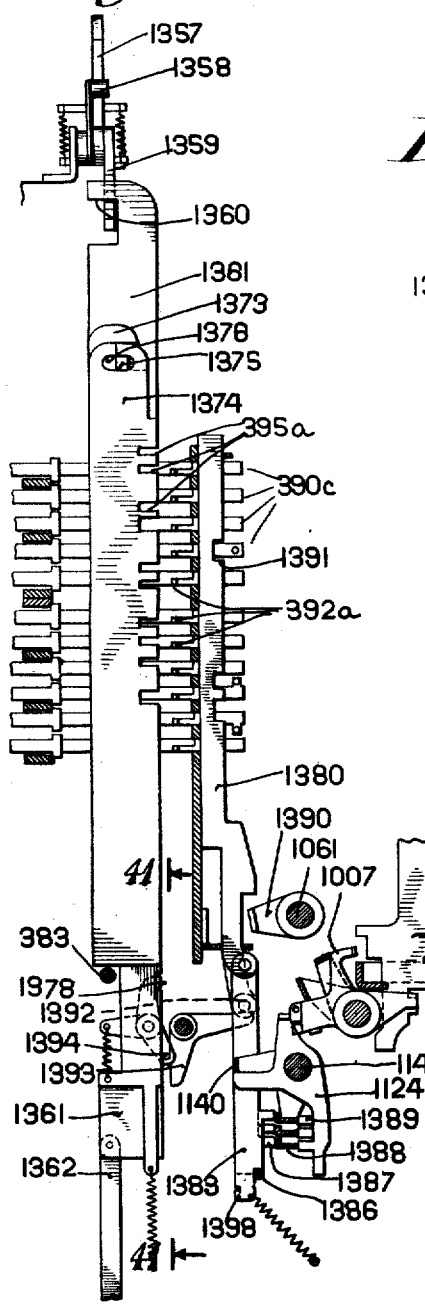
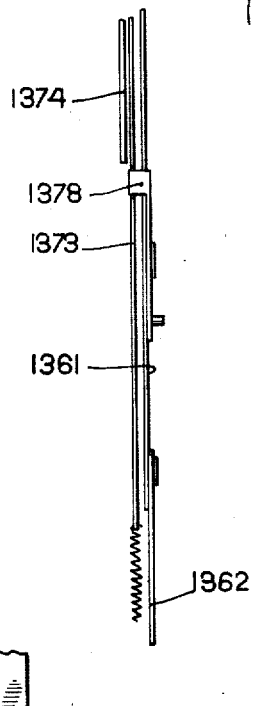
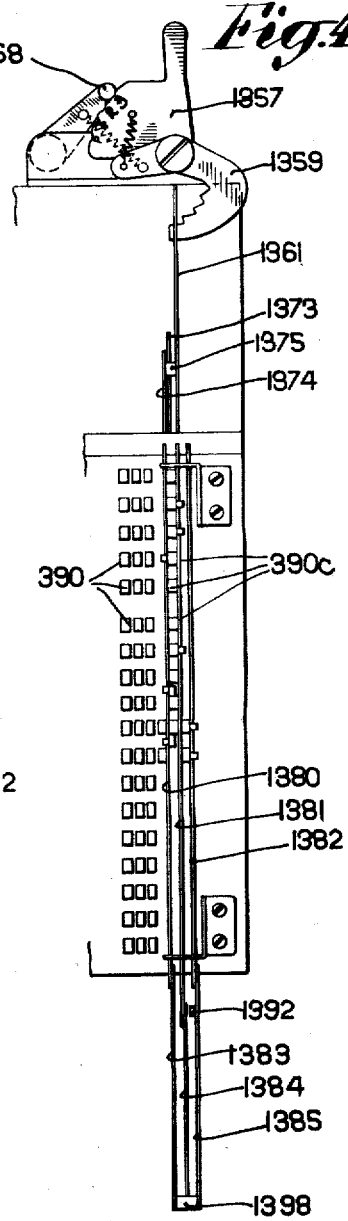
Inventor
JOHN ROYDEN PEIRCE
By his Attorney

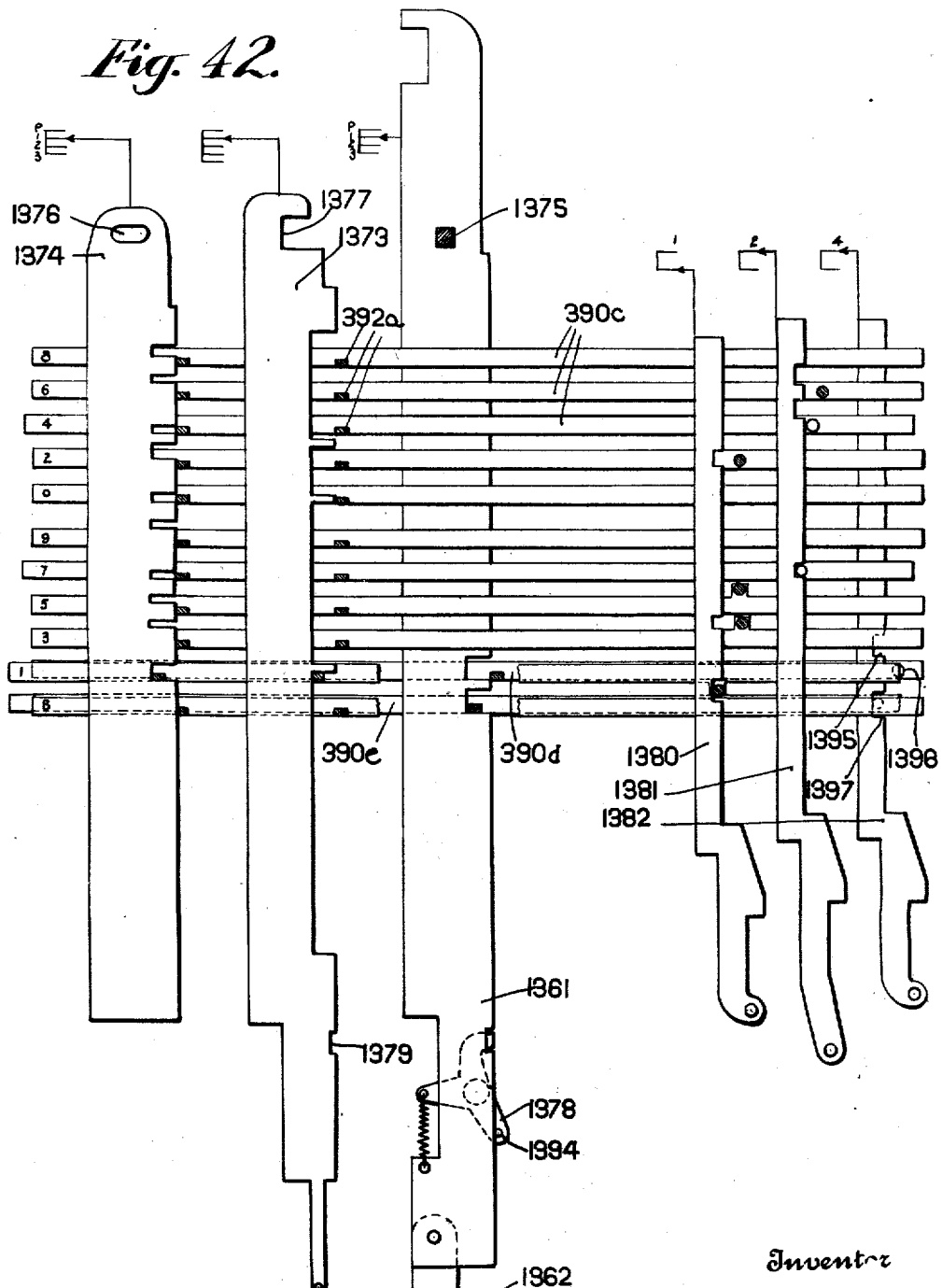

June 7, 1932.   J. R. PEIRCE   1,862,032
RECORD ANALYZING AND POSTING MACHINE
Filed Oct. 28, 1926   73 Sheets-Sheet 30
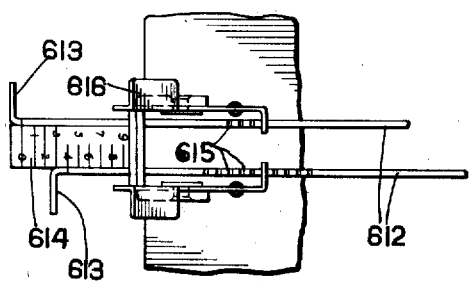
Fig. 44.
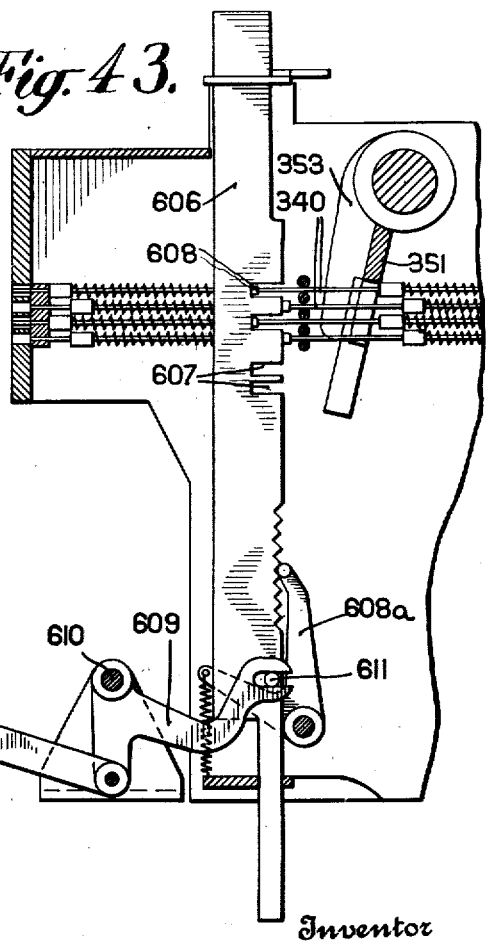
Fig. 43.
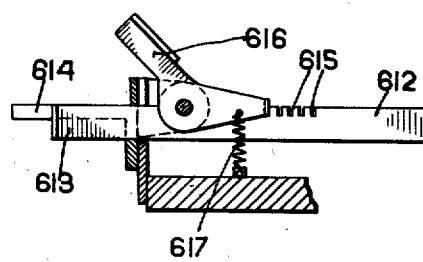
Inventor
JOHN ROYDEN PEIRCE
By his Attorney June 7, 1932. J. R. PEIRCE 1,862,032
RECORD ANALYZING AND POSTING MACHINE
Filed Oct. 28, 1926 73 Sheets-Sheet 31
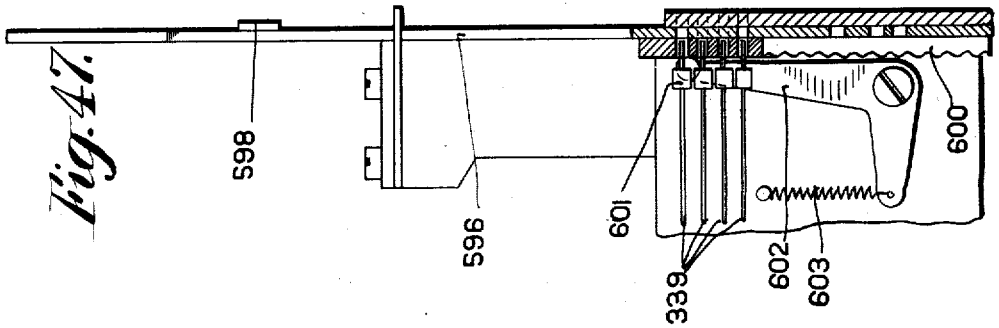
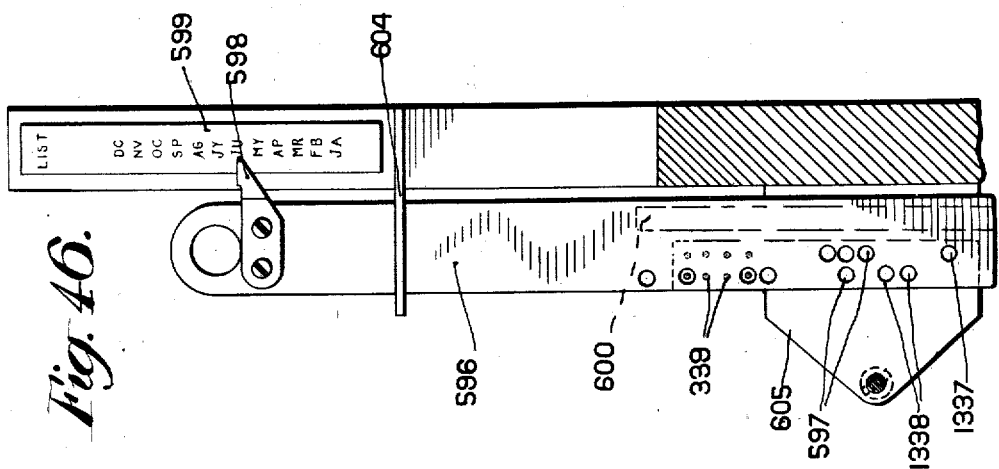
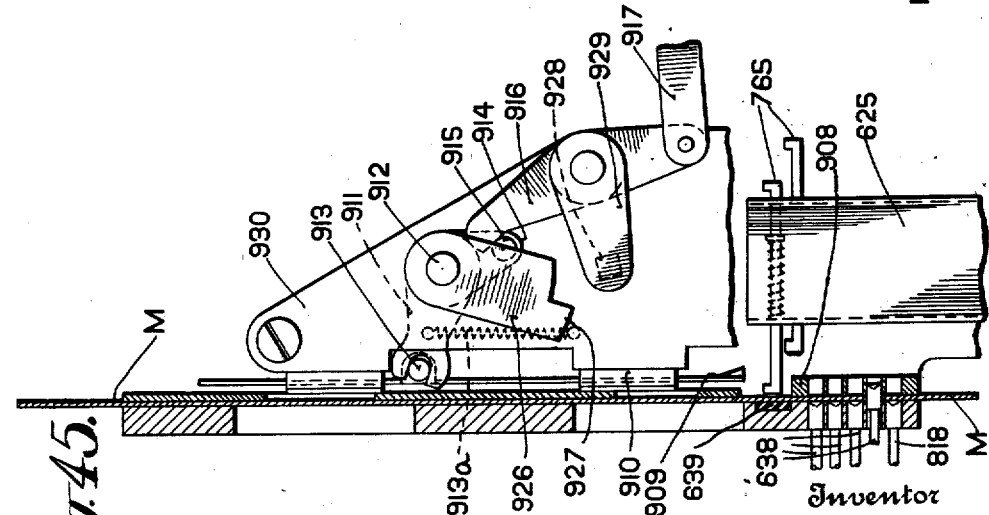
Inventor
JOHN ROYDEN PEIRCE
By his Attorney June 7, 1932. J. R. PEIRCE 1,862,032
RECORD ANALYZING AND POSTING MACHINE
Filed Oct. 28, 1926 73 Sheets-Sheet 32
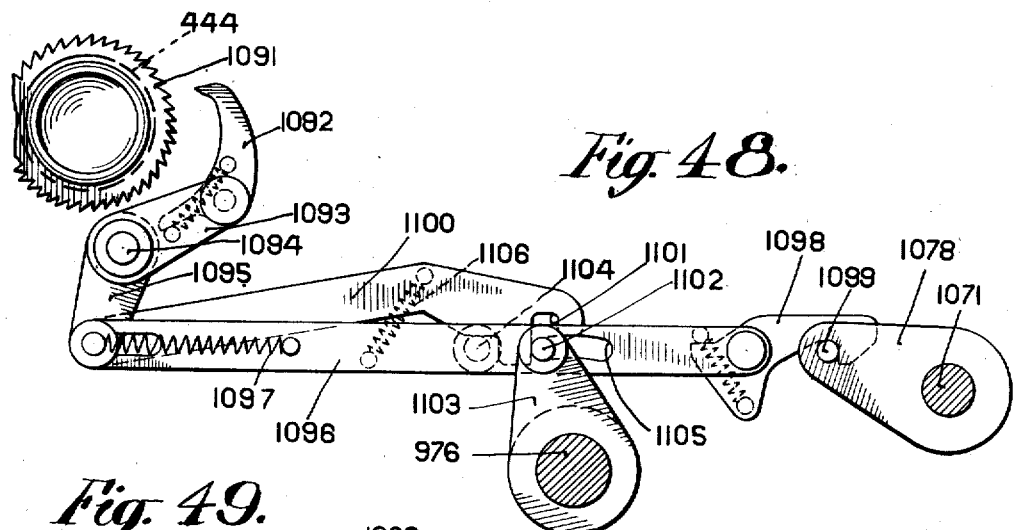
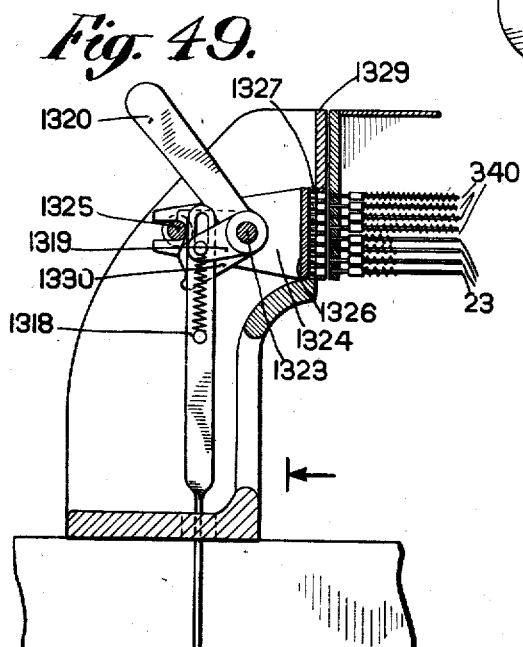
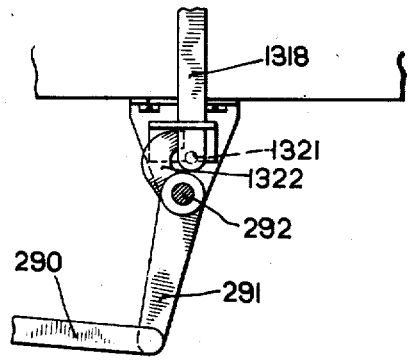
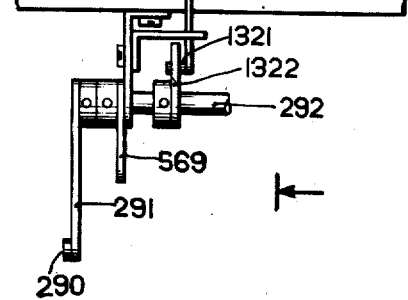
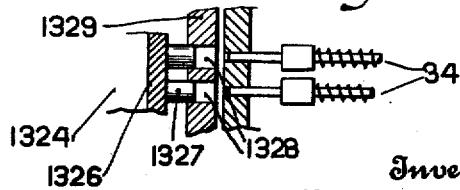
Inventor
JOHN ROYDEN PEIRCE
By his Attorney June 7, 1932.   J. R. PEIRCE   1,862,032
RECORD ANALYZING AND POSTING MACHINE
Filed Oct. 28, 1926   73 Sheets-Sheet 33
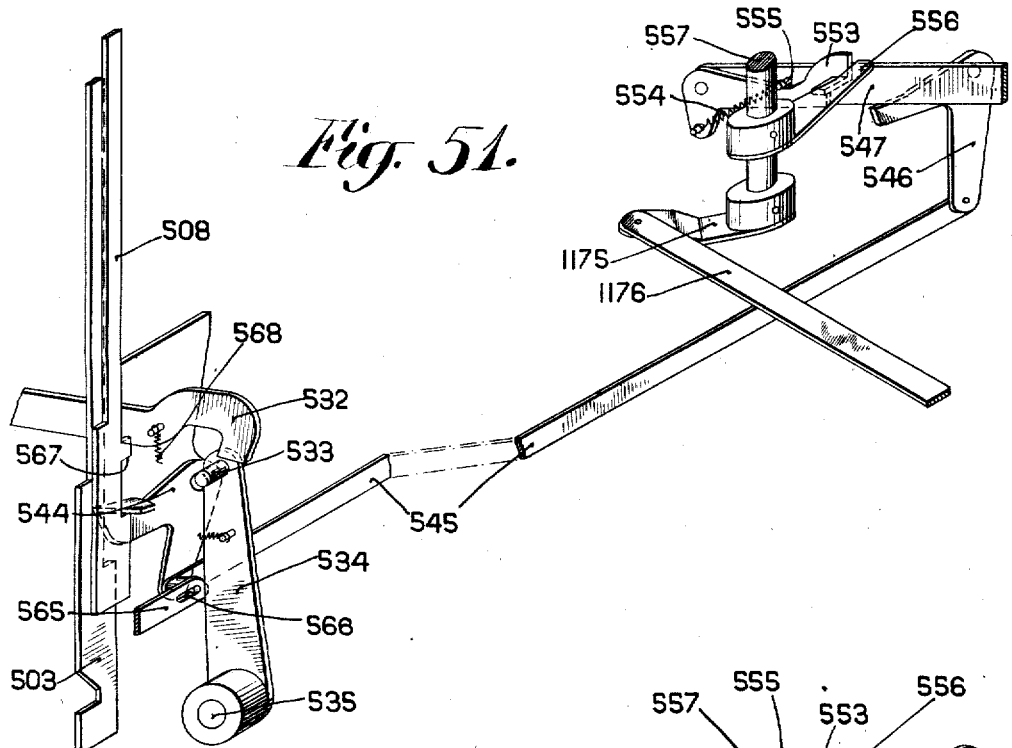
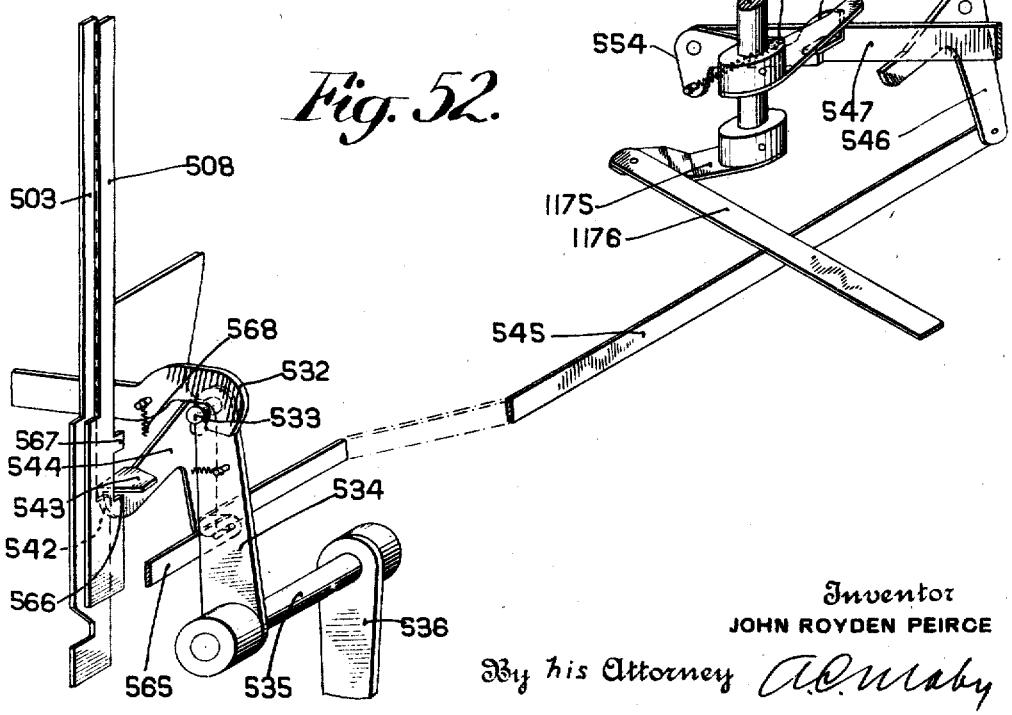
Inventor
JOHN ROYDEN PEIRCE
By his Attorney June 7, 1932.  J. R. PEIRCE  1,862,032
RECORD ANALYZING AND POSTING MACHINE
Filed Oct. 28, 1926  73 Sheets-Sheet 34
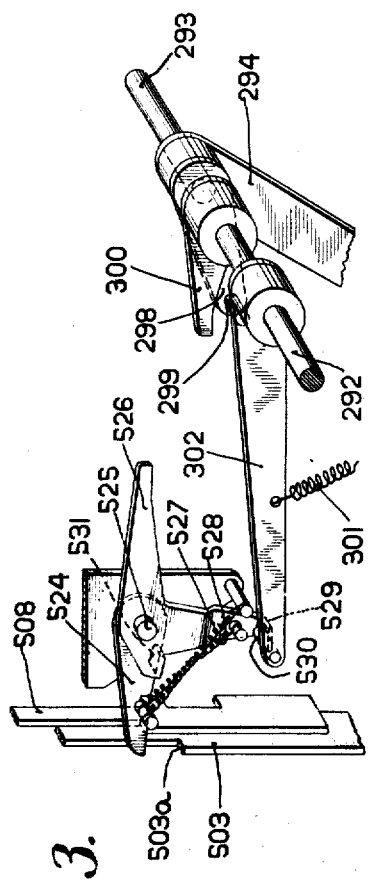
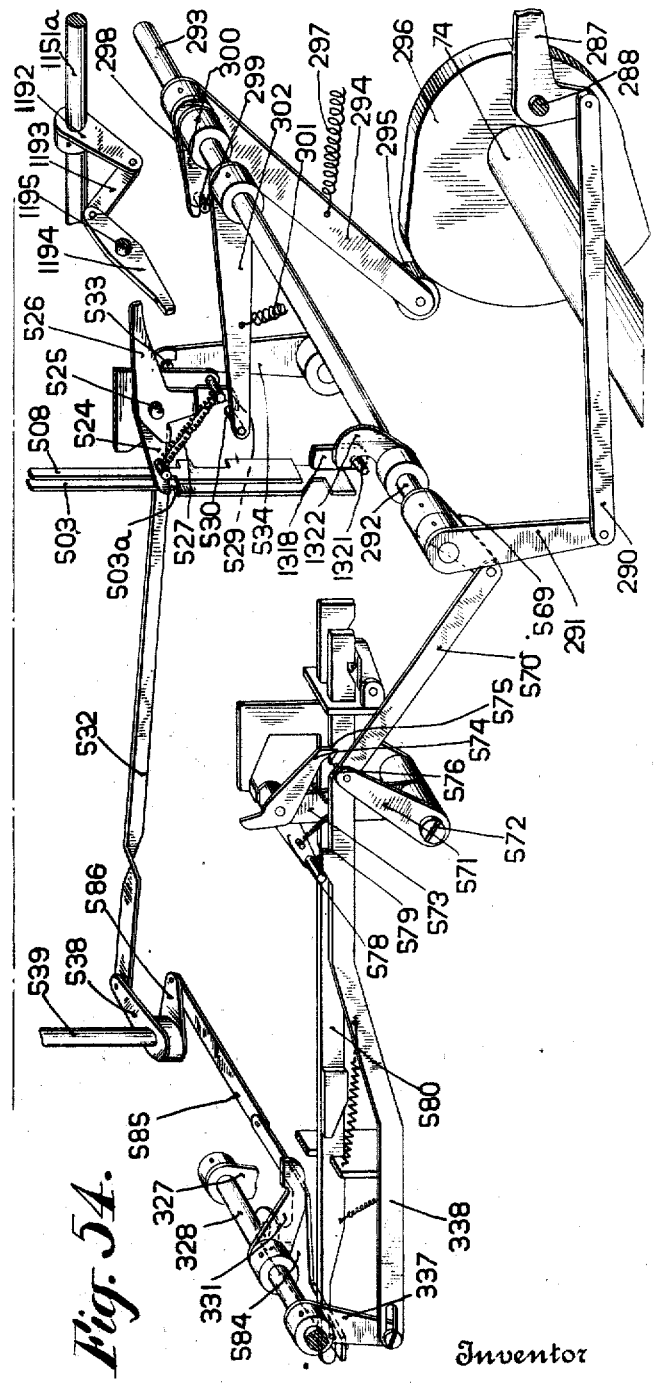
Inventor
JOHN ROYDEN PEIRCE
By his Attorney June 7, 1932. J. R. PEIRCE 1,862,032
RECORD ANALYZING AND POSTING MACHINE
Filed Oct. 28, 1926 73 Sheets-Sheet 35
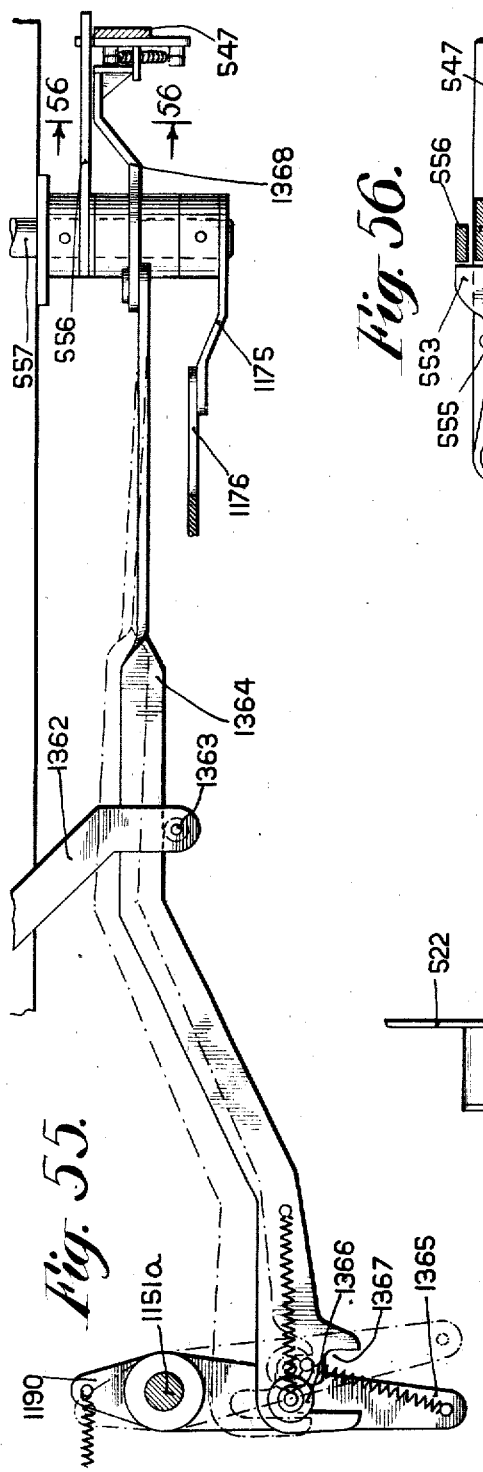
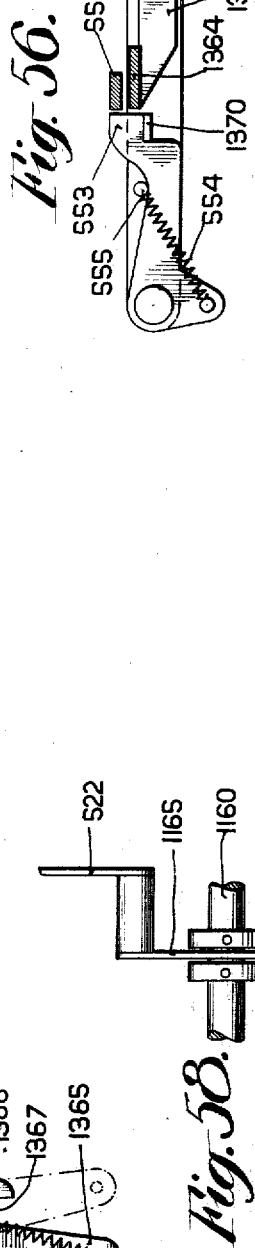
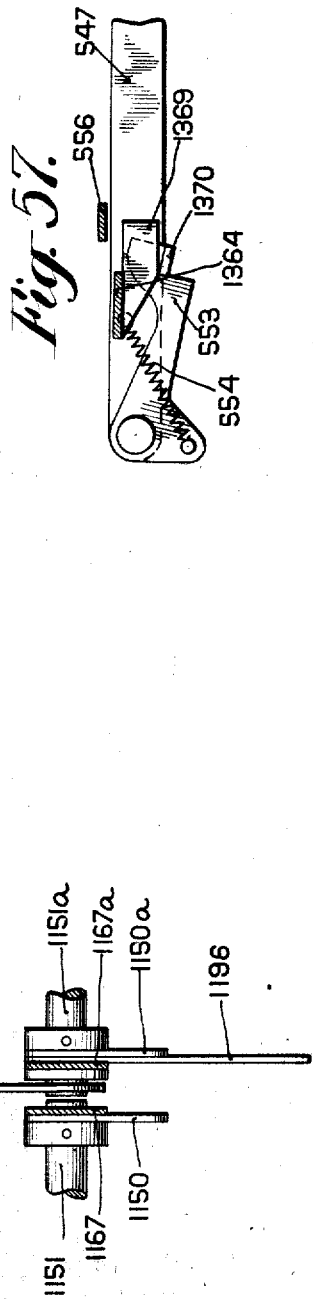
Inventor
JOHN ROYDEN PEIRCE
By his Attorney

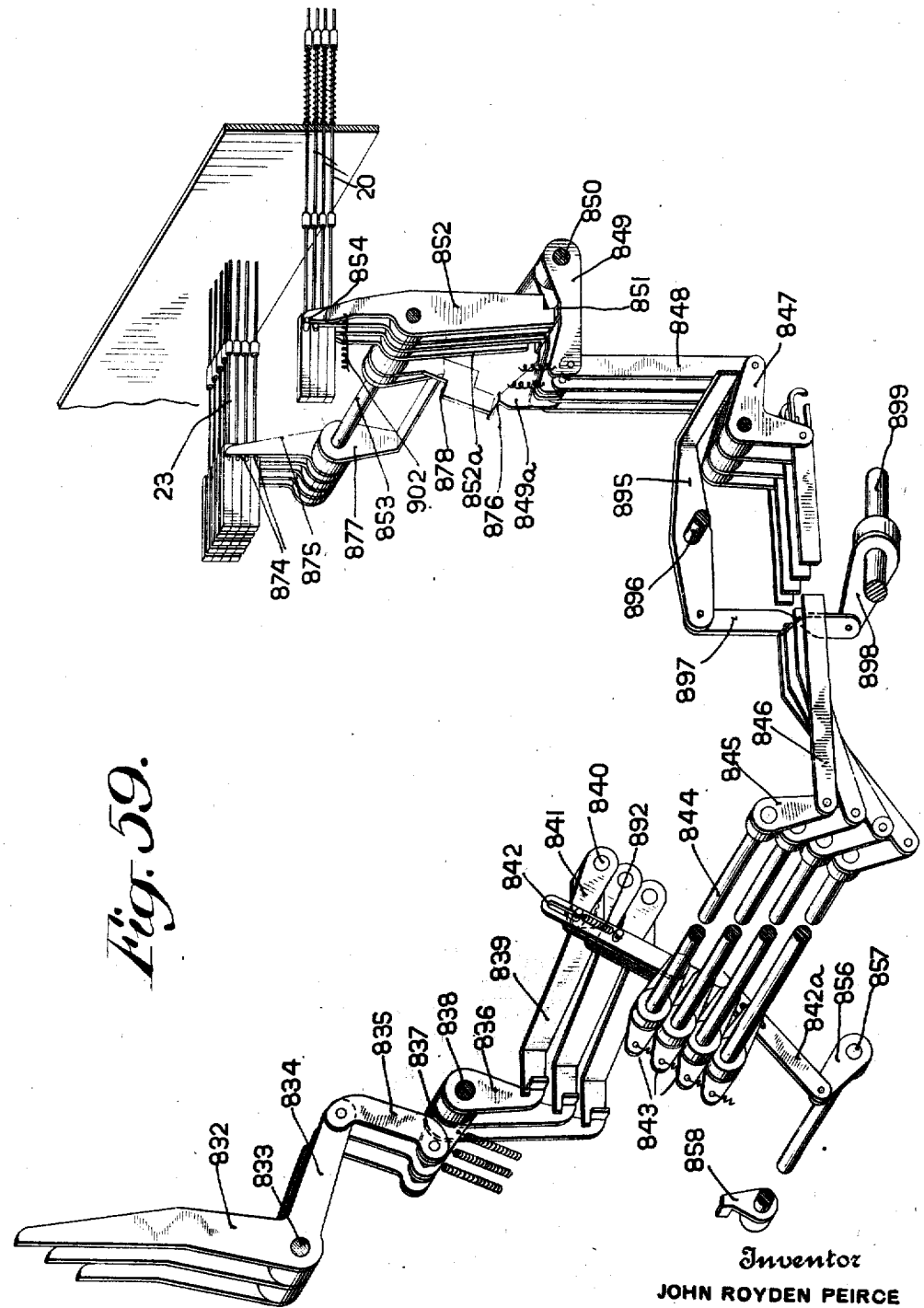

June 7, 1932.  J. R. PEIRCE  1,862,032
RECORD ANALYZING AND POSTING MACHINE
Filed Oct. 28, 1926  73 Sheets-Sheet 37
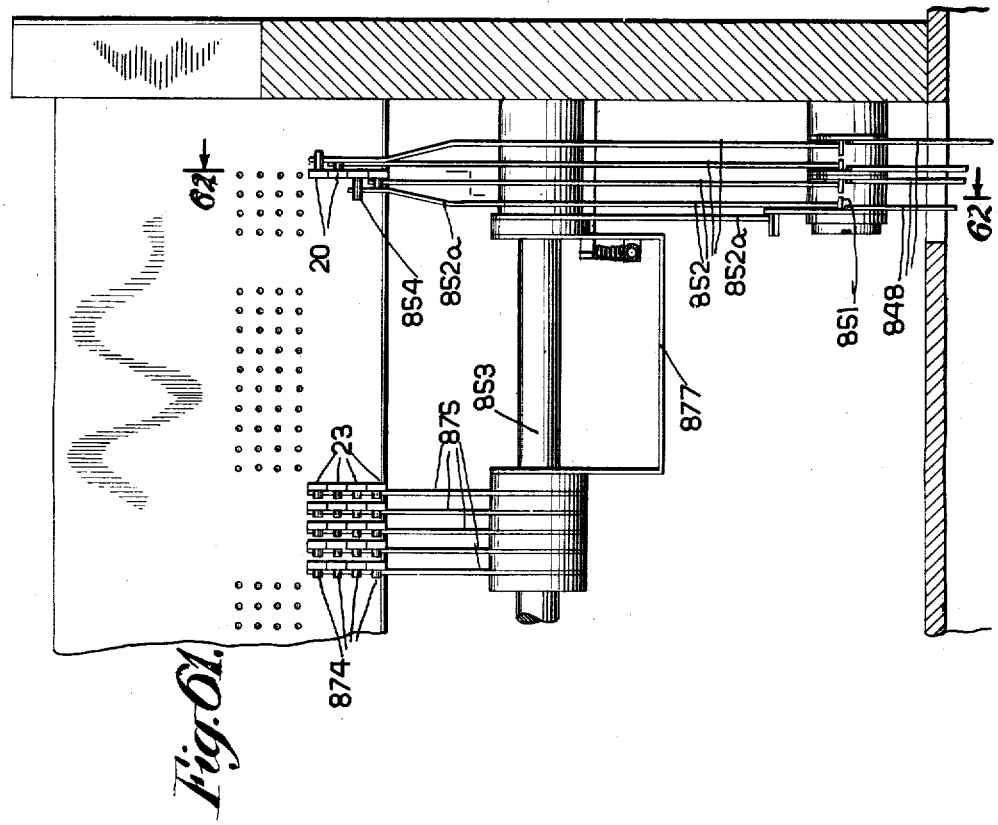
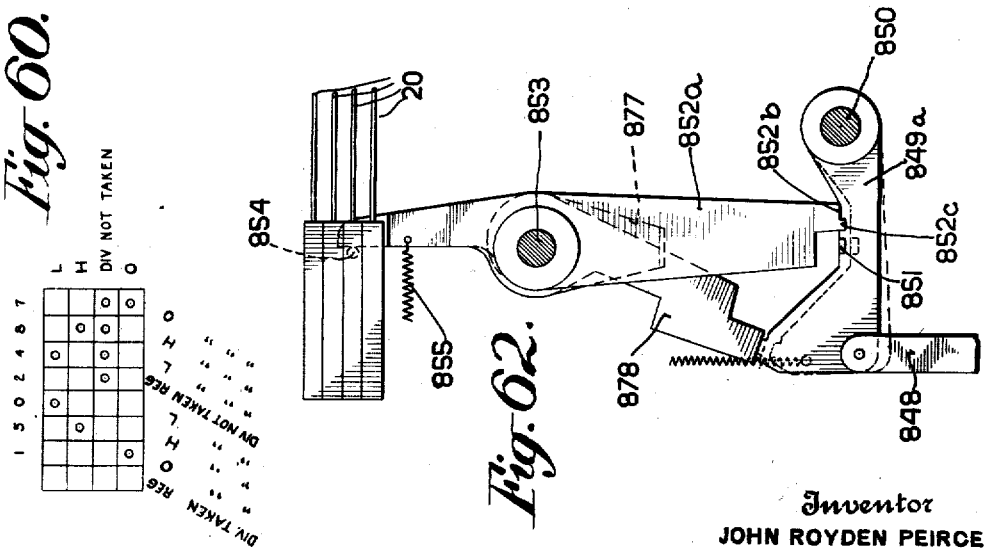
Inventor
JOHN ROYDEN PEIRCE
By his Attorney

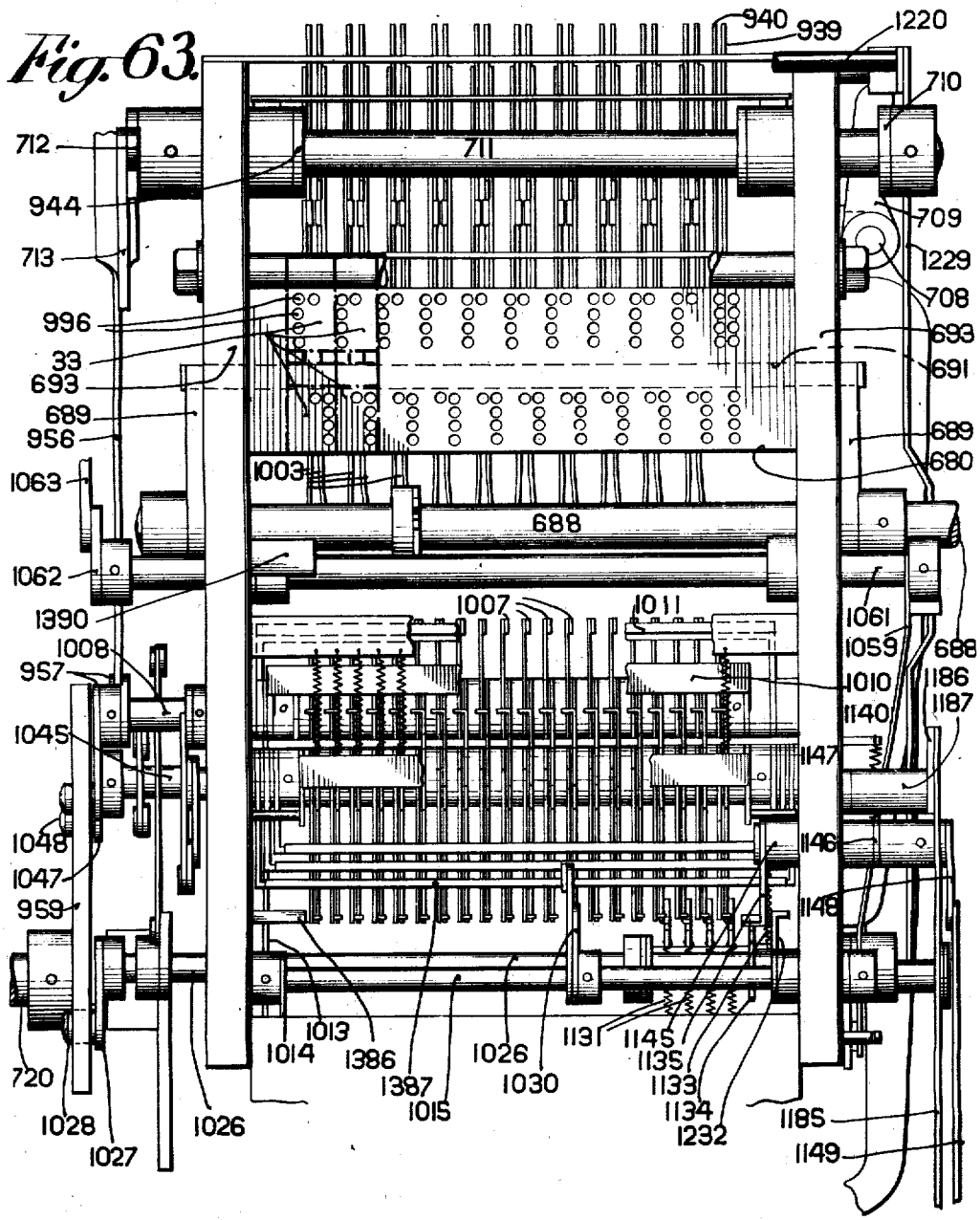

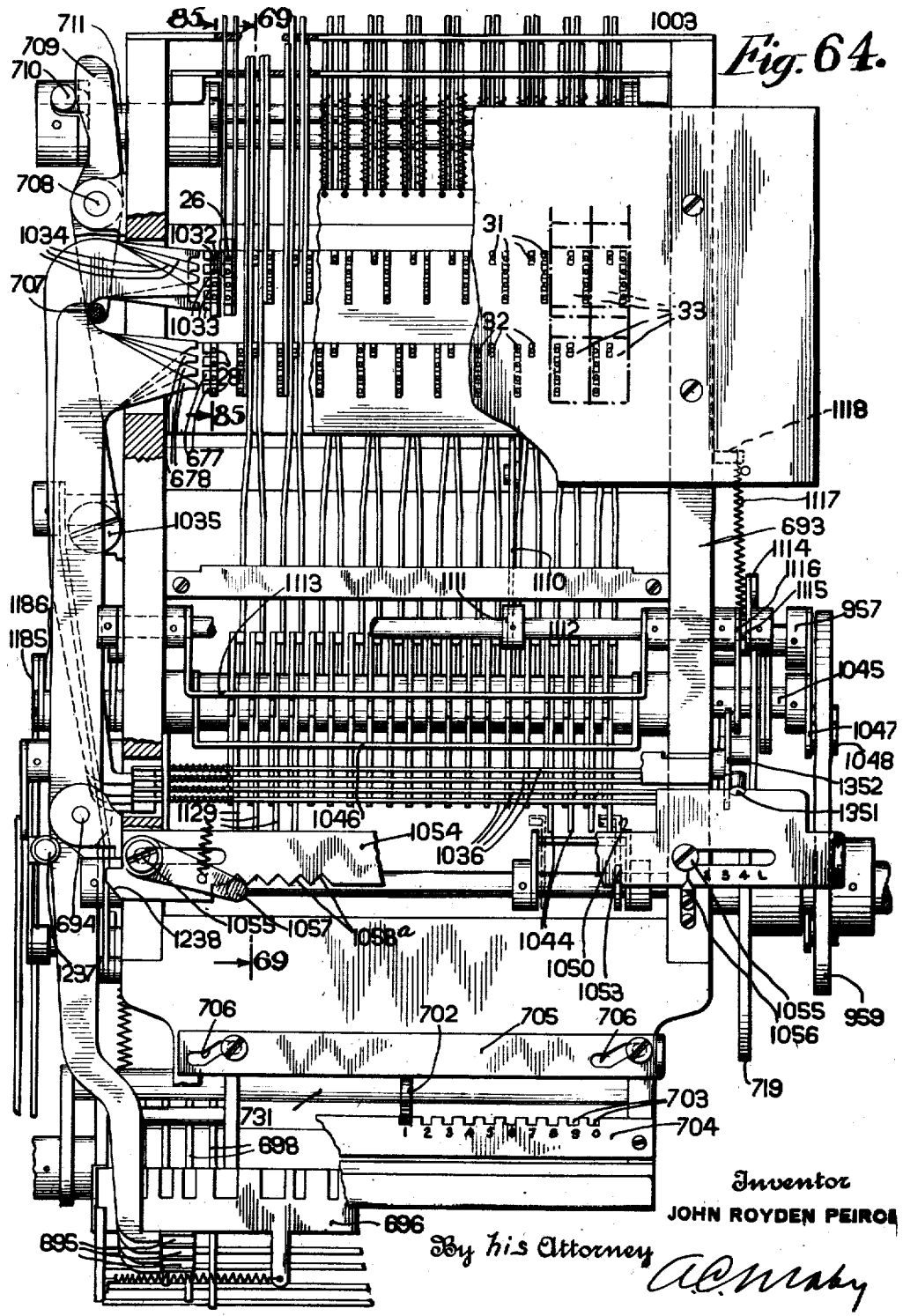

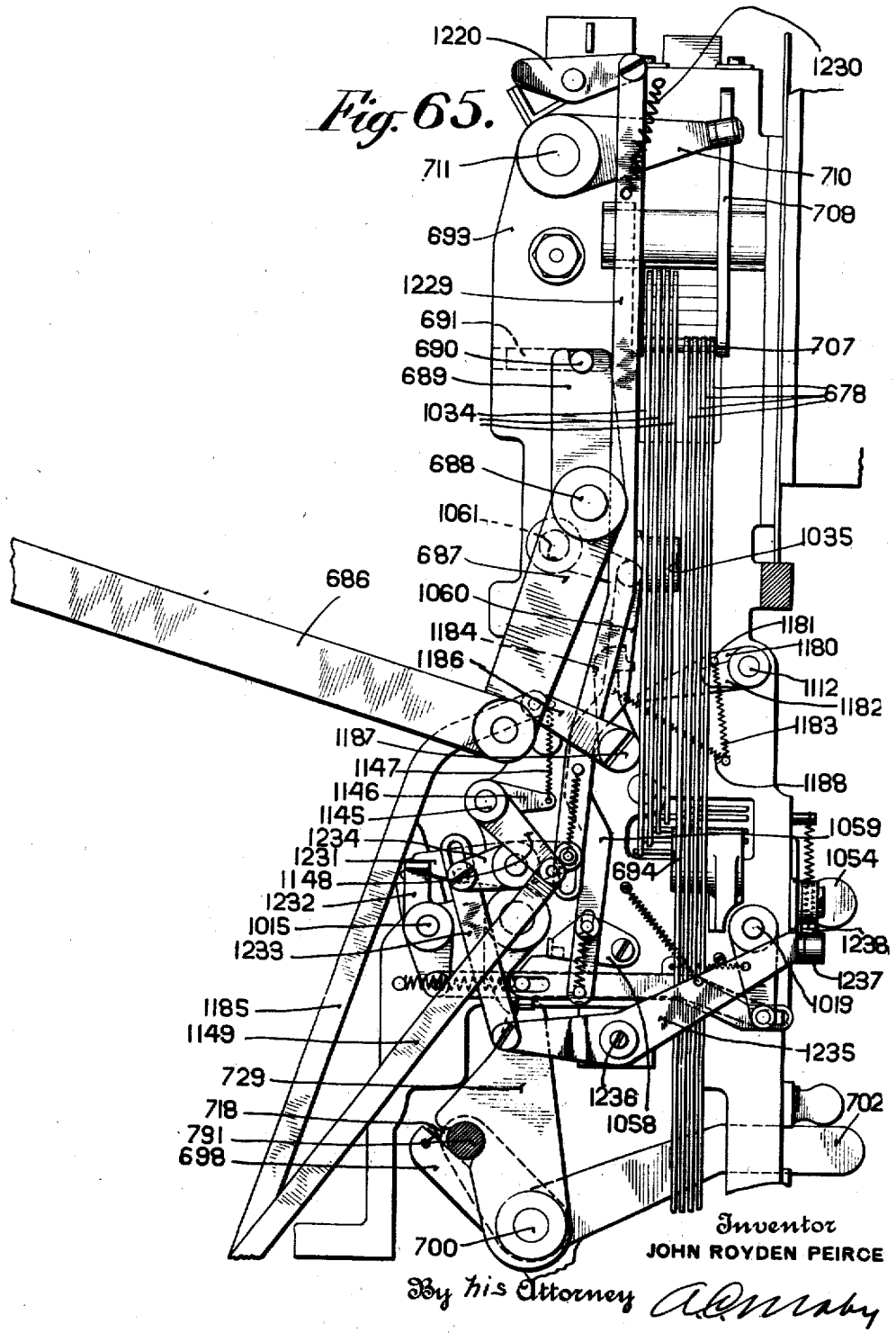

June 7, 1932. J. R. PEIRCE 1,862,032
RECORD ANALYZING AND POSTING MACHINE
Filed Oct. 28, 1926 73 Sheets-Sheet 42

Inventor
JOHN ROYDEN PEIRCE
By his Attorney

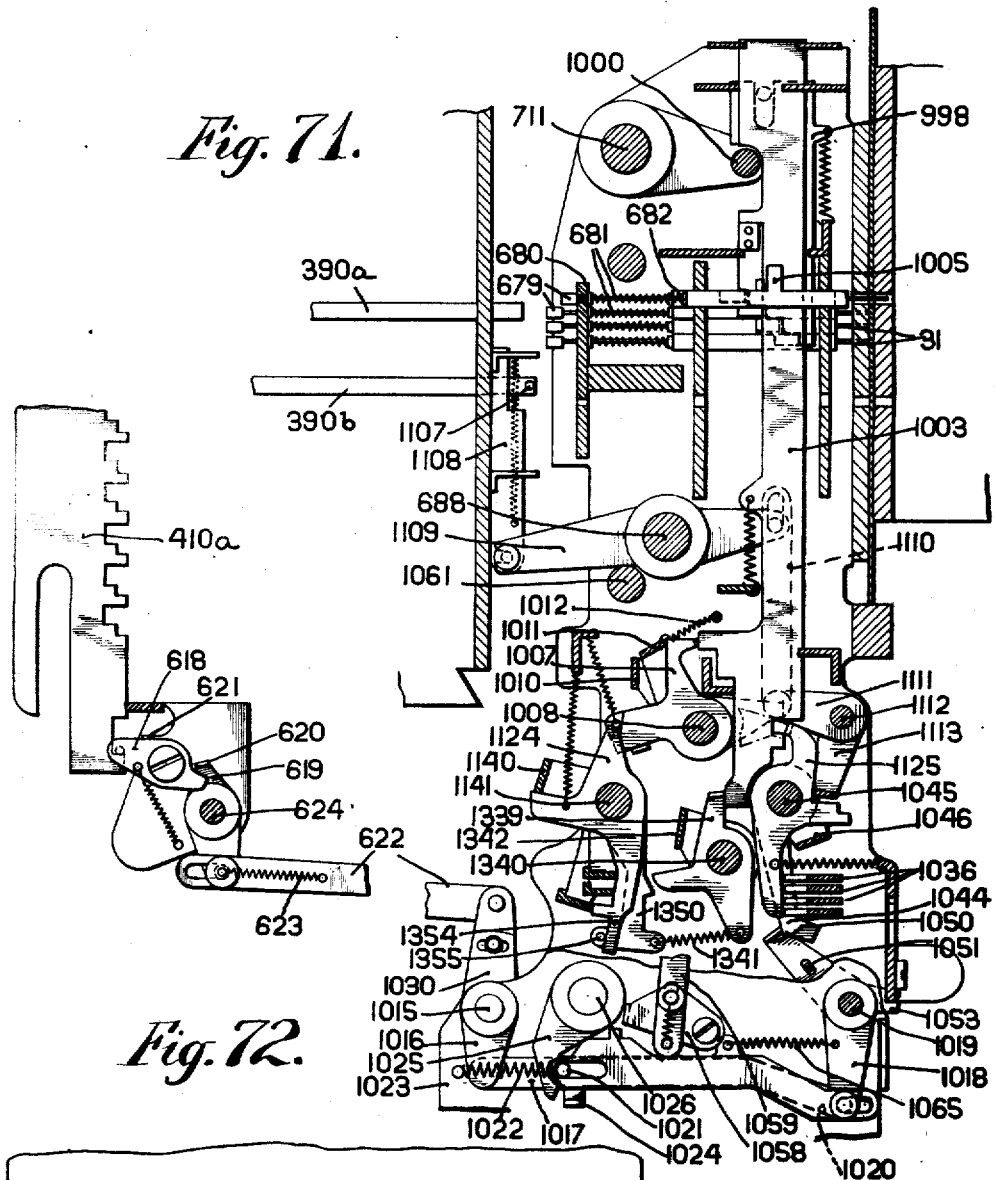

June 7, 1932.　　　J. R. PEIRCE　　　1,862,032
RECORD ANALYZING AND POSTING MACHINE
Filed Oct. 28, 1926　　　73 Sheets-Sheet 44

Inventor
JOHN ROYDEN PEIRCE
By his Attorney

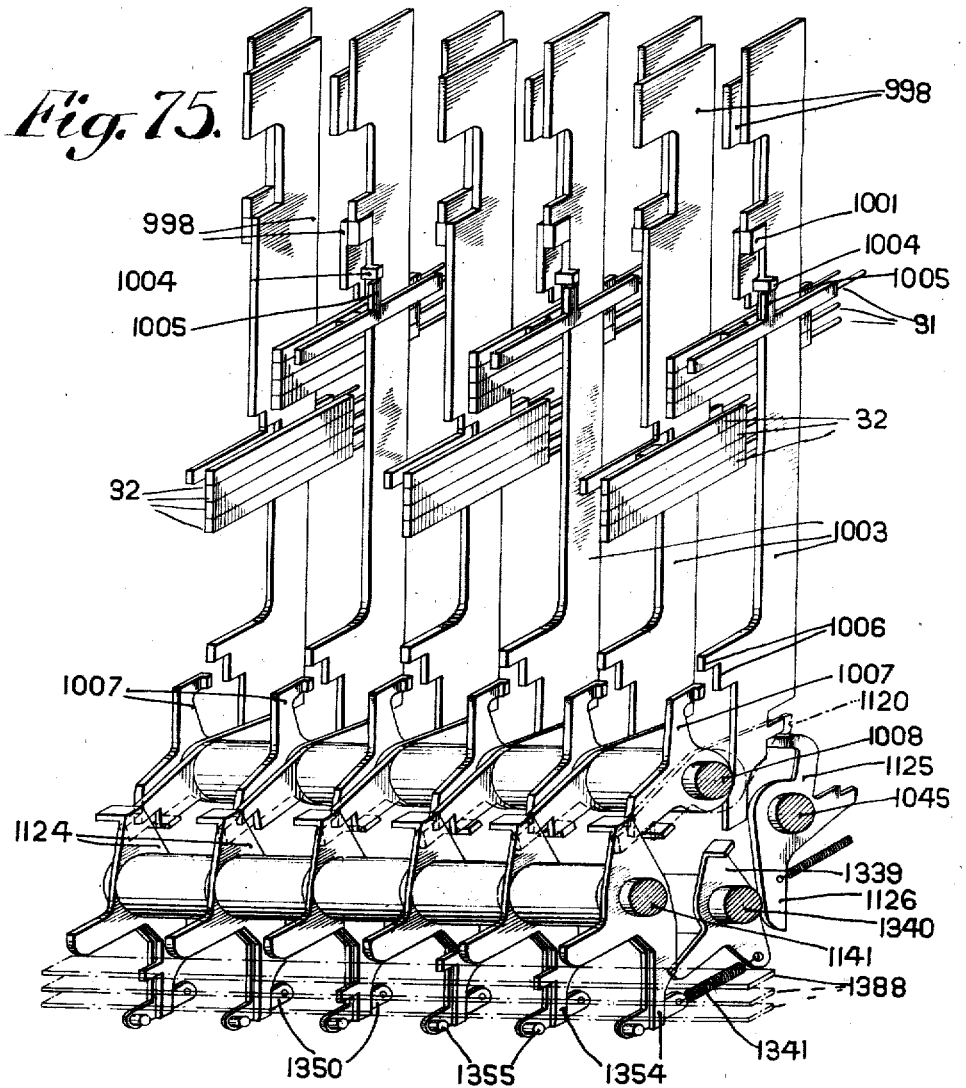
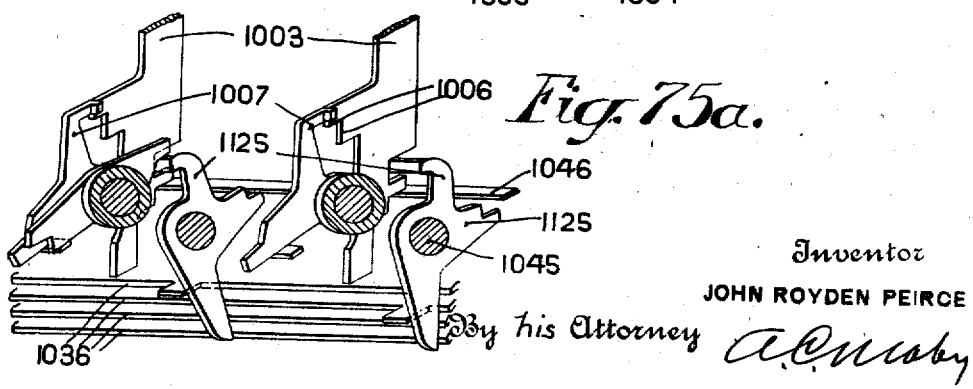

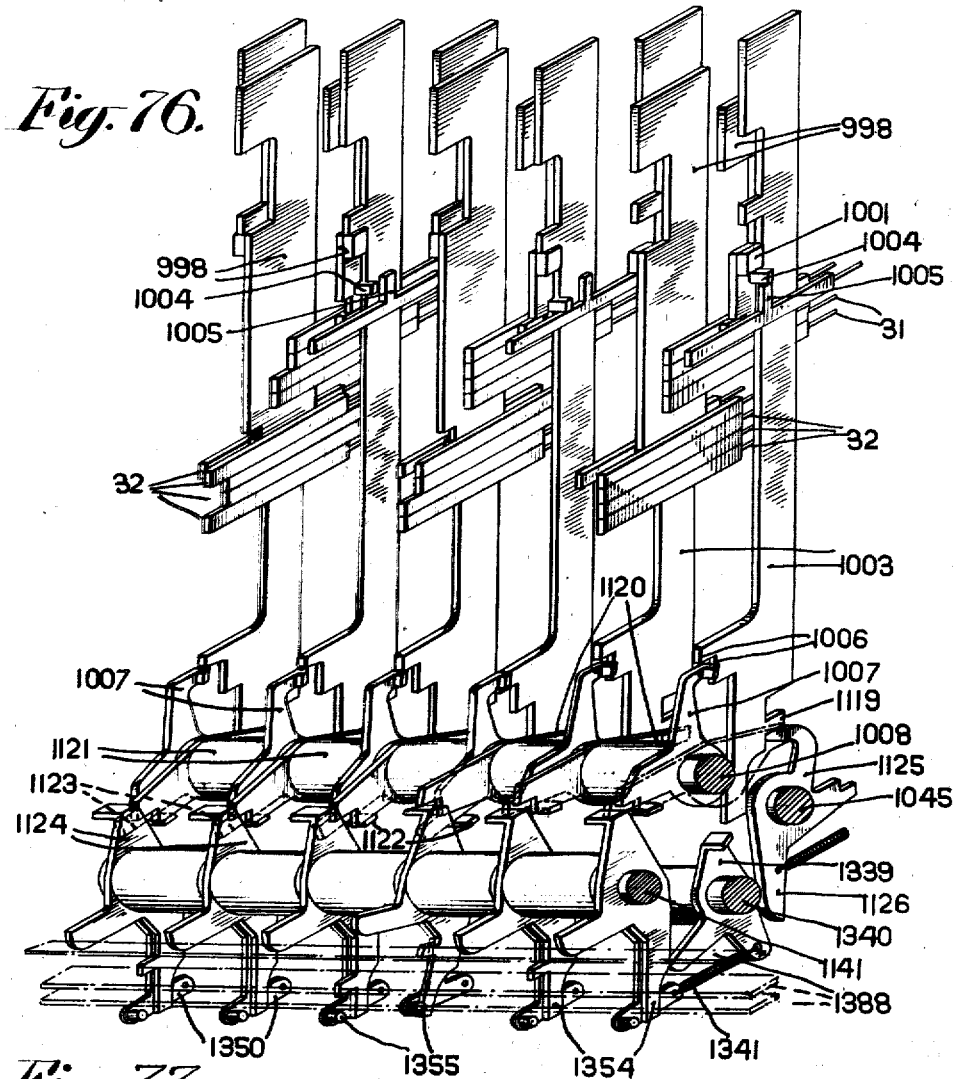

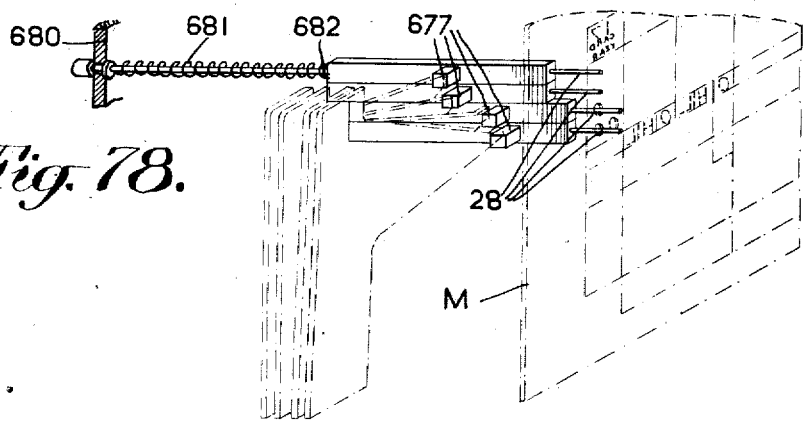
Fig. 78.
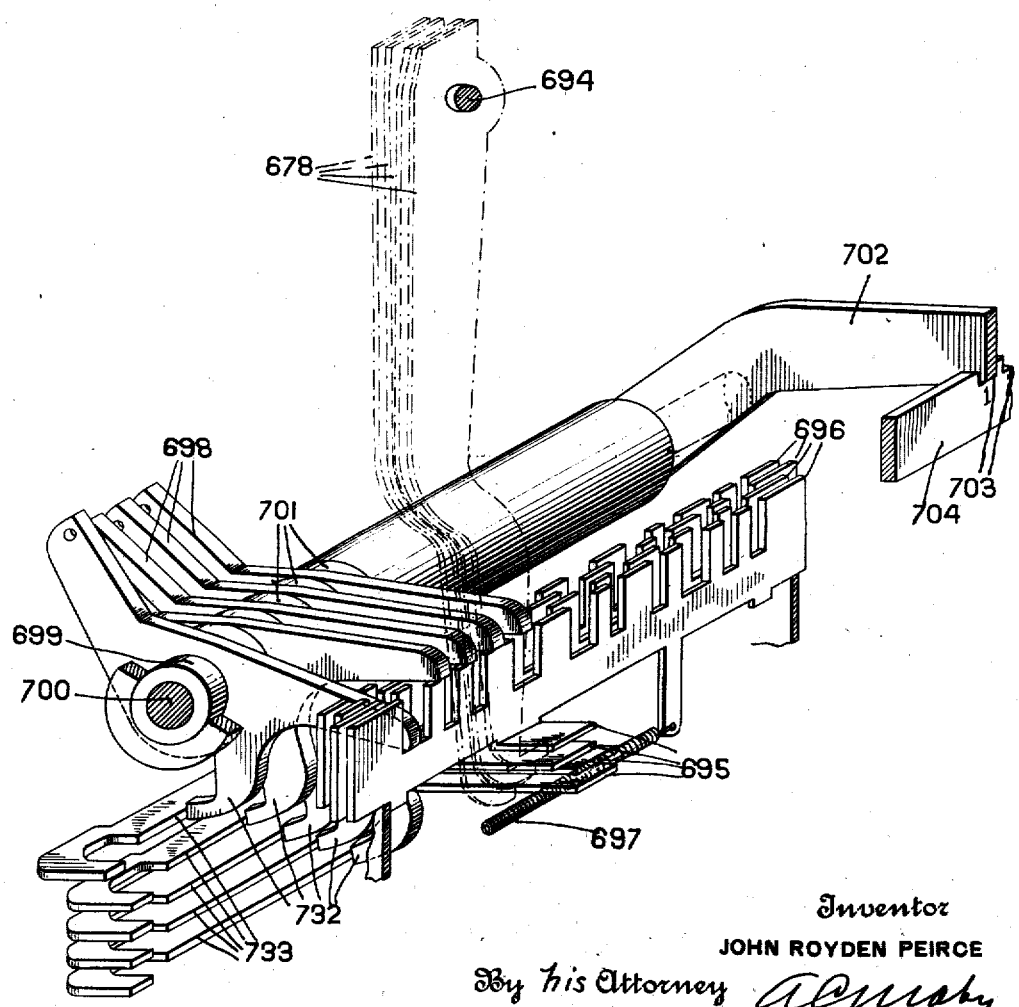
Inventor
JOHN ROYDEN PEIRCE
By his Attorney

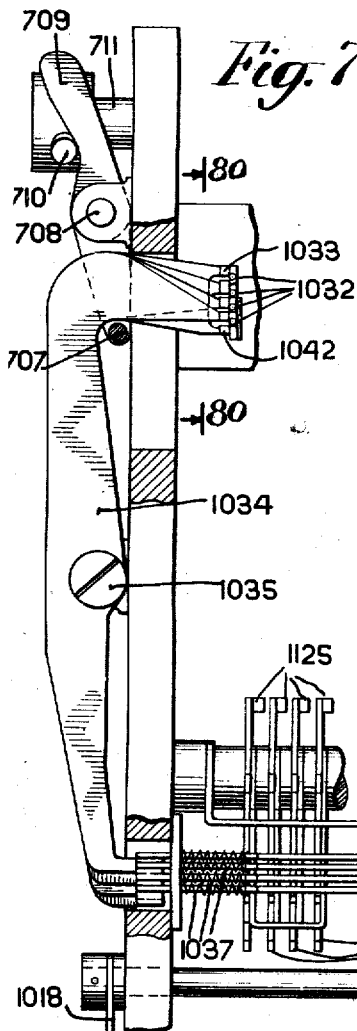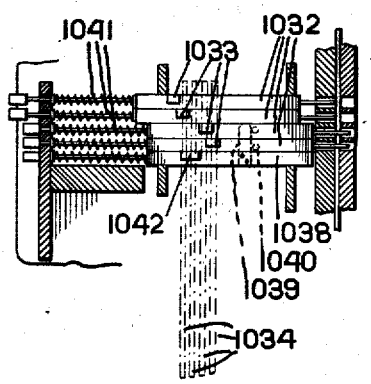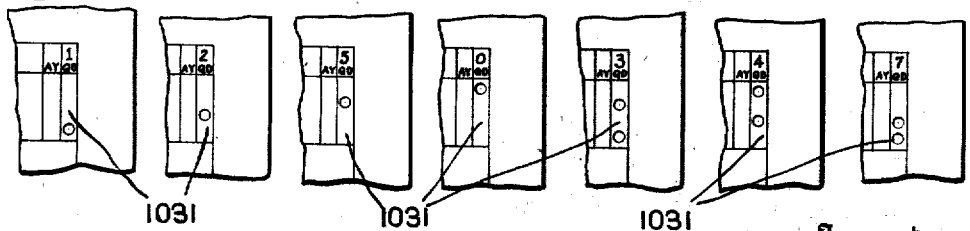

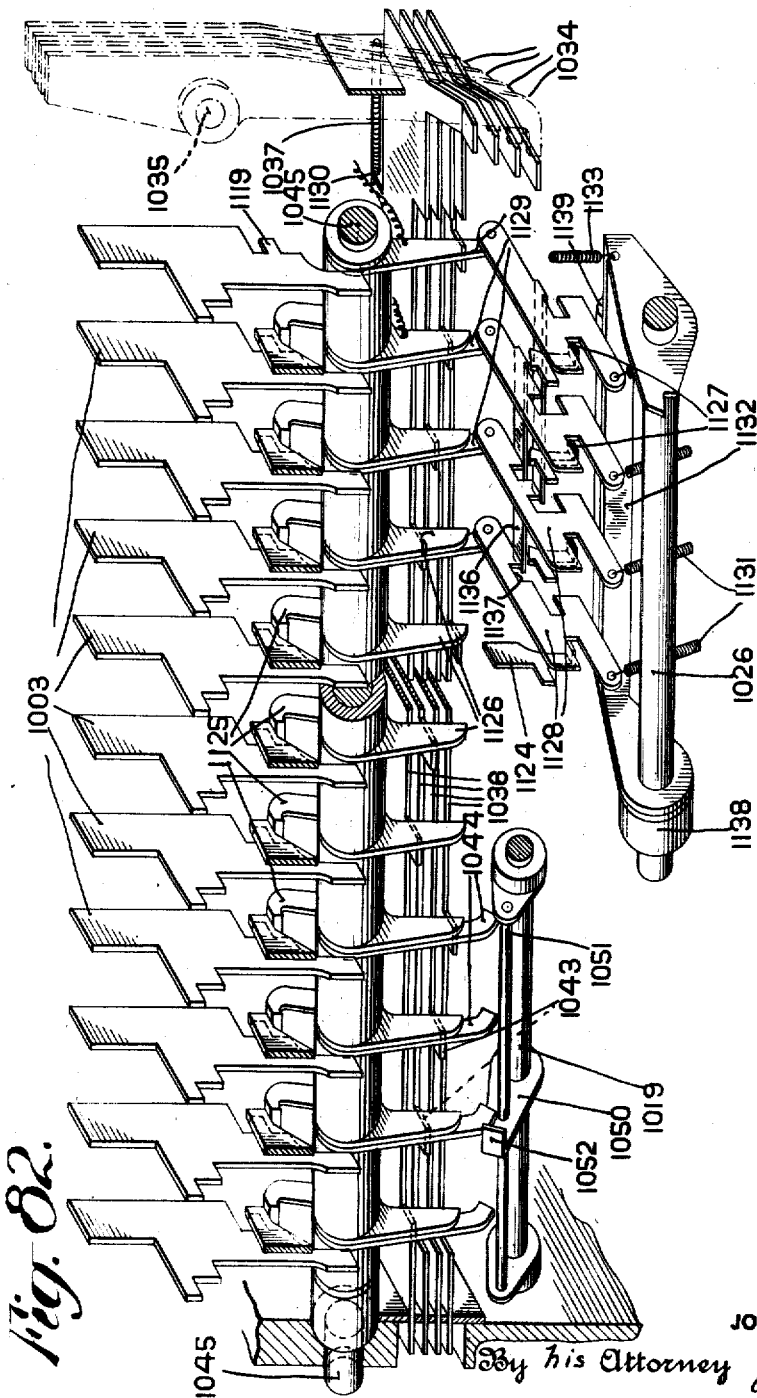

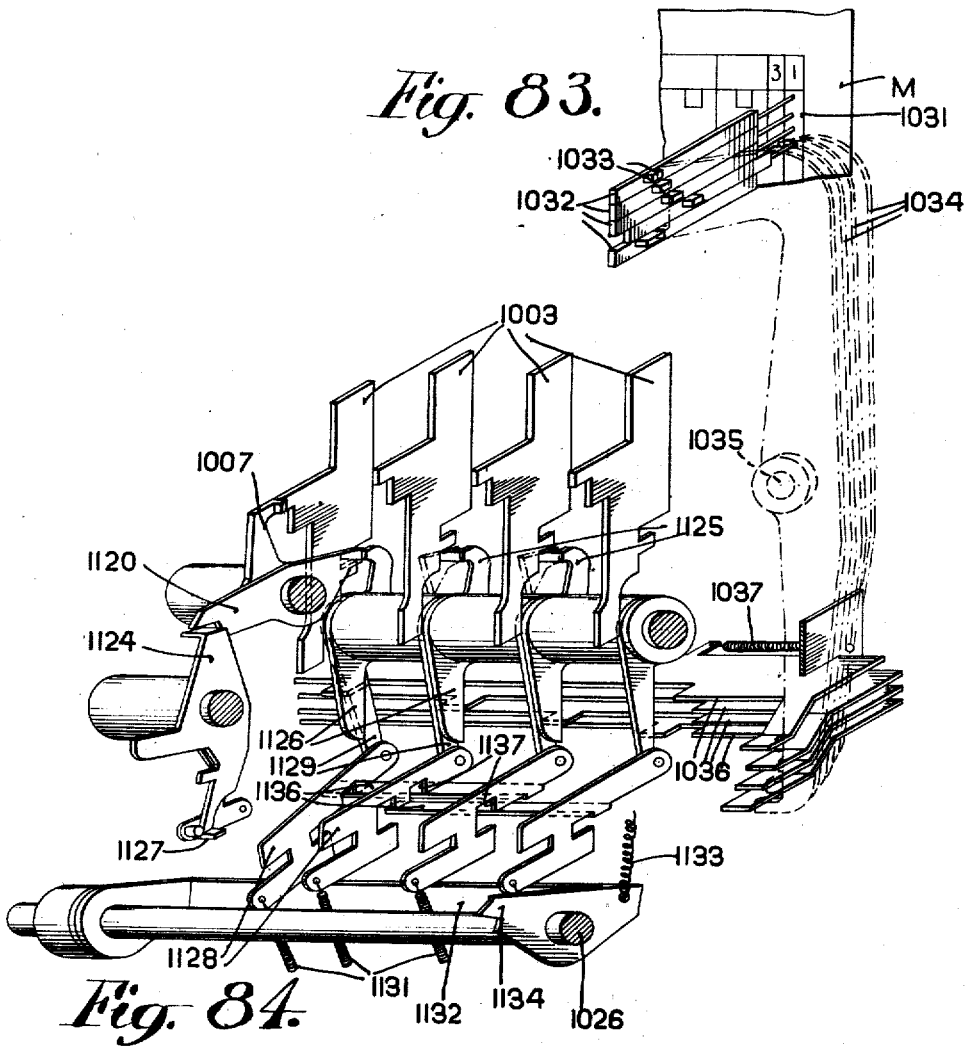

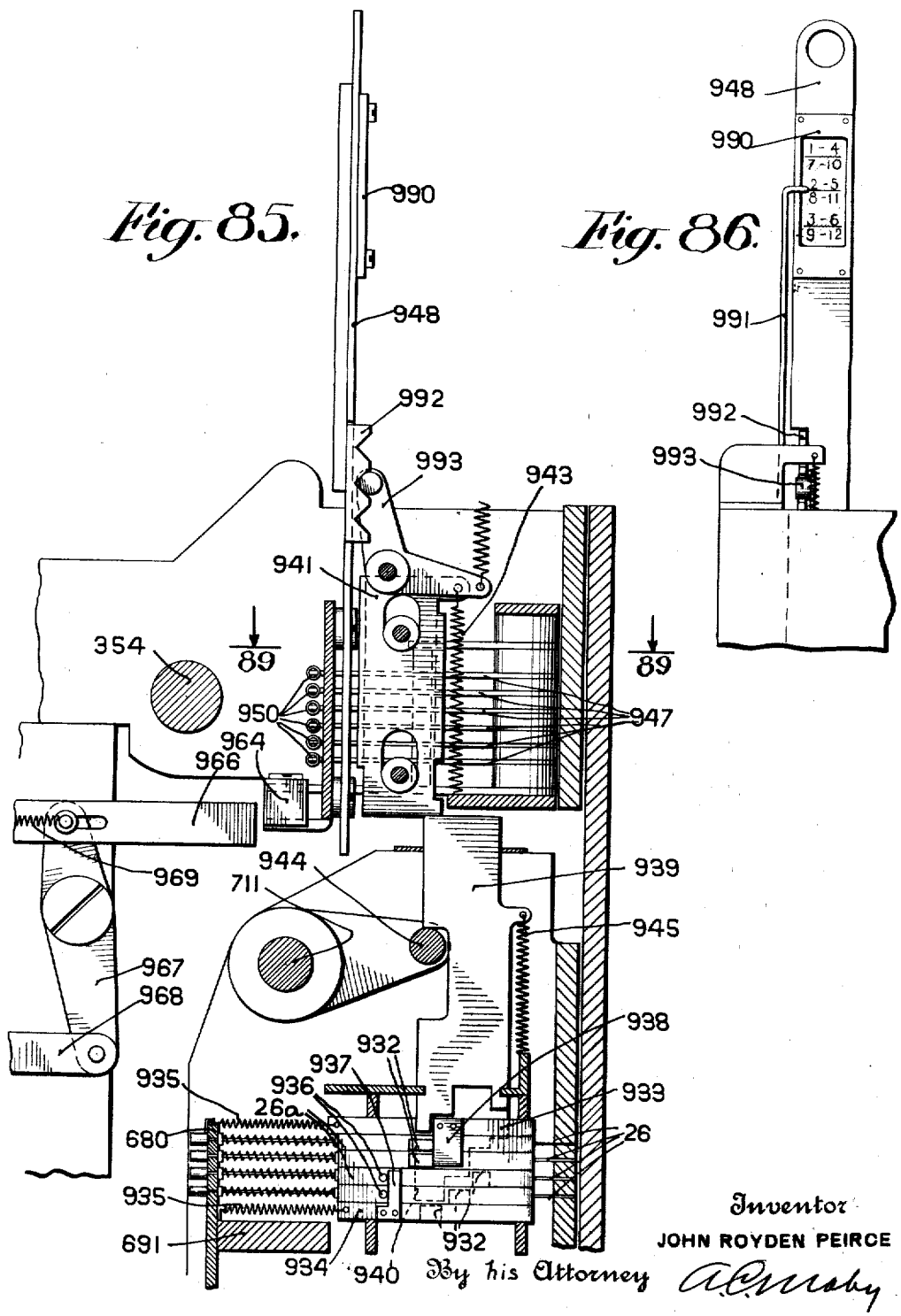

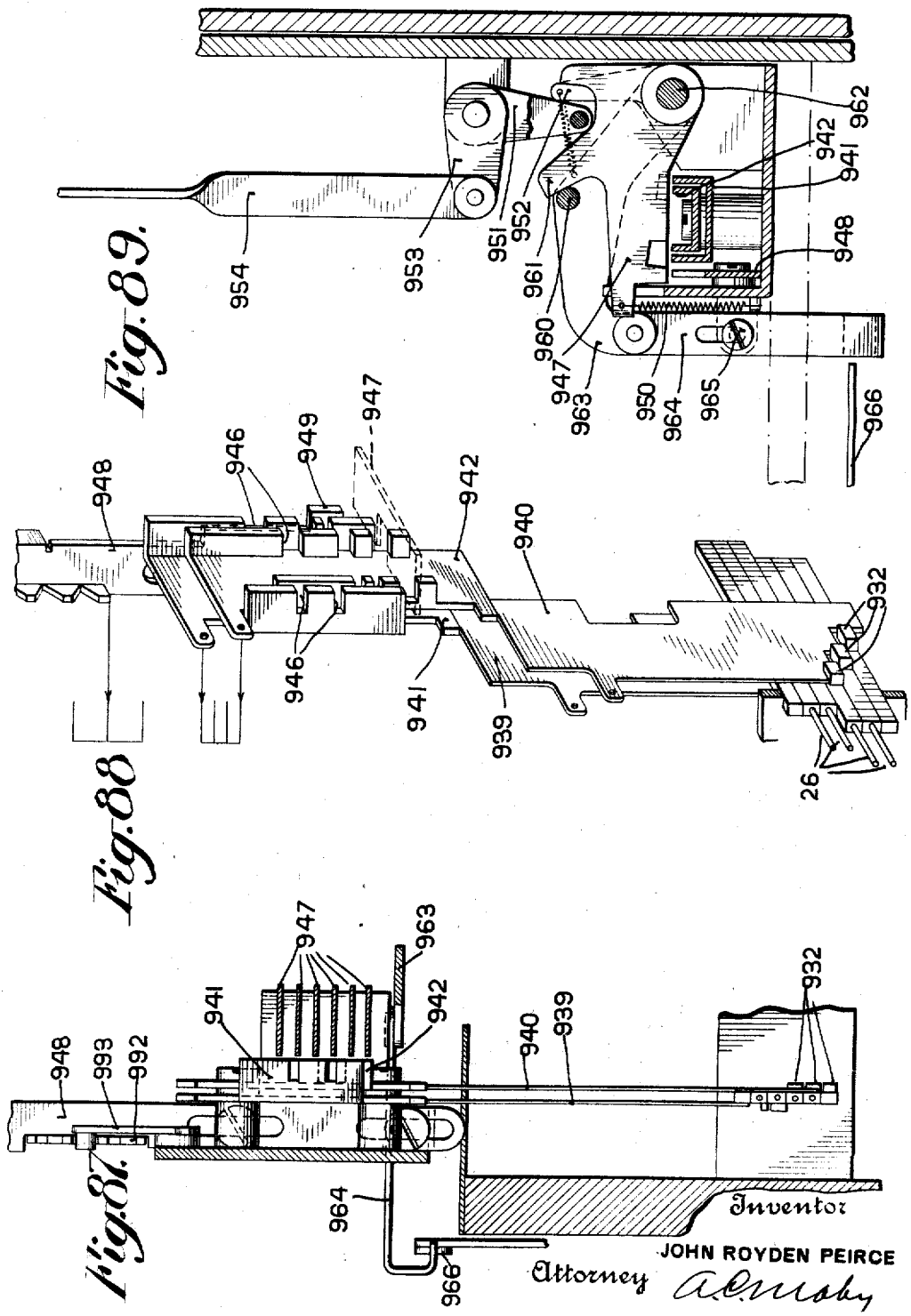

June 7, 1932.  J. R. PEIRCE  1,862,032

RECORD ANALYZING AND POSTING MACHINE

Filed Oct. 28, 1926   73 Sheets-Sheet 53

Inventor
JOHN ROYDEN PEIRCE
By his Attorney

June 7, 1932.  J. R. PEIRCE  1,862,032
RECORD ANALYZING AND POSTING MACHINE
Filed Oct. 28, 1926  73 Sheets-Sheet 54

Inventor
JOHN ROYDEN PEIRCE
By his Attorney

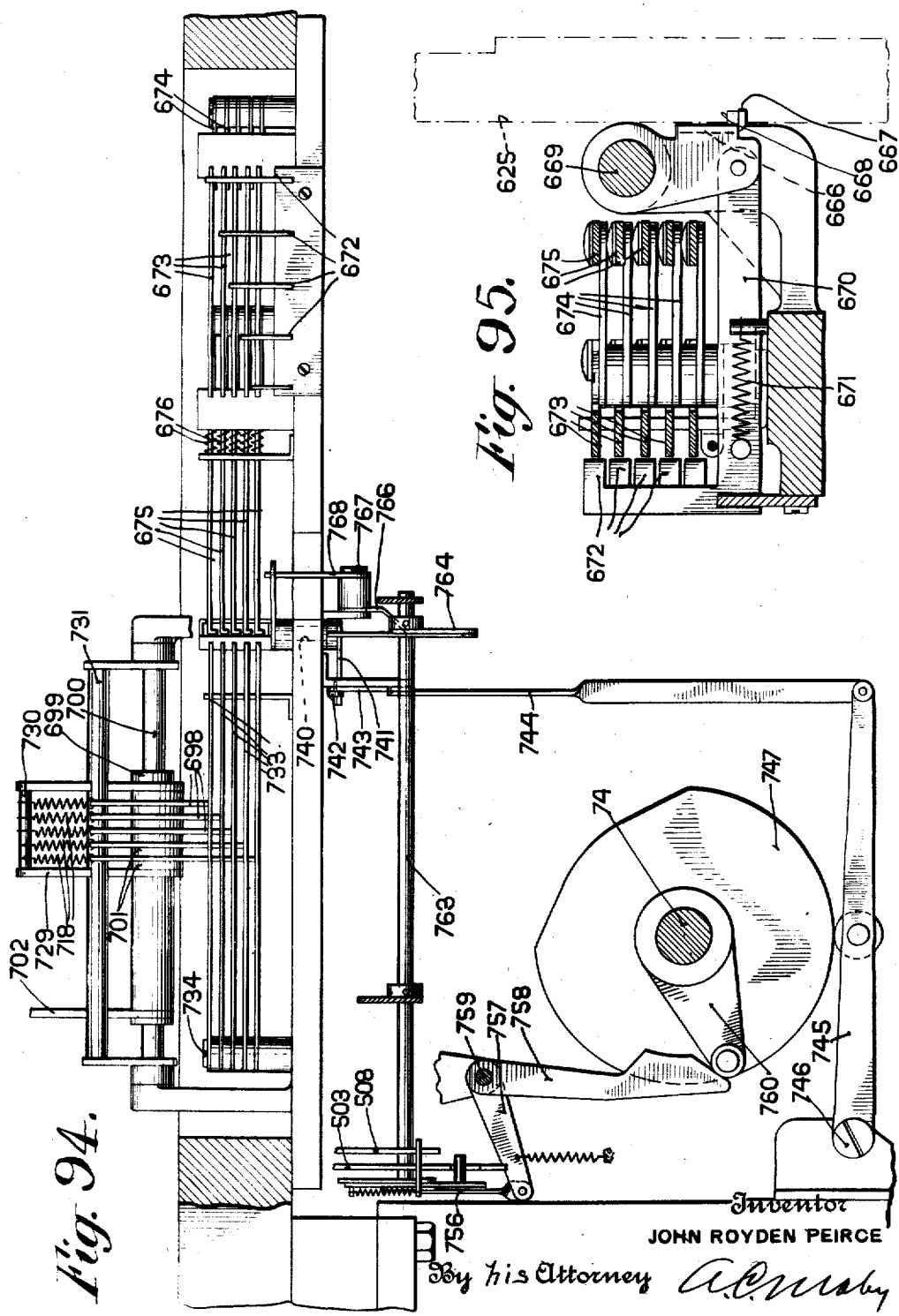

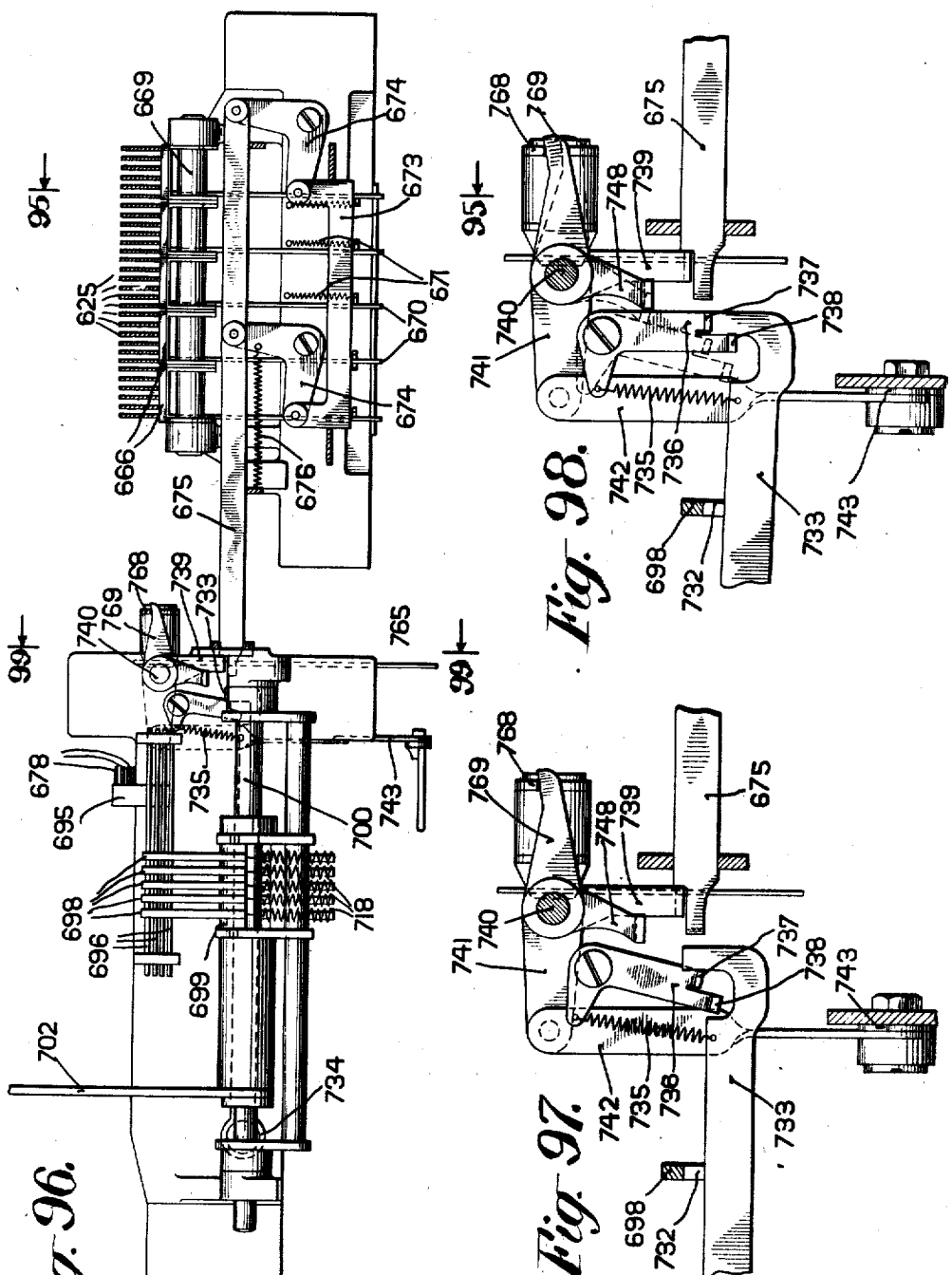

June 7, 1932. J. R. PEIRCE 1,862,032
RECORD ANALYZING AND POSTING MACHINE
Filed Oct. 28, 1926 73 Sheets-Sheet 57
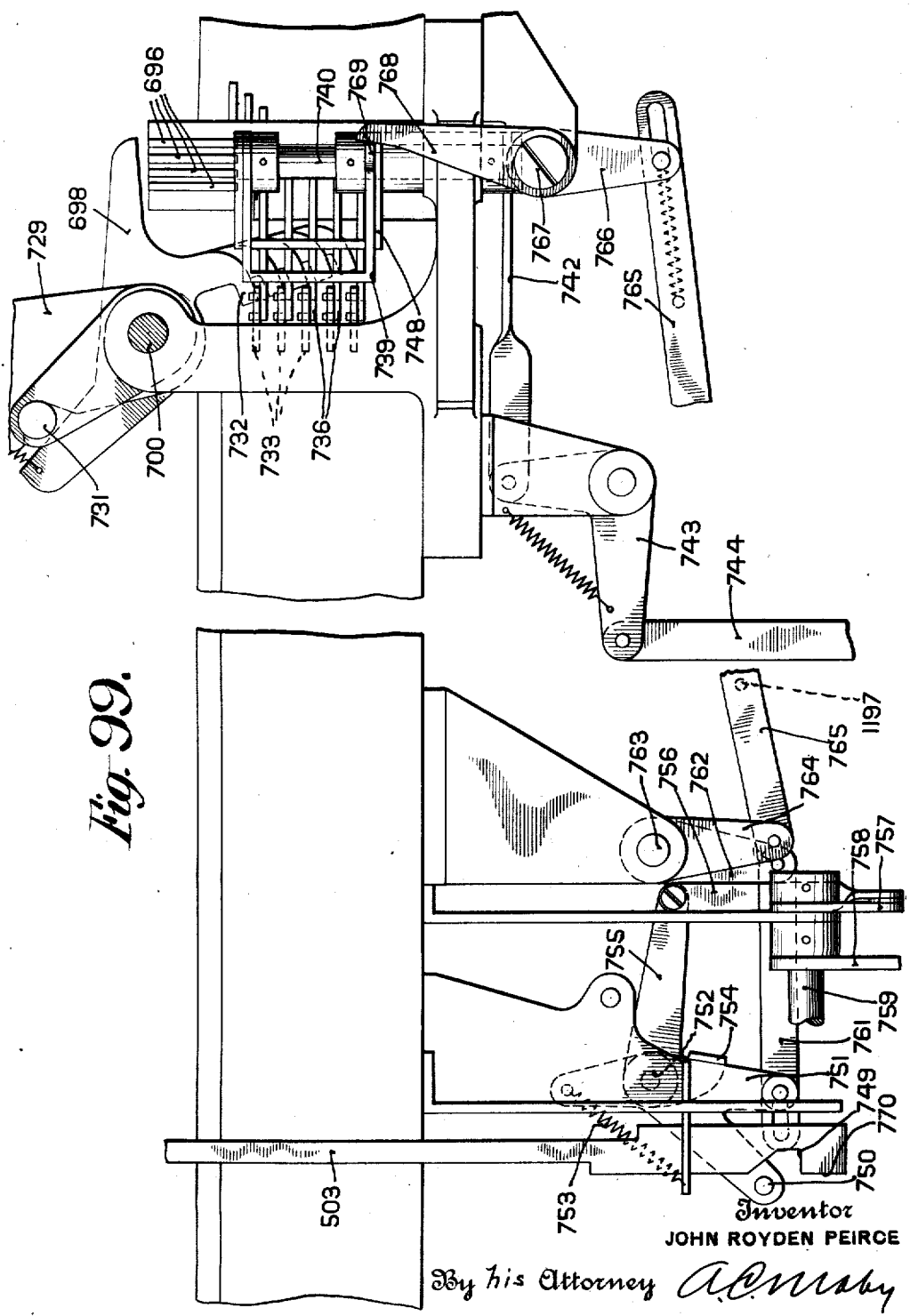
Inventor
JOHN ROYDEN PEIRCE
By his Attorney

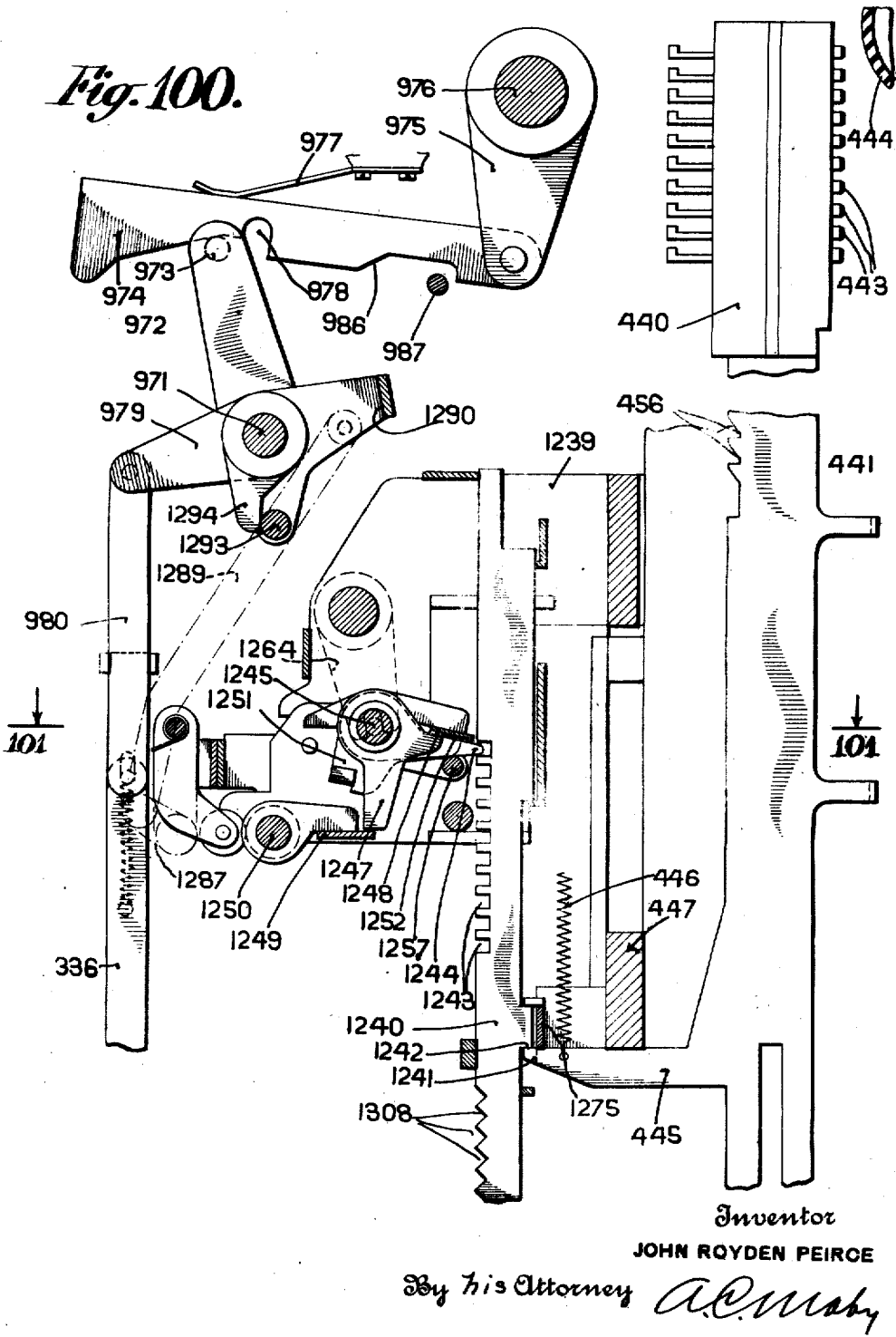

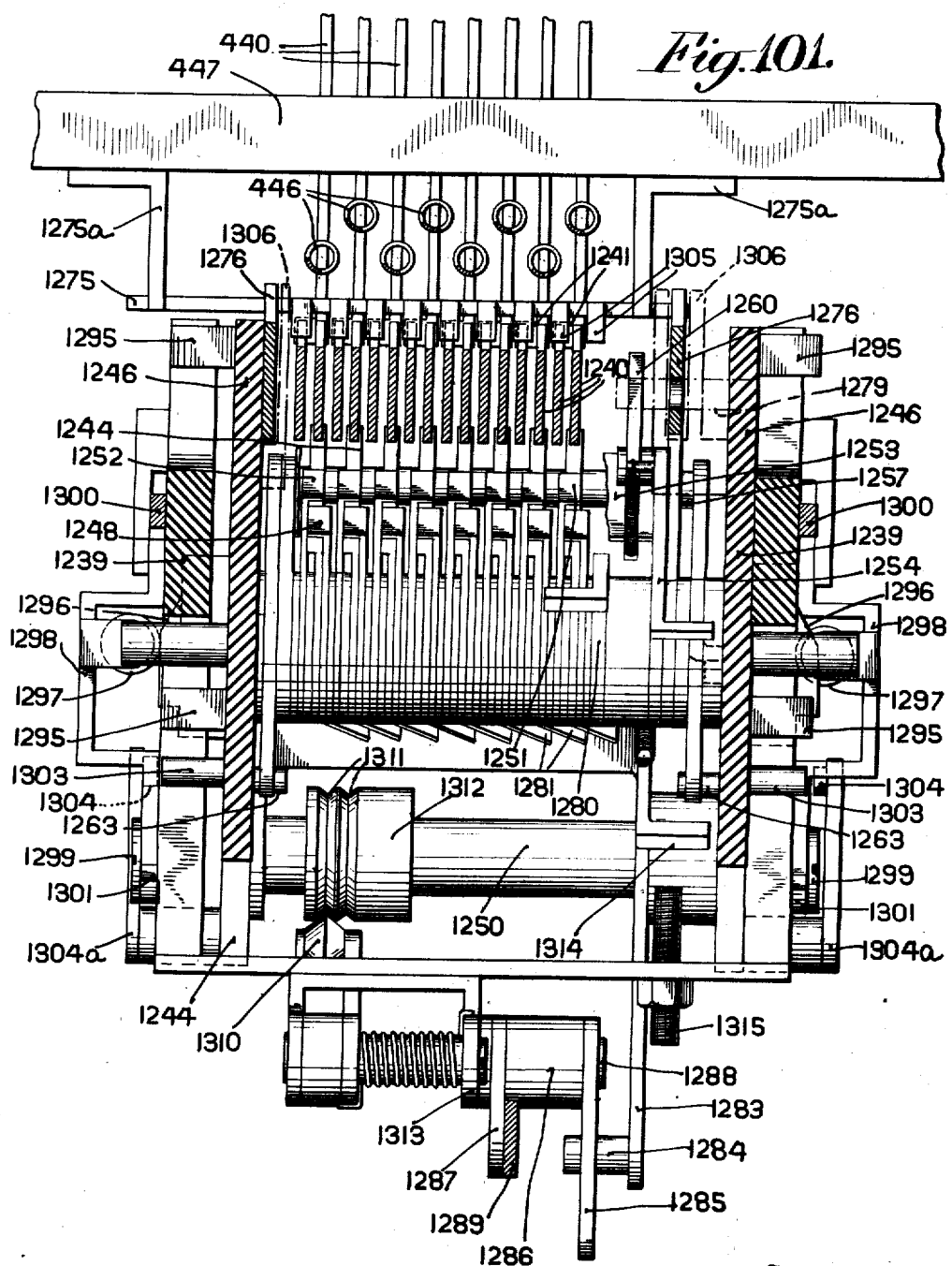

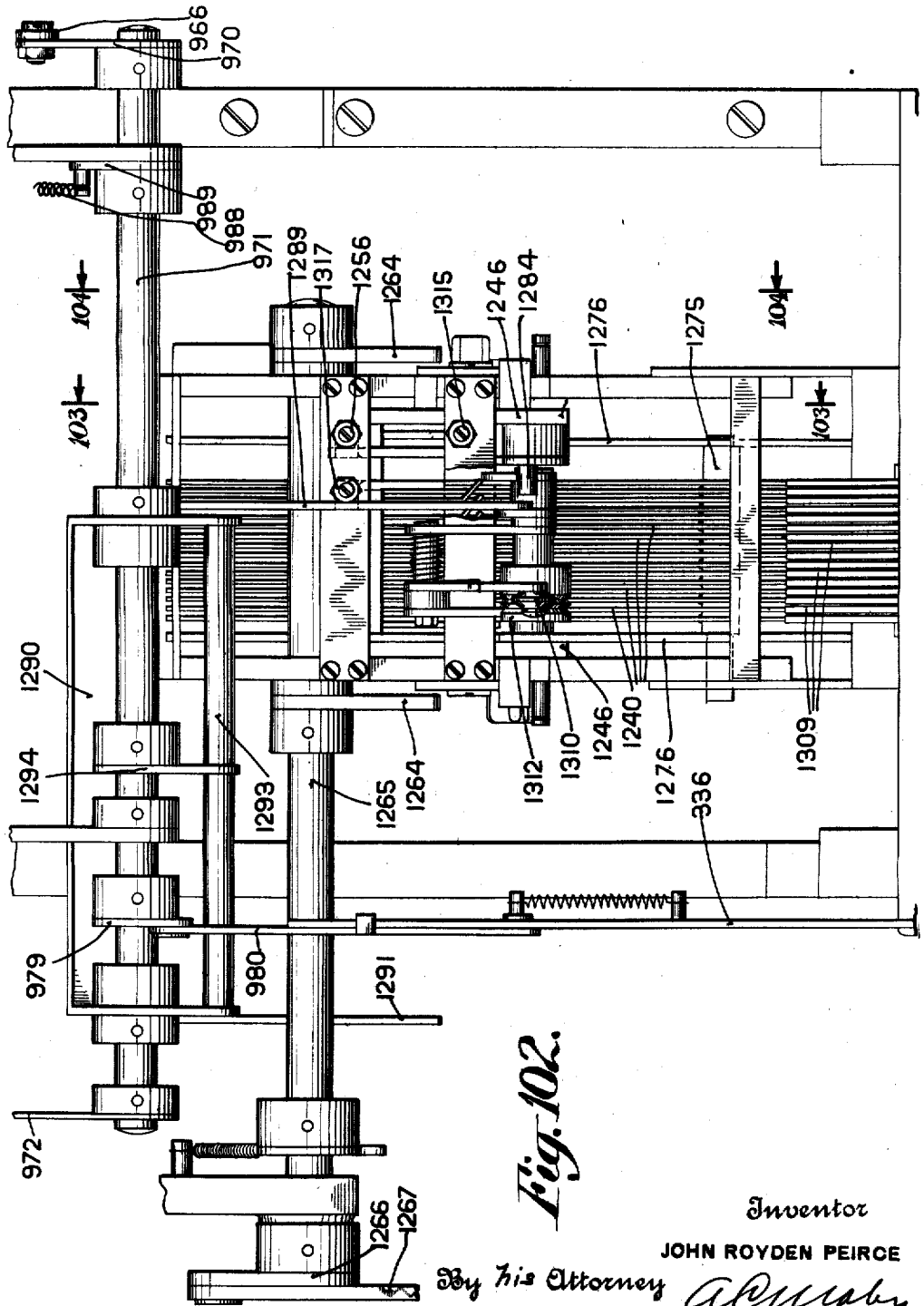

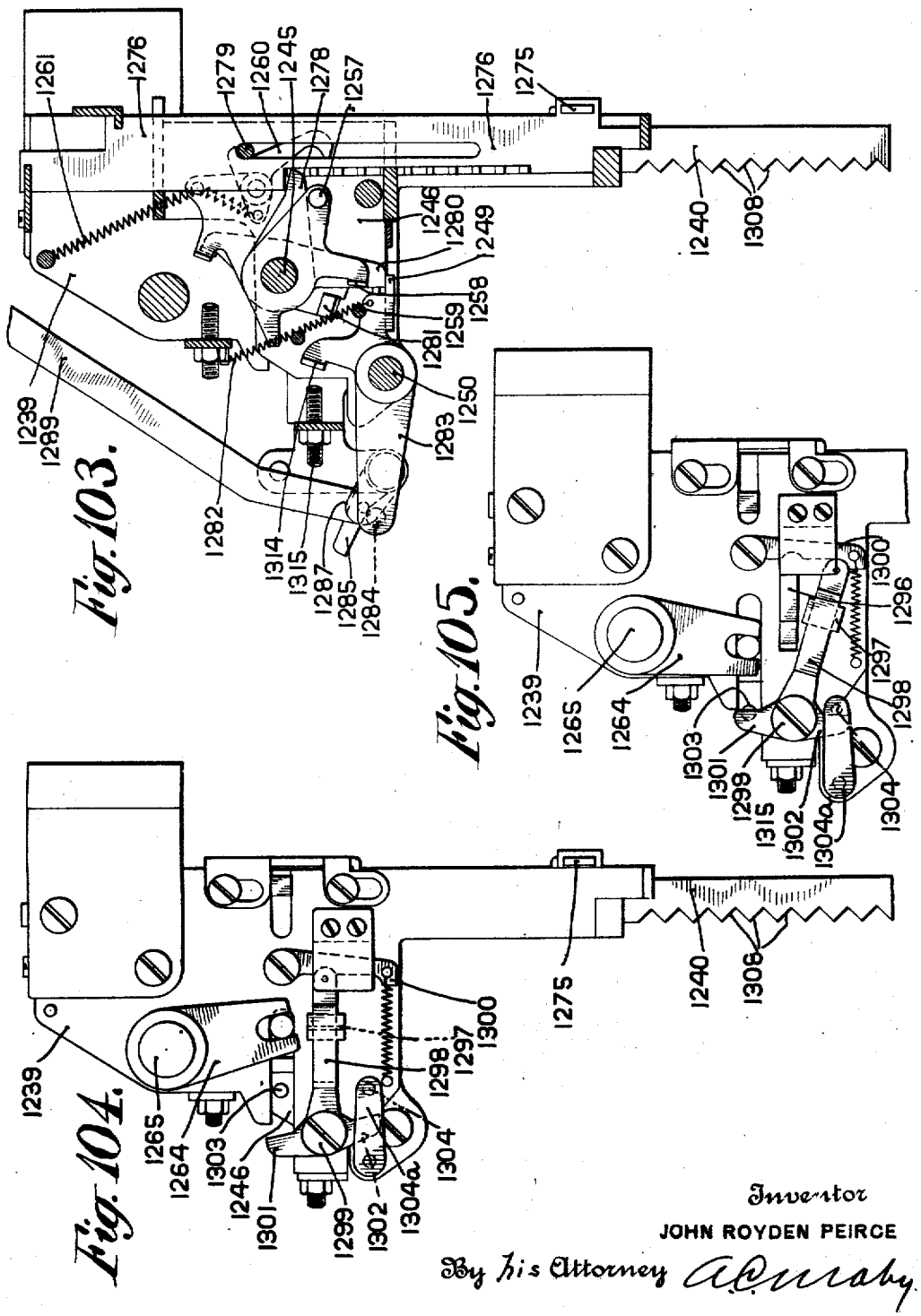

June 7, 1932. J. R. PEIRCE 1,862,032
RECORD ANALYZING AND POSTING MACHINE
Filed Oct. 28, 1926 73 Sheets-Sheet 62
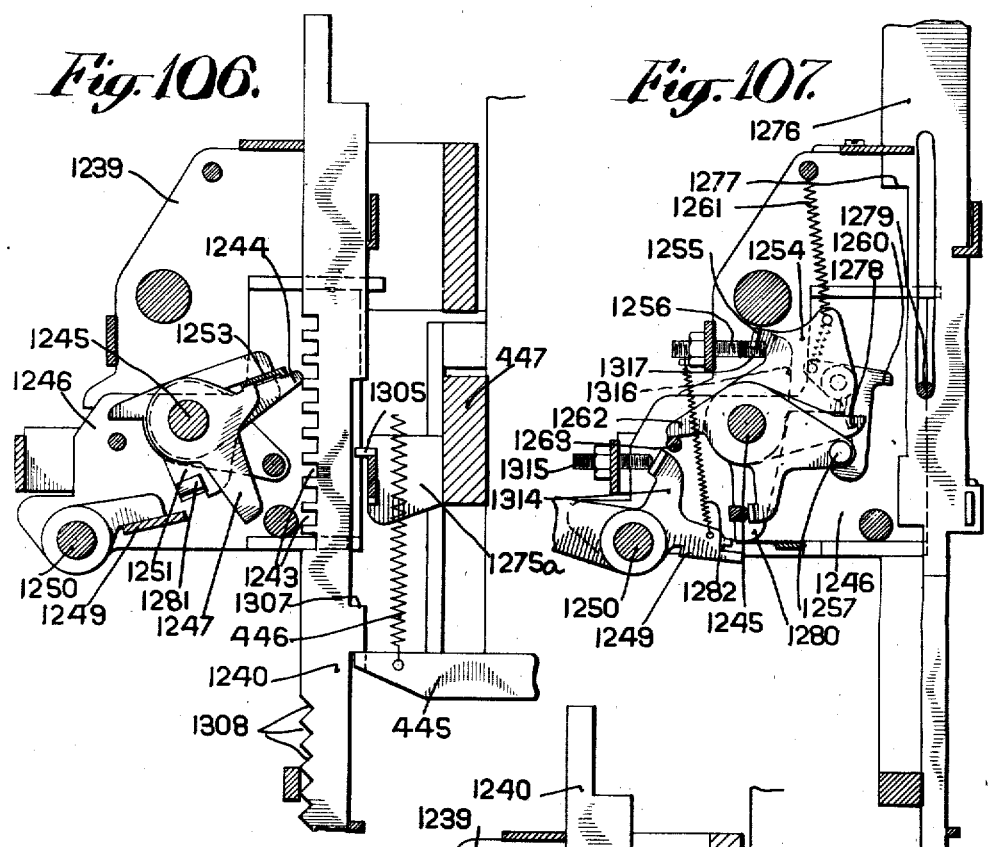
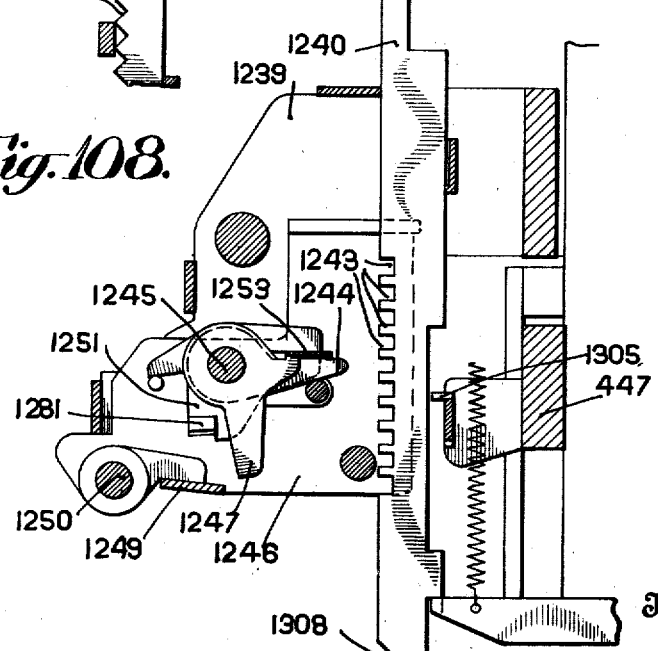
Inventor
JOHN ROYDEN PEIRCE
By his Attorney

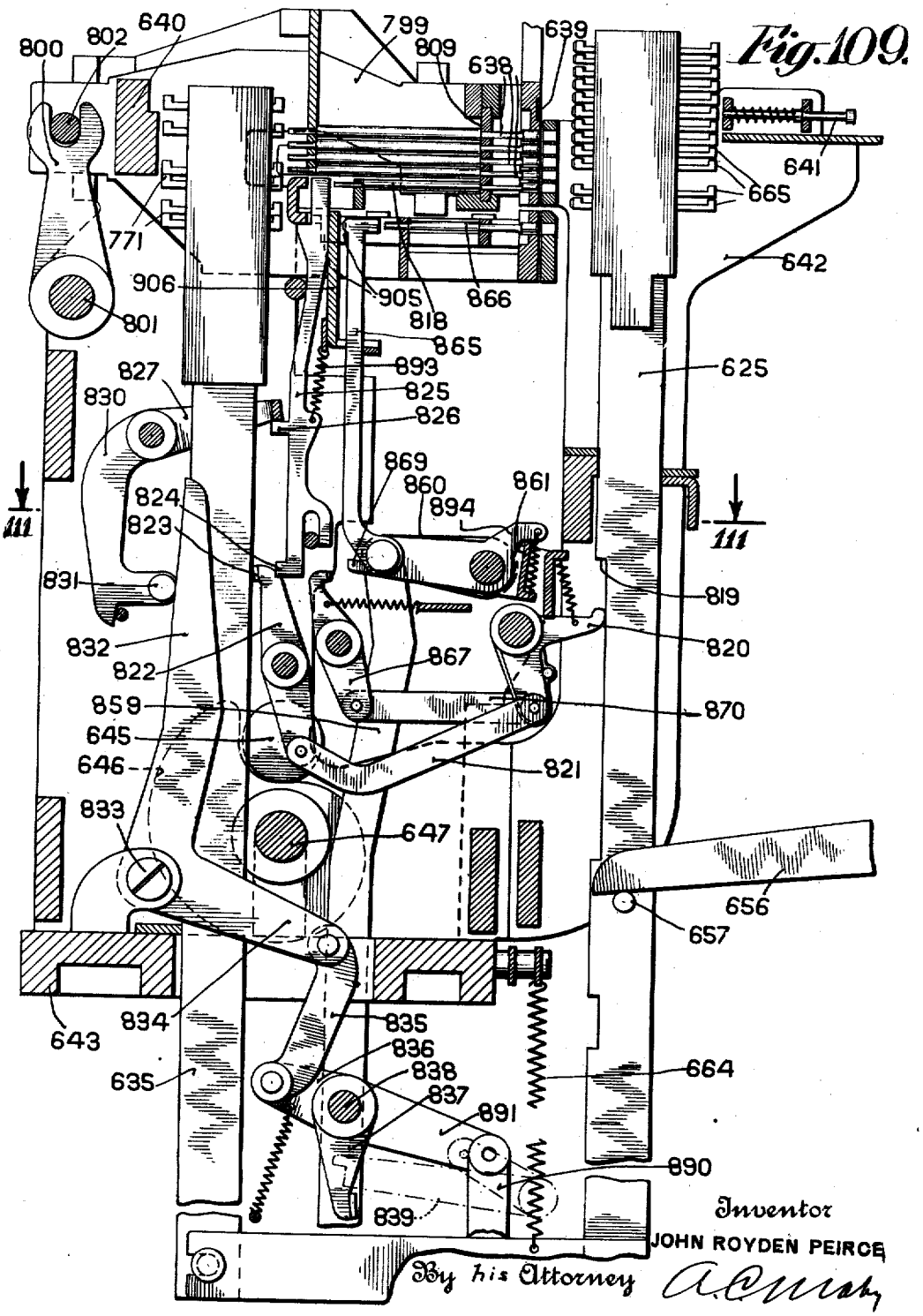

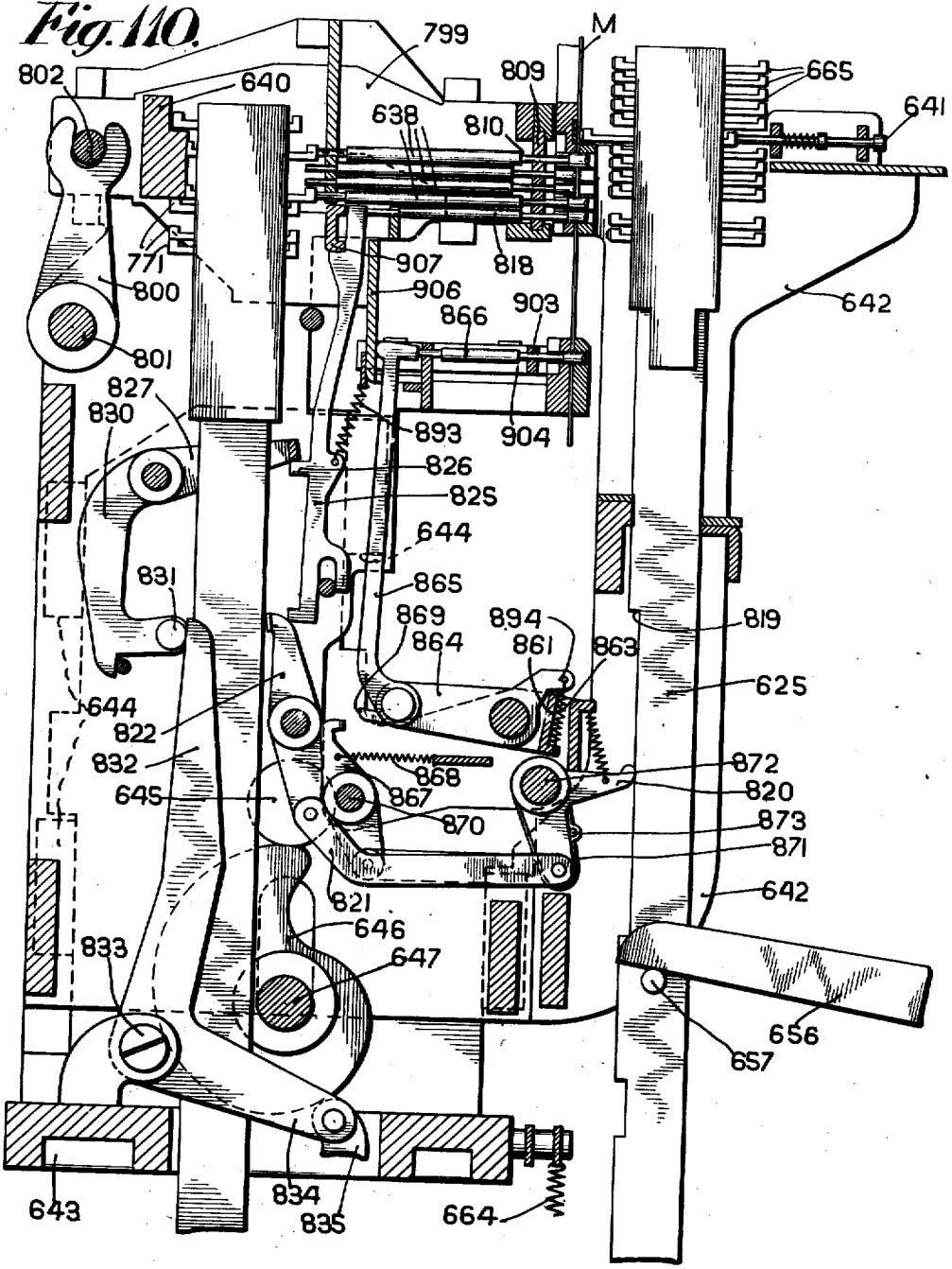

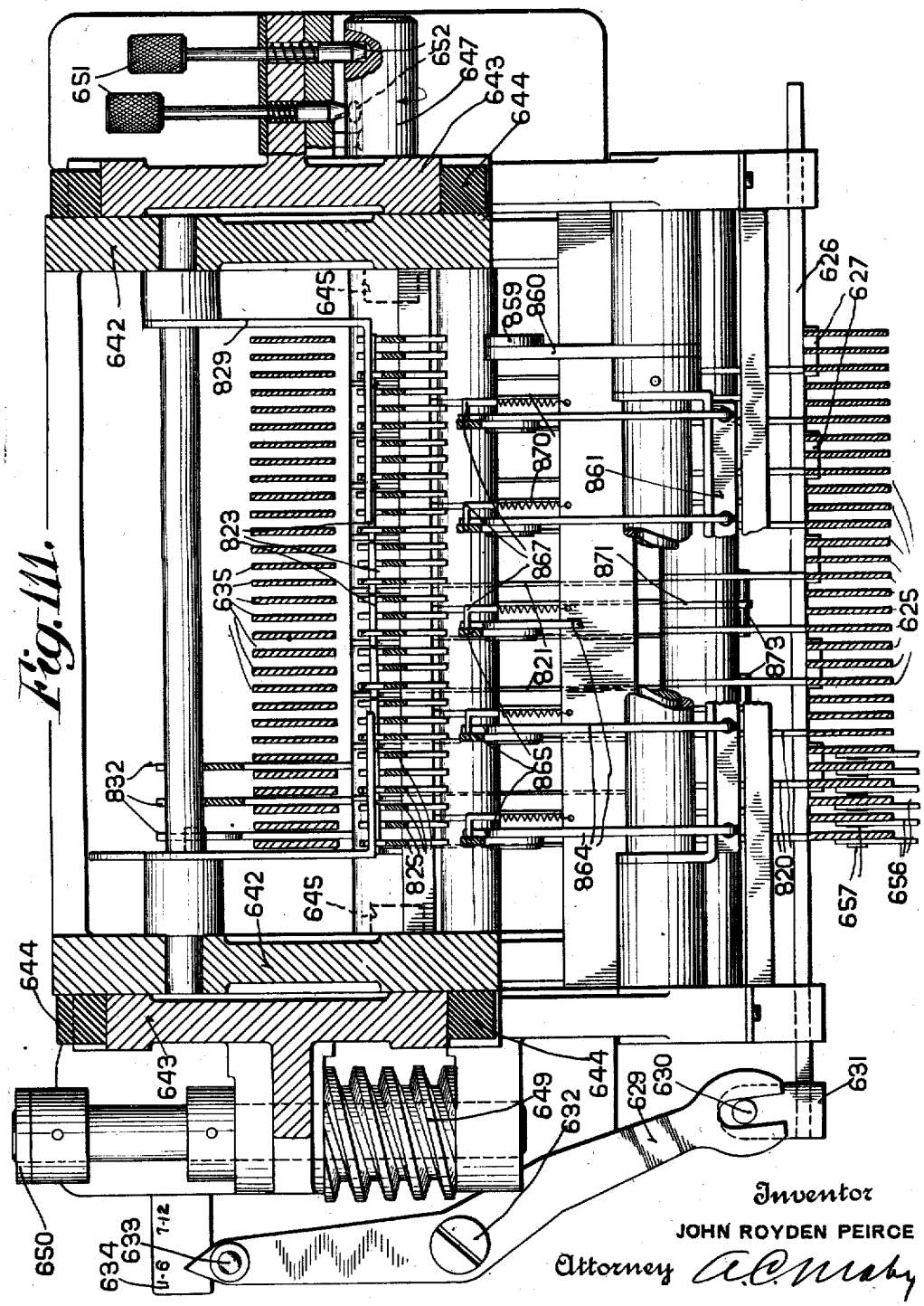

June 7, 1932. J. R. PEIRCE 1,862,032
RECORD ANALYZING AND POSTING MACHINE
Filed Oct. 28, 1926 73 Sheets-Sheet 66
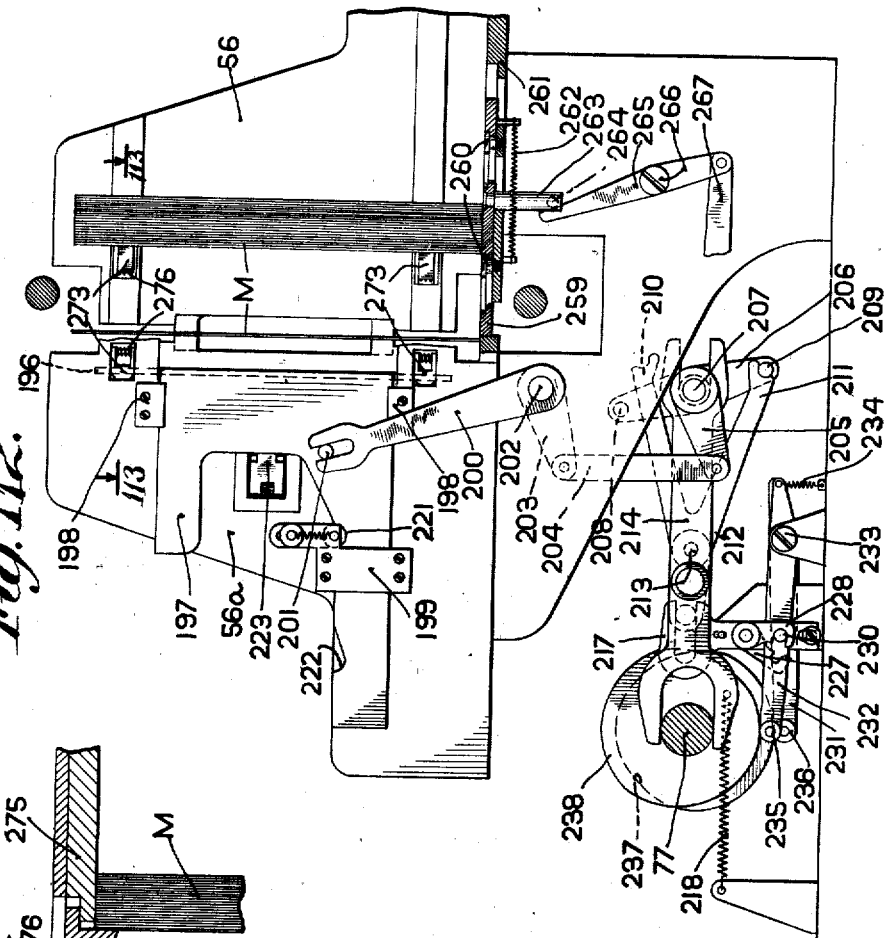
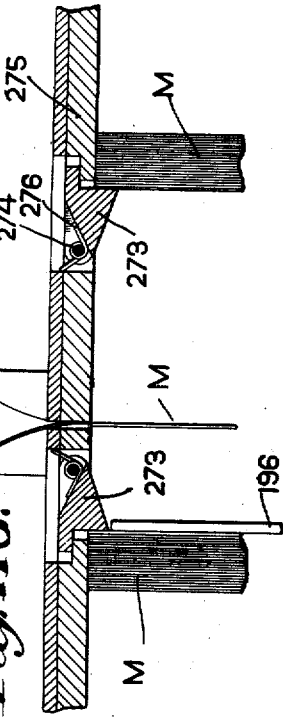
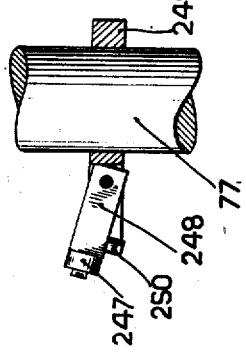
Inventor
JOHN ROYDEN PEIRCE
By his Attorney

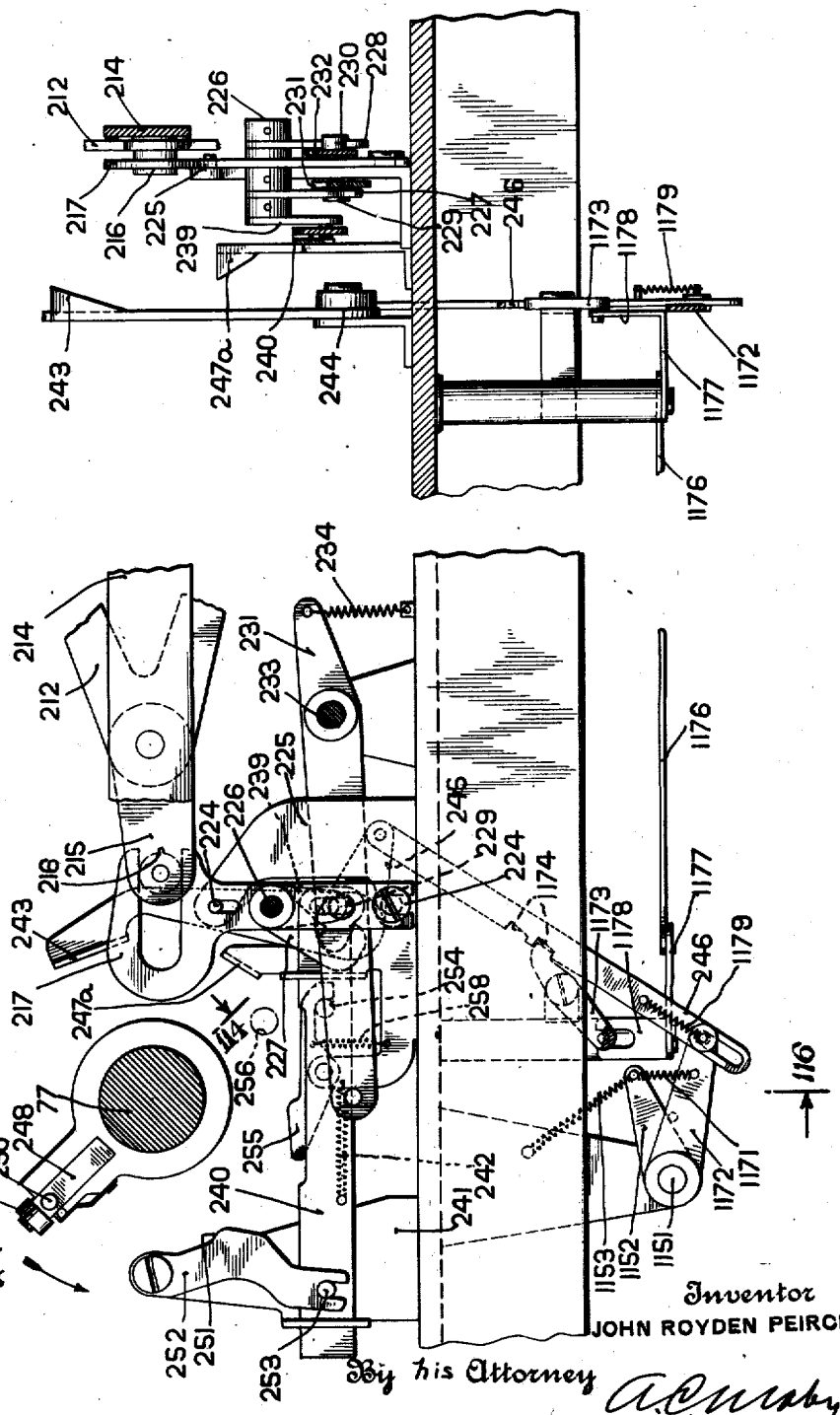

June 7, 1932. J. R. PEIRCE 1,862,032
RECORD ANALYZING AND POSTING MACHINE
Filed Oct. 28, 1926 73 Sheets-Sheet 68
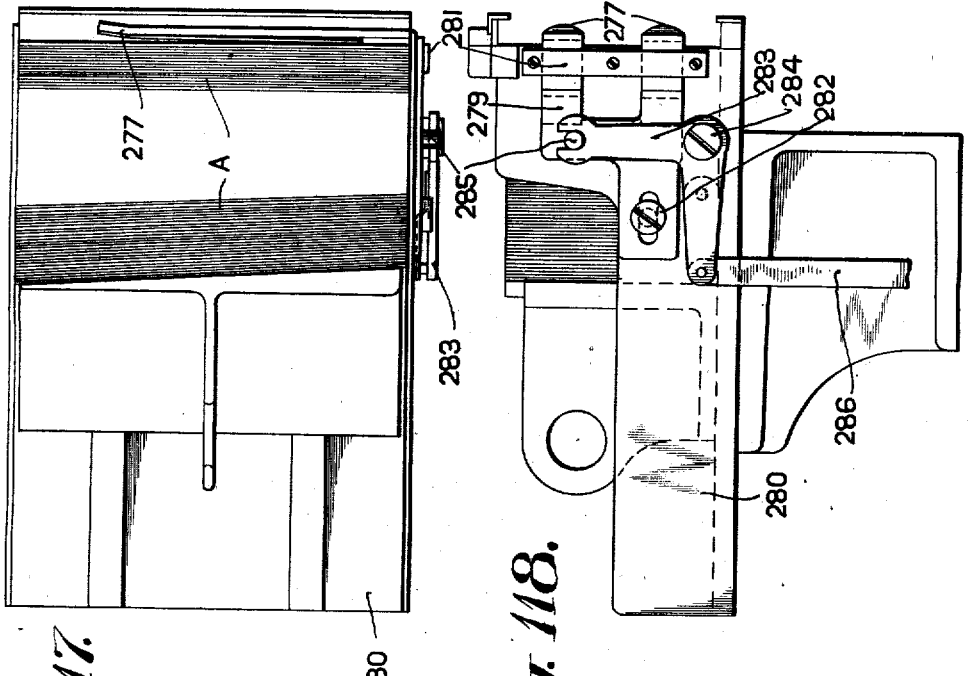
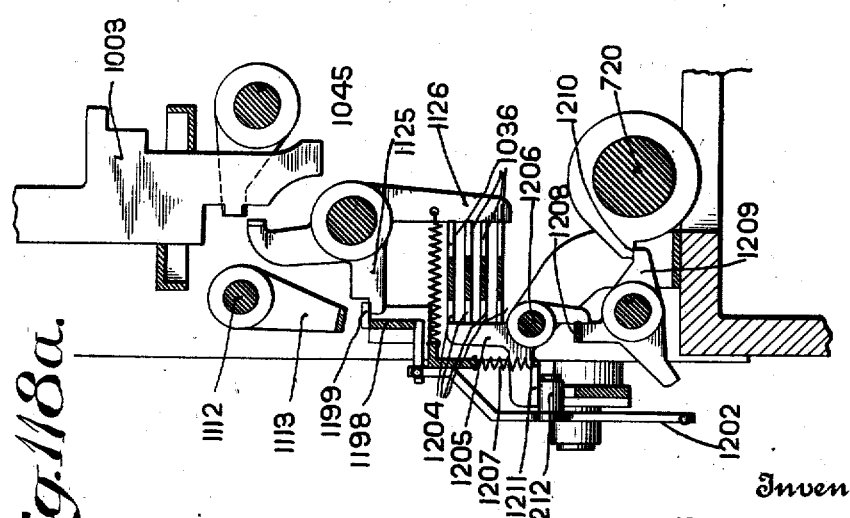
Inventor
JOHN ROYDEN PEIRCE
By his Attorney June 7, 1932.  J. R. PEIRCE  1,862,032
RECORD ANALYZING AND POSTING MACHINE
Filed Oct. 28, 1926   73 Sheets-Sheet 69
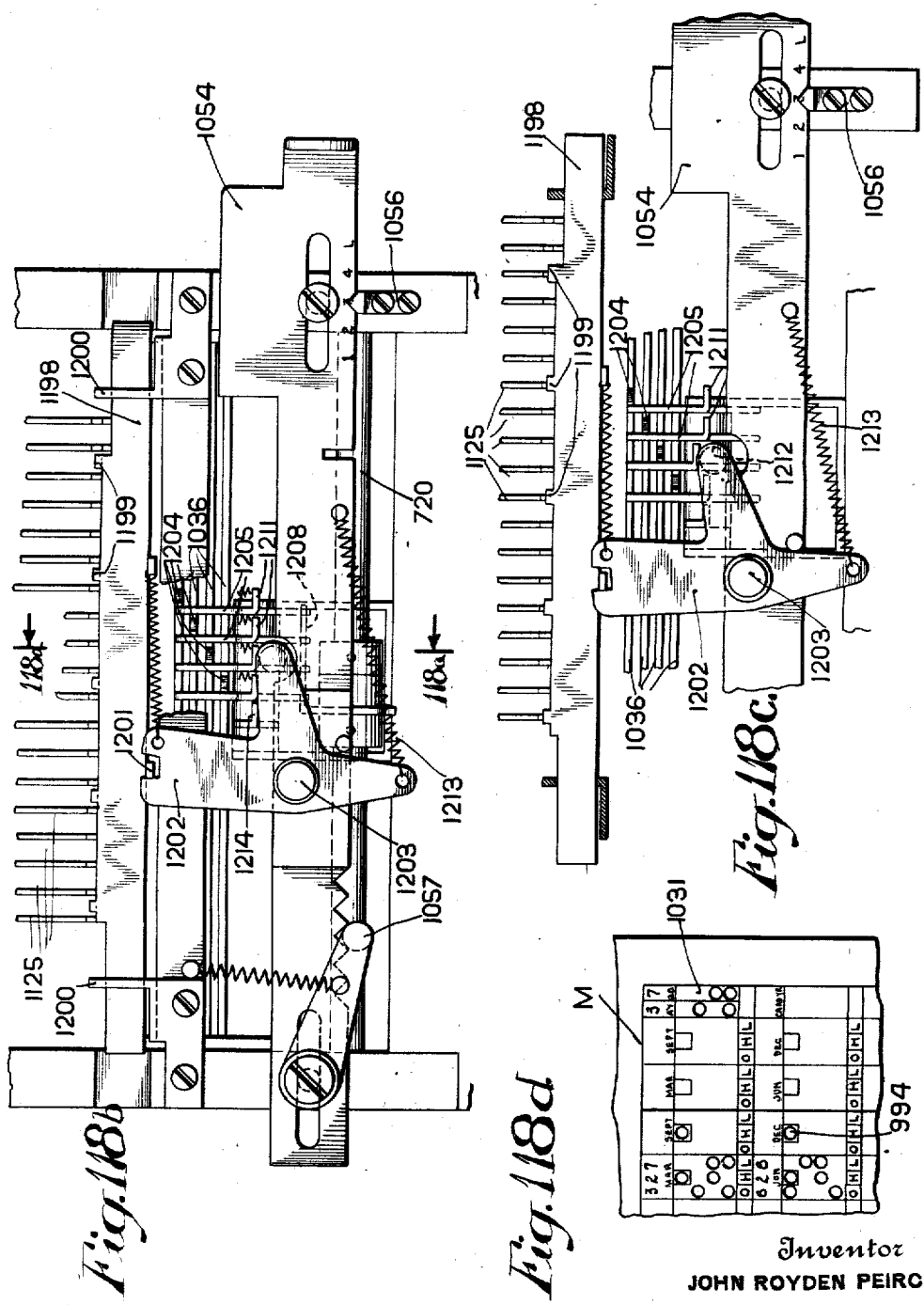
Inventor
JOHN ROYDEN PEIRCE
By his Attorney

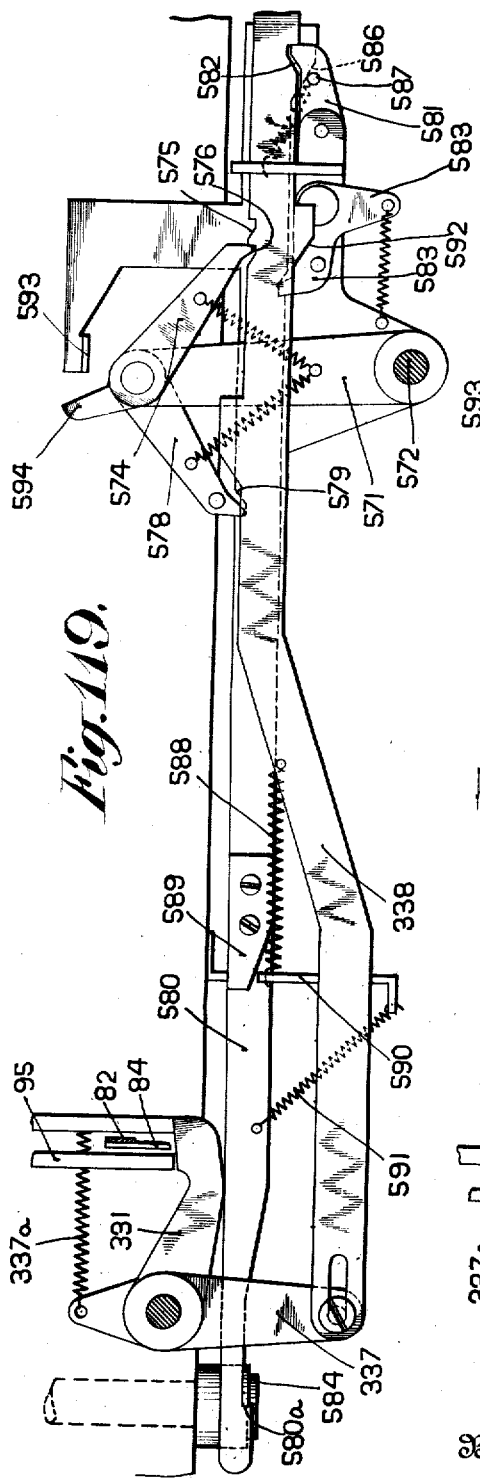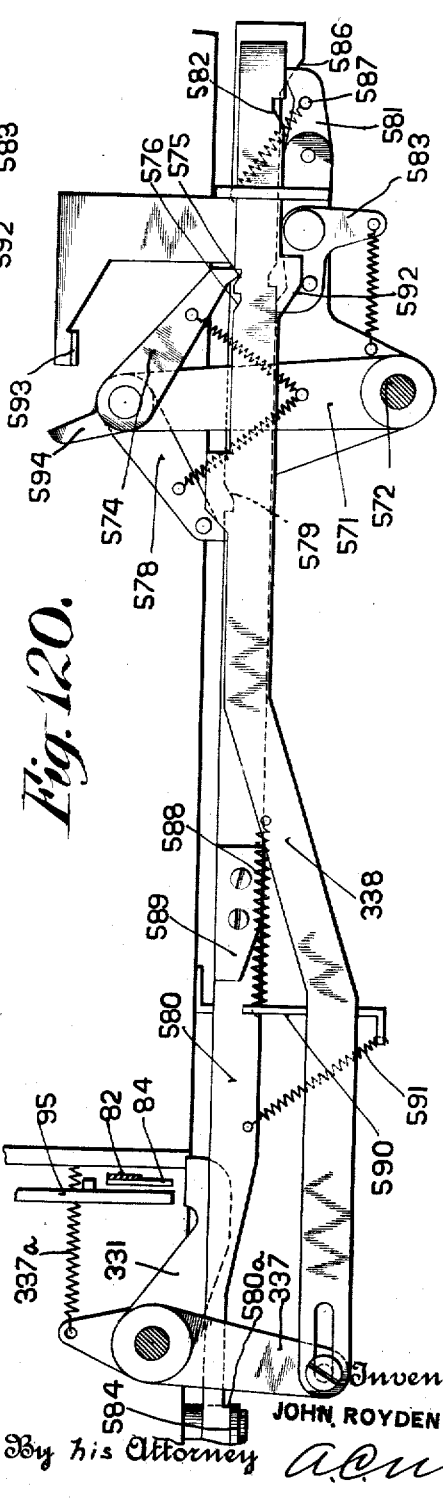

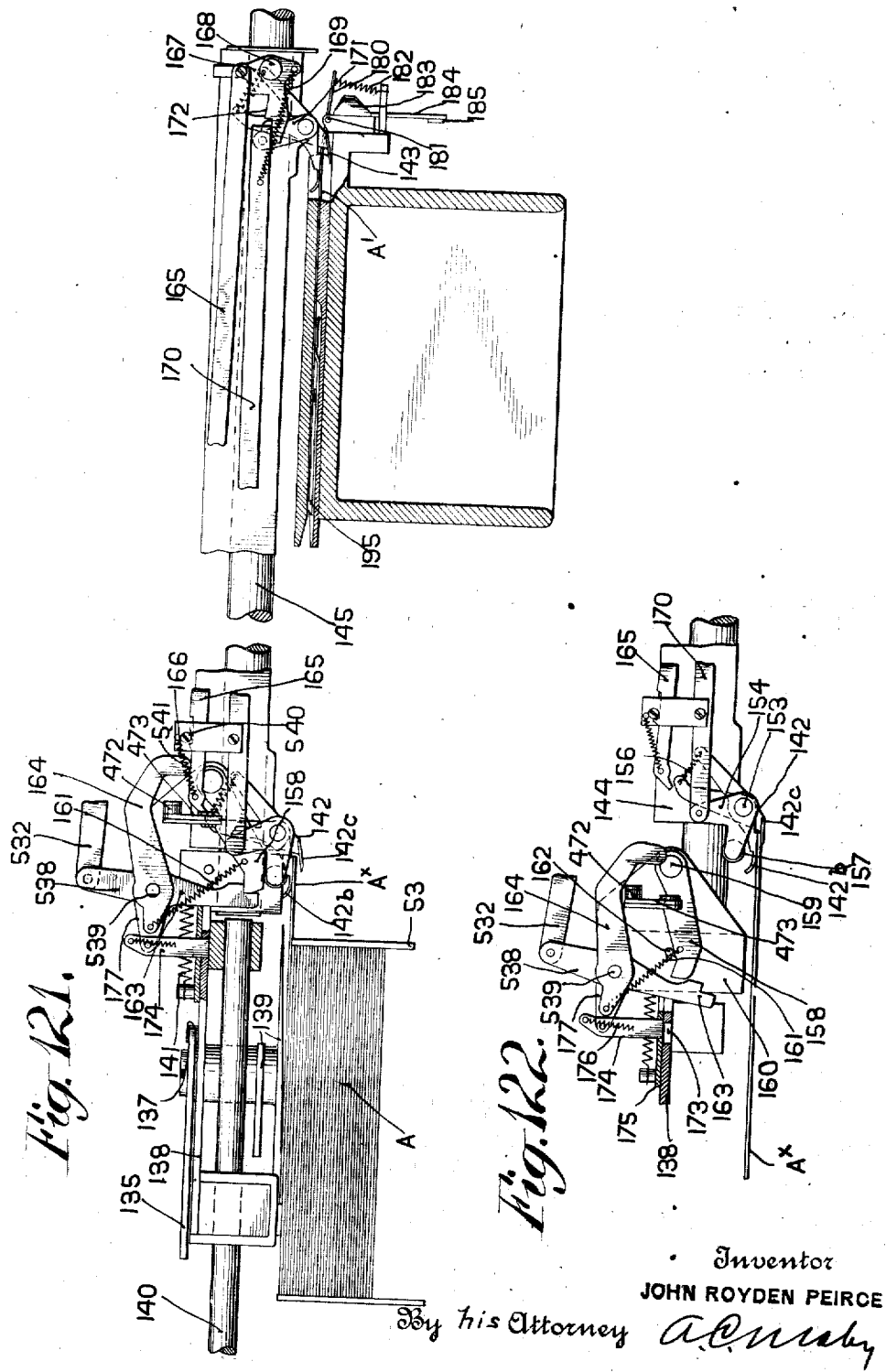

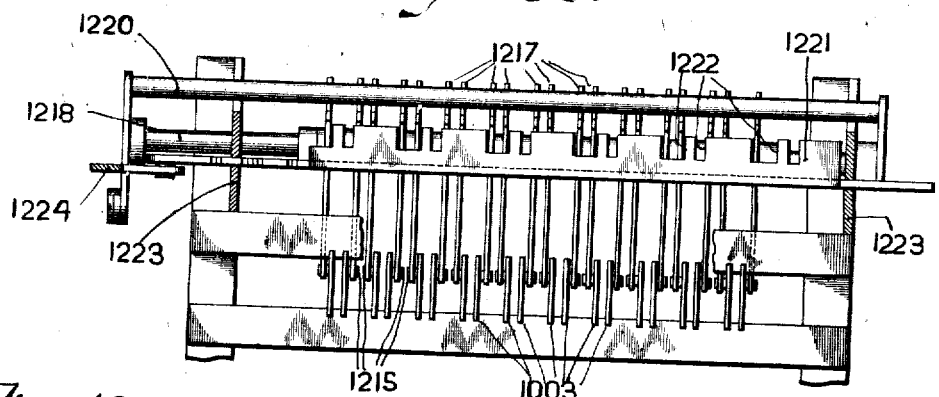
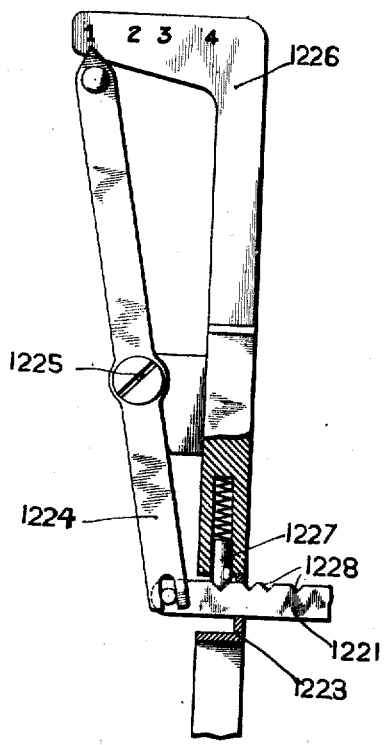
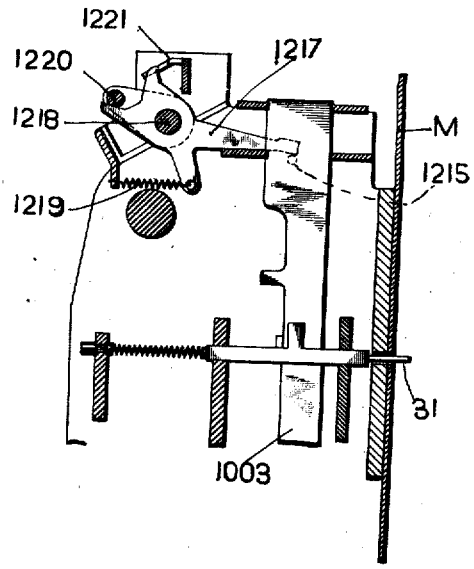

Patented June 7, 1932

1,862,032

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

RECORD ANALYZING AND POSTING MACHINE

Application filed October 28, 1926. Serial No. 144,661.

This invention relates to posting machines adapted to be controlled by perforated record cards.

In my copending application for record comparing and posting machines filed January 8, 1923, Serial No. 611,491, now Patent Number 1,761,741, dated June 3, 1930, I disclose a machine in which a master card and an audit card are adapted to be fed from separate magazines to separate comparing positions where sensing devices are adapted to read the perforations in certain sections of each card, comparing these perforations and if they are found to represent the same value the master card moves to a posting station and a posting designation is performed thereon and the two cards are passed on to certain receiving pockets of the machine. If, on the other hand, the designations compared are found to be of different values, one of the cards is passed on to a selected receiving pocket, while the other is retained at the comparing station. A new card is then fed to the vacant position in the comparing station and the comparing operations between the two cards now present is performed. The machine disclosed in the former application is also provided with means for ascertaining which of several recording fields is active so that the posting operation may be performed in the active field.

The present invention relates to the same class of machines and has for its main object to provide a machine capable of performing several additional operations. For instance, in connection with an insurance policy, should the earlier machine sense that a premium is payable but has not been paid, the master card instead of receiving a posting entry and then being fed to the regular file pocket is fed to a reject pocket without an entry being made. In the present machine, in addition to this operation the machine enters upon a sheet of paper the fact that the premium payable on the particular policy is overdue. Also where several payment periods have passed without any payment having been made upon the particular policy, the machine will show upon the printed record sheet that several payment periods have elapsed without any payment having been made.

Another object of the present invention is to cause the machine to enter upon the master card in both perforated and printed forms, the date upon which the posting operation is effected.

Another object is to provide mechanism for ascertaining the manner in which a dividend due to the insured has been disposed of and for indicating this information upon the master card.

Another object is to adapt the machine to ascertain from the audit card the manner in which payment of the premium is made and for indicating this information on the master card.

Another object is to provide mechanism for cancelling an audit card when a posting operation has taken place under control of that audit card.

Another object is to provide mechanism for causing the machine to stop when by reason of a mistake in the grouping of the cards the comparing mechanism tends to cause a large number of cards to be fed repeatedly through the machine without the feeding of cards from the opposing group.

Another object is to provide mechanism for ascertaining when a card being run through the machine belongs to a different group from that for which the machine has been set up to operate.

Another object is to provide mechanism for causing stoppage of the machine if an actuated type element fails to become properly restored.

Another object is to provide mechanism whereby the machine may be set up so that a group of master cards alone may be run through and a list made showing certain conditions in connection with some of the cards.

Other objects of the present invention relate to improvements in record controlled apparatus to the general end that additional and novel results may be secured as will be hereinafter set forth in the specification.

According to the present invention provision is made for comparing records one with another and with set up devices in the machine. Novel posting means are provided; more specifically provision being for both printing a posting designation and for effecting a perforated posting designation upon records. The machine further provides means for making special lists representative of special conditions of the controlling records. These special lists are also under control of set up devices of novel character in the machine. The set up devices act in conjunction with either one or with both of the controlling records to control the special listing mechanism or the posting mechanism or both mechanisms. Provision is made for controlling the comparison mechanism in the event special forms of lists are to be made out. Alternative forms of lists may be made upon the machine depending upon whether it is desired to have a simple posting list of items representative of delinquent accounts or the like or whether a more detailed and complete list is desired of one or a plurality of items or conditions of items derived from each of the successive controlling cards which are passed through the machine.

A further object is to so coordinate the mechanism as to permit repeated analysis of like records without calling the aforesaid controlling or stopping mechanism into operation.

A further object of the present invention resides in the provision of a record controlled apparatus with analyzing means arranged to analyze a sequence or progression which may be discontinuous and in which provision is made for specially controlling the machine, as for instance by stopping its operation, when the analyzed sequence or progression reverses.

A further object of the present invention resides in novel coordination of the card feeding, the comparing mechanism and controlled selectively delivery mechanism for the records to provide for novel control of the operation of the machine.

A further object of the present invention resides in the provision of novel set up devices for the machine and further in the provision of novel controlling mechanism co-ordinated therewith.

A further object of the present invention resides in improvements in recording or printing mechanism and of controls therefor. The recording or printing devices are differentially controlled in one manner by one mechanism, and superimposed thereupon is a supplemental control which effects a different but related position of the printing or recording devices.

Further objects reside in an improved comparing mechanism and listing mechanism controlled thereby to control the making of special lists under special conditions not heretofore provided for.

Further objects reside in a record controlled apparatus of novel form including comparing mechanism and devices controlled thereby to designate the results of the comparison in a selective manner. Such designations may be made by posting, or by listing, as the case may be. The posting and listing are selective under the control of the machine and of the cards acted upon thereby. The listing may be of special character under special card and machine conditions.

A further object of the present invention resides in the improvements in the printing and listing mechanism and posting mechanism. One object may be stated as to control the operation of the machine in any desired way as by stopping it in the event that parts, such as type, are not properly restored and in condition for a continued and further operation.

Further objects reside in improved comparing and posting mechanisms controlled thereby to control posting or non-posting under special conditions not heretofore provided for.

Further objects reside in the provision of special selective delivery means for the records which are brought into operation upon the completion or filling of a record with designations such as postings.

Other objects reside in the provision of means for posting one record under the coordinate control of another record and effecting a cancellation record or posting upon the record mentioned to show that there had been a corresponding posting upon the first record.

Further and other objects reside in the provision of novel set up devices coordinated with the cards for certain desired controlling operations. Provision is made for analyzing certain perforated data on an individual card with certain other related perforated data on the same card and thereby selectively controlling the operation of the machine.

Other objects of the present invention reside in the provision of comparing mechanism of novel character for a record controlled machine; of posting mechanism of novel form for such machines and of improved listing mechanism therefor, and also in the provision of novel controls for the aforesaid individual mechanisms either individually or collectively.

While the machine of the present invention finds particular utility in the handling of insurance statistics, records and accounts, its use is not limited to such applications, but on the other hand may be used in a wide variety of work where record cards containing perforations are used for controlling machine operations. For instance, the machine could be used in commercial accounting in making out various lists of status of accounts and for posting the individual records. The insurance terms herein used form a convenient means for explaining the invention and its objects, and in setting forth the novel results which the machine effects. Such terminology is to be considered broadly and as illustrative, and not in its specific and detailed meaning as applied to insurance accounting or practice per se.

Further and other objects will be hereinafter described and set forth in the accompanying specification and claims and shown in the accompanying drawings, which by way of illustration show what I now consider to be a preferred embodiment of the invention.

Numerous other objects will appear in the following description of the machine.

Referring to the drawings wherein I have shown what I now consider to be the preferred form of my invention:

Figs. 2 and 2a are diagrammatic representations of the various operations performed by the machine under control of the master record card and the audit card.

Fig 3 is a view of the master record card adapted to be employed in the machine.

Fig. 4 is a view of the audit card adapted to control the making of entries upon the master card.

Figs. 5 and 6 are portions of listing sheets containing data produced under control of the master card.

Fig. 7 is a portion of a master card containing certain controlling perforations.

Figs. 8 and 9 are portions of the master card containing other controlling perforations.

Fig. 10 is a diagrammatic representation of comparing mechanisms adapted to ascertain the relative values of designating numbers on the master card and audit card.

Figs. 11 and 12 taken together constitute a plan view of the machine.

Fig. 13 is a front view of the machine with numerous portions omitted so as to show more clearly certain parts of the mechanism for feeding the audit cards and the driving and controlling mechanisms.

Figure 14:
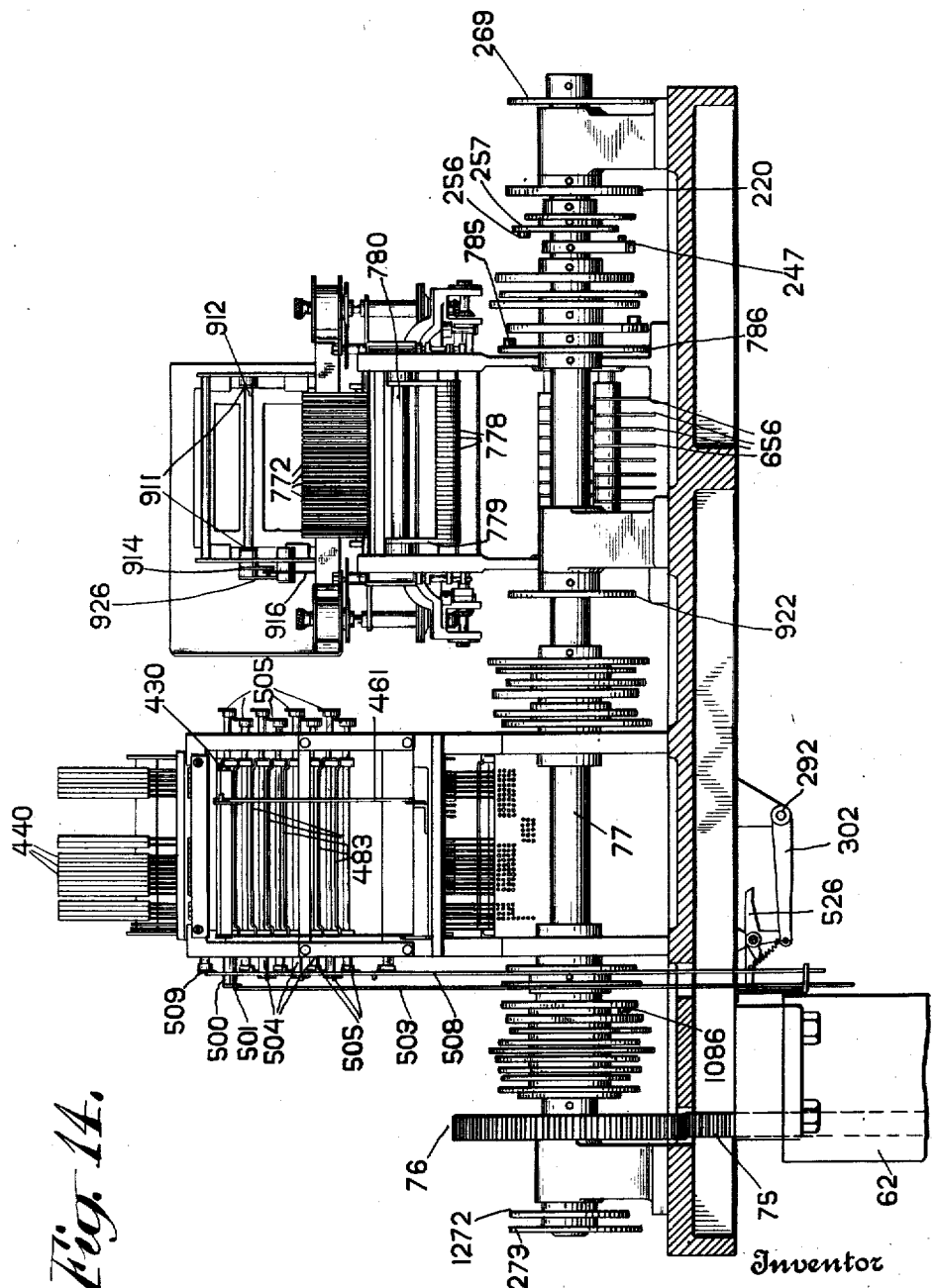

Fig. 14 is a section of the upper portion of the machine taken on line 14—14 of Figs. 11 and 12 and showing the upper drive shaft with numerous controlling cams.

Figure 15:
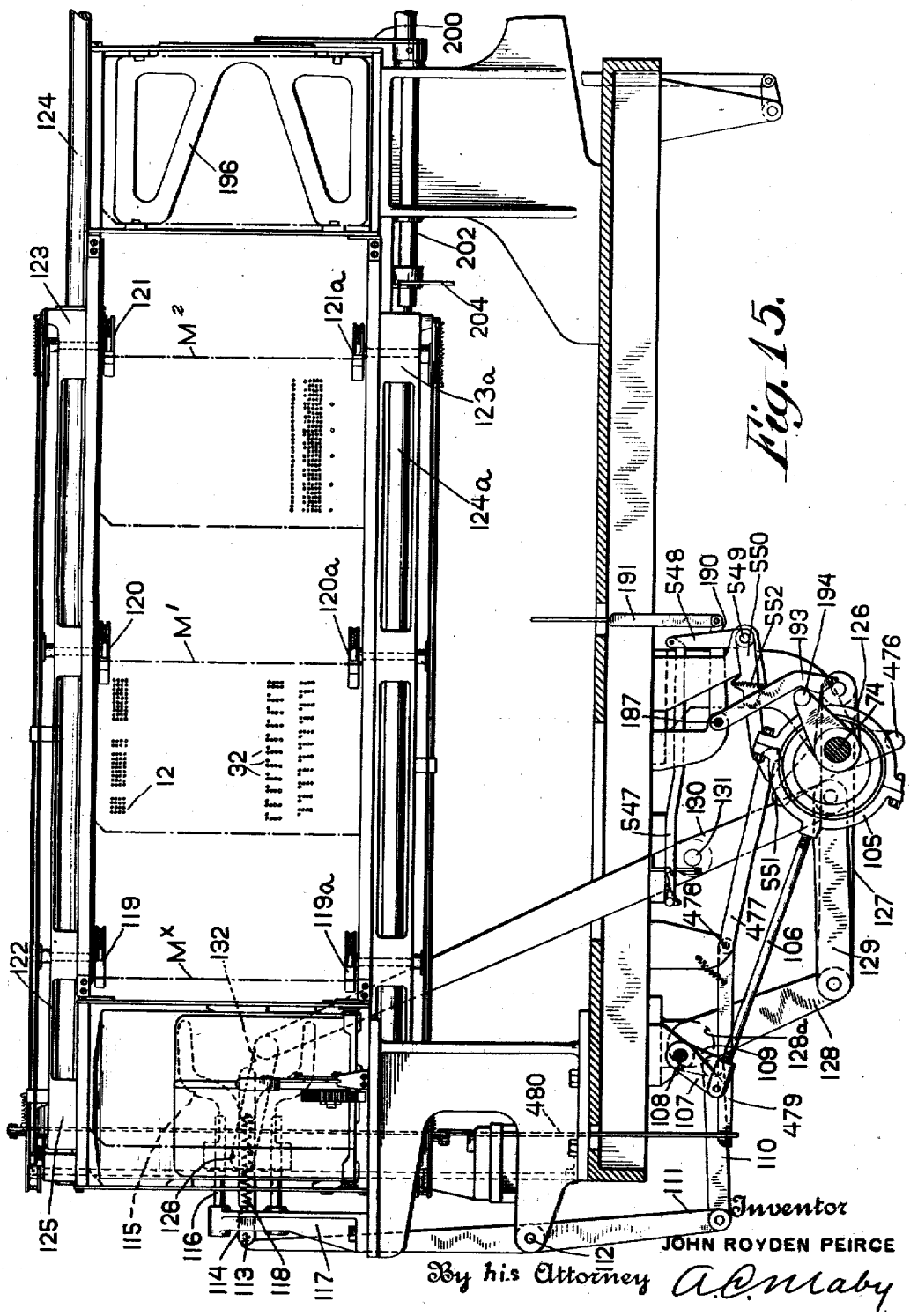

Fig 15 is a view showing the master card feeding mechanism and is a section taken substantially on line 15—15 of Figs. 11 and 12.

Figure 16:
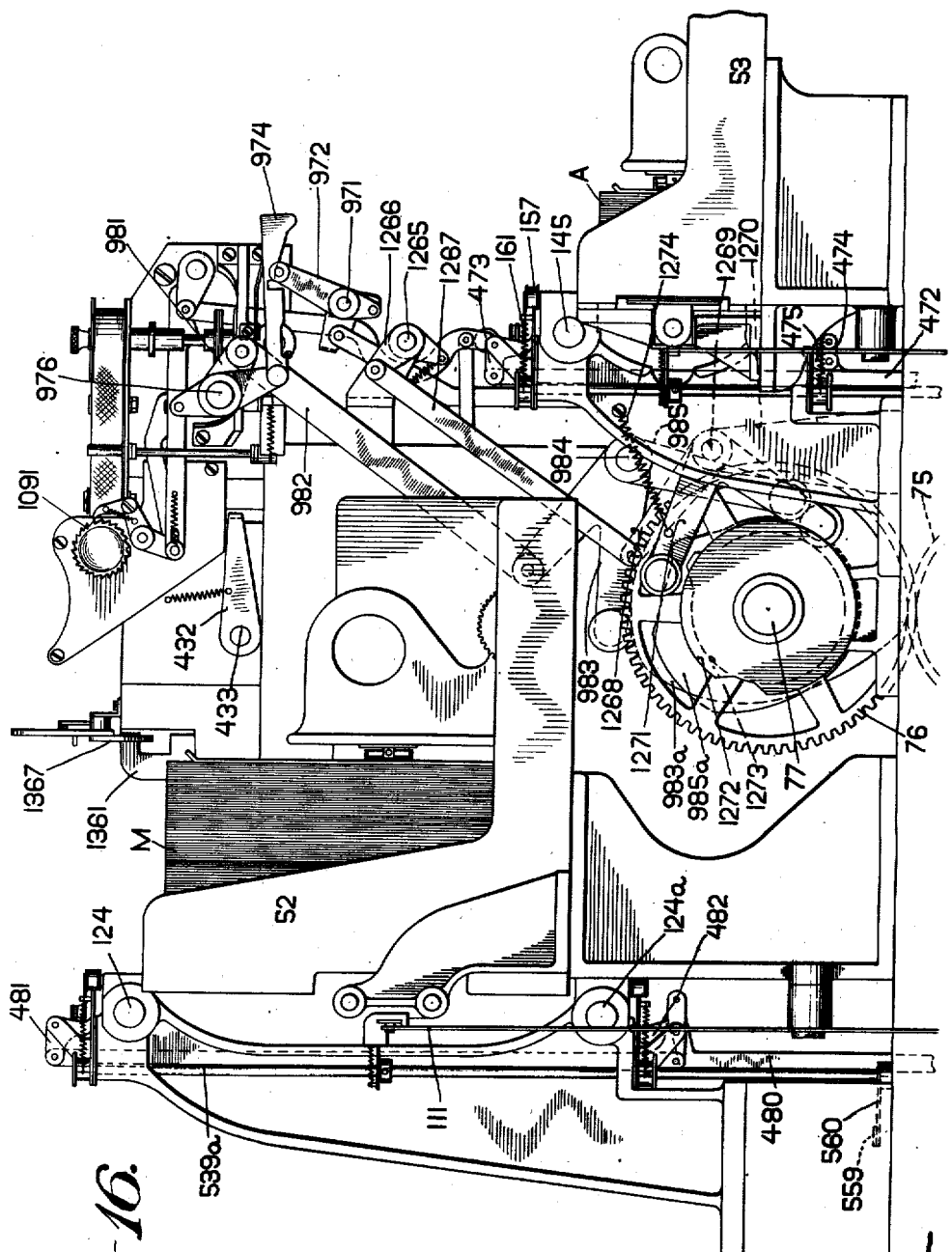

Fig. 16 is a view of the upper portion viewed from the left of the machine, showing portions of the printing mechanisms and the master card and audit card supply magazines.

Fig. 17 is a view showing mechanisms contained in the lower portion of the machine taken on the same plane as Fig. 16, parts being shown in section.

Fig. 18 is a detail view of controlling keys shown in Fig. 17.

Fig. 19 is a section taken on line 19—19 of Fig. 11 looking toward the comparing section of the machine and shows controlling and operating links and levers.

Fig. 19a is a detail showing the several positions of parts of Fig. 19.

Figure 20:
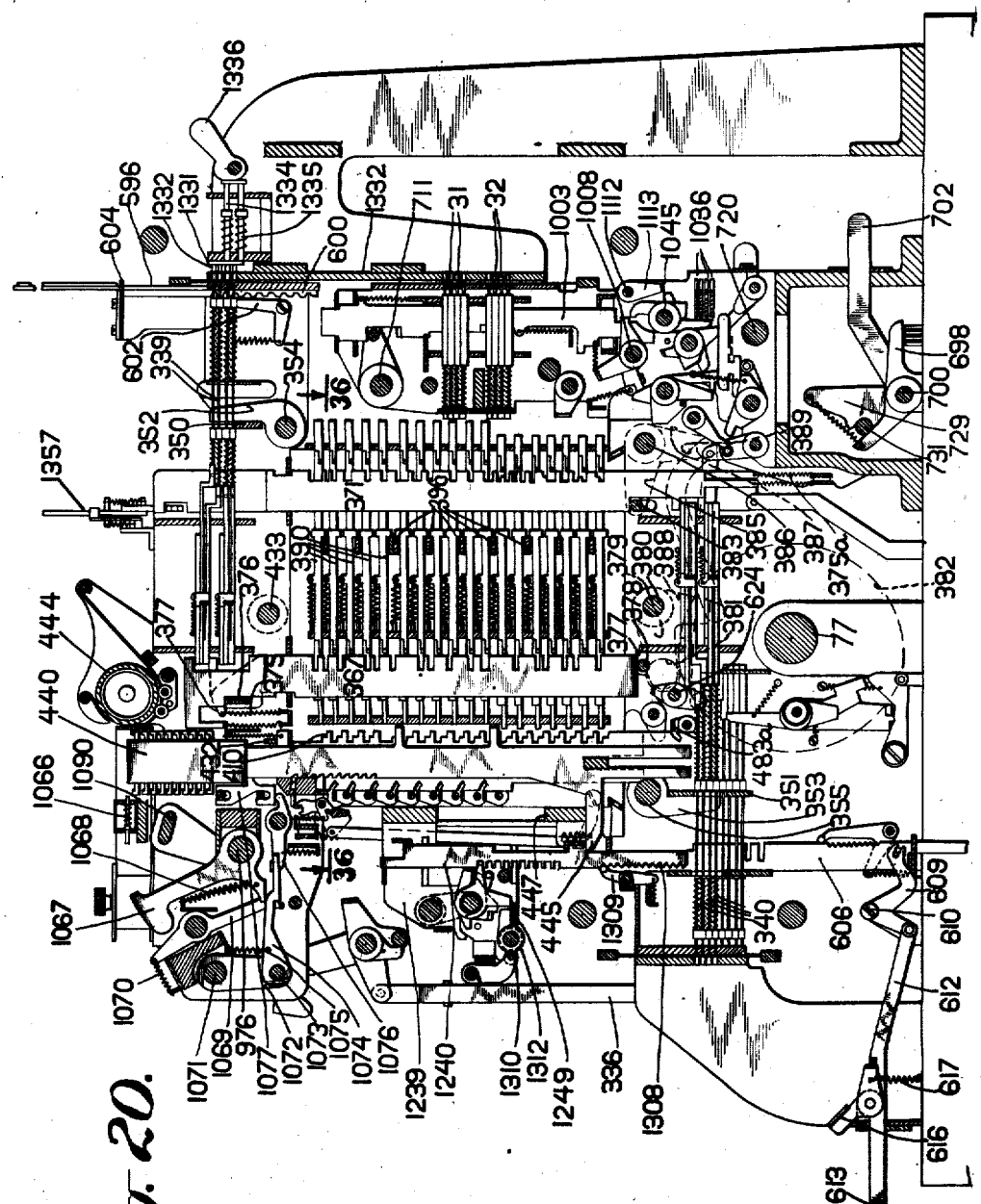

Fig. 20 is a sectional view of the comparing section of the machine taken on line 20—20 of Fig. 11

Fig. 21 is a side elevation of the comparing section of the machine, the view being taken on line 21—21 of Fig. 11.

Fig. 22 is a section of the lower portion of the machine showing mechanisms contained directly below the mechanisms shown in Fig. 21.

Fig. 23 is a view of the outside of the posting station and is the section of the machine taken on line 23—23 of Fig. 12 and shows manually set-up mechanisms for controlling the month in which the machine is operating.

Fig. 24 is a section of the posting station taken on line 24—24 of Fig. 12 and shows printing and perforating mechanisms for applying data to the master card.

Fig. 25 is a section taken on line 25—25 of Fig. 12 showing the outside of the posting station and the driving mechanism therefor.

Fig. 26 is a manual set-up device for controlling the machine for operating in predetermined periods.

Figure 27:
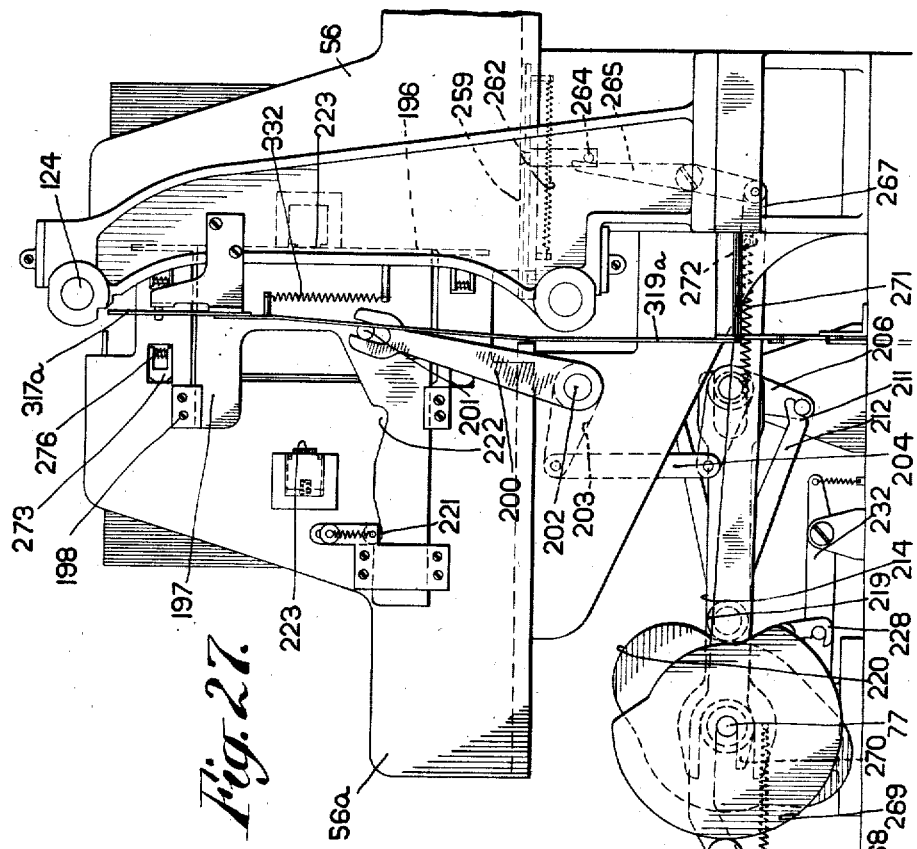

Fig 27 is an elevation of parts of the mechanism shown at the right end of the machine including reject and file pockets for receiving master cards and also showing mechanism for cancelling audit cards after the latter have performed controlling functions.

Figure 28:
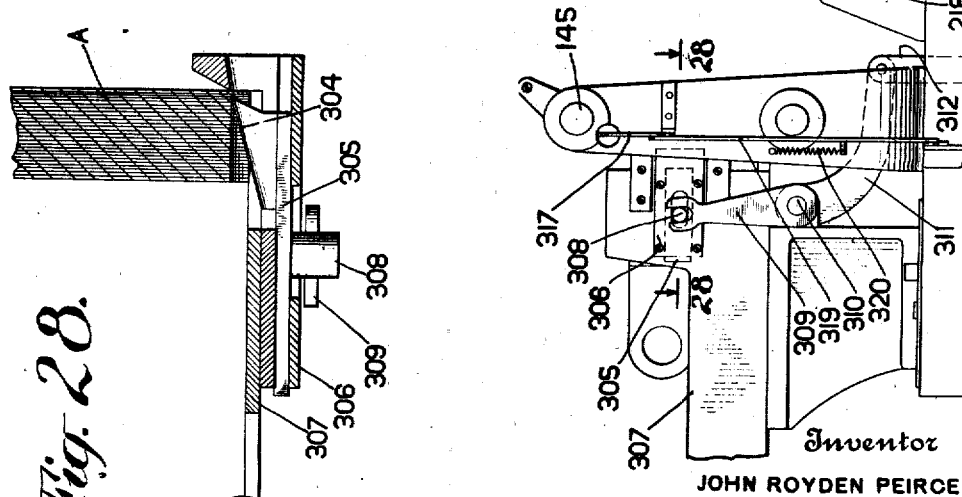

Fig. 28 is a section taken on line 28—28 of Fig. 27 showing the audit card cancelling mechanism.

Figure 29:
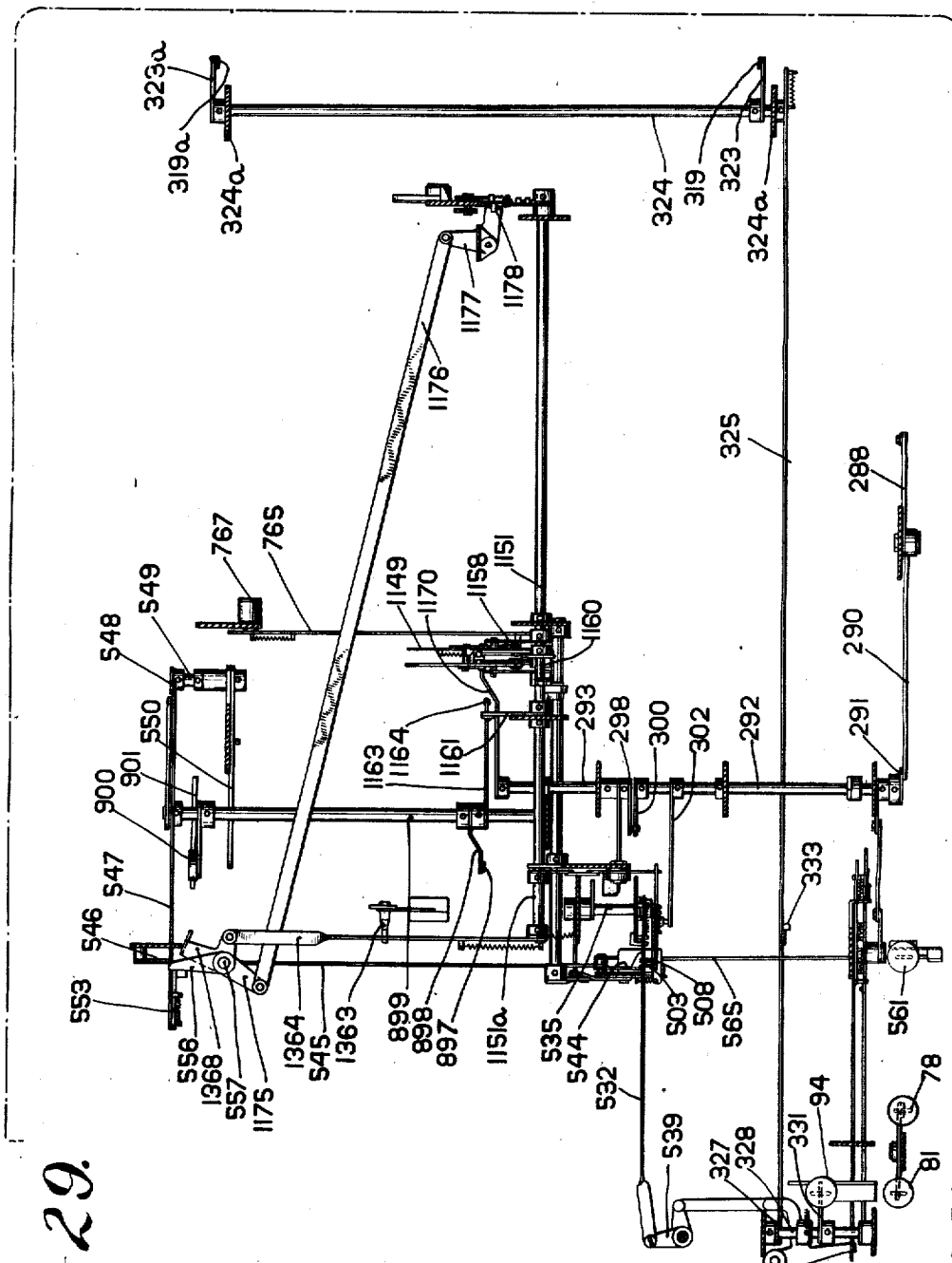

Fig. 29 is a sectional view taken on line 29—29 of Fig. 13 showing controlling linkages and mechanisms contained below the base of the machine.

Figure 30:
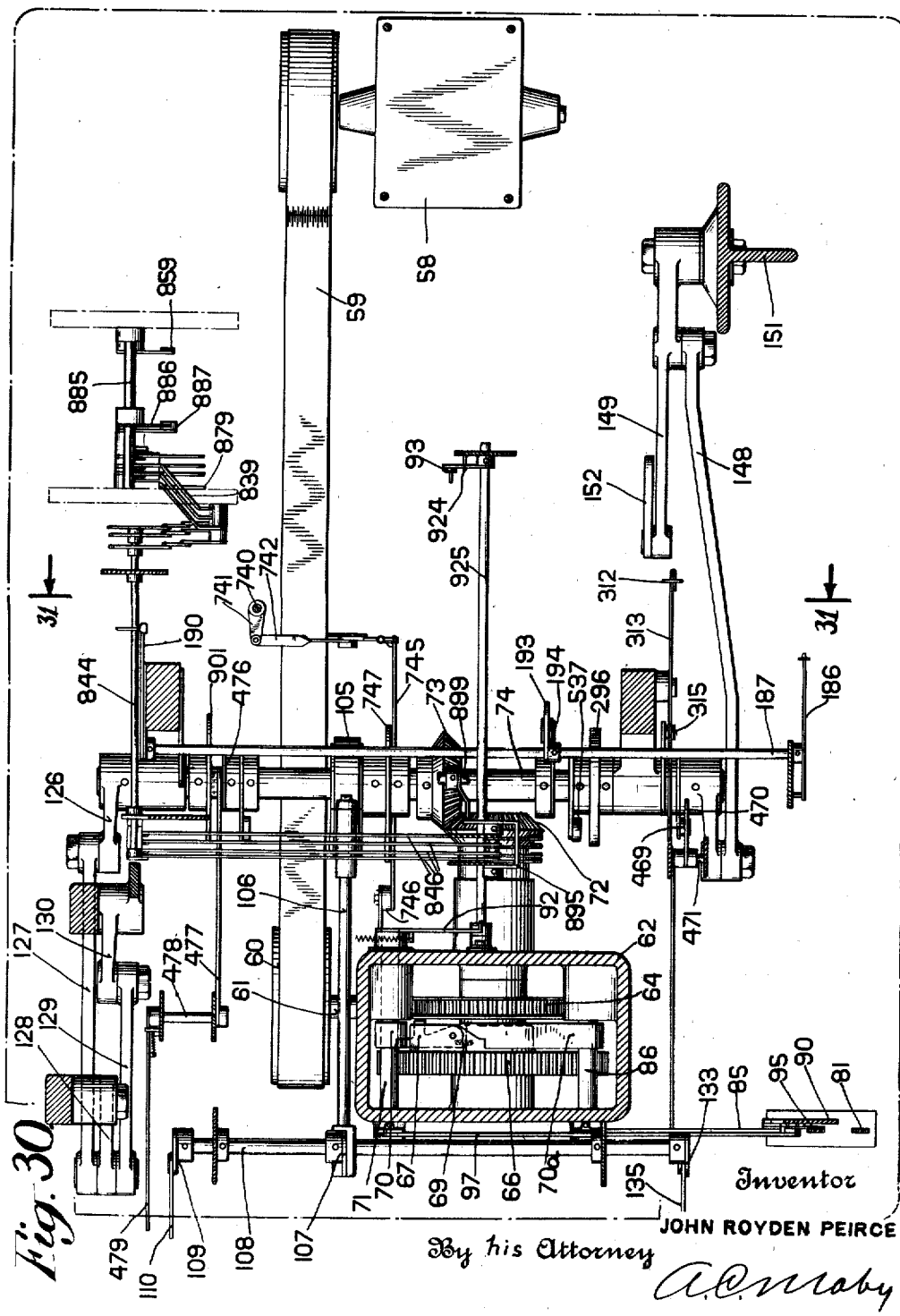

Fig. 30 is a section taken on line 30—30 of Fig. 13 showing additional mechanisms contained below the base of the machine including driving and controlling mechanisms.

Figure 31:
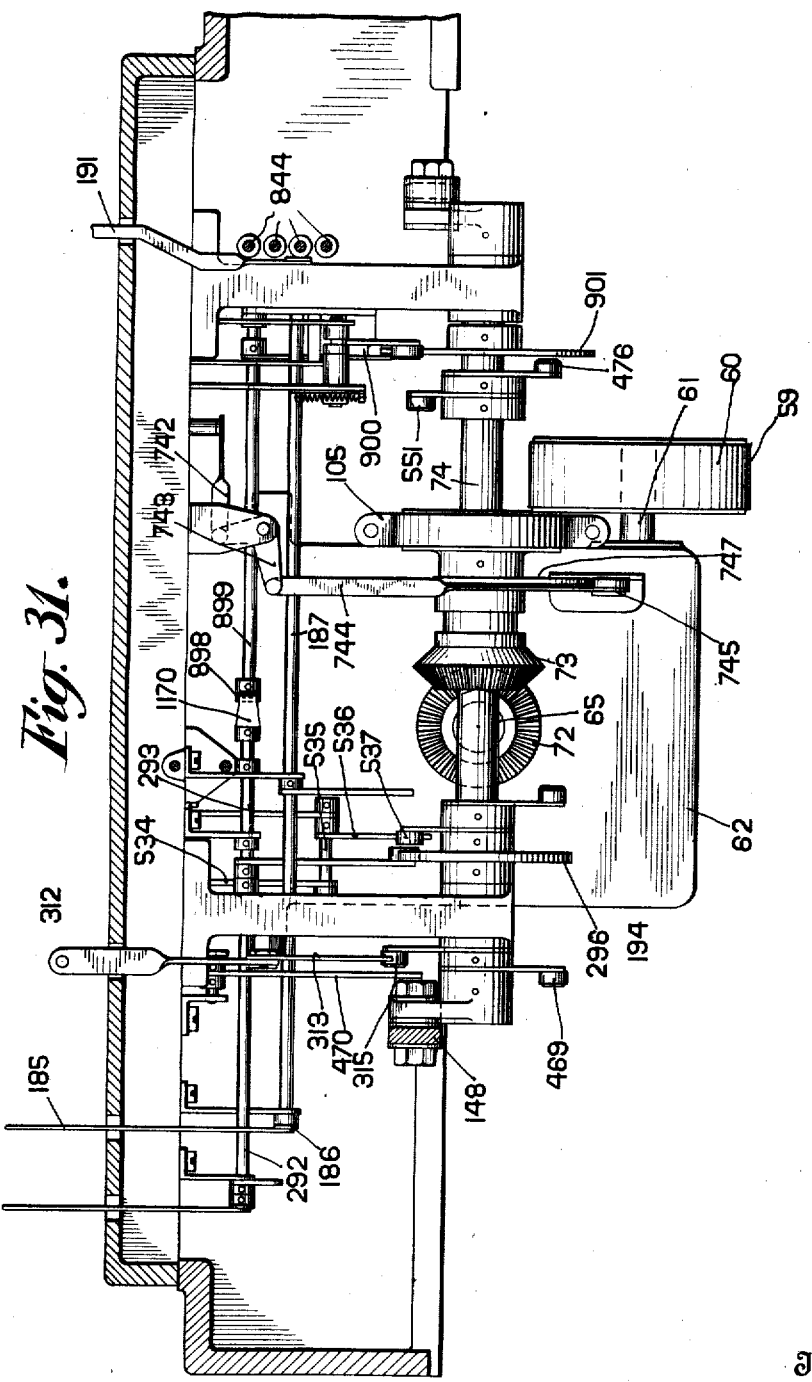

Fig. 31 is a section of the drive and control mechanisms contained below the base of the machine taken on line 31—31 of Fig. 30.

Figure 32:
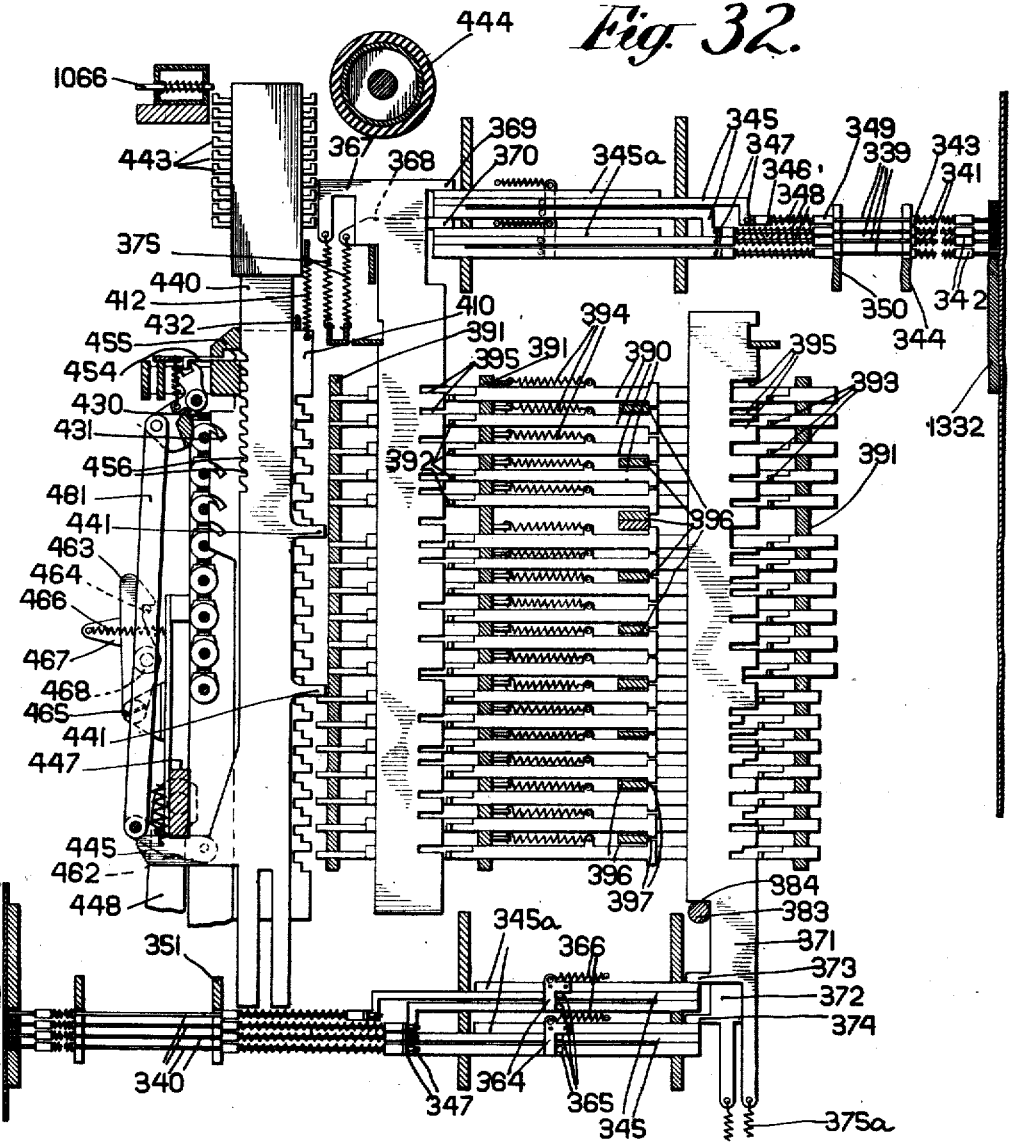

Fig. 32 is a view of the comparing mechanisms shown in Fig. 20, the parts being shown on a larger scale with numerous elements omitted so as to be more readily seen.

Figure 33:
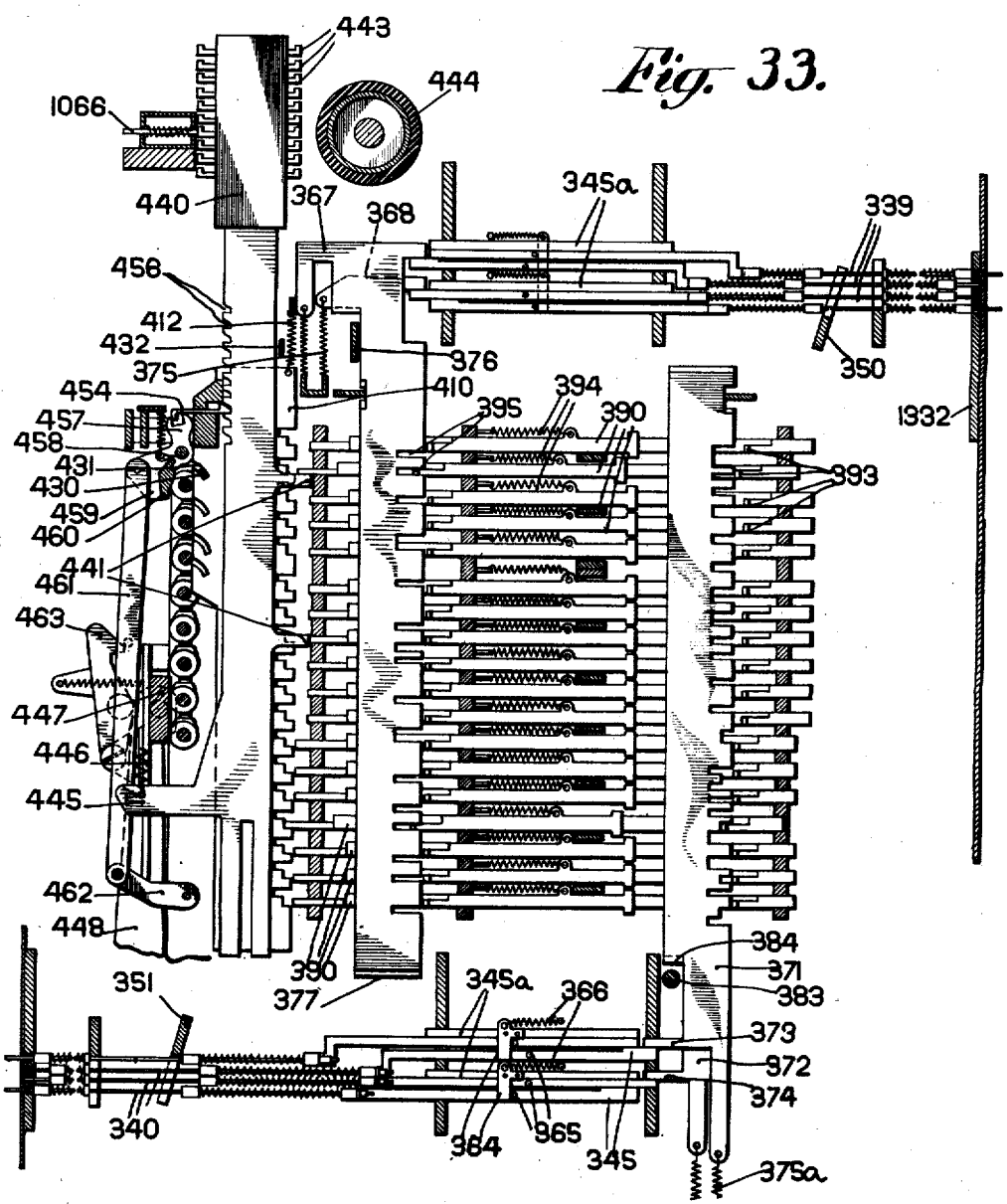

Fig. 33 is a view of the mechanisms contained in Fig. 32 with certain of the parts shown in different operating positions.

Fig. 34 is a perspective view of certain of the comparing elements disclosed in Fig. 32 in their normal positions.

Fig. 35 is a view of the parts shown in Fig. 34 in a reading position.

Fig. 36 is a section taken substantially on line 36—36 of Fig. 20 showing comparing mechanisms.

Fig. 37 is a section taken on line 37—37 of Fig. 36.

Fig. 38 is a diagrammatic view indicating the manner in which the machine ascertains which of several time periods the master card is grouped into.

Fig. 39 is a detail view showing manual set-up mechanisms for controlling the printing of certain data.

Fig. 40 is an end view of the mechanism shown in Fig. 39 looking toward the left.

Fig. 41 is a detail of Fig. 39 taken on line 41—41 of Fig. 39.

Fig. 42 is a diagrammatic representation of the operation of the mechanism shown in Fig. 39.

Fig. 43 is a detail of parts of the mechanism shown in Fig. 20 illustrating a manual set-up control device.

Fig. 44 is a fragmentary plan view of the mechanism shown in Fig. 43.

Fig. 45 is a detail of mechanism for causing stoppage of the machine in the event of jamming the type elements.

Figs. 46 and 47 are detail views of mechanism for controlling the machine to operate upon cards representing predetermined months.

Fig. 48 is a detail of the platen spacing mechanism.

Fig. 49 is a detail of mechanism for locking the audit card sensing pins in inoperative position when the machine is set for listing data taken from the master card without the controlling influence of the audit card.

Fig. 49a is an enlarged detail of the device shown in Fig. 49.

Fig. 50 is a sectional detail taken on line 50—50 of Fig. 49.

Figs. 51 and 52 are perspective details of the audit card and master card feed controlling mechanisms.

Figs. 53 and 54 are perspective details of the audit card feed mechanism, Fig. 53 being an enlarged view of part of the mechanism contained in Fig. 54.

Fig. 55 is a detail of mechanism for preventing card feeding operations when the machine is performing listing operations.

Fig. 56 is a sectional detail taken on line 56—56 of Fig. 55.

Fig. 57 is a view of the mechanism shown in Fig. 56 in different operating positions.

Fig. 58 is a detail of the audit card and master card feed controlling mechanisms.

Fig. 59 is a perspective view showing mechanism for transmitting readings taken from the audit card to the posting mechanism.

Fig. 60 is an illustration of the combinational arrangement of perforations in the card for representing certain information.

Fig. 61 is a detail of mechanism adapted to control certain of the card sensing pins.

Fig. 62 is a sectional detail taken on line 62—62 of Fig. 61.

Fig. 63 is a view of the zone sensing mechanism as seen from the front of the machine, parts of the mechanism being broken away to more clearly bring out the details of the other parts.

Fig. 64 is a detail of the zone sensing mechanism as seen from the back of the machine, parts of the mechanism being broken away.

Fig. 65 is a side view of the mechanism shown in Fig. 64 looking toward the left at the latter figure.

Figures 66, 67, 68:
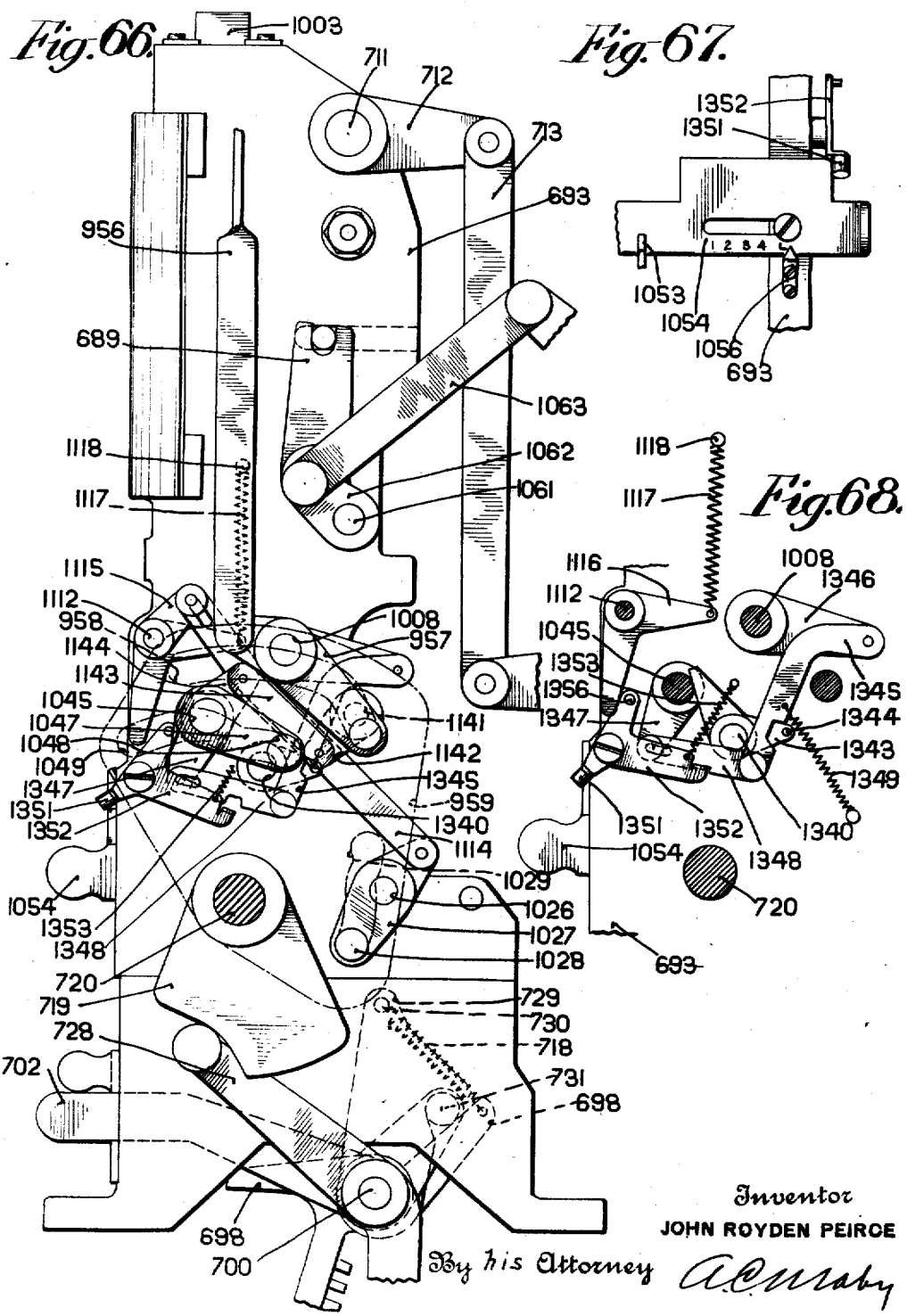

Fig. 66 is a side view of the mechanism shown in Fig. 64 looking toward the left at the latter view.

Fig. 67 is a detail of mechanism shown in Fig. 64.

Fig. 68 is a view of part of the mechanism shown in Fig. 66.

Figure 69:
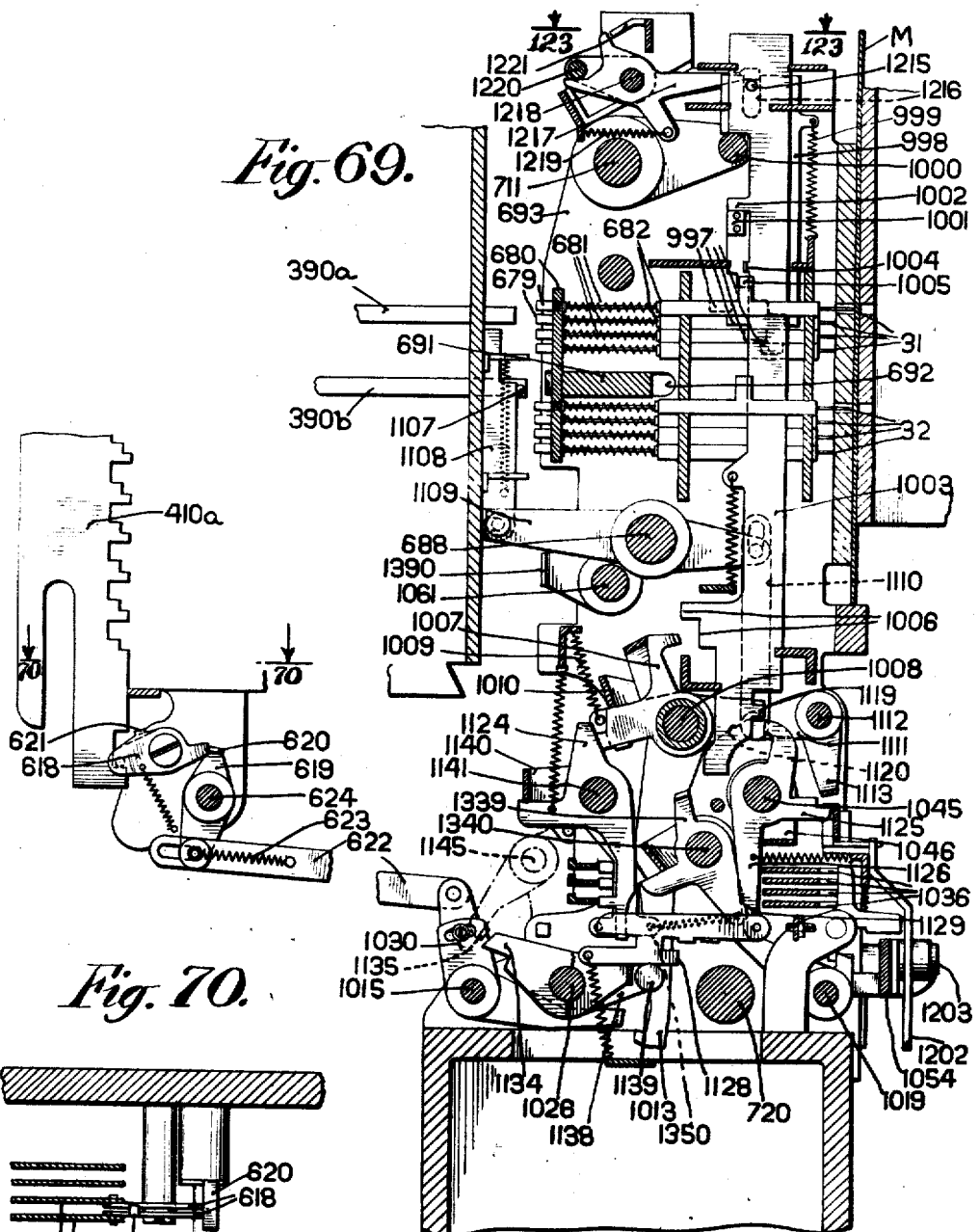

Fig. 69 is a sectional elevation taken on line 69—69 of Fig. 64, the parts being shown in normal positions.

Figure 70:
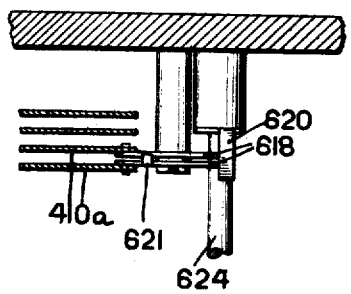

Fig. 70 is a sectional detail taken on line 70—70 of Fig. 69.

Fig. 71 is a view of the mechanism shown in Fig. 69 with the parts in operative positions, some of the parts shown in Fig. 69 being omitted.

Fig. 72 is a portion of a master card showing preforations for effecting certain controlling operations.

Figures 73, 74:
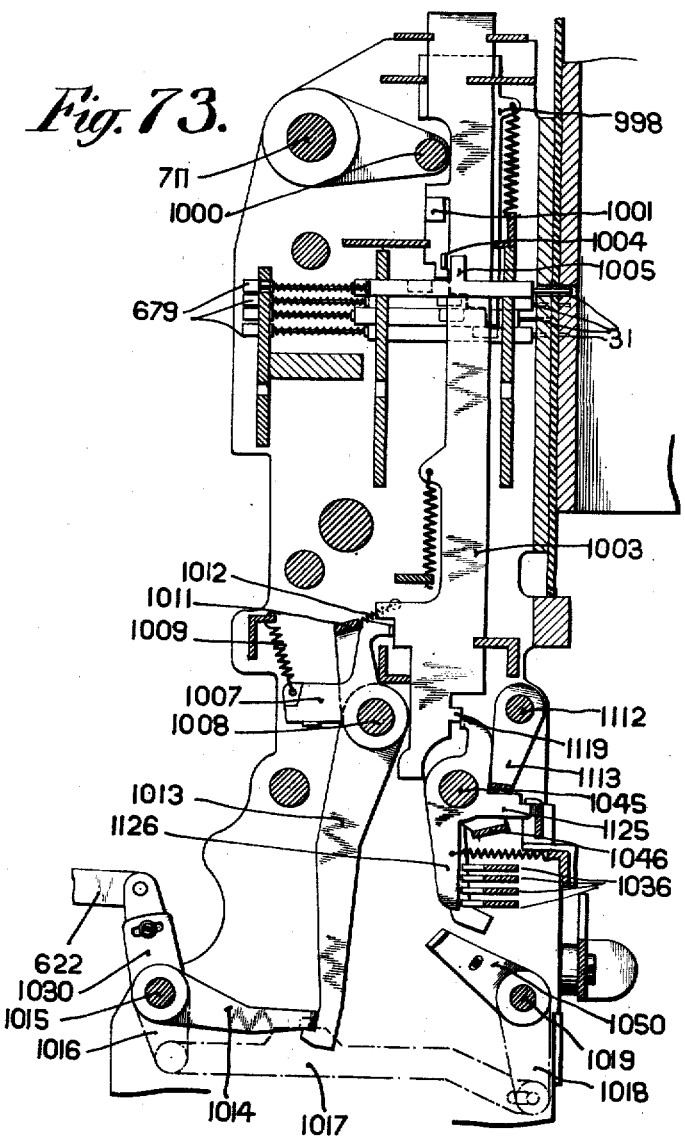

Fig. 73 is a view of the mechanism shown in Fig. 69 in operative position to prevent printing operations under certain conditions, parts of the mechanism of Fig. 69 being omitted.

Fig. 74 is a portion of a master card containing perforations for indicating that posting operations have already taken place in the field in which the machine is operating.

Fig. 75 is a perspective view of the mechanism shown in Fig. 69 and 71 in normal position.

Fig. 75a is a detail of parts shown in Fig. 75.

Fig. 76 is a view of the mechanism shown in Fig. 75 in operative position.

Fig. 77 is a portion of a card containing perforations adapted to cause the mechanism of Fig. 76 to assume the operative position there shown.

Fig. 78 is a perspective view of mechanism adapted to find an active zone of a master card, and associated mechanism for selecting the field in which posting operations are to take place.

Fig. 79 is a detail mechanism shown in Fig. 64 in operative position.

Fig. 80 is a sectional detail taken on line 80—80 of Fig. 79.

Figs. 81a to 81g, inclusive, are fragmentary portions of a master card perforated for effecting various controlling operations.

Fig. 82 is a perspective view of parts of the zone sensing mechanism.

Fig. 83 is a view of the portion of the mechanism shown in Fig. 82.

Fig. 84 is a portion of a master card containing perforations indicating that posting operations have been performed in certain of the posting fields.

Fig. 85 is a sectional view taken on line 85—85 of Fig. 64 showing mechanism adapted to detect cards filed in a wrong group.

Fig. 86 is a detail of mechanism shown in Fig. 85 and illustrates manual set-up mechanism for causing the machine to operate on cards of a definite group and to stop when cards of some other group are sensed.

Fig. 87 is a detail of mechanism shown in Fig. 85.

Fig. 88 is a perspective view of mechanism shown in Fig. 87.

Fig. 89 is a sectional detail taken on line 89—89 of Fig. 85.

Figure 90:
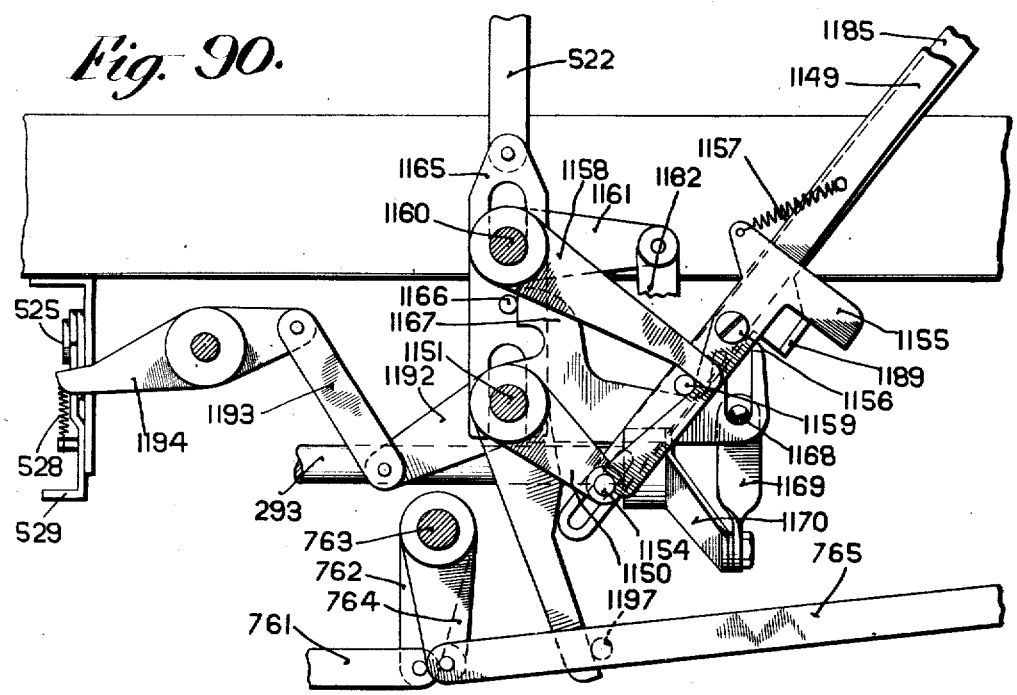

Fig. 90 is an enlarged detail of certain of the parts shown in Fig. 22 in their normal positions.

Figure 91:
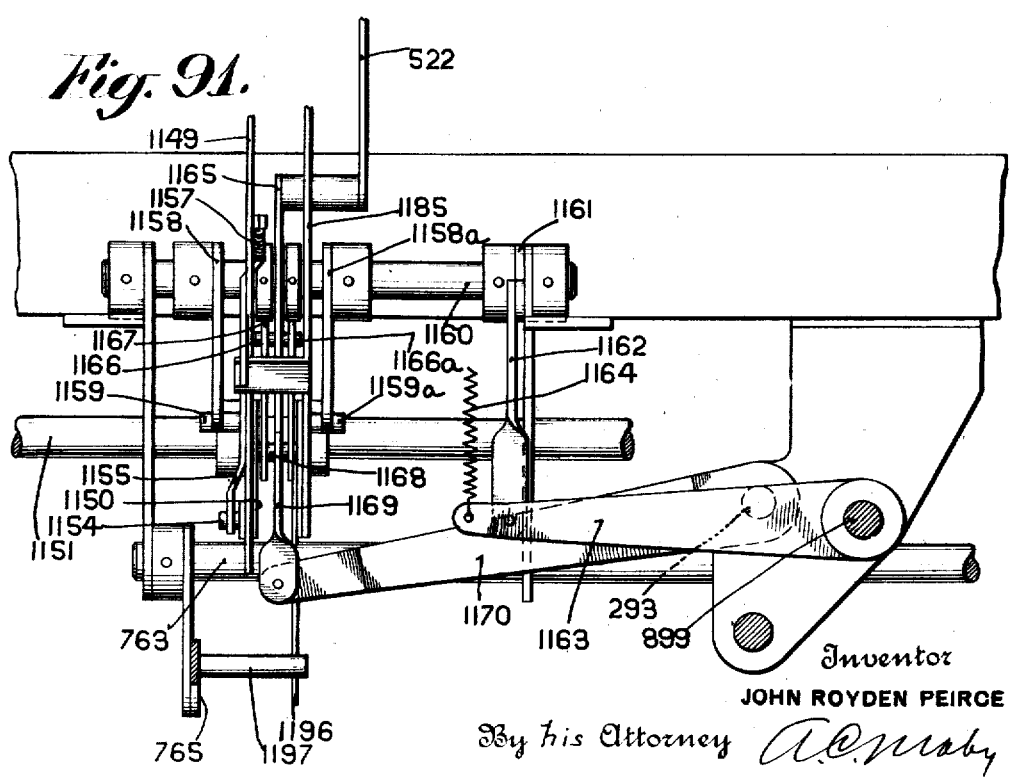

Fig. 91 is a view of the parts shown in Fig. 90 viewed from the right.

Figure 92:
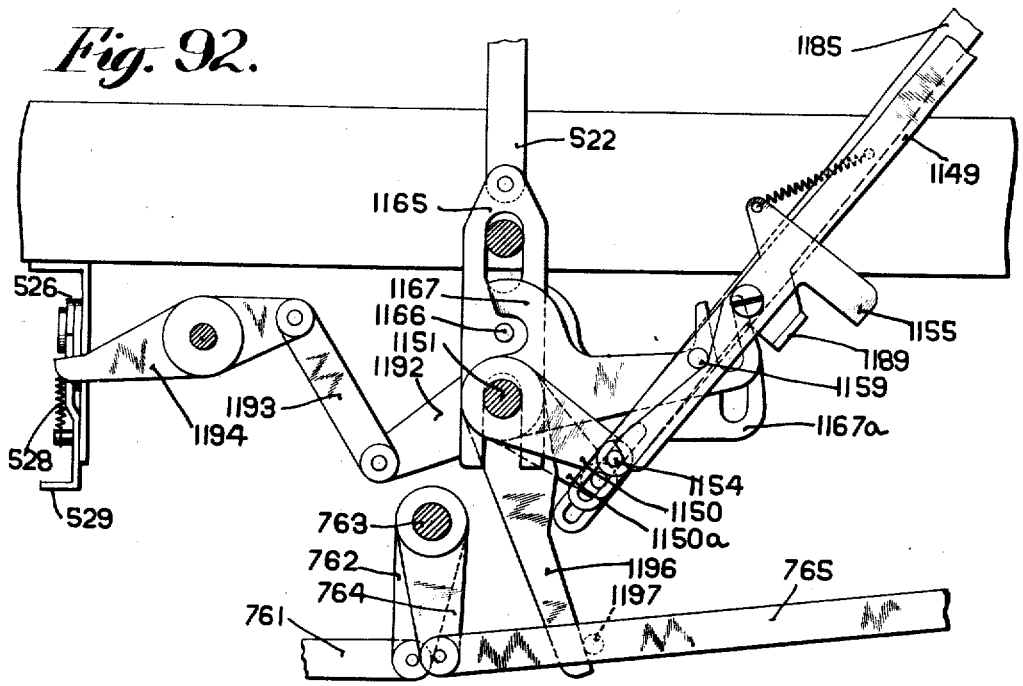
Figure 93:
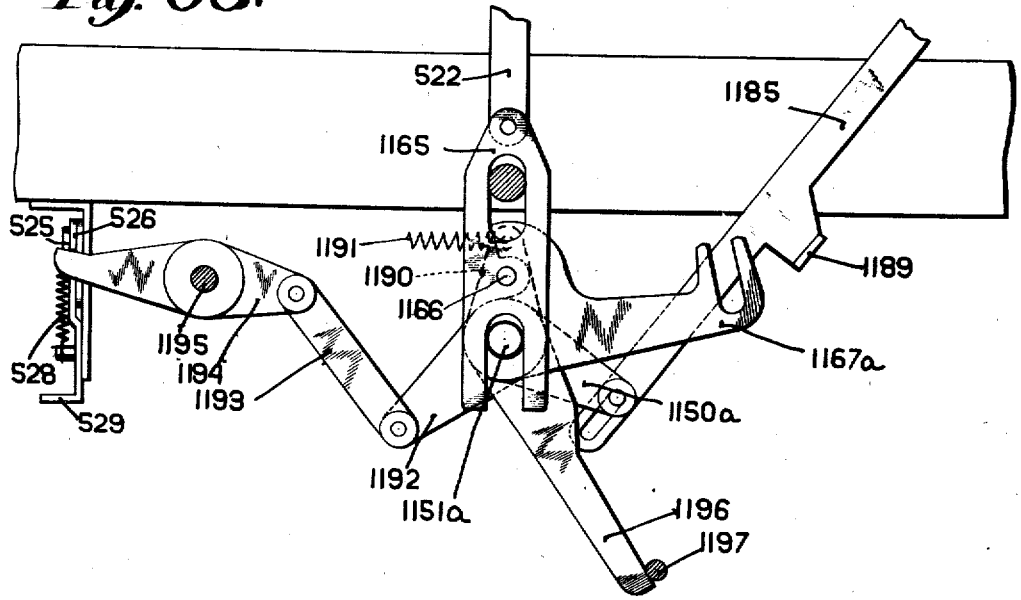

Figs. 92 and 93 are views of mechanism shown in Fig. 90 in different positions.

Fig. 94 is a view of the zone-finding mechanism viewed from the front of the machine showing certain control and restoring elements.

Fig. 95 is a sectional detail taken on line 95—95 of Fig. 96.

Fig. 96 is an illustration of zone-finding mechanism adapted to ascertain which of several zones on the master card is "active".

Fig. 97 is an enlarged detail of part of the mechanism shown in Fig. 96.

Fig. 98 is a view of the parts shown in another position.

Fig. 99 is a sectional view taken on line 99—99 of Fig. 96 showing the zone-finding mechanism.

Fig. 100 is an enlarged detail of mechanism shown in Fig. 20 for detecting a misfiled master card, the parts being shown in normal positions.

Fig. 101 is a section taken on line 101—101 of Fig. 100.

Fig. 102 is a view of the mechanism shown in Fig. 100 as seen from the front of the machine.

Fig. 103 is a section taken on line 103—103 of Fig. 102.

Fig. 104 is a detail taken on line 104—104 of Fig. 102.

Fig. 105 is a detail of mechanism shown in Fig. 104 in operative position.

Fig. 106 is a detail of parts shown in Fig. 100 in moved position.

Fig. 107 is a view of mechanism shown in Fig. 103 in another position.

Fig. 108 is a view of the parts shown in Fig. 106 in another position.

Fig. 109 is a section showing type elements and punches for producing records upon the master card.

Fig. 110 is a view of the mechanism shown in Fig. 109 with the parts in operative positions.

Fig. 111 is a section taken on line 111—111 of Fig. 109 showing means for locking the type bars against operation.

Fig. 112 is a detail of the master card pocket and reject pocket shown in Fig. 27 with the controls set to cause the master card to be deposited in the file pocket.

Fig. 113 is a section taken on line 113—113 of Fig. 112.

Fig. 114 is a section taken on line 114—114 of Fig. 115 showing details of the clutch mechanism.

Fig. 115 is a detail of controlling mechanism for the pockets shown in Fig. 112, the parts being here shown in position to cause the master card to be deposited in the reject pocket.

Fig. 116 is a section taken on line 116—116 of Fig. 115 showing clutching mechanism.

Figs. 117 and 118 are a plan and side elevation view respectively, of the audit card reject pocket.

Fig. 118A is a detail of parts shown in Fig. 69 and is taken on line 118A—118A of Fig. 118B.

Fig. 118B is a detail of parts shown in Figs. 64 and 69 for controlling the printing of an asterisk on the listing sheet and the feeding of master cards.

Fig. 118C is a view of some of the parts of Fig. 118B in different positions.

Fig. 118D shows a portion of a card perforated to control the mechanisms shown in Figs. 118A to 118C.

Figs. 119 and 120 show in different positions mechanism for causing stoppage of the machine after two audit cards have been successively fed through without the corresponding feeding of a master card.

Fig. 121 is a detail of the audit card feeding mechanism, parts being shown in section and the card-gripping means being in position to receive a card.

Fig. 122 is a detail of part of the mechanism shown in Fig. 121, clips have gripped the card and begun to advance.

Fig. 123 is a view taken on line 123—123 of Fig. 69 showing mechanism for detecting a card upon which posting was previously effected for the period in which the machine is set to operate and also an advance indication of a payment not yet due, and for controlling the machine accordingly.

Fig. 124 is a detail of said mechanism in a different position from that shown in Fig. 69.

Fig. 125 is a detail of means for setting said mechanism.

Figure 126:
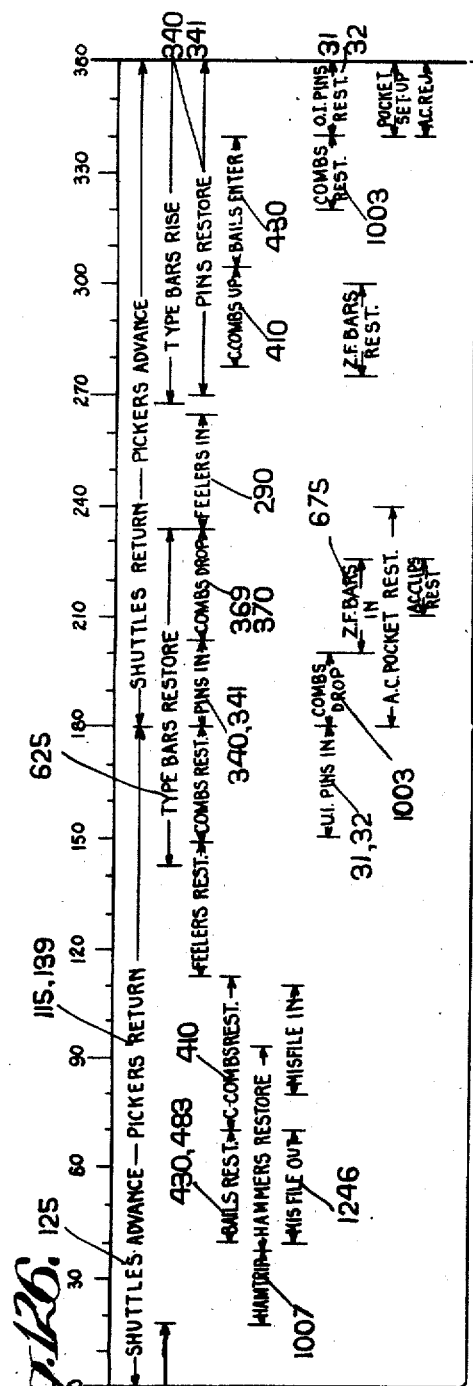
Figure 127:
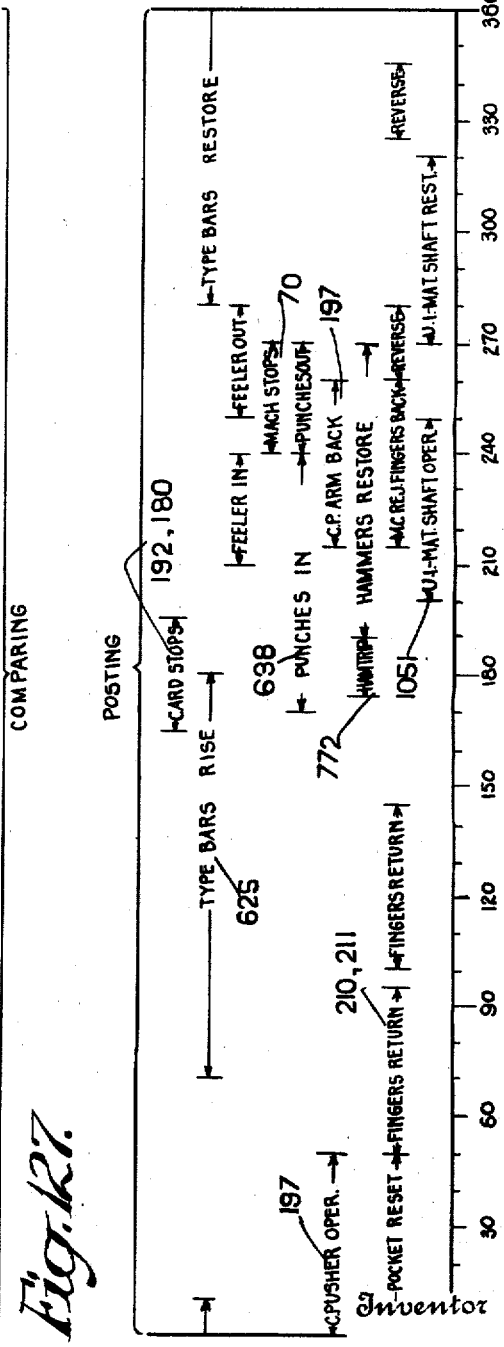

Figs. 126 and 127 are timing charts; Fig. 126 showing the times of operation of the various parts of the machine during a comparing cycle of operation and Fig. 127 showing the times of operation of the parts during a posting cycle of operation.

Before entering upon a detail description of the machine, the cards adapted to be used in the machine will be described and a general description in connection with the diagrams in Figs. 2 and 2a will be given.

Fig. 3 shows a master card, designated M, upon which is recorded the salient data concerning an insurance policy. In a horizontal field 40, at the top of the card, data representing date, policy number, premium payable and other data are printed. Directly below this field is a horizontal field, 40a, containing perforations representing the printed data in the field above. Under each digit are the perforations representing that particular digit. In a horizontal field 41, is the name of the insured and below this field, in the field 41a, are the perforations representing the name of the insured, each letter being represented by one or more perforations in any of six possible positions directly below the particular letter. In the horizontal field 42, is contained the house number and street of the insured, while the corresponding perforated data representing the same information is contained in the field below designated 42a. Field 43 contains in printed form the city and state in which the insured resides and the corresponding perforations are contained in the field 43a. The lower portion of the card is divided into numerous fields including five main fields, 44a–44e, inclusive, contained between the heavy vertical lines 45. Each of these fields is divided into sub-fields, 33, representing the four quarterly periods of the year. In the upper portion in each of the fields is a small square 994 adapted to receive a perforation indicating that the insured has been notified that a premium is payable, in connection with his policy. This perforation is made on another machine and is to be sensed by the machine disclosed in the present invention. Within the fields 33, outside of the small square, 994 is space for additional perforations indicating that posting has been effected and also representing the date on which the posting entry was made. These perforations are made by the present machine, the date also being printed in the space directly above the perforations themselves. In the lower portion of fields 44a and 44b, etc., is another subfield, 46, adapted to receive perforations relating to dividends payable to the insured upon his policy. This data is entered upon the card by a perforating machine. In the space 46a, directly above the sub-field 46, the machine also prints data relating to the dividend. If a policy is issued during the months of January, February, or March, the first of the four year sub-fields, 33, under the heading Mar. will be utilized for posting operations. In the present instance the data entered being 3.28 representing the third month and the 28th day. If a policy is issued in the months of April, May or June, the field under the heading, Jun. will be utilized. Should the policy issue toward the end of the year, the last of the four sub-fields 33, in the main field 44a, will be utilized for the first entry, the three previous fields remaining blank. For the following year the entries will be made in the field 44b, etc., until the card has become exhausted when the last entry is made in the last quarter in the field 44e.

In this system it will be seen that in making the entries upon the master card any one of the five fields, 44a to 44e, may be the active field for that particular year depending upon the year in which the insurance issued. It is therefore necessary that the machine be adapted to ascertain which of the five year fields is active on a particular card when posting operations are being performed, so that if the machine ascertains that the premium is payable in connection with a particular policy, and that the payment of the premium has been made, it will automatically post the fact of payment in the proper field. Fig. 4 shows the audit card, designated A, which is produced in the machine which makes out the notice which is to be sent to the insured. In producing the notice, the notice machine reads data contained in the field 40 on the master card and enters the data upon the notice slip along with the name and address of the insured, which it also takes from the master card by reading the perforations and printing the data on the notice slip. While printing the notice the machine also prints in the field 47 on the audit card A, data taken from field 40 of the master card and perforates this data in the field 47a on the audit card. Certain data relating to dividends may also be entered in printed form in its proper position in the horizontal field 48 of the audit card and perforated in the field 48a of this card. Both the audit card and the master card contain provision for numerous other items of information, some of which have no connection with the machine of the present invention and therefore need not be dealt with here. Certain other items of information do have to do with the present invention and will be dealt with presently.

Figure 2:
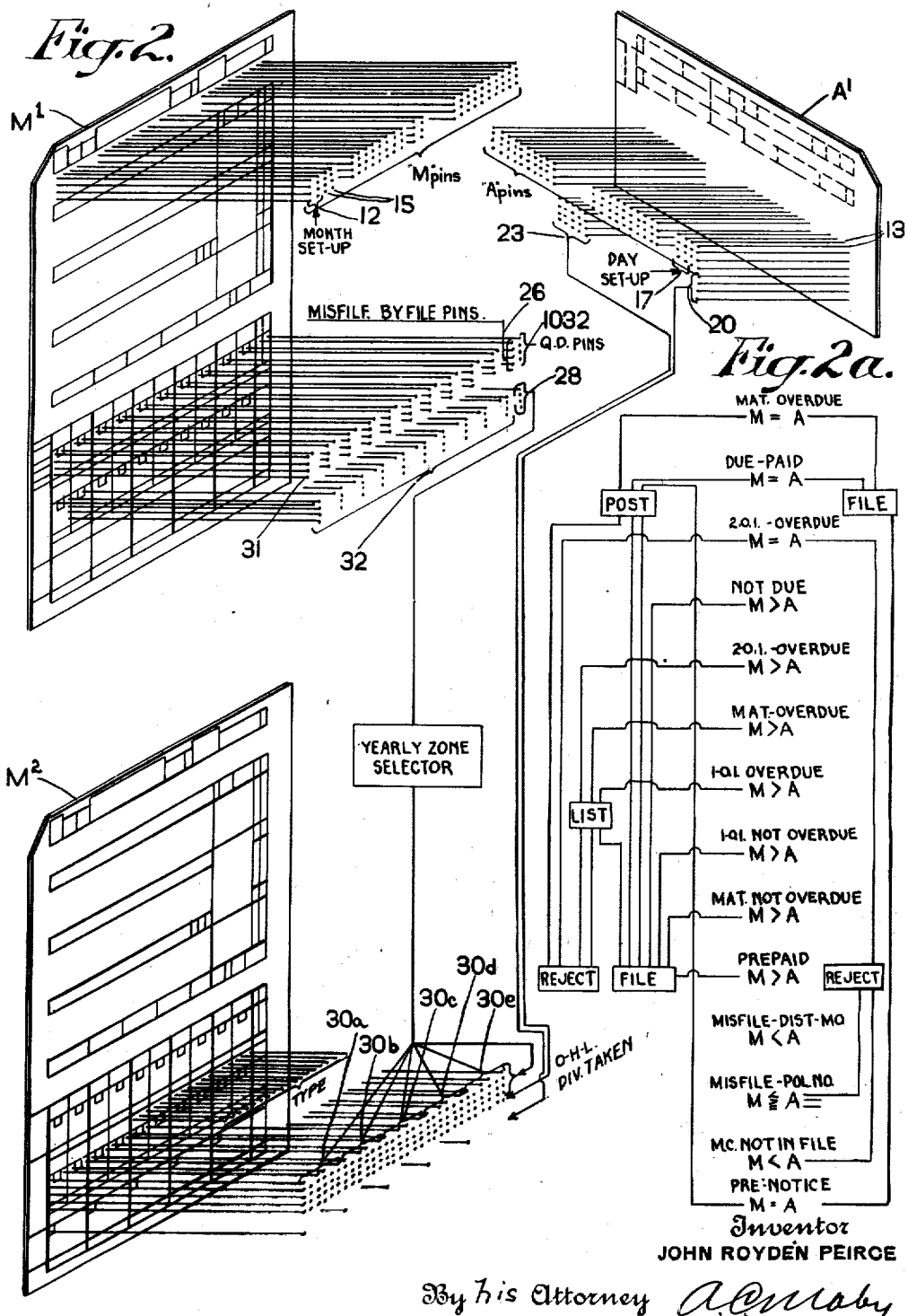

In Fig. 2, the master card is shown in two successive positions designated M¹ and M², and the audit card A¹ is shown in position opposite the master card M¹. The cards M¹ and A¹ in this figure represent the positions of the cards when in the comparing station of the machine having been fed there from their respective supply pockets.

In the comparing station several sensing operations are performed upon each card. Some of the data thus sensed in one of the cards is compared with corresponding data sensed in the other card while some of the data is compared with certain set-up conditions in the machine. For instance, a group of pins 12, designated "month set-up", are adapted to cooperate with an adjustable plate within the machine which is manually set to represent the month for which posting is being effected. This plate contains perforations and the pins for reading the perforations are grouped with the pins which read the data on the master card.

Another group of pins, 13, is adapted to sense perforations 14, Fig. 4, representing the month on the audit card. The data sensed by these two groups of pins is compared and if the month is found to be the same in both instances certain-controlling mechanisms are set to cooperate with other controlling mechanisms to bring about the posting operation.

Another group of pins 15, is adapted to sense perforations designated 16 in Fig. 3, on the master card and the data thus sensed is compared with a reading taken by a group of pins 17 designated "Day set-up". These pins take their reading from certain combs which are manually set-up. If the readings taken by the groups of pins 15 and 17 are found to represent the same day, additional controlling mechanisms are so set as to contribute toward permitting a posting operation to take place. The remainder of the pins in the group designated M pins are adapted to read the perforations on the master card representing the policy number, district, premium payable and so forth contained in the field 18 on the master card as shown in Fig. 3.

Similarly the remainder of the group of pins, designated A pins are adapted to sense perforations representing corresponding items in the field 19 on the audit card, Fig. 4. The readings taken by these opposing groups of pins are compared and if the data is found to be the same in both instances, further controlling mechanisms are so set as to contribute toward permitting the machine to perform posting operations. The group of pins designated 20, is adapted to read perforations 21 on the audit card (see also Fig. 4), to ascertain certain effects in connection with the place and manner of payment of the premium to control posting of data in the fields 22, designated O., H., and L., on the master card shown in Fig. 3. The group of pins 23 is adapted to cooperate with perforations 24, Fig. 4 in the audit card representing a dividend due the insured and along with the pins that sense perforations 21 to control the making of a perforation in the field 25 on the master card indicating that a dividend has been credited to the insured.

Another group of pins 26 is adapted to sense perforations in the field 27 of the master card and determine whether the particular card belongs to the group upon which the machine has been manually set to operate. If the card belongs to the group, the machine is permitted to continue operations, otherwise it is stopped.

Another group of pins 28 is adapted to read perforations in the field 29 of the master card to ascertain the year in which the first entries were made upon the card, comparing this with a set-up in the machine representing the current year and through this comparison determine the position upon the card for posting the current data by selecting one of the five groups of punches, designated 30a, 30b, 30c, 30d, or 30e for operation.

Another group of pins contained in two rows, 31 and 32, is adapted to sense perforations in all of the fields 33, to determine the status of the account and to control the operation of the machine accordingly. Thus if these pins ascertain that the account is in good standing it permits operation of the group of punches 30a to 30e, respectively, which has been selected for operation by the pins 28 to perform a posting operation by perforating the master card.

When a posting entry is made in the last of the active quarters or sub-fields 33 in the main field 44e, it becomes necessary to enter the account upon a new master card upon which the data relating to the payment of premiums for the ensuing year will be entered commencing in the main filed 44a. In order that a new card may be filled out to take the place of the one matured, the machine is adapted to feed the master card after making the last entry, to the reject pocket of the machine instead of to the file pocket.

Fig. 2a is a diagram indicating the operations that the machine is adapted to perform upon detecting various conditions of the account. Thus at the top of the diagram we find a condition wherein the master card is equal to the audit card or in other words, the policy numbers on the two cards are equal. The other data on the master card is the same as that being sensed on the audit card. Also, the card is maturing, and this entry is being made in the last of the active fields 33. The master card is fed to the posting station and the posting operation is performed. The audit card on the other hand is fed to the file pocket. After posting, the master card is then fed to the reject pocket so that it may be removed from the files and a new card substituted. The condition of the card is also indicated as being overdue by day, which means that the machine has detected that the premium, being paid is late, but is not being paid beyond the grace period and as the policy therefore does not lapse, the posting operation is performed in the usual manner.

The next condition is one where the master card and the audit card being sensed are found to be the same, the machine having ascertained from the master card that a payment is due and the presence of the audit card matching the master card indicating that the amount has been paid. The master card is then fed to the posting station where posting is performed after which the card is passed on to the file pocket to be returned to the files. The audit card, on the other hand, is then fed to the audit file pocket where it is cancelled.

A third condition is where the machine detects the presence of an audit card corresponding with the master card, indicating that a payment for the current period is being made but the machine also detects that there are two open items or unpaid premiums. Two payments are now due and the non-payment of the first of these two has caused the policy to lapse. No posting operation will be performed under this condition and the audit card is therefore fed to the reject pocket.

A fourth condition is one in which the master and audit cards, upon being compared, are found not to match each other. The machine also ascertains that the policy number of the master card is larger than the policy number of the opposing audit card. The cards are fed into the machine with the higher numbers running first. The machine is adapted upon discovering different numbers upon the master and audit cards to retain the card having the lower number and to feed out the card having the higher number. Thus in the present instance, the master card is removed from the posting station while the audit card remains at that station to be compared with the next master card coming into the station. The file to which the master card is fed will be determined by other conditions of the card. In the present instance, the machine has ascertained that a premium is not due at the present period and the card is therefore fed to the file pocket for filing.

A fifth condition is one where the master card policy number is larger than the policy number on the opposing audit card. The audit card is again retained in the posting station while the master card is fed out. The machine in this instance has also ascertained that there are two open items, in other words, two due premiums have not yet been paid. The machine then enters this information upon the listing sheet after which the master card is fed on to the reject pocket.

A sixth condition is one where the master card policy number is larger than the policy number on the opposing audit card and again the audit card is retained, while the master card is fed on. The machine also ascertains that the card should mature during the current posting period and that the premium is overdue. This fact is therefore entered upon the listing sheet and the master card fed to the reject pocket.

A seventh condition is one where the number of the master card is greater than that of the audit card and there is one open item or in other words, one premium stands unpaid, and is overdue, but as the grace period has not passed, the policy does not lapse and the master card will therefore not be fed to the reject pocket.

The next condition is one where the master card number is greater than that of the audit card and one premium is due but is not overdue. The master card is then passed on to the file pocket.

The next condition is one where the master card number is greater than that of the audit card. The card will mature upon the making of a posting entry, but the premium is not overdue and the master card is fed to the file pocket.

The next condition is one where the master card number is greater than that of the audit card but the premium has been prepaid. The master card will then be fed to the file pocket.

The next condition is one where the master card number is less than that of the audit card but the machine has detected, however, that the master card being sensed does not belong to the group of cards being run through the machine, or in other words, the master card has been misfiled. In this case neither the audit card nor the master will be fed from the comparing station, and the machine will be caused to automatically stop, permitting the operator to remove the card from the machine.

The next condition is also one in which the master card has been misfiled according to policy number. In this case the audit card is fed to the reject pocket.

In the next condition, the master card number is less than the audit card number, indicating that the master card which should have been fed into position to compare with the audit card was not in the file. As the machine is adapted to feed the card which has the higher of two opposing policy numbers, the audit card will in this instance be fed to the reject pocket.

The next condition is one where the master and audit cards are equal and the machine also detects a perforation indicating that a notice has been made out in advance for the next premium period. Ordinarily the machine would be controlled to reject the master card and list the policy as having lapsed. In order to avoid this rejection and listing, mechanism is provided whereby the machine recognizes the advance notice perforation as such, suppresses operation of the rejection and listing control so far as the advance notice perforation is concerned.

In the event that a master card bearing the number 25, for illustration, should be misfiled between those numbered 96 and 95, it will be recognized that when the audit card numbered 95 enters the comparing station, the misfiled master card bearing the number 25 will also enter the comparing station and these two cards will be sensed and their numbers compared in the usual manner. As the number of the audit card is greater than that of the master card, the latter will be retained, while the former is fed to the reject pocket. Obviously, the number of the next audit card to arrive will also be greater than that of the master card being sensed and this condition will continue until all of the audit cards down to that numbered 25 have been rejected. In order that the operator may quickly detect the condition of the cards so that time shall not be wasted, the machine is adapted to automatically stop after a predetermined number of audit cards have been fed to reject without the corresponding operation of the master card-feeding mechanism. In the present instance the machine is adapted to stop when two audit cards have been fed from the comparing station without the feeding of a master card therefrom.

In connection with the fifth, sixth, and seventh conditions shown in Fig. 2a we have seen that where one or more premiums remain unpaid in connection with a particular master card, the machine is adapted to enter this fact upon a list sheet. Fig. 6 illustrates the sheet adapted to receive the printed data under such conditions. The list is of policies upon which premiums are payable but have not been paid.

Where more than one premium remains unpaid, an asterisk is printed on the line containing data relating to the policy, but if but one premium remains overdue, the asterisk is omitted.

The machine may also be employed to make a list of policies upon which premiums are overdue, without passing the audit cards through the machine along with the master cards. For this purpose the machine may be set up to feed only master cards and to make a list of all policies on which premiums are overdue. Fig. 5 illustrates the list produced under these conditions.

Where a number of premiums are overdue, the data relating to that particular policy is repeatedly printed upon the listing sheet as many times as there are unpaid premiums relating to the policy. The first line of data contained on the list relates to a policy numbered 2,198,765–C2. The amount of the policy is $1,987.65 and the unpaid premium was payable on the tenth day of the third month of the year in which the machine is operating. The second item relates to a policy upon which a premium payable on the eighth day of the sixth month remains unpaid and overdue. The asterisk indicates that more than one premium remains overdue. The data is therefore entered again on the next succeeding line upon the list, the number of the policy and the amount thereof being the same. The date, however, is the eighth day of the third month of the year, indicating that the next previous premium remaining unpaid was due on that date. The absence of the asterisk in this line indicates that this is the earliest unpaid premium. The fourth, fifth and sixth lines of the report relate to a policy upon which three premiums remain overdue. The last seven items on the sheet relate to a policy upon which seven premiums are overdue and the policy is listed upon the sheet once for each overdue premium showing that the premiums for the eighteenth day of the twelfth, ninth, sixth and third months of the current year are overdue and the tenth day of the twelfth, ninth, and sixth months of the preceding year are also overdue. An asterisk is entered with each of the overdue premiums, except the first, which is the last on the list.

The main drive

Figure 1:
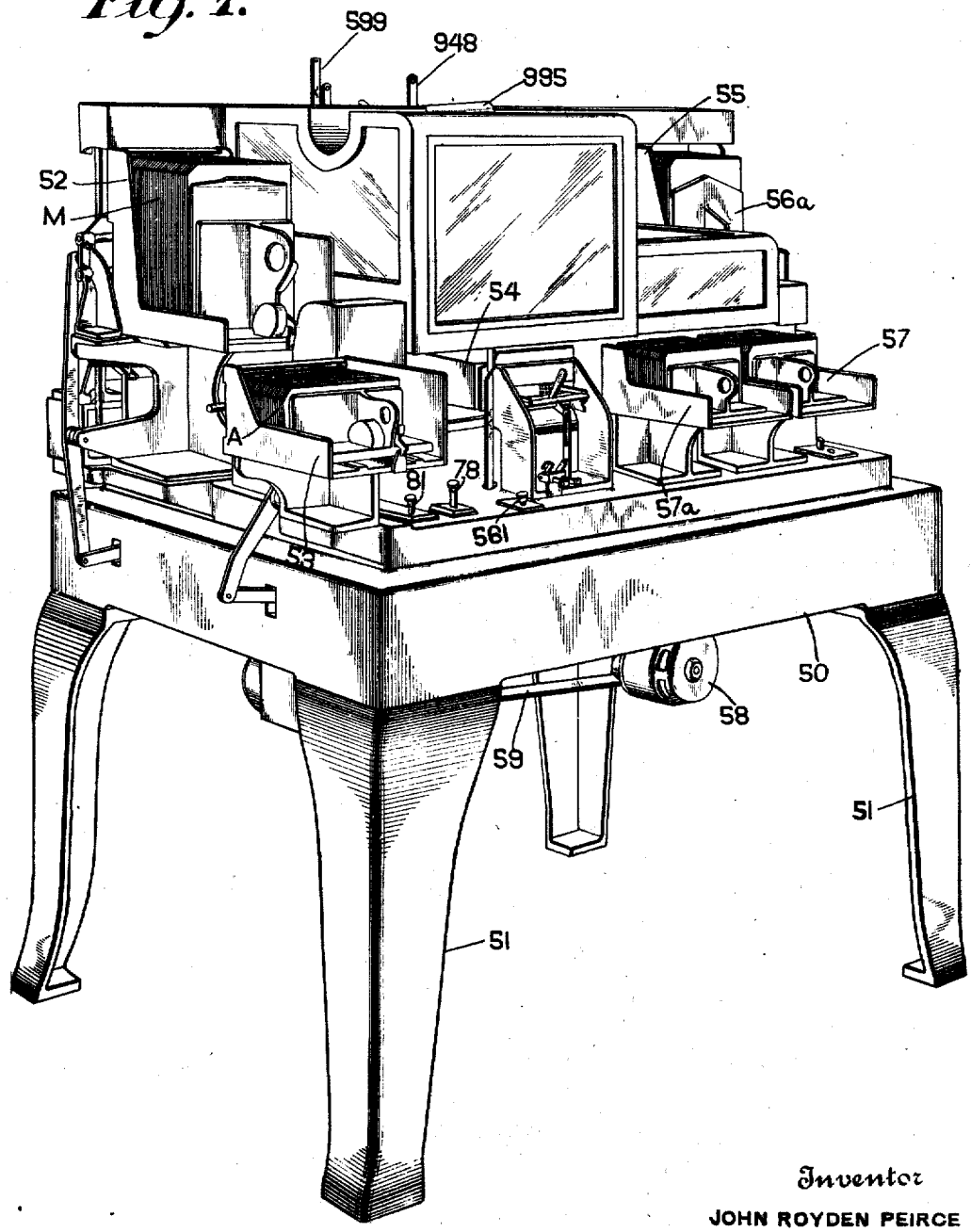
Fig. 1 is a perspective view of the assembled machine.

The assembled machine is shown in Fig. 1 and is supported by a base 50, standing on legs 51. In Figs. 1, 11 and 12, the master card supply magazine is shown at 52 and the audit card supply magazine at 53. The comparing station of the machine to which the audit and master cards are fed for comparison, is shown at 54 and the posting station where data is applied to the master card under control of readings taken at the comparing station is shown at 55. The master card file pocket is shown at 56, and the master card reject pocket at 56a, while the audit card file and reject pockets are shown at 57 and 57a respectively.

The machine is adapted to be driven by an electric motor 58, Figs. 1, 13, and 30, connected by a belt 59 to a pulley 60 on a shaft 61 reaching into a gear and clutch box 62 and provided with a worm 63 meshing with a worm wheel 64 loosely mounted on shaft 65. Fixed to said shaft is a clutch dog 67 adapted to engage in any of several holes 68 in the side of the worm wheel. A spring 69 normally tends to actuate dog 67 into position to engage said holes 68 so as to cause rotation of the shaft 65. A cam-stop 70 pivoted at 71, (Fig. 17) when turned counter-clockwise to the position shown in Fig. 17 is adapted to lie in the path of the dog 67 to cam the dog out of engagement with the worm wheel 64 and to stop rotation of the shaft 65. A similar cam stop 70a is also adapted to cooperate with the clutch dog to stop the shaft 65 at approximately 90 degrees later in its rotation. The latter position is the normal stopping position of the machine.

The shaft 65 reaches out of the box 62, and has fixed thereto a bevel gear 72, (Figs. 30 and 31) meshing with the bevel gear 73 fixed on the shaft 74. The latter shaft actuates the card feeding carriages and other mechanisms. Also fixed on the shaft 65 is a spur gear 66, (Fig. 17), meshing with an idler gear 75 which in turn meshes with a gear 76, (Figs. 11, 14 and 17), fixed on the upper main cam shaft 77.

When current is turned on, the motor 58 commences to operate causing the worm wheel 64 to turn idly on shaft 65.

Start and stop keys

In the normal idle position of the machine, the clutch member 67 is held in inoperative position by the cam stop 70a and in order to start the machine this stop is rotated clockwise about its pivot 86 to release the clutch dog 67 so that the latter may be pressed by its spring against the face of the worm wheel 64 and drop into one of the holes 68. The starting is effected by depressing the start key 78. This rocks the lever 79 about its pivot 80, Figs. 13 and 18, and raises the stop key 81. This in turn rocks the lever 82 counterclockwise about its pivot 83, rocking the links 84, 85 downwardly, turning the lever 87 to rock the shaft 86 clockwise to remove the stop 70a. The links 84, 85 are connected at 88 to an idler link 89 pivotally attached to a bracket 90.

Stoppage of the machine is effected by depression of the stop key 81, moving the stop 70a and intermediate connections in the reverse directions and placing the stop 70a in the path of the clutch dog 67.

The stop 70 is provided for an emergency to automatically stop the machine at an intermediate point to prevent damage to the machine in the event that certain type elements should fail to restore at the proper time. This stop is normally in inoperative position and is held in such position by a latch 91, Fig. 24, engaging a lever 92 fixed to the shaft 71 of the stop 70. A spring 93 normally tends to rock the stop 70 to operative position so that should the latch 91 release the lever 92 the machine will be brought to a stop in the position indicated in Fig. 17. The machine may be re-started from this emergency stop position by depression of the emergency re-start key 94. The shank 95 of this key is connected by the bell crank lever 96 to a link 97 connected to a lever 98 fixed on the shaft 71 to rock the latter clockwise to move the stop 70 to inoperative position. The latch 91 will then lock the stop in this position. Should the stop 70a be in its operative position when the key 94 is depressed, a projection 99 on the shank 95 will engage the lever 82 and link 84 at their point of connection and cause depression of links 84 and 85, thus rocking the stop 70a to inoperative position. When the emergency start key 94 is depressed and released, it is returned to its upper or normal position by a spring 100 and locked in such position by a latch 101, Fig. 11. The return of the key 94 to its upper position while the stop 70 is latched in its inoperative position is permitted by the pin and slot connection between the link 97 and the lever 98. When the stop 70 is released by the latch 91, it is adapted to move to operative position by reason of this pin and slot connection without affecting the position of the key 94.

There are several conditions under which operation of the stop cams is effected automatically and these will be dealt with in connection with the description of the mechanisms bringing about this operation.

Card feeding mechanism—Master card feed

The lower shaft 74, Figs. 17, 30, and 31, is provided with an eccentric 105 connected by a rod 106 to a lever 107 fixed on shaft 108, to oscillate the latter. The shaft 108, Figs. 15, 17, and 30, is provided with a lever 109 connected by a link 110 to a lever 111 pivoted at 112 and adapted at its upper end to engage a pin 113 fixed to an arm 114 on the card picker 115 which is slidably mounted on rods 116 fixed to the stationary bracket 117. A spring 118 is adapted to normally hold the card picker in its normal lefthand position as viewed in Fig. 15. Once each cycle of the machine, the lever 111 pushes the picker 115 to the right and advances the first card of the pack from the supply magazine 53, so that its forward end assumes the position M$^x$. From this point the card will be advanced successively to the positions M$^1$, M$^2$ and then to one or the other of pockets 56, 56a of Fig. 12, by three sets of card clips. The first set comprising upper and lower clips 119, 119a, the second set comprising upper and lower clips 120, 120a and the third set comprising upper and lower clips 121, 121a. All of these clips are carried by a shuttle 122 comprising an upper frame 123 and a lower frame 123a slidably mounted on rods 124 and 124a and interconnected by a yoke 125. The shaft 74 has fixed thereon a crank 126 connected by a link 127 to a rocker arm 128 pivoted at 128a and connected by a link 129 to a lever 130 pivoted at 131 and connected at its upper end by a link 132 to the yoke 125 at 126. The rotation of shaft 74 will thus cause a reciprocating movement of the shuttle 122.

Audit card feed

The audit card feed is similar to the master card feed. The shaft 108, (Fig. 13) has fixed thereon a lever 133 connected by a link 134 to a lever 135 pivoted at 136 and adapted at its upper end to engage a pin 137 fixed to the arm 138 of the card picker 139 slidably mounted on the rods 140, (see Fig. 121). Oscillation of shaft 108 thus moves the picker toward the right as viewed in Fig. 13 and the spring 141 returns it to its normal left-hand position. The card picker is adapted to feed cards from the magazine 53 to the position indicated at $A^x$ from which point it will be taken by a set of card clips to the comparing station and from there by another set of card clips to the pockets 57 or 57a. The card clips for feeding the card from the position $A^x$ comprise an upper set of clips 142 and a lower set 142a, while the clips for feeding the card from the comparing station to either of the pockets 57, 57a, comprise an upper set 143 and a lower set 143a. These clips are carried by a shuttle comprising an upper frame portion 144 and a lower portion 144a, slidably mounted on rods 145 and 145a. The members 144 and 144a of the card shuttle are interconnected by a yoke 146. The lower shaft 74 has fixed thereto a crank 147 connected by a link 148 to a lever 149 which is pivoted at 150 to bracket 151 and connected at its upper end by a link 152 to the yoke 146 so that the rotation of shaft 74 causes a reciprocatory movement of the card shuttle. The details of the card clips are similar to those disclosed in my aforesaid application and in my patent, No. 1,506,382, dated October 26, 1924, and therefore need not be fully disclosed here. Some of the details of the audit card clips are shown in Figs. 121 and 122 of the present application. The clips comprise an inner jaw 142b and an outer jaw 142c, pivotally mounted at 153 on the shuttle frame 144, the clip jaws being connected at their rear ends by a spring 156 which tends to close the clips.

Also pivoted at 153 is a bell crank 154 having a cam follower 157 adapted to cooperate with the inclined lever 158 which is pivoted at 159 to a fixed bracket 160 of the machine. The spring 161 tends to rock the lever 158 clockwise until it engages the stud 162. The lever 158 is normally held by latch 163 in the position shown in Fig. 121. When the card shuttle moves to the left the roller 157 rides up the incline of the lever 158, rocking the clips into position to receive the card as in Fig. 121. If a card is to be fed during this cycle of the machine, the latch 163 is rocked clockwise releasing the lever 158 which is moved to inoperative position by its spring 161, permitting the outer clip 142c to close upon the card as in Fig. 122, thus gripping the card to pull it to the right when the clips advance. If no card is to be fed during that cycle, the lever 158 remains latched so that the clips cannot close over the card and as the shuttle moves toward the right the roller 157 rides down the incline of the lever 158 holding the clips open until they have moved away from the card and then permitting them to fold to their inoperative position. Fixed with respect to the latch 163 is an arm 164 adapted to engage a link 165 to move the same against the action of its spring 166 to its unlatched position. The link 165 is connected to a stepped lever 167 pivoted at 168 to the shuttle and connected by a spring 169 to the arm 170. The arm 170 is connected at one end of the bell crank 154 and at the other to a lever 171 connected with the second set of the card clips 143. The lever 171 controls the operation of the card clips 143 in the same manner as does the bell crank 154 control the operation of the card clips 142, and the operation produced by the roller 157 in cooperation with the lever 158 is transmitted to the lever 171 so that the functions performed by one set of card clips will also be performed simultaneously by the other set.

When the latch 163 rocks clockwise to release the inclined lever 158 and the rocking of the arm 164 which is fixed with respect to the latch 163 releases the link 165 and permits it to move to the right the stepped lever 168 rocks clockwise until the shoulder 172 lies in the path of the link 170 so that the latter can only move part way toward the right. This limits the clockwise rotation of the card clips and holds them in the plane of the card. When no card is being fed, however, and the link 165 is not released, the shoulder 172 is held out of the path of the link 170 and the latter is permitted, when the roller 157 rides down the incline of 158, to move its full stroke to the right, rocking the clips completely out of the plane of the cards, so that they may move past the card remaining in position without engaging the same. When the card clips are prevented from feeding cards, it is also necessary to prevent the picker 139 from advancing a card from the supply magazine 53. To this end, the arm 138 on the card picker is provided with an aperture 173 adapted to receive a stop 174 reaching through an aperture in the fixed plate 175. The spring 176 normally tends to move the stop 174 into the aperture 173, as shown in Fig. 121. The aperture 173 registers with the stop 174 when the card picker is advanced its full distance to the right, feeding a card. The stop 174 then drops into the aperture and holds the card picker in this position preventing it from returning under the action of its spring 141. If no card is to be fed the stop 174 remains in the aperture so that the stud 137 does not move back to where it can be engaged and advanced by the lever 135. If a card is to be fed, on the other hand, the rocking of the latch 163 also effects the clockwise rotation of a lever 177 removing the stop 174 from the aperture 173 and the card picker returns to normal position, ready to feed another card when actuated by the lever 135.

After the card clips have passed beyond the reach of the inclined lever 158, the latter is restored to its latched position as in Fig. 121. This is effected by a crank 469 fixed on shaft 74 (Figs. 13 and 30) which rocks lever 470 about its pivot 471. Fixed to the pivot 471 is an arm 470a reaching through a slot in a link 472 to depress the link, thus rocking a bell crank 473 (Figs. 13, 16, 121 and 122). The bell crank engages the lever 158 and rocks it from its tripped position in Fig. 122 to its latched position of Fig. 121, the spring 161 causing latch 163 to engage the lever. For restoring the inclined lever associated with the lower clip 142a (Fig. 13) the link 472 has a projection 474 (Fig. 16) adapted to rock bell crank 475 which engages and returns the inclined lever to latched position.

The means for restoring the inclined levers for the master card clips is similar to that associated with the audit card and comprises a crank 476 (Figs. 15 and 30) fixed on shaft 74, adapted to actuate lever 477 fixed to shaft 478 to which is also fixed an arm 479. This arm reaches through a slot in link 480 which is connected to bell cranks 481 and 482 (see also Fig. 16). These bell cranks actuate the inclined levers as in the case of the audit card clips.

The various conditions under which the card feeding is permitted or suspended will be dealt with presently, in connection with the description of the card sensing and analyzing mechanisms which bring about these controls.

Card stripping mechanism

When a card reaches the station at which it is to be analyzed it is stripped from the card clips by a card stop which is normally in the path of the card. The leading edge of the card, on striking the stop, is brought to a halt while the card clips continue a short distance and disengage the card, whereupon the said clips fold back out of the plane of the card ready for the return stroke.

In order to avoid increasing the bulk of the drawings no attempt is made in the present application to show all of the details of the card stripping mechanism, reference being made to applicant's Patent No. 1,506,382 for record sheet and apparatus controlled thereby, dated August 26, 1924, and to applicant's copending application Serial No. 611,491 for record comparing and posting machines, filed January 8, 1923, now Patent No. 1,761,741 dated June 3, 1930. These cases show card stripping mechanism substantially similar to that employed in the present instance. Enough is shown here, however, to enable one skilled in the art to construct the device.

The stop for stripping the audit card from the clips when the card reaches the comparing station is shown in Fig. 121 at 180. This stop comprises a plate pivotally mounted at 181, and is actuated into operative position by a spring 182. An arm 183 is adapted to be pressed against the stop 180 to rock the latter out of the path of the card by an arm 184 connected by a link 185 to a lever 186 (see Fig. 13), fixed to a rod or shaft 187 which is held rocked in normal position against a stud 188 by a spring 189. The opposite end of the rod 187 has fixed thereto a lever 190 connected to a link 191 for actuating the card stop 192 (Fig. 11), for stripping the master card from the clips at the comparing station. Also fixed to rod 187 (Fig. 15) is a cam lever 193 adapted to be actuated by a cam arm 194 mounted on the shaft 74. The timing of the actuation of the card stops is such that the stop is rocked out of the path of the card at the beginning of the feeding stroke of the card carriage, so that if the card clips close upon the cards under control of mechanisms to be described hereinafter, the card will be free to move on. Soon after the card carriage starts to move, the stops are released so that if the card is feeding they will press against the side thereof, but if the card is to remain in position the stops again assume the function of holding the card in this position. Means such as a spring-pressed stop 195 may be provided to spring over the rear edge of the card so as to prevent retrograde movement thereof when the card reaches the sensing position. The audit card stop 180 is also shown in Fig. 11, and the rod 187 and actuating levers 186 and 190 are also shown in Fig. 30 along with the cam 194 and the cam lever 193 for rocking said rod.

Master card file and reject pockets

As shown in Fig. 12, the master card file pocket 56 and reject pocket 56a are disposed opposite each other, and the card is carried by the card carriage to a position between the two pockets. From this position it is pushed by mechanism into one or the other of the pockets, depending upon the set-up effected by the proper controls. The mechanism for pushing the card into one or the other of the pockets is shown in Figs. 27 and 112, and comprises a vertical plate 196 (see also Fig. 15), fixed to a slide 197 mounted in supporting guides 198 and 199 fixed to the side of the reject pocket. Normally the plate is in the position shown in Fig. 112, so that when the card is deposited between the pockets, movement of the plate serves to push the card into the file pocket. This movement is effected by a lever 200 engaging a stud 201 fixed to the slide plate 197. Said lever is fixed on shaft 202 on which is also fixed a lever 203 connected by a link 204 to an arm 205 fixed to a double arm 206 and adapted to oscillate about the point 207. The arm 206 has provided at its opposite ends pins 208 and 209 adapted to be engaged by one or the other arms 210, 211 of an actuating member 212 pivotally mounted at 213 to a reciprocating arm 214 (see also Fig. 115). The arm 212 is provided with rearward projection 215 which carries a roller 216 adapted to be actuated by a slotted arm 217. The up or down movement of arm 217 is adapted to rock the member 212 so as to cause the arm 210 to engage pin 208 or to cause arm 211 to engage pin 209 as the arm 212 moves toward the right. In this way the link 204 may be rocked upwardly or downwardly to push the plate 196 to the right or to the left respectively. The arm 214 is forked at either end, and supported on shaft 77 at one end and the pivot stud 207 at the other end. A spring 218 is adapted to normally hold the arm 214 in its left hand position, and a cam follower 219 carried on this arm is adapted to cooperate with a cam 220 which moves the arm 214 to the right. By this arrangement the plate 196 is moved once to the right and once to the left during each card cycle of operation of the machine. The reversal of the timing of this movement determines whether the plate shall be in position to push the card into the file pocket or into the reject pocket, and this control in turn is effected by the condition of the card itself in a manner hereinafter to be described.

When the plate 196 is in either its left hand or right hand position it may be held there by a resiliently acting detent 221 adapted to engage in notches 222 in plate 197. This lock will yield whenever the plate is actuated in either direction. Shock absorbers in the form of resiliently supported blocks 223 (Figs. 27 and 112) may be provided for the plate 197 to engage on being moved in either direction so as to absorb the shock of the quick movement of the plate. The cam 220 (Fig. 27) is adapted to move the arm 212 toward the right twice during each cycle of operation of the machine, and the direction in which this movement moves the plate 196 is determined as pointed out by the position of the arms 210, 211. In order to raise and lower the hook 217 for positioning the arm 212 (see Fig. 115), the said hook is mounted by pin and slot connections 224 on bracket 225. Rotatably carried by the latch 217 is a shaft 226 (see also Fig. 116), carrying two latches 227, 228 adapted to engage pins 229, 230 fixed to levers 231, 232 (see also Fig. 112). These levers are pivotally mounted at 233 and are actuated by springs 234 to press the cam follower wheels 235, 236 at their opposite ends into cooperation with the cams 237, 238 fixed on shaft 77. These cams cause the levers 231, 232 to rock up and down in the reverse order to each other, so that if the latch 227 is in engagement with pin 229, the latch 217 will be moved downwardly during a certain time in the machine cycle so that the arm 210 will, when moved to the right, engage pin 208 to move the plate 196 to the right. If the latch 228, however, is in engagement with its pin 230, the arm 211 will engage pin 209 and cause the plate 196 to move to the left. The position of the latches 227, 228 is controlled by a lever 239 fixed on shaft 226 and having pin and slot connection with arm 240 slidably mounted on brackets 225 and 241. A spring 242 normally holds the arm 240 in its right hand position, thus holding the latch 227 in cooperation with pin 229. This is the normal position of the parts and results in the placing of the master card in the file pocket during each cycle of operation. If, however, the card is to be placed in the reject pocket a cam member 243 rotatably mounted at 244 and actuated by a lever 245 and link 246 is rocked counter-clockwise as viewed in Fig. 115 so as to lie in the path of the roller 247 on a dog 248 (see also Fig. 114), pivotally carried by a member 249 fixed on shaft 77 (see also Fig. 14). The shaft rotates in a counterclockwise direction as viewed in Fig. 115, and if the roller 247 engages the cam member 243 the dog 248 is rocked upon its pivot so as to bring the stud 250 into the path of the shoulder 251 of a lever 252 mounted on bracket 241. This rocks the lever to the left, and through the connection at 253 with arm 240 moves the latter against the action of its spring 242 to the left. A stud 254 then cooperates with a latch 255 pivotally mounted on bracket 225, which holds the member 240 in this position. The timing of the movement of plate 196 is now such as to place the card in the reject pocket. At the proper time in the cycle of operation, a pin 256 carried by a cam 257 (see also Fig. 14) fixed on shaft 77 is adapted to engage the latch 255, rocking the latter against the action of its spring 258 to release the arm 240, permitting it to return to its normal right hand position. From the foregoing it will be seen that normally a card will be placed in the file pocket and when, through the control of the card or otherwise, a card is placed in the reject pocket, the machine immediately resets itself by engagement of roller with a cam 247a so as to place the next succeeding card in the file pocket unless it is again set to place such card in the reject pocket.

When arm 240 is in its left hand position the cooperation of hook 228 with pin 230 on arm 232 will time the movement of plate 196 so as to move the card into the reject pocket. When arm 240 is in its right hand position the cooperation of hook 227 with pin 229 on arm 231 will time the movement of plate 196 so as to move the card into the file pocket. The movement of arm 240 in either direction takes place when the arms 231, 232 are coincident or in other words when the pins 229, 230 are coaxial so that when one of hooks 227, 228 releases its pin the other will be in position to engage its pin.

In order that the master card shuttle may move its complete distance it is necessary to open up the floor of the card pockets to permit the shuttle mechanism to pass through. This slide portion of the floor, however, must be moved back to normal position before the card can be moved into the file pocket so as to form a support for the card as it is being pushed into position. This device is shown in Figs. 27 and 112. A slidable portion of the floor 259 is guided by screws 260 fixed in the main floor 261 of the pocket and is normally moved to closing position by spring 262 fixed at one end to a pin attached to the slidable floor and at the other end to a pin attached to the fixed portion of the floor. A depending bracket 263 fixed to the slidable floor 259 carries a pin 264 adapted to be engaged by a lever 265 pivoted at 266 and connected to an arm 267. The said arm carries at its left hand end (Fig. 27) a cam follower 268 cooperating with a cam 269 fixed on shaft 77. Said arm is also forked as shown at 270 so as to straddle the small end of the shaft 77 to act as a supporting guide for the arm. The arm is normally pulled toward the right as viewed in Fig. 27 by a spring 271 engaged at its left hand end to a bracket 272 so as to cause the follower 268 to follow the contour of the cam 269. The raised portion of the cam causes the sliding floor 259 to be moved to open position, and when the follower rides down upon the low portion of the cams, the spring 262 moves the sliding floor to closed position. The timing of these movements, as will be understood, which is controlled of course by the contour of the cam 269 is such that the sliding floor will be closed whenever a card is being moved into the pockets by the plate 196, and will be open during the movement of the card carriage through the pockets in either direction. In order that the master cards shall be held in position in the file and reject pockets after the plate 196 moves away from them, stop members 273 (Fig. 113) pivotally mounted at 274 in the side walls 275 of the pockets are provided. These stops are actuated by springs 276 (see also Figs. 27 and 112) into operative position as shown in Fig. 113 to hold the cards in place. When the card is pushed by the plate 196 into its pocket it cams the stops 273 out of its path, and the springs 276 return the stops after the card has gone by.

*Audit card file and reject pockets*

The audit card file and reject pockets 57 and 57a are positioned side by side as shown in Figs. 12 and 13. The stroke of the card feeding carriage 144 is such that when a card is taken from the comparing station it is carried past the reject pocket 57a to the file pocket 57, the card passing inside of the supporting fingers 277 until the leading edge of the card engages the pocket wall and plate 278 at 279 (see also Fig. 118) whereupon it is stripped from the clips as the card carriage moves slightly farther to its extreme position. Thus it will be seen that audit cards are fed to the file pocket unless the reject pocket mechanism strips them from the clips as they are passing the reject pocket. This mechanism is shown in Figs. 12, 13, 29, 30, 54, 117 and 118. The plate 279 which carries the fingers 277 is supported on the side wall 280 of the pocket by a supporting member 281 fixed to the pocket wall, and a flanged pin or screw 282 also fixed to the pocket wall and reaches through the slot in the said plate 279. The plate is adapted to be moved from its normal left hand position as viewed in Figs. 12, 117 and 118 by a bell crank 283 pivoted at 284 and cooperating at its upper bifurcated end with a pin 285 fixed to the plate 279. The left hand end of said bell crank is connected by a depending link 286, which when raised moves plate 279 and fingers 277 to their outward position so that the fingers will stand in the path of the card as it is being carried toward the file pocket to intercept the card and strip it from the clips. As shown in Fig. 13, link 286 is connected to a bell crank 287 pivoted at 288 to bracket 289. Bell crank 287 is connected through its other arm to link 290, which in turn is connected to a lever 291 fixed on shaft 292 (see also Fig. 54). Co-axial with shaft 292 is a shaft 293 to which is fixed an arm 294 having a cam follower 295 cooperating with cam 296 fixed on shaft 74. A spring 297 holds the follower 295 in cooperation with its cam. This mechanism produces an oscillatory motion in shaft 293. Fixed to shaft 293 is a lever 298 (see also Fig. 53), provided with a pin 299. A lever 300 fixed on shaft 292 is adapted to engage the top of pin 299, and is normally held in such engaging position by a spring 301 connected to lever 302 also fixed on the shaft 292. Thus as the shaft 293 rocks counter-clockwise, as viewed in Figs. 53, 54, the spring 301 causes the lever 300 to follow the pin 299, and the shaft 292 is also rocked in a counter-clockwise direction. The link 290 is thus moved to the right as viewed in Figs. 54 and 13, causing a counter-clockwise movement of bell crank 287 and an upward movement of link 286 which, as seen in Fig. 118, moves the plate 279 and fingers 277 into position to intercept the audit card. The mechanism for determining whether shaft 292 shall be permitted to follow the rocking of shaft 293 during a cycle of operation is controlled in accordance with the conditions of the cards being analyzed and will be described along with the description of the card analysis.

Audit card cancellation

It is desired that, after entries have been made under control of an audit card, the said card shall be marked in some manner to indicate that it has passed through the machine and a posting entry made. The object of this cancellation is to avoid the possibility of any of such cards being inadvertently put through the machine again. In the present instance cancellation is effected by cutting out a portion of the card along one of its edges as indicated by the dotted lines 303 (Fig. 4). The mechanism for producing this result is shown in Figs. 12, 13, 27, 28 and 30. As shown in Figs. 27 and 28, a cutting knife 304 is fixed to a slide 305 mounted in support 306 fixed to the wall 307 of the file pocket. A stud 308 fixed to the slide 305 reaches through a slot in the support 306 and is engaged by the upper bifurcated end of a lever 309. Said lever is fixed on a shaft 310 to which is also fixed a curved lever 311 connected by a depending link 312 (see also Fig. 13) to an arm 313 pivoted at 314 and adapted to be engaged at its opposite end by a cam arm 315 fixed on shaft 74. The rocking of the arm 313 causes depression of link 312 and a right hand movement of the knife 304, as viewed in Fig. 28, to clip out the edge of the card as stated.

Nonjam mechanism

In my aforesaid Patent No. 1,506,382, I disclosed mechanism adapted when a card is stripped from the card carriage in an intermediate position for bringing about stoppage of the machine so that the card may be removed before another card is fed to the same position, which would result in a piling up of cards in some intermediate position causing damage to the cards and possibly to the machine. Similar mechanism is employed in the present machine, but need not be fully disclosed here as the details may be found in said patent.

In Fig. 25 the end of a bar 316 is shown. This bar is mounted on and moves with the audit card feeding carriage, and normally projects outwardly from the carriage and is held in such position by a spring. At the end of the feeding stroke of the carriage the bar engages a lever and its spring yields unless said bar has been locked in its outward position by reason of the displacement of a card. In the latter case the bar will actuate the lever and cause the machine to stop. The details of this mechanism are omitted from the present case. The lever adapted to be struck by the bar 316 is shown at 317 in Figs. 13 and 27. This lever is pivoted at 318 and is connected through its other arm to a link 319 held upwardly by a spring 320. The said link reaches downwardly through a hole 321 in the table or top 322 of the base 50 of the machine. As shown in Fig. 13, link 319 is connected to a bell crank 323 fixed on a shaft 324 carried by brackets 324a (see also Fig. 29), and is connected through a pin and slot connection to a link 325, a spring 326 being provided to hold the lever 323 and link 325 in normal positions with respect to each other. The left end of the link 325 is connected by pin and slot to a lever 327 fixed on a shaft 328. When a card has been stripped from the clips in an improper position and lever 317 is rocked, the link 319 is depressed, rocking bell crank lever 323 clockwise, pulling the link 325 to the right and rocking shaft 328 counter-clockwise. Lever 331 fixed on shaft 328 (Figs. 29 and 54) reaches under the toggle mechanism 82, 84 shown in Fig. 18 so that movement of the link 325 to the right rocks the lever 331 upwardly and moves the toggle 82, 84 from its depressed position to the position shown in Fig. 18. This rocks the stop member 70a into position to stop the machine as previously described. As shown in Fig. 29, the other end of shaft 324 has fixed thereto a lever 323a, connected to a link 319a. The latter, as shown in Fig. 27, reaches upwardly and is held in position by a spring 332 and is connected to a bell crank lever 317a. Said bell crank is adapted to be actuated by mechanism not shown here, but which is similar to the mechanism shown in the aforesaid patent carried by the master card carriage, and is adapted to be actuated when a card is improperly stripped from said carriage to bring about the same stopping operation as when the audit card has been stripped from the carriage. Link 325 (Figs. 13 and 29) has fixed thereto a pin 333 cooperating with a lever 334 fixed with respect to the arm 335 which is connected to a link 336 reaching upwardly into the machine. An upward movement of link 336 is adapted to move the link 325 to the right to bring about stoppage of the machine when the machine, upon analyzing the cards, discovers that a card has been misplaced in its file or has been placed in the wrong file. The movement of link 325 to the right in this instance is permitted by the pin and slot connection between link 325 and bell crank 323. The mechanisms for raising the rod 336 to bring about this stoppage will be dealt with later.

As shown in Figs. 13 and 54, the shaft 328 has also fixed thereto a lever 337 connected by a pin and slot to a link 338. Movement of this link to the right will also rock shaft 328 and cause the machine to stop. This movement is effected when several audit cards, two in the present instance, have been fed sucessively without the feeding of a corresponding master card, and causes stoppage of the machine to permit the operator to investigate the cause of such operation. This also will be dealt with in detail later.

*Comparing station*

As previously pointed out, the master and audit cards are simultaneously fed from pockets 52, 53 (Fig. 11) to the posting station 54. The audit card is shown in position in the comparing station at A1 (Fig. 13) and the master card is shown in its position in the comparing station at M1 (Fig. 15). An outside view of the comparing station looking from the left is shown in Fig. 19. A similar view looking from the right is shown in Fig. 21. These views disclose the mechanism for actuating the feeler pins and comparing combs and other mechanisms contained within the comparing section. This inner mechanism is shown in Fig. 20, which is a cross section of the comparing station as indicated by the line 20—20 of Fig. 11. In Fig. 20 the master card sensing pins, designated M pins in Fig. 2, are shown at 339. These pins sense the data represented by perforations in the field 18 of the master card shown in Fig. 3, which data represents the information contained in print directly above said field. The audit card sensing pins, designated A pins in Fig. 2, adapted to sense the perforations in the field 47a of Fig. 4, representing the data contained in the field 47 of said card, are shown at 340 in Fig. 20. These same pins are shown on a larger scale in Fig. 32. The master card sensing pins are adapted to move to the right by springs 341 pressing at one end against a collar 342 fixed on the pins, and at the other end against a washer 343 loose on the pin 339 and engaging a fixed stop 344. Attached to the rear end of each pin 339 is a pin slide 345, the said slide being slidably mounted on said pin as at 346, and pressed against the collar 347 on the end of said pin by a spring 348 which presses at its other end against a collar 349 fixed to the pin. A restoring plate 350 normally holds the pins in the non-reading position shown in Fig. 32. The construction and arrangement of the audit card pins 340 is similar to that of the pins 339, and these pins are restored to normal position as in Fig. 32 by a restoring plate 351. In Fig. 20 the plates 350, 351 are shown as mounted on levers 352, 353, fixed on shafts 354, 355. In Fig. 21 the shaft 354 is shown as having fixed thereon a lever 356 connected by a link 357 to a lever 358 fixed on shaft 355. Also fixed on the latter shaft is a cam follower arm 359 (Fig. 19) cooperating with a cam 361 fixed on the shaft 77. A spring 362 fastened at its lower end to link 357 and at its upper end to the frame of the machine holds the follower against the cams. The timing is such that the shafts 355, 354 rock so as to rock the plates 350, 351 clockwise about their pivotal points immediately after the cards stop in the comparing station. The sensing pins then urged by the springs 341 move into contact with the card, some finding perforations in the card and passing therethrough and the others being stopped by the card. Directly above the pin slides 345 is a slide 345a not attached to any of the sensing pins. This slide has fixed to the side thereof an arm 364 reaching downwardly past the two upper slides 345, and adapted to be engaged by pins 365 fixed to the slides 345. A spring 366 normally holds the slide 345a in its normal position as in Fig. 32. The slides 345 of the two lower pins 339 or 340 are similarly provided with pins 365 cooperating with an arm 364 mounted on a slide 345a. The two upper sensing pins 339, as shown in Fig. 32, are adapted to control the position of a combination comb 367, and the two lower pins of this same group are adapted to control the position of a second combination comb 368, these two combs being mounted side by side in close proximity to each other. The control is effected by means of projections 369, 370 integral with the said combination combs. Similarly pins 340 and their slides 345 control the position of combination combs 371, 372 through stops 373 and 374. Referring to Fig. 33, it will be seen that the top pin of the group 340 has advanced, carrying with it the slide 345, and this in turn, through the pin 365, has also carried forward the slide 345a, permitting the comb 371 to move downwardly two steps until its projection 373 engages the slide 345 associated with the second pin 340 from the top. It will also be seen that the bottom pin of the group 340 has advanced, and through its pin 365 carried with it the lower slide 345a, permitting the comb 372 to descend one step where it is stopped by the slide 345 associated with the third pin from the top in group 340. Perforations in upper and the lower positions of the four possible positions represent the digit 6. Thus combs 371 and 372 in Fig. 33 are set to represent the digit 6. The pins 339 which read the master card are also shown in Fig. 33 as having advanced through perforations representing 6 in the card, and the combination combs 367, 368 have in like manner been set to represent the digit 6. The combination combs 367, 368 are pulled downwardly by springs 375 and are restored by a bar 376, the ends of which, as shown in Fig. 20, are fixed to uprights 377. The lower ends of the uprights reach slightly below the combs 367, 368 and rest on a bar 378 fixed at its ends to arms 379 fixed to a shaft 380. One of the arms 379 carries a cam follower 381 cooperating with a cam 382. The cam serves to raise the uprights 377 and bar 376 which, in turn, raises the combs. The reason for the provision of bar 376 for raising these combs, instead of permitting the combs to rest directly on bar 378 to be raised thereby, is to prevent any tendency of the combs to buckle by being pushed upwardly at their lower ends and pulled downwardly by springs 375 at their upper ends, the combs being lightly constructed. The combs 371, 372 on the other hand, are pulled downwardly by springs 375a at their lower ends, and may therefore be raised directly by a bar 383 engaging shoulders 384 on the combs (see also Fig. 32). The bar 383 is carried by arms 385 fixed on each end. These arms are in turn fixed on a shaft 386, and one of the arms is integral with an arm 387, thus forming a bell crank. One of arms 379 also is integral with another arm 388, forming a bell crank. The arms 387, 388 are interconnected by a link 389, so that the cam 382 will raise and lower all of the combination combs together. The combs are lowered from their normal positions after the pin slides 345 have moved to reading position, and are restored after the stop bars 390 have been restored.

*Stop bars*

After the feeler pins have taken their readings from the master and audit cards and have controlled the setting of the combination combs 367, 368 and 371, 372, the stop bars 390 analyze the arrangement of the combination combs to ascertain whether the readings of the two cards agree, and if not, to ascertain which of the two cards contains the higher policy number, so as to cause the feeding of one of the cards and not the other. The stop bars 390 (Figs. 32, 33) are mounted in guide supports 391 and are provided with lateral projections 392, 393 reaching across the combs 367, 368 and 371, 372 respectively. A spring 394 fastened between one of the guide supports 391 and the stop bar tends to pull the latter toward the left to cause the projections 392, 393 to move into the notches 395 in the combination combs. Restoring bars 396 engaging shoulders 397 on the stop bars are provided for moving the stop bars toward the right to inoperative position. The opposite ends of the restoring bars 396 are fixed to plates 398, 399 (Figs. 19 and 21). These plates are slidably mounted in guide ways 400 fixed to the machine. Toggles 401 attached at 402 to each of the plates 398, 399, and at 403 to a fixed portion of the machine, the attaching pin reaching through a slot 404 in the plates 398, 399, are adapted to move said plates to the right or to the left. Cam follower arms 405, 406 are connected to the toggles and are bifurcated at their lower ends to straddle the shaft 77 for guidance and support. Rollers 407 carried by these arms cooperate with cams 408 on the shaft 77. Springs 409 constrain arms 405, 406 to follow the contour of their cams to break the toggles, thus moving the restoring arms 396 to the left as viewed in Figs. 32, 33 to release the stop bars 390. At the proper time in the cycle of the machine the cam spreads the toggle again and restores the stop bars to their normal positions.

In Figs. 34 and 35 which are diagrammatic views of the stop bars and the combination combs, it will be seen that the lateral projection 392 reaches across both of the combs 367, 368, and the projection 393 in like manner reaches across both of the combs 371, 372. In Fig. 34 the parts are shown in normal position, while in Fig. 35 the combs 367 and 371 are shown as having descended three steps each while the combs 368 and 372 have not moved from their upper or normal positions. Also the restoring bars 396 have released the stop bars 390 so that springs 394 may move the stop bars to the left. It will be noted that the upper one of the two stop bars illustrated has been permitted to move part way to the left by the arrangement of notches in the combination combs. In this instance the notches in combs 367, 368 are of full depth so that the projection 392 is free to move its full distance, but in one of the combs 371, 372 the notch presented to the projection 393 is a shallow one and the projection 393 has been permitted to move a limited distance to the left. The lower one of the stop bars illustrated on the other hand has not been permitted to move at all by reason of its projection 392 engaging the outer edges of combs 367, 368.

Adjacent to the left hand ends of the stop bars 390 are shown what I term comparing combs 410 (Figs. 20, 21, 32, 33, 34, 35), there being one such comb for each vertical row of stop bars 390. The right hand edge of the comb 410 is provided with a series of steps 411, there being two such steps for each stop bar. After the stop bars have taken their positions the comparing combs 410 are moved upwardly a distance depending upon the setting of the stop bars. The combs 410 are constrained to move upwardly by springs 412 fastened at one end to the comb and at the other end to a fixed portion of the machine.

For restoring the comparing combs to normal position and retaining them there a bail 432 (Figs. 19, 20, 21, 32, 33) may be provided. This bail engages the tops of the combs 410 and is fixed to a shaft 433 to which is also fixed a lever 434 (Fig. 21) connected by a link 435 to a follower arm 436 pivotally supported at 437 and cooperating through its roller 438 with a cam 439 on the cam shaft 77. A spring 429 causes the cam follower 438 to maintain contact with the cam.

In Figs. 32 and 34 the parts are shown in their normal positions. It will be seen from these views that if the stop bars 390 move the full distance to the left they will move into the deep notch in the comb 410 and thus prevent the latter from rising when it is released. In Figs. 33 and 35 we have seen that one of the stop bars 390 has moved part way to the left and has thus permitted the comparing comb 410 to rise one step. Adjacent to the rear edge of the comparing combs are several bails 430. In Fig. 32 these bails are shown in their normal inoperative position. In Fig. 34 but one of the bails is shown, namely the uppermost, also in its normal position. In Figs. 32 and 34 it will be noted that if the bails are rocked clockwise they will be stopped by the edge of the comb 410. After the comb has risen one step, however, as in Figs. 33 and 35, a notch 431 in the comb 410 will permit the uppermost bail to rock clockwise as shown in Figs. 33 and 35. It will also be understood that if the comb 410 were to rise two steps, bail 430 will again be prevented from rocking clockwise by striking the edge of the comb below the notch 431. In the operation of the machine if all of the comparing combs 410 rise one step the uppermost bail 430 will register with notch 431 in all of the combs and thus be permitted to rock clockwise. Whenever this takes place, this bail, which may be termed the posting bail, will set up the machine to perform posting operations, the two cards being fed from the comparing station, the audit card to the file and the master to the posting station for posting operations, after which it will be removed from the posting station to the file pocket. When the cards are fed from the comparing station, new ones are fed in. If a different setting takes place in the comparing combs; in other words, if any one of the combs should fail to rise one step or should rise two steps, the posting bail will fail to operate. One other of the bails will then be permitted to rock, or none of the bails will operate, and the subsequent operation of the machine will be controlled accordingly.

Fig. 11 shows a top view of the master card sensing pins 339. Counting from the left the first two vertical rows of pins correspond with the two columns representing the month columns on the master card Fig. 3. The next two vertical columns of pins are associated with the two columns representing the day on the master card. There is then a space as there are no pins for sensing the year. Following this there are ten columns of sensing pins 339 for sensing the policy number and class on the master card. There are then spaces as the fields on the master card designated Plan and D are not analyzed here. The next four rows of sensing pins are associated with the four columns allotted to the district on the master card and the next six to the premium payable. There are no pins for sensing the column designated P. The corresponding columns on the audit card are analyzed by the audit card sensing pins 340 for comparison with the data contained on the master card as heretofore pointed out. For each of the vertical rows of sensing pins 339 shown in Fig. 11 there is a corresponding one of the comparing combs 410. In my aforesaid application No. 611,491 I described seven comparing combs associated with the policy number of an insurance policy and described the manner in which the machine operates to compare the numbers of the audit and master cards and upon detecting a difference in the numbers to ascertain which of the two cards bears the greater of the two numbers and to control the subsequent operations of the machine accordingly.

In the present machine I have shown eight comparing combs for analyzing the policy number and have therefore also shown an additional comparing bail 483. The comparing bails are numbered 1 to 8 in Fig. 10, the lowermost of which is the added bail. The operation of this bail is similar to that of the others and in Fig. 10 it is shown diagrammatically on the same side of the combs 410 as the others, but in the machine it is placed on the opposite side of the combs to economize in space, as it would interfere with other mechanisms if aligned with the rest of the bails unless the other parts were spread out.

In Fig. 10 it will be seen that if the comparing combs 410 representing the month rise one step, they will present notches 431 to the comparing bail 430 and will also present notches 431a to each of the posting bails 483. Should these combs fail to rise or should they rise two steps, none of the bails can operate. The comparing combs associated with the columns representing class cooperate only with the posting bail 430 and are adapted to prevent the latter from operating unless they should rise one step. When the class designation on the two cards agrees the combs will rise one step and permit the posting bail to operate. The four comparing combs associated with the district designation are similar to those associated with the month and by rising one step will permit any of the bails to operate. The six comparing combs associated with the premium payable columns are similar to the class comparing combs and cooperate only with the posting bail. They are adapted to prevent this bail from operating unless they rise and this takes place when the premium payable indicated on the two cards agrees.

The eight combs associated with the policy number are so notched that if they all rise one step the posting bail 430 will be free to rock but all other bails will be stopped. The eighth bail which may be termed the units bail is stopped by the eighth combination comb which may be termed the units comb; the seventh or tens bail is stopped by the seventh or tens comb, etc. If any one of the policy number combs fails to rise, all others rising one step, the posting bail will be stopped by the comb which fails to rise and this bail will not rock. On the other hand, the comb which failed to rise will now fail to stop its corresponding bail and the latter will rock. Should any comb rise two steps none of the bails of the same or lower denomination will rock. If the posting bail rocks it will set up the machine to perform posting operations. If no bail rocks the machine will perform a normal operation effecting the feeding of the audit card to the reject pocket without feeding master cards. If any one of the digit bails 483 rocks, it causes the machine to feed master cards and interrupts the normal feeding of audit cards.

Whether the comparing combs 410 shall rise or not and the number of steps they may rise is controlled as we have seen by the setting of the combination combs 367, 368, 371 and 372 which in turn is controlled by the numbers being sensed on the master and audit cards. When a number is sensed in the master card, the combs 367, 368, (see Figs. 32 and 33) are so set that at least one of the stop bars 390 will be free to advance its full distance to the left if otherwise free to do so to prevent rising of the comparing comb 410. The sensing of a number in the corresponding column on the audit card will cause the combination combs 371, 372 to be so set that the same top bar 390 may or may not be permitted to advance to the left. If the two numbers being sensed are of the same value, then the stop bar in question will be permitted by the combs 371, 372 to advance far enough to permit the comparing comb 410 to rise one step. This, as we have seen, will permit the posting bail to rock but the comparing comb will prevent rocking of the corresponding bail. If the number being sensed in the audit card is of a value greater than that being sensed in the master card, the setting of combs 371, 372 will be such that the stop bar 390 in question will not be permitted to advance to the position where it would stop the rising of the comparing comb 410 and the latter will rise its full distance or two steps, and none of the bails will operate. If on the other hand the number being sensed in the audit card is of a lower value than that in the master card, then the setting of the combination combs 371, 372 will permit the stop bar 390 in question to advance its full distance to the left to prevent the comparing comb 410 from rising. This will prevent the rocking of the posting bail but will permit the rocking of the corresponding comparing bail.

Referring to Fig. 10, if the eighth or units comparing comb fails to rise, it will permit the eighth or units bail to rock. If the seventh comparing comb fails to rise, it will permit the seventh comparing bail to rock. If both of these comparing combs fail to rise, the seventh will still permit the seventh bail to rock but will lock out the eighth bail. In other words, the comparing comb farthest to the left or the one representing the highest order in a number controls where the two numbers being compared differ in several orders. By this arrangement it will be seen that the machine is adapted to sense numbers on two different cards or in other words to sense two numbers and to compare these numbers to ascertain whether they agree in value and also to ascertain when they disagree in value which of the two numbers is the greater. The four comparing combs 410 associated with the columns on the cards designated "District" operate similarly to the policy number comparing combs. The number representing the district is sensed on both the master and audit cards and causes the setting of stop bars 390 in the same manner to control the district comparing combs 410. If the two numbers agree in value, the district comparing combs rise one step and will free all of the bails including the posting and the comparing bails for operation. If there is a disagreement between the districts on the two cards, at least one of the district bails will fail to rise or will rise two steps and will prevent all of the bails from operating. The two bails associated with the column on the cards representing the month are similar to the bails representing the district. In this instance the reading is taken from the audit card on the one hand and from a setup in the machine on the other instead of from the master card. The number set up in the machine is then compared with the number representing the month on the audit card. If the numbers agree in value, the combs will rise one step as usual but if there is a disagreement, at least one of the combs will fail to rise or will rise two steps and in both instances prevent any of the bails from rocking. The comparing combs 410 associated with the column on the cards representing the premium are controlled by similar sensing pins and combination combs and stop bars for comparing the numbers sensed on the master and audit cards. If the numbers are the same in both instances, these combs will rise one step to permit the posting bail 430 to operate. If there is a disagreement in any order in the two numbers the corresponding comparing comb will either fail to rise or will rise two steps and will prevent the operation of the posting bail. The two comparing combs 410 associated with the columns on the card representing class operate in the same manner as do the premium comparing combs.

The posting bail 3 is fixed on a shaft 500. Also fixed on the end of this shaft is a lever 501 (see Figs. 14, 19 and 22). This arm is actuated by a spring 502 to counterclockwise position as viewed in Fig. 19. The opposite end of lever 501 is connected to a link 503 reaching down to the lower portion of the machine as shown in Fig. 22. The several bails 483 are mounted on shafts 504. These shafts as shown in Fig. 19 have fixed to their ends levers 505 actuated to normal position by springs 506.

The opposite ends of these levers reach under pins 507 fixed in a link 508 supported at 509, 510 for movement up and down. The position of the bail 483a with respect to the rest of the bails 483 is shown in Fig. 20 as being somewhat lower than the bails 483 and on the opposite side of the comparing combs 410. The shaft on which this bail rocks is shown at 511 (Fig. 19) and has fixed thereon a lever 512 connected by a link 513 to a lever 514 cooperating with a pin on the link 508. The connection between lever 512 and link 513 is by pin and slot in order to permit the link 508 to be raised by one of the other bails without affecting the lever 512 and its bail. The opposite ends of shafts 500 and 504 have fixed thereto levers 515 resting on pins 516 fixed in a link 517. This link is connected to a bell crank lever 518 having a cam follower 519 cooperating with cam 520 on the shaft 77. The cam serves to lower the link 517 to release the bails to permit their springs 502 to rock them. It also serves to raise the link 517 at the proper time to restore the bails to normal positions. The lever 515a associated with the lower bail 483a cooperates with a pin 516a in the link 517 and is operated similarly to levers 515. Also fixed on the shaft 500 of the posting bail is a lever 521 having pin and slot connection with a link 522 reaching down into the base of the machine. This link is normally held up by a spring 523 which thus tends to rock the shaft 500 counterclockwise (as viewed in Fig. 22) against the action of spring 502 (Fig. 19) which tends to rock the shaft 500 in a clockwise direction as seen in Fig. 22. The spring 502 is stronger than spring 523 and thus overcomes the action of the latter.

Presuming the numbers on the master and audit cards to be the same, all of the comparing combs will rise one step as we have seen and the posting bail will operate, raising the link 503. Turning to Figs. 53 and 54, the raising of this link will through shoulder 503a raise the lever 524 loose on stud 525 on which is also loosely mounted an arm 526. A spring 527 connected between the lever 524 and a fixed portion of the machine tends to hold the lever in its normal or lower position. A spring 528 connected between the lever 524 and arm 526 serves to rock the latter clockwise when the arm 524 is actuated by link 503. This operation moves the projection 529 on arm 526 from the position shown in Fig. 54 to that shown in Fig. 53 where it will lie under a pin 530 fixed in the end of lever 302 and will prevent the downward movement of this lever and consequently also prevent the rocking of the shaft 292. The rocking of this shaft as we have seen sets up the reject pocket to intercept an audit card and to receive the same. The suppression of this rocking then prevents such operation and the audit card is fed to the file pocket. When the link 503 descends the lever 524 is returned by its spring 527 and through the projection 531 fixed to arm 526 and engaging the lower edge of said lever 524 moves the arm 526 out of cooperation with the pin 530.

Adjacent to the links 503 and 508 is a link 532 cooperating with a pin 533 fixed to a lever 534 on a shaft 535 having a depending lever 536 (Figs. 51, 52, 54 and 31). The lever 536 lies in the path of a cam arm 537 fixed on shaft 74 and is actuated thereby once each revolution of said shaft. This actuates the link 532 to move it toward the right as viewed in Figs. 51, 52 and 54 and through a lever 538 rocks a shaft 539 (see also Figs. 29, 13, 121 and 122). The shaft 539 has fixed thereto the card clip latches 163 previously described so that the operation of link 532 causes the latches to release the inclined lever 158 to permit the clips to close upon the card as already described for the purpose of effecting feeding. Also fixed on said shaft is the arm 164 which is actuated to move the link 165 out of latched position shown at 540 to permit the spring 541 to move link 165 to the right as viewed in Figs. 121 and 122. Also fixed on shaft 539 is the arm 177 which controls the feeding of cards from the supply pocket as heretofore described. The movement of link 532 to the right to effect feeding of cards removes the stop 174 from operative position to permit cards to be fed from the supply pocket.

Besides caused the audit card to feed to the file pocket the raising of the link 503 is also adapted to cause the master cards to be fed. It also causes a setting up of the master card pocket control so that the master card which is being sensed will when it is fed during a later cycle of the machine from the posting section be fed to the file pocket. Whether this card will eventually go to the file pocket, however, will be controlled by other conditions through other mechanisms so that while the agreement between the numbers on the master and audit cards may set the mechanism to feed the master card to the file pocket other conditions may throw down this setup or in other words alter it and cause the card to be fed to the reject pocket instead.

The machine is adapted to normally feed audit cards and as feeding is to be effected when the link 503 rises, this link does not in any way effect the audit card feed. On the other hand it is not the normal operation of the machine to feed master cards and the link 503 therefore is adapted to bring about the feeding of such cards. This is effected by means of a shoulder 542 on link 503 which when the link is raised engages a projection 543 on a bell crank 544 and rocks the same clockwise as viewed in Figs. 51 and 52. Connected to the bell crank 544 is a link 545 which in turn is connected at its opposite end to bell crank 546. The rocking of bell crank 544 thus produces a similar rocking of bell crank 546 and this in turn raises a link 547 which rests on the top of bell crank 546. The link 547 is connected at its right hand end as viewed in Fig. 15 to a lever 548 fixed to a stud 549 to which is also fixed an arm 550 adapted to be actuated by a cam arm 551 on the shaft 74. A spring 552 tends to hold the arm 550 in its normal or downward position. The action of the cam 551 and spring 552 serves to reciprocate the link 547. The left hand end of link 547 carries a latch 553 actuated by a spring 554 against a stop 555. Normally as the link 547 reciprocates the latch 553 passes under a lever 556 but when link 547 is raised from the position of Fig. 52 to that of Fig. 51 the latch 553 will engage the lever 556 when the link 547 moves to the right and will rock the shaft 557 (see also Figs. 11 and 29). The rocking of this shaft as viewed in Fig. 11 will through a lever 558 move a link 559 toward the right. This link is connected to a lever 560 fixed on the card clip shaft 539a associated with the master card feeding clip mechanisms which operate similarly to the audit card clips so that the operation of the parts just described serves to unlatch the card clips to permit them to close upon the master cards to effect feeding.

In the operation of the machine there are times when it is desired to cause the machine to feed master cards as for instance when it is found that a master card is out of its proper position in the files and has been fed into the machine. The machine in this instance will be automatically stopped and it will be necessary to cause the machine to feed master cards to remove the misplaced card from an intermediate position in the machine. This feeding of master cards may be controlled manually by the depression of a key 561 (Figs. 11, 13, 22 and 29). The stem 562 of this button is adapted to rock a bell crank 563 against the action of a spring 564 and to pull a link 565 toward the left as viewed in Figs. 22, 51 and 52. This link has pin and slot connection 566 with the link 545 so that the depression of the said key will move the link 545 toward the left and this with depression of the start key will effect feeding of master cards one station as just described. The machine then continues in its operation. The pin and slot connection 563 permits the link 545 to be moved to the left during the automatic operation without effecting the connections to the key 561.

Presuming that the master card and audit card then agree and that the policy number on the master card is higher than that on the audit card we have seen that at least one of the policy number comparing combs will fail to rise and will thus prevent the posting bail from rocking but will permit one of the other bails to rock and that this in turn will cause the link 508 to be raised. When this occurs the machine will be set up to feed master cards and to suppress the feeding of audit cards. The feeding of master cards is effected by the engagement of shoulder 566 on link 508 with the projection 543 in the same manner as described in connection with the shoulder 542 on link 503, the actuation of bell crank 544, link 545 and associated mechanisms being the same as just described. The raising of link 508 also raises the link 532 by means of a projection 567 so that the rocking of lever 534 will not move the link 532 to the right. When the link 508 returns to normal position the spring 568 will return link 532 into cooperative relation with stud 533 on the lever 534.

Presuming the policy number on a master card to be less than that on the opposing audit card the machine will operate to feed audit cards and not to feed master cards, the audit card in this instance going to the reject pocket. This is the normal operation of the machine and takes place when none of the card feed controls are actuated. In this instance the comparing comb 410 associated with the policy number in the order in which the disagreement occurs will rise two steps and lock out all of the bails so that neither of the links 503 and 508 will rise to change the normal feeding operations of the machine. In the operation of the machine for posting the master cards as previously are arranged in numerical order so that the cards will feed from the higher policy numbers downwardly. The audit cards are similarly arranged. The mechanism for causing the machine to stop after two audit cards have been fed in succession to the reject pocket as previously stated, is as follows: Referring to Fig. 54 it will be remembered that whenever the shaft 292 is permitted to rock the audit card goes to the reject pocket.

Presuming an audit card to be thus fed and shaft 292 to be rocked, lever 569 fixed on shaft 292 and connected to a link 570 will rock a lever 571 fixed on a stud shaft 572. This shaft carries fixed thereto an arm 573 having a pawl 574 adapted to cooperate with notches 575 and 576 in a horizontal bar 338. Another pawl 578 also carried by arm 573 is adapted to cooperate with a notch 579 (see also Figs. 119 and 120) in a bar 580. The parts are shown in normal position in Fig. 120.

Presuming the shaft 292 to be rocked to feed an audit card to enter the reject pocket the arm 573 will be rocked clockwise and the pawl 574 engaging in notch 575 will move the bar 338 to the right where it will be latched by a pawl 581 engaging in a notch 582. The movement of the bar 338 to the right will rock the arm 337 against the action of its spring 337a and raise the arm 331 up to the toggle comprising links 82, 84 (see also Fig. 18). When the shaft 292 rocks back to its normal position, the arm 571 will rock in a counterclockwise direction and a pawl 578 will move the bar 580 to the left where it will be latched by a pawl 583. Should the parts be in these positions when the shaft 292 again rocks to cause an audit card to enter the reject pocket, the arm 571 will again rock clockwise and the pawl 574 engaging in the notch 576 will move the bar 338 another step to the right raising the arm 331 higher to actuate the toggle elements 82, 84 breaking the same and actuating the stop member 70a to stop the machine in the manner previously described. Should the last card referred to be sent to the file pocket instead of to the reject pocket as assumed the shaft 292 will not rock and the bar 338 will not be moved the additional step to the right. In this instance the bar 338 will be released and permitted to return to its normal position. The releasing of bar 338 is effected by a lever arm 584 connected by a link 585 (Fig. 54) and lever 586 to the shaft 539. This shaft as we have seen rocks whenever an audit card is to be fed. When the bar 580 is moved to the left and latched there the arm 584 will have been actuated toward the left and will subsequently move back to its right hand position where it will engage the shoulder 580a at the end of arm 580. Before the arm 584 moves toward the left the shaft 292 will have rocked and caused the card to enter the reject pocket or it will have been suppressed. In the latter event when the arm 584 moves toward the left it will move the bar 580 to the left also. A cam surface 586 at the right end of the bar 580 will engage a pin 587 on pawl 581 depressing the pawl and releasing the bar 338 permitting the spring 588 to return bar 338 toward the left to its normal position. During the movement of the bar 580 toward the left a cam 589 fixed on said bar will ride upwardly on the bracket 590 thus raising the bar 580 out of cooperation with the arm 584 and permit the spring 591 to return the bar toward the right to its normal position, the latching pawl 583 having been depressed by a cam 592 on the bar 338 when the latter moved to the left. A bracket 593 carried by the bar 580 will, when the bar is moved to the left by the arm 584, strike the upwardly extending portion 594 of pawl 574 and lift the latter out of cooperation with the bar 338 so that the latter will be free to move to the left.

Month setup mechanism

As has been stated, the machine does not sense the month designation in the master and audit cards for comparison but senses the month designations in the audit card only and senses a setup designation in the machine on the master card side. The month setup mechanism is shown in Figs. 11, 20, 46 and 47. In Fig. 11 the two rows of pins 339 at the extreme left of this group are the month reading pins on the master card side of the machine. These pins are shorter than the other pins in this group and do not reach far enough to engage or pass through the master card but cooperate with a metal plate shown at 596. As shown in Fig. 46 this plate is provided with perforations 597 adapted to be brought into register with one or more of the card sensing pins 339 shown behind the plate. The plate is adapted to be raised and lowered so as to vary the arrangement of the holes 597 with respect to the sensing pins. An index 598 carried by the plate 596 is adapted to cooperate with a chart 599 indicating the several months of the year. The index is shown as registering with the month of June on the chart and the perforations in the plate registering with the units column of pins represent the digit 6 which in turn represents the month of June. By adjusting the plate to register with any of the other months the proper combination of perforations will be brought into proper relation with respect to the pins. Thus when the master card sensing pins take their readings, the month reading pins will read the perforations in the plate 596 while the corresponding pins on the audit card side take their readings directly from the audit card, the comparison being made through the regular combination combs and stop bars 390 of Fig. 32.

The plate 596 is provided with a notched bar 600 adapted to cooperate with a roller 601 carried on a bell crank 602 and actuated by a spring 603 into engagement with the notches. This device serves as an impositive lock for holding the bar 596 in any position to which it may be set. The upper portion of the chart 599 contains the designation List to which the index 598 may be set. This setting is used when the machine is being employed for listing purposes and is reading only master cards without comparing them with audit cards. The perforated plate 596 is supported in guides 604 and 605.

Day setup mechanism

In comparing the two cards the designation representing the day is read directly from the master card but on the audit card side it is read from a mechanical setup device in the machine and the comparison is made between the master card and the machine setup. This day setup device is shown in Figs. 20, 43 and 44 and comprises two combs 606 provided with notches 607. The sensing pins 340 in this instance are provided with collars 608 adapted when the pins take a reading to enter the notches 607 or to be prevented from entering. The notches are so arranged that by raising or lowering the combs 606 the proper combinations may be brought into cooperation with the pins. The combs are adapted to be raised by means of an arm 609 pivoted at 610 and having pin and slot connection at 611 with the combs 606. An actuating link 612 is connected to the arm 609 and is adapted to rock the same to raise and lower the combs. The bent over portions 613 at the ends of the links 612 are provided for permitting the operator to grip the links. The setting of the links 612 is effected in cooperation with the chart 614. The upper edges of the links 612 are provided with notches 615 adapted to cooperate with a latching lever 616 actuated by spring 617 to lock the combs 606 in the position to which they have been set. In setting the combs the operator depresses the latches 616 to release the links 612. The combs 606 will be held in set position by a spring-pressed detent 608a. The two comparing combs 410a, Fig. 10, which are controlled by the stop bars 390 associated with the day sensing devices do not cooperate with any of the bails 430 or 483 and as shown in Figs. 10 and 33 are not provided with any projections or notches on their edges for cooperation with these bails. On the other hand the lower ends of these combs cooperate with latching levers 618, Fig. 69, to rock the same from their normal positions as shown here where they prevent counterclockwise rotation of a lever 619, to their unlatching position shown in Fig. 71 where the lever 619 is permitted to rock. The lever 619 has a projection 620 cooperating with both of the latches 618. The latch 618 associated with the units column is provided with a projection 621 reaching over the top of the latch associated with the tens column. Thus when the units column comparing comb 410a rises and the tens column comb does not rise the latch 618 associated with the units column will be rocked out of cooperation with the projection 620 but the other latch 618 remains in cooperation and prevents the lever 619 from rocking, but should the tens column comparing comb 410a rise two steps it will carry with it the units column latch 618 and both of the latches will thus release the projection 620 to permit the lever 619 to rock. Should the tens comparing comb 410a rise but one step carrying its latch one step the latch will rise up to the projection 621 but will not rise far enough to move the projection 621 and in this instance the lever 619 will not be released. The comparison in the present instance is of the perforation designated 16 on the master card with the day setup on the audit card side. The perforation shown here represents the digit 1 as indicated in the printed field above. This value upon being compared with the setup will control the day comparing combs 410a in the same manner as are the other comparing combs 410 controlled so that a comb will rise two steps when the value of the digit being compared is greater in the machine setup than on the master card. The comb will rise one step when the digit on the master card is the same as that in the setup. The comb will not rise at all when the digit in the master card is greater than that in the setup. When as in the illustration the day is represented by a digit in the units column the mechanism associated with the units column will compare this value with the units column setup. The tens column mechanism associated with the master card finding no perforation will control the combination combs as if a zero were sensed and will thus compare a zero with the setup reading and will cause the latch 618 to operate or not in accordance with the comparison. The tens column mechanism will be controlled as in the case of sensing a zero. If the tens setup contains no significant character there being no character in the tens column on the card the two readings, that is the tens column reading on the card and the tens column reading in the setup, will agree and the tens comparing comb will rise one step but will not affect the position of the units column latch 618. This latch then will be controlled only by the comparison of the units reading in the card with the units reading in the setup and will or will not unlatch the lever 619 depending upon whether the value on the card is equal to, greater than or less than the setup. Thus if the date reading on the master card is higher than the setup in the machine the latches 618 will not release the lever 619. If the day designation on the card is the same as the setup in the machine, the latch 618 will release the lever 619. If the day designation on the card is less than the setup the latches 618 will also release the lever 619. In the operation of the machine the link 622 may or may not move to the right as viewed in Fig. 69 depending upon certain other conditions upon the master card. When this lever moves to the right it will through its spring connection 623 with the lever 619 attempt to rock the shaft 624 upon which the lever is fixed. If the lever 619 is released, the shaft will rock otherwise the spring 623 will stretch and the shaft 624 will not rock. The effect of the rocking of shaft 624 will be more specifically dealt with in connection with certain printing operations to be described presently.

*Selection of the posting field*

As heretofore pointed out, the master card (Fig. 3) is divided into five fields for posting. These fields are designated 44a to 44e inclusive and are subdivided into four quarters 33 representing the quarters of the year. In performing posting operations, since the location of a particular year is not the same on all of the cards it is necessary to ascertain from each card yearly field contains the record for the current year. The designation in the field 29 represents the card year for that particular card. In other words, in the present instance the designation 21 means that this card came into use in 1921 and that the record for that year is therefor contained in the first of the several card year fields or in other words the field 44a. The year 1922 would then occupy the field 44b and so on. Should the card year in field 29 be 22 then the field 44a would contain the record for 1922 and the field 44b would contain the record for 1923, etc. The machine is adapted to ascertain the card year from the field 29 and to effect a setup of mechanism in the machine which setup along with a manual setup will permit the mechanisms associated with the current year to operate so that if, as in the present instance the machine ascertains that the card year as represented in field 29 is 1921 and the machine has been manually set to operate for the current year of 1922 these two setups working in cooperation with each other will release for operation the perforating and printing mechanisms to operate in field 44b. This selection operates to select the perforating and printing mechanisms to operate in any of the four subfields or quarter fields 33 of the main year field so that it is also necessary to effect a selection between the four quarter fields in order to post in a definite one of these fields. To this end two manual selecting setups are effected, the first of which determines which three of the six columns shall operate. In other words, the six type bars and punch operating bars are employed to print and punch the data contained in the year field. The first three of these punch and type bars operate in the upper and lower subfields 33 which represent the first quarter of the year designated MAR and the second quarter designated JUN. The other three of the group operate in the upper and lower subfields designated SEPT and DEC. If the posting is being effected in the first or second quarters of the year, the punch and type bars for the third or fourth quarters of all of the years will be locked against operation so that when the machine automatically selects for operation the type and punch bars for any particular year only those three associated with the first and second quarters of that year will become free to operate. The other of the manual setups determines whether the punch and type bars shall operate in the upper or lower or in other words the first or the second quarter. If the posting is being effected for the first quarter then the manual setup comprises the raising of the punching and printing devices to operate in the upper field. From this it will be recognized that if the posting is being effected for the third quarter of the year, the manual setup will lock out the three bars operating in the first and second quarters and will also cause the perforating and printing to take place in the upper fields so that the posting will be effected in the field 33 designated SEPT. The mechanism involved in effecting these selections is as follows: Referring to Figs. 12, 23, 24 and 111, the type bars 625 have adjacent to their inner edges a bar 626 provided with several projections 627 adapted as shown in Fig. 111 to reach across three of the type bars and to lock them against rising by engaging in notches 628. The locking projections 627 may be moved across the edges of the type bars by sliding the bar 626 laterally. This is effected by a lever 629 having pin and slot connection 630 with a plate 631 fixed on the bar 626. The arm 629 is pivoted at 632 and has at its upper end a knob 633 and may be rocked in accordance with the scale designations 1—6 and 7—12 carried on the cart 634 fixed to the machine. In the position shown with the arm 629 turned to cooperate with the chart designation 1—6 of the projection locks 627 will lock out of operation all of the type bars associated with the third and fourth quarters of the five year fields, the type bars associated with the first and second quarters being free to operate. By shifting the arm 629 to cooperate with the chart designation 7—12, the locks 627 will be moved out of cooperation with the type bars for the third and fourth quarters and into cooperation with those for the first and second quarters. In Fig. 24 the type bars 625 are shown connected to the punch bars 635 by means of an arm 636 rigidly attached to the type bar and engaging the punch bar by a pin and slot connection 637 so as to constrain the punch bar to move up and down with the type bar.

The manual setup for determining whether the type bars and punch bars which have now been selected for operation shall cooperate with the upper or lower quarters of the year comprises mechanism for raising the punches 638 (Fig. 24) the platen 639, the punch actuating bar 640 and the plunger 641 for actuating the type and also to control the distance to which the type bars and punch bars rise. The punches 638, the platen 639, with its ribbon spools punch actuating bar 640 and type plungers 641 are all mounted on a movable frame 642 (see also Figs. 109, 110 and 111). This frame is mounted to move up and down in an outer frame 643 fixed with respect to the machine, the inner frame 642 being provided with guide blocks 644 cooperating with the outer frame. The inner or movable frame 642 is provided with rollers 645 on opposite sides cooperating with cams 646 mounted on shaft 647. Referring to Fig. 23, shaft 647 has fixed thereon a worm wheel 648 meshing with a worm 649 adapted to be turned by means of a crank 650. The turning of the crank 650 turns shaft 647 to cause the cams 646 by cooperating with rollers 645 to raise the inner frame 642 to cause posting in an upper quarter of the year field. The shaft 647 may be locked in its upper or lower position by means of spring pressed locking pins 651 cooperating with holes 652 in the shaft 647. It is also necessary when the punches and platen are set for posting in the upper or lower fields to control the setting of the punch bars and type bars 625 and 635 respectively. To this end three shafts 653, 654 and 655 are provided with levers 656 fixed thereon and cooperating with pins 657 on the type bars (Fig. 24). The shafts also have fixed thereon arms 658 (Fig. 23) having pin and slot connections 659 with bars 660. Movement of the bars 660 up and down will vary the position of the levers 656 to determine the position to which the type bars may rise. The three bars 660 associated with the shafts 653, 654 and 655 cooperate with a chart 661 (Fig. 26). As shown here the bars 660 fartherest to the left cooperates with the portion of the chart representing months. When posting in the upper or first and third quarters of the year the vertical chart designations 661a are employed and when posting in the lower or second and fourth quarters the chart designations 661b on the left portion of the months section of the chart are employed. This same arrangement is employed in connection with the tens and units columns of the days portions of the chart, thus if posting is to be effected on the twenty-eighth day of the ninth month or in other words the twenty-eighth of September this being the third quarter of the year the three bars 660 will be as shown in Fig. 26, the month bar being set to the "9" in the right hand column 661a of the chart, the tens bar 660 representing the tens order of the day of the month being set at "2" in the right hand column and the bars 660 associated with the units column of the day being set at "8" in the right hand column on the chart. The several bars 660 are held in their set position by a spring pressed stop 662 (Figs. 23 and 25). The shaft 655 (Figs. 23 and 24) carries lever 656 for each of the type bars 625 associated with the month columns. In other words, referring to Fig. 11 this shaft has a lever 656 associated with the first type bar 625 counting from the left and skipping the next two it has a lever associated with the succeeding type bar or the fourth one. It also has a lever associated with the 7th, 10th, 13th, 16th, 19th, 22nd, 25th, and 28th type bars so that the setting of the shaft 655 by the adjustment of bar 660 will set all of the levers 656 associated with all the month type bars so that when the restoring bar 663 rises the type bars 625 which are released for operation will be raised by springs 664 to a point where the type 665 will be positioned with respect to the platen 639 and the plunger 641 to present a type for printing in accordance with the setting of the bars 660 on chart 661 (Fig. 26). In like manner the shaft 654 carries levers 656 to cooperate with all of the type bars representing the tens order in the day of the month and the shaft 653 carries levers 656 associated with all of the type bars representing the units column in the day of the month. In using the type bars for printing the month designation it will be recognized that the 10th, 11th and 12th months each requiring two digits for their designation would ordinarily necessitate an extra type bar and additional space on the card and in the machine for their accommodation unless some economizing scheme be employed. In the present instance I prefer to confine the machine to one type bar for indicating any of the twelve months. It would, of course, be possible to have two digits on each of the three type elements representing the 10th, 11th and 12th months by squeezing the digits close together and their positions may be controlled by increasing the number of combinations of perforations used for this purpose. In the present instance it is convenient to designate the 10th month by using the combination of perforations employed to represent "O" and I therefore use the type element representing "O" to represent the 10th month. Similarly it is convenient to use the combination of perforations representing "A" and "C" as used elsewhere in the machine to designate the 11th and 12th months respectively as these combinations of perforations employ the upper four of the six possible positions in the alphabet code and can easily be employed in the four position combinations used in the digit code. I therefore use the type elements representing "A" and "C" to indicate the 11th and 12th months respectively. Thus referring to Fig. 8 it will be noted that in the field 33 representing the fourth quarter of the year the month of November is indicated by a combination of three perforations and by the printing of the letter "A." Also in Fig. 9 the month of posting in the fourth quarter is October, one perforation representing the character "O" is employed and the character "O" is also printed to represent the 10th month. It is to be understood that the setting of the bars 660 (Fig. 26) to control the perforating and printing of the date in the several fields 33 is for the purpose of indicating the exact day on which the posting upon the card is effected and all cards passing through the machine and receiving posting designations on that particular date will bear the same date designations. I have now described the manner in which manual setups are effected to determine the date that shall be perforated and printed in one of the quarterly fields 33. I have also described the manner in which the machine shall be controlled to effect the posting in either the upper or lower quarterly fields 33. I will now describe the manner in which the machine under control of the card and a manual setup will automatically determine which of the major year zones 44a to 44e inclusive is to receive the posting designations.

Referring to Fig. 96, the type bars 625 are divided into five groups of six bars each, each group having associated therewith a bail 666 having a laterally bent-over portion 667 (see Figs. 23, 24 and 95) cooperating in a notch 668 in the type bar 625. Each of the bails is loosely mounted on shaft 669 and has connected thereto a link 670 actuated by a spring 671 to hold the bail in position to lock the type bar 625 down in its inoperative position. Each of the links 670 reaches upwardly and has a lug 672 lying in the path of a bar 673 so that as viewed in Fig. 95 when the bar 673 moves to the left it will rock the bar 667 away from the group of six type bars associated with a particular one of the five year fields. In Fig. 96 one of the bars 673 is shown. The bars are connected to a pair of bell cranks 674 for parallel movement, the bell cranks in turn being connected to a link 675, a spring 676 being provided to move the link toward the left to move the bar 673 downwardly as viewed in Fig. 96 and to the left as viewed in Fig. 95. There are, of course, five of the links 675 as shown in Fig. 94, one for each of the five groups of type bars. In the operation of the machine, the five links 675 attempt during each cycle of the machine to move to the left to release their respective groups of type bars. Under the control of the card itself but one of these links will be permitted to thus move to the left to release its group of type bars. The mechanism for this purpose includes the sensing pins 28 (Fig. 2) adapted to cooperate with the field 29 on the card (Fig. 3). These particular pins are shown in Fig. 78 and are provided with lugs 677 on their sides. Normally the lugs 677 stand in the path of transfer levers 678. When the pins advance to take a reading from the card, the pins that pass through perforations will carry their lugs out of the path of the transfer levers.

*Operation of the sensing pins*

As shown in Fig. 69 the sensing pins 31, 32 which are adjacent to the pins 28 and controlled and operated in the same manner are provided with collars 679 fixed to their rear ends and abutting a plate 680 through which the pins pass. Springs 681 press against the plate at one end and against a shoulder 682 on the pins at the other. Movement of the plate 680 bodily toward the right will tend to move all of the pins in the same direction by the action of the springs. The pins that engage the card M will be stopped and their springs will be compressed. Those of the pins that are in alignment with perforations in the card as shown in Fig. 71, will pass through the card. The operation of the plate 680 is by means of a pair of complementary cams 683, 684 (Fig. 21) operating a cam follower arm 685 loose on shaft 355 and connected by a link 686 to a lever 687 pivoted at 688. Also fixed on shaft 688 are a pair of levers 689 (Figs. 19, 63 and 65) having pin and slot connection 690 with a bar 691 fixed to the plate 680; the bar 691 being supported in slots 692 in the frame 693 for support and guidance. The operation of the cam moves the plate 680 back and forth to cause the pins to advance against or through the card and to retract them after the readings have been taken from the pins. After the pins have taken their readings and the lugs 677 thereon (Fig. 64) have been set in accordance with the reading, the levers 678 then rock to take the readings from the pins. The levers 678 are pivoted at 694 (Fig. 64). The lower ends of the levers 678 cooperate with bent-over portions 695 integral with a set of combs 696 (see also Fig. 78). Spring 697 tends to move the combs toward the left as viewed in Figs. 64 and 78 against the levers 678 so that when the levers rock to take their readings from the sensing pins those that engage the lugs 677 on the pins then move beyond the clearance permitted and the corresponding combs 696 therefore remain in their normal positions. Those of the levers 678 that find the lugs 677 displaced by reason of the corresponding pins having advanced through perforations in the card rock and permit their respective combs 696 to move to the left. Fig. 78 shows the two upper projections 695 as having moved toward the left with their respective combs 696 in response to the reading taken by the pins 28 wherein the two lower pins have advanced as shown. The setting of the four combination combs 696, serves to determine which year field on the master card contains the record for the current year, by cooperating with fingers 698. There are five fingers 698, one for each of the five year fields on the card. These fingers are loosely mounted on sleeve 699 slidably carried on shaft 700 and spaced by collars 701. Also fixed with respect to sleeve 699 is an adjusting arm 702 (Figs. 64, 78, 94 and 96) cooperating with notches 703 in a fixed index plate 704. The arm is normally held in the notches by means of a locking plate 705 (Fig. 64) which when in its normal position as shown prevents the arm from being raised out of cooperation with the notches. By sliding the plate 705 to the right it will by reason of its slots 706 rise out of engagement with the arm 702 and permit the latter to be rocked upwardly so that it may be adjusted with respect to the several notches and lowered into any one of the notches. These notches are designated 1 to 10 respectively and represent a period of ten years. When set in the notch 1, the machine will be adjusted to operate for the current year of 1911, 1921 or 1931, etc. when set in the notch designated 2, the current year would be 1912, 1922, etc. Thus in operating the machine this arm is set in the notch representing the current year and the fingers 698 will thus be moved to a position with respect to the combination combs 696 representing the current year. When the pins 28 take a reading in the card year field 29 (Fig. 3) and the levers 678 are set in accordance with this reading, the cooperation between the setting of the combs 696 and the position of the group of fingers 698 will be such that one of these fingers will rock into an opening across the four of the combs. That particular finger corresponds to the one of the five year fields in which the posting for the current year is to be effected.

The actuation of the lever 678 is controlled by a bail 707 (Figs. 64 and 65) pivoted at 708 and having a cam arm 709 adapted to be actuated by a cam lever 710 fixed on shaft 711 the other end of which shaft has fixed thereto a lever 712 (Figs. 19 and 63) connected by a link 713 to a lever 714 fixed with respect to a cam follower lever 715 cooperating with a cam 716 on shaft 77. A spring 717 holds the cam follower in contact with the cam. The operation of the fingers 698 is controlled by springs 718 tending to rock the fingers into cooperation with the combs 696 (see Figs. 66, 94 and 96) and a cam 719 fixed on shaft 720. The shaft 720 as shown in Fig. 19, has fixed thereon a lever 721 connected by a link 722 to a lever 723 fixed on a stud shaft 724 on which is also fixed a two arm cam lever 725 cooperating with complementary cams 736, 727. The cam 719 (Fig. 66) thus oscillates and through a cam follower 728 rocks the shaft 700. Loose on this shaft are also the bail arms 729 having the usual connecting bar 730 to which the outer ends of the springs 718 are anchored (Figs. 66 and 96). Fixed on this shaft 700 is a bail 731 passing between the upper arms of fingers 698 and the bail arms 729, the springs 718 thus hold the fingers and the bail arms against the bail 731. Rocking of the shaft 700 clockwise as viewed in Figs. 75 and 78 and counterclockwise as viewed in Fig. 66 will thus move the bail arm 729 and through springs 718 cause the fingers 698 to follow to take a reading from the combs 696. Movement of the shaft in the reverse direction causes the bail 731 to rock the fingers 698 out of engagement with the combs, the bail arms 729 being caused to return to normal position by the springs 718. The lower ends 732 lie adjacent to the edges of five hooks 733 so that when one of the fingers rocks into the notches of combs 696 as seen in Fig. 78, it will actuate the corresponding one of the hooks 733. As shown in Figs. 96 and 97 the hooks 733 lie in the path of the bars 675. The rear ends of the hooks 733 are pivoted at 734 (Figs. 94 and 96). Springs 735 tend to hold the hooks in their normal positions. When a hook 733 is moved from its normal position of Fig. 97 by one of the fingers 798 to the position of Fig. 98, it will be latched in this position by the spring actuated latch 736, the tail 737 of the latch holding the hook in its moved position and the tail piece 738 preventing the latch from overthrowing. As previously stated the bars 675 are pulled toward the latch by spring 676 but are normally prevented from so moving by a bail 739 fixed on shaft 740. Also fixed on this shaft is an arm 741 connected by a link 742 (Figs. 97, 98) to the bell crank 743 (see also Figs. 94 and 99) which in turn is connected by a link 744 to a cam follower arm 745 pivoted at 746 and cooperating with a cam 747 on shaft 74 (see also Fig. 30). The cam thus causes the shaft 740 to rock. When this shaft rocks clockwise as viewed in Figs. 96, 97 and 98, the bars 675 are released to move to the left. This takes place subsequent to the operation which moves one of the hooks 733 out of position. Four of the bars 675 will then engage the hooks 733 and one will be permitted to move to the left as the corresponding hook will have been moved out of its path as shown in Fig. 98. When the bail 739 rocks to release the bars 675 it also rocks an idler bail 748 against the latches 736 rocking the operating one back to its inoperative position to release the hook 733. The bar 675 will, of course, at this time be in position to prevent the hook from moving back to its normal position.

The hook 733, however, will have moved far enough to prevent the latch 736 from returning to latching position when the bar 675 is restored to its normal position so that when the bar releases the hook 733 the latter will be moved by its spring 735 to normal position.

We have now seen how the zone or field setup in the machine by being compared with the card year field 29 in the master card has selected a group of six type and punch bars for operation in the active year field on the master card and also how three of these bars have been locked out of operation by a manual selection. It is now desired in the event that the master and audit cards do not compare, to lock the selected type and punch bars against operation. This is effected in the following manner. Referring to Fig. 99 we have seen that the link 503 rises when the master and audit cards compare and remains in the position here shown when the cards do not compare. The lower end of this link is provided with a notch adapted to receive a stud 750. A spring 753 tends to rock the lever 751 counterclockwise but is normally prevented from doing so by a projection 754 on a lever 755 connected by a link 756 to a lever 757 fixed with respect to a cam lever 758 (Figs. 94 and 99) pivoted at 759. A cam arm 760 fixed on shaft 74 actuates the lever 758 rocking the lever 755, thus releasing the arm 751 to operate. If the link 503 has not risen the stud 750 rocks into the notch 749, moving a link 761 which is connected to arm 751, toward the right. Link 761 is connected to a lever 762 fixed on a shaft 763 (see also Figs. 94 and 99) on which is also fixed a lever 764 connected by a link 765. The lever 765 has pin and slot connection with a lever 766 pivoted at 767 and fixed with respect to a lever 768. The lever 768 engages the arm 769 of bail 748 (Figs. 96, 97, 98 and 99) rocking the latter against the latches 736. This operation takes place after the cards have been compared and the bails have been released for operation causing the operation or suppression of the link 503 and also after the hooks 733 have been actuated but before the bar 675 moves to the left so that a hook 733 that has been left in the position of Fig. 98 will become released by reason of a noncomparing condition between the master and audit cards and when the bars 675 attempt to move toward the left they will all be prevented by the hooks 733, and thus none of the type and punch bars will be released for operation. When this suppression of the type and punch bars takes place, the feeding of the cards will be in accordance with the reading taken by the comparing bails previously described, wherein the master card will be fed if one of these bails operates, the audit card remaining in the comparing station and wherein the master card remains at the comparing station and the audit card is fed out if one of the comparing bails rocks. If the master and audit cards do compare and the link 503 (Fig. 99) rises, the stud 750 when it rocks will engage the edge 770 of link 503 preventing the rocking of arm 750 and the movement of link 761, etc., preventing the movement of the bail 736 (Figs. 97 and 98). The bar 675 corresponding to the operating one of the hooks 733 will then operate as described to release the appropriate set of type and punch bars. After the selection of the type and punch bars has taken place, the restoring bar 663 rises permitting the type bars 625 to rise to the position of the set levers 656, presenting the appropriate one of the type elements 665 and the proper combination of punch plungers 771 as illustrated in Fig. 109. The arrangement of the punch plungers 771 is such that when the type element 665 representing the digit 1 rises to operative position in alignment with the type plungers 641 the uppermost of the punch plungers 771 will be in alignment with the fourth from the top of the punches 638. When the type representing the digit 2 is in printing position the uppermost punch plunger 771 will align with the third from the top of the punches and when the type element representing the digit 3 is in printing position the uppermost punch plunger 771 will register with the second from the top of the punches 638 and the second from the top of the punch plungers will register with the fourth from the top of the punches, these two punches according to the code employed representing the digit 3. It will be understood from this that the arrangement of the six plungers illustrated is such that they will be positioned with respect to the punches in accordance with the position of the type elements 665 so as to produce perforations to correspond with the characters being printed representing the date on which the perforation is being effected in the appropriate one of the quarter fields 33 of the several year fields on the master cards.

After the type and punch bars have been set to operative position as in Fig. 109 the type elements and punches will be actuated to print upon and to perforate the card. The mechanism for actuating the type elements for printing is as follows: Referring to Fig. 24, the hammers 772 are loosely mounted on shaft 773 and are adapted to be actuated by springs 774 to strike the plungers 641. Each hammer is locked in inoperative position by a spring actuated latch 775. The lower end of this latch is provided with a lateral projection adapted to be engaged by a shoulder on an arm 776. This arm is normally held in an inoperative position by a spring 777 and is loosely mounted on a shaft 778 carried by an arm 779 fixed to a shaft 780 (see also Fig. 14). The shaft 780 has fixed thereto a lever 781 (Fig. 25) connected by a link 782 to a cam arm 783 pivoted at 784 and adapted to be actuated by a stud 785 fixed in the side of a cam 786 (see Fig. 14) on shaft 77. The rocking of shaft 780 pulls the arms 776 toward the right as viewed in Fig. 24. Normally the shoulder on this arm rides above the lateral projection on the latch 775 and fails to actuate the later. Each arm 776 is engaged by a lateral projection on a lever 787 engaging a slide 788 which in turn is held in its lower position by a shoulder 789 on the type bar. The lever 787 is thus held against the action of its spring 790 when the type bars are in their normal positions. When a type bar rises the corresponding slide 788 rises under the influence of spring 790 which rocks the lever 787 and depresses the arm 776 so that the shoulder on the latter will now engage the projection on latch 775 when moved to the right and will rock said latch readily understood. It will also be noted from this chart that if the uppermost of the four hole spaces in field 48a of the audit card has been perforated that the premium was adjusted by a loan. A perforation in the second from the top of the four hole spaces also indicates that the premium was paid through the home office. A perforation in the third from the top of the hole spaces always indicates that the dividend was not taken by the insured. A perforation in the lowermost hole space always indicates that the premium was paid through an outside source. In the posting operations, the machine analyzes the perforations in the field 48a on the audit card to ascertain the mode of payment of the premium. If no perforation appears in this field, no record is made upon the master card and it will be understood that payment of the premium was made through the regular channels and that no dividend was due or paid to the insured. A perforation in the field 48a indicating according to the table in Fig. 60 that a dividend was taken by the insured along with one or more perforations in the field 24 representing the amount of the dividend also printed in the field 24a will cause the machine to perforate the master card in the space 25 indicating that a dividend was taken. The printing in field 24a on the audit card and the perforations in the field 24 are produced by the notice writing machine when the audit card A is made out but the printing and perforating in fields 48 and 48a respectively, may be produced by an operator on a perforating machine after payment of the premium has been made and the manner of such payment has become known.

The mechanism for analyzing the perforations in fields 24 and 48a is as follows: Referring to Figs. 24, 109 and 110, there is a horizontal row of six punches 818 adapted to cooperate with the spaces designated O, H, L on the master card. These punches are mounted in the horizontally movable frame 799 which in turn is carried by the vertically movable frame 642 so that when the frame 642 is raised to the position of Fig. 110 the six punches 818 will be in alignment with the two upper sets of spaces designated O, H, L, representing the first and third quarters of the year. When the frame 642 is in its lower position as in Fig. 109, these punches will be in position to cooperate with the O, H, L spaces representing the second and fourth quarters of the year. Also three of the punches must be suppressed as only one set, representing the quarter of the year in which posting is being effected, is to be operated. This control is effected in the following manner: The type bar 625 is provided with a shoulder 819 which when the bar is in its lower position engages and depresses a lever 820. This lever is connected by a link 821 to a latch 822 having a lateral projection 824 on each of three interposers 825. There is one lever 820 for each set of the three type bars 625 associated with the quarterly fields 33. In the present instance the type bar which carries the type for printing the month designation is used for this purpose. Thus when this type bar rises it unlatches the three interposers 825 associated with the three punches 818 associated with the corresponding set of O, H, L spaces on the master card. Only one of the three punches, however, if any, is to operate and it is therefore necessary to select the proper one for operation. To this end each of the interposers 825 is provided with a projection 826 cooperating with one of three bails 827, 828 and 829. All of the interposers 825 associated with the O spaces across the entire width of the master card are associated with the lowermost bail 829. All of the interposers associated with the H hole spaces cooperate with the middle bail 828 and all of the interposers associated with the L spaces on the master card cooperate with the upper bail 827. Each bail is provided with an arm 830 carrying a pin 831 adapted to engage a lever 832 pivoted at 833 and having an arm 834 connected by a link 835 to a lever 836 fixed with respect to a lever 837 loosely mounted on shaft 838. The lever 836 is normally latched by a latch 839 as shown in Fig. 59 pivoted at 840 and fixed with respect to a lever 841. This lever has pin and slot connection with a link 842 connected to a lever 843 fixed on shaft 844 on which is also fixed a lever 845 connected by a link 846 having pin and slot connection with a bell crank 847 which in turn is connected by a link 848 to a lever 849 loosely mounted at 850. Each of the levers 849 has a lateral projection 851 cooperating with a lever 852 loosely pivoted at 853 and cooperating at its upper end with a pin 854 fixed to the side of the pins 20. Normally three of the levers 852 are adapted to prevent the levers 849 from rocking upwardly, but when the corresponding one of the pins 20 advances to take a reading and passes through a perforation in the card, the corresponding lever 852 will be rocked out of the path of the projection 851 to permit the corresponding lever 849 to be rocked upwardly. The fourth of the levers designated 852a is associated with the fourth of the levers designated 849a (see Fig. 62) and is normally out of the path of the projection 851 so that normally, so far as the lever 852a is concerned, the lever 849a is free to rise. The lever 852a cooperates with the third from the top of the pins 20 as shown in Fig. 60 so that when this pin advances it will rock said lever the lower end of which will thus be rocked into the path of the projection 851, the shoulder 852b lying directly above said projection and the lower portion 852c being to the left of the projecout of cooperation with the hammer 772, permitting the hammer to be actuated by its spring to strike the plungers 641 which in turn will actuate type in alignment therewith to effect printing. From this description it will be seen that unless a type bar rises from its normal position the corresponding type hammer will not be released for operation.

The restoration of the hammers 772 is effected by means of a bail 791 fixed on shaft 773 (Fig. 24). Fixed to the outer end of shaft 773 is a lever 792 (Fig. 25) connected by a link 793 to a cam follower arm 794 pivoted at 795 and fixed with respect to a complementary arm 796. These two arms cooperate with complementary cams 797 and 798 fixed on shaft 77.

The actuation of the punch plungers is as follows: The actuating bar 640 has its ends fixed in the frame 799 (Figs. 24, 109, and 110) movably mounted in the frame 642. A pair of levers 800 fixed on shaft 801 are adapted to cooperate with studs 802 fixed to the frame 799. Fixed on shaft 801 is a lever 803 (see Fig. 25) connected to a cam follower arm 804 bifurcated at its left hand end to straddle the shaft 77 for guidance and provided with cam follower rollers 805, 806 cooperating with cams 807 and 808 fixed on the shaft 77. The rocking of the shaft 801 moves the frame 799 from the position shown in Fig. 110 wherein the bar 640 is shown as actuating two of the punch plungers 771 which in turn actuate the two corresponding punches 638 causing them to perforate the card M. A plate 809 also carried by the frame 799 engages shoulders 810 on the punches. When the frame 799 is moved toward the right as viewed in Figs. 109 and 110 this plate releases the punches for operation. When the frame 799 is restored toward the left, the plate engages the shoulders on the punches and restores them to normal or inoperative positions. It is to be understood that the type elements 665 as well as the punch plungers 771 are actuated by springs (not shown here) to return them to their normal positions after they have been released by their actuating elements.

*Restoration of type and punch bars*

Referring to Figs. 23, 24 and 25 the restoring bar 663 engages a projection 811 fixed to the type bar 625. Links 812 attached to the outer ends of the bar 663 are connected at their upper ends to bell crank levers 813 (see also Fig. 12) pivoted at 814. The opposite ends of these bell cranks are provided with cam followers 815 cooperating with cams 816 fixed on shaft 77. Springs 817 hold the followers in contact with their cams. The action of the springs and the cams cause the bar 663 to be raised and lowered to cause type bar 642 and punch bars 635 to rise and to be lowered to control the operation of the type and punch bars.

*Place of payment and dividend punches*

Referring to Figs. 3 and 4 each of the year fields 44a to 44e inclusive, are shown as including hole spaces 22 designated O, H and L, respectively, there being one of these sets of three spaces for each of the quarters of the year. These spaces are for the purposes of indicating the manner or mode by which the premium payable upon the policy was paid, the O representing that the payment was made to one of the outside or district offices, H indicating that the payment was made to the home office and the L indicating that the payment was by the insurance company crediting the premium to the policy holder and lending him the amount of the premium. A fourth mode of payment, not indicated, is where the payment is made through the regular channels. Each of the year fields also includes a space designated 25 within which a hole may be perforated to indicate that a dividend due the insured upon his policy has been paid to him. In the subfield 46a, the amount 5.28 printed indicates that the insured is entitled to payment of a dividend of $5.28 for the year. The perforations in the subfield 46 represent according to the perforation code the sum of 5.28. Referring to the audit card in Fig. 4, the field 48 contains the designation 5 and the field 48a is shown as having a perforation 21 in the second from the top of the four hole spaces in the vertical row, the perforation representing 5. The designation in fields 48 and 48a are in accordance with the table shown in Fig. 60. According to this table where no perforations are provided in the field 48a and no designation is printed in the field 48 it will be understood that the dividend was taken or received by the insured and the payment of the premium by him was through the regular channels. Where a single hole appears in the lowermost hole space in the field 48a and the designation 1 appears in the field 48, it will be understood that the dividend was taken by the insured and payment of the premium was made from the outside. Where a perforation appears in the second from the top of the hole spaces and a 5 appears in the field 48 the dividend was taken by the insured and the premium was paid through the home office. Where a perforation appears in the uppermost hole space and O is printed in the space 48 the dividend will have been taken by the insured and payment of the premium will have been adjusted by a loan. A perforation in the third from the top of the four hole spaces and a 2 printed in the space 48 indicates that the dividend was not taken by the insured and it also indicates that the premium was paid through the regular channels. The remainder of the columns will be tion. This will permit the lever 849a to rise from its dotted line position to its full line position and the lever 852a will at the same time be prevented from returning under the influence of its spring 855 when the pin 20 is restored. The lever 843 (Fig. 59) associated with the lever 849a through shaft 844, link 846, etc., is connected through pin and slot connection to a link 842a which is connected to a lever 856 fixed on a shaft 857 on which is also fixed a latch 858 adapted as shown in Fig. 24 to cooperate with the lower end of a link 859 connected at its upper end to an arm 860 (see Figs. 109 and 111) fixed to a bail 861. When the latch 858 releases the link 859 the latter will rise under the influence of spring 862. The bail 861 is connected through springs 863 to arms 864 connected to interposers 865. There are five arms 864 and interposers 865, one for the punch 866 associated with each of the dividend spaces 25 of the five year fields on the master card. Only the interposer associated with the year field in which the machine is posting is to be released for operation. To this end all of the levers 864 are locked down by a latch 867 actuated by a spring 868 to cooperate with a projection 869 on said lever 864. The latches 867 are connected by links 870 to an arm 871 loose on the shaft 872. The arm 871 is provided with a pin 873 latching across the two bell crank levers 820 associated with the two sets of type bars 625 for the corresponding year, thus when either of the bell cranks 820 is permitted to rock by the rising of the type bars 625 the latch 867 associated with the corresponding year will be actuated to release the arm 864 permitting the corresponding one of interposers 865 to rise under the influence of spring 863 in response to the rocking of the bail 861. The interposer will thus be moved from its inoperative position as shown in Fig. 24 to the position of Fig. 109 into alignment with the punch 818. It will thus be seen that when the type bars 625 rise, the interposer 865 associated with the punch 818 adapted to perforate a hole in the dividend space 25 on the master card will be released for operation. This interposer, however, does not rise to operative position when the third from the top of pins 20 advances through a perforation in the audit card.

According to the table in Fig. 60, if no perforation appears in the third from the top of the hole spaces in the field 48a on the audit card the punch 866 will so far as this field is concerned be caused to perforate in the dividend taken space 25 on the master card. It is desired, however, to suppress operation unless an entry appears in the dividend field 24a on the audit card with the corresponding perforations in the field 24. To this end, the feeler pins 23 (Figs. 59 and 61) which sense the field 24 of the audit card are all provided with laterally projecting pins 874 adapted, when the sensing pin advances, to rock levers 875 loose on a shaft 853 but all fixed with respect to an arm 877 which in turn is also fixed with respect to a latch 878 loosely mounted on shaft 853. Normally the latch 878 prevents the arm 849a from rising (see also Fig. 62) and prevents the latch 858 (Fig. 24) from releasing the bail 861. Thus when the absence of a perforation in the third space prevents the lever 852a from moving into the path of the projection 851 the arm 849a will still be held in its depressed position unless one of the pins 23 has advanced through a perforation in the card. When such a pin does advance, the latch 878 will be rocked out of the path of the arm 849a and the latter will be free to rise.

Restoration of punch interposers

The restoration of the interposers 825 (Figs. 24, 109 and 110) is effected as follows: Referring to Fig. 23, a two-arm lever 879 loose on a shaft 880 engages the lower side of the type restoring bar 663. The link 883 connects arm 879 to a lever 884 fixed on shaft 885 on which shaft is also fixed a cam 886 (Fig. 24) cooperating with a follower arm 887 (see also Fig. 30). The arm 887 is fixed on shaft 880 on which are also fixed an arm 888 and three arms 889. Also fixed on shaft 880 is an arm 881 actuated by a spring 882 to hold the follower 887 into engagement with the cam. The arm 888 has pin and slot connection with the spring 859 so that the action of the cam 886 rocking shaft 880 clockwise will serve to depress the link 859 to restore the bail 861 to normal position with the interposers 865 by pressing upwardly on the rear projection 894 of the arm 864. All the three arms 889 have pin and slot connection with links 890 connected to the rear arm 891 of lever 836 (see also Fig. 109). The levers 836 as we have seen are fixed with respect to the latches 837. When the cam 886 depresses the follower 887 it also causes the downward movement of the three links 890 rocking the latches 837 clockwise as viewed in Fig. 109 to their normal positions permitting the latches 839 to move to latching positions as shown in Fig. 59, under the influence of their springs 892. At the same time the arms 832 will be rocked counterclockwise as viewed in Figs. 109, 110 and 24 rocking the bails 827, 828, 829 clockwise causing the interposers 825 to be depressed to their normal positions against the action of their springs 893.

Restoration of interposer controlling devices

Referring to Fig. 59, the arms 849 are depressed to their normal positions by means of a bail 895 pivoted at 896 and connected by a link 897 to a lever 898 fixed on shaft 899 (see also Figs. 29 and 30). The shaft 899 has fixed thereto a cam follower 900 cooperating with a cam 901 fixed on shaft 74 (see also Fig. 31). The cam causes the bail 895 (Fig. 59) to depress the arms 849 permitting the springs 902 to rock the levers 852 back to their normal latching positions.

Referring to Figs. 109 and 110, it will be noted that the arms 832 are mounted on the fixed frame 643 and do not rise and fall with the bails 830 with which they cooperate. For this reason the arms 832 are of such length that when the bails rise from the position shown in Fig. 109 to that shown in Fig. 110 the bail pins 831 will continue to cooperate with the arms 832. It will also be noted that the punches 866 are carried by the fixed frame 643 and therefore do not rise with the punches 638 and 818. For this reason the restoring plate 903 for the punches 866 is connected at its ends by bars 904 provided with guide blocks 905 between which the plate 906 is carried by the movable frame 799. The plate 906 may thus rise without affecting the position of the restoring plate 903 but when it moves to the right it releases the punches 866 and actuates the interposers 865. When it is restored to the left it releases the interposers and moves the restoring plate 903 to the left to withdraw the punches 866 from the card. A bar 907 also carried by the frame 799 is adapted when the frame moves to the right to actuate the interposer 825 to actuate the punches 818.

Inasmuch as the interposers 865 are not carried by the frame, latches 867 are also carried by the fixed frame 643. The latches 822, however, cooperating with the interposers 825 are carried by the vertically moving frame 642, the connecting link 821 moving from the position of Fig. 109 to that of Fig. 110.

In connection with the raising and lowering of the type elements 765 and the type plungers 641 it will be noted that the type actuating hammers 772 are provided with two engaging points, one to engage the plungers when in the lower position and the other when in the upper position.

Referring to Fig. 25, when the frame 799 is raised and lowered with the shaft 801 and link 803 the cam actuated link 804 will pivot about the shaft 77. The slight changing of the timing of the operation of the cam link 804 does not in any way affect the operation of the machine.

Type jam machine stop

Referring to Figs. 24 and 45 it will be seen that when a type element 765 is actuated to printing position as shown in Fig. 45, unless the type is restored to normal position with respect to its carrying bar 625 before the latter descends the type element 765 will engage the punch die 908 and will be bent or broken. In order to avoid this, mechanism is provided for stopping the machine when the type element fails to return to its proper position. This mechanism comprises a plate 909 mounted to slide up and down in guides 910. The plate 909 is wide enough to reach across the full width of the platen 639 so as to cooperate with all of the type bars 625. A lever 911 pivoted at 912 is connected by pin and slot 913 to the plate 909 and is adapted to be actuated by a spring 913a to move the plate 909 downwardly into contact with the type. A lever 914 fixed with respect to the arm 911 is provided with a stud 915 cooperating with a lever 916 connected by a link 917 to a bell crank 918 (Fig. 24) pivoted at 919 to the fixed frame of the machine and connected by a link 920 to a cam arm 921 cooperating with cam 922 on shaft 77. A spring 923 serves to hold the cam arm 921 in cooperation with the cam. The lower end of the link 920 has pin and slot connection with a lever 924 pivoted at 925 and fixed with respect to a latch 91. The timing of the cam 922 is such that the link 920 is permitted to rise after the type have been actuated and before the type bar 642 descends. The rising of link 920 rocks the lever 916 clockwise, releasing the arm 911 and permitting it to drop downwardly with the plate 909. If the type has been properly returned in their carriers 625, the plate 909 will move through the path of the type and will cause an arm 926 also fixed on the shaft 912 to rock counterclockwise so as to present the long shoulder 927 in the path of a lug 928 on a lever 929 fixed to rock with the lever 916. The engagement of the lug 928 with the shoulder 927 will thus limit the rocking of lever 916 and consequently also permit the upward movement of the link 920. Should the plate 909 encounter a type element when it descends it will prevent the shoulder 927 on arm 926 from rocking into the path of the lug 928 and the lever 929 will rock its full distance with lever 926 and will permit the link 920 to rise its full distance in following the contour of the cam 922. The full upward motion of link 920 will after taking up the lost motion in connection with lever 924 actuate said lever and move the latch 91 out of cooperation with cam stop 70 permitting its spring 93 to rock it from the position shown in Fig. 24 to that shown in Fig. 18 to cause the machine to stop. The pin and slot connection between the arm 98 and link 97 will now be such that the machine may again be restarted after the type has been properly adjusted, by depression of the start key 94. The frame 930 upon which the plate 909 and lever 911 and associated mechanisms are mounted is carried by the frame 642 and moves up and down with the punches 638 and 813. The link 917 swings about its connection with the bell crank 918 when the parts are moved up and down without affecting the operation of said parts.

Detecting cards in wrong group

Referring to Figs. 3, 8 and 9, it will be seen that the master cards are provided with notches in their upper edges. In Fig. 3, the notch is toward the right hand side of the card; in Fig. 8 it is in the middle of the card and in Fig. 9 it is on the left hand side. According to the present arrangement all of the cards for the 1st, 4th, 7th and 10th months of the year are placed in the first group with the notch on the left hand side as shown in Fig. 9. All cards belonging to the 2nd, 5th, 8th and 11th months are placed in the second group with the notch in the middle of the card, Fig. 8, while all of the cards belonging to the 3rd, 6th, 9th and 12th months are provided with the notch toward the right as in Fig. 3. All cards similarly notched may be placed in one group so that there will be three groups of cards. In operating the machine for any particular month, the group of cards including that month will be run through the machine. In other words, when operating to post for the month of January the group of cards including the January, April, July and October cards will be run through the machine. Mechanism is provided for detecting the presence of a card belonging to one of the other months or in other words one of the other groups in field 27 on the master card. The perforations designate the group to which the particular card belongs. The mechanism for analyzing this field to detect the presence of a card not belonging to the group includes the sensing pins 26, Figs. 2, 64 and 85. The perforations in the field 27 will indicate any of the four months, January, April, July and October, if the card belongs to the first group and when the machine is set to operate in any one of those four months it will pass for operation all cards having the code perforations for any of those four months. In Fig. 85 the enlarged portions 26a of the pins are provided with lateral projections 932. Above the pins is a dummy bar 933 and below the pins is another dummy bar 934. These bars are held toward the left by springs 935. The two lower pins are provided with projections 936 engaging an arm 937 reaching upwardly from the lower bar 934 so that when either of these two lower pins advances to the right to make a perforation in the card it will carry with it the lower bar 934. The upper bar 933 carries a downwardly projecting arm 938 cooperating with the projections 932 on the two upper pins 26 so that when either of these pins advances it will carry to the right with it the upper bar 933. The pins are moved to the right to take a reading by the restoring plate 680 previously referred to. Adjacent to the pins are two stop plates 939, 940 (see also Figs. 87 and 88). Resting on the upper edge of the plates are two combination combs 941 and 942 pulled downwardly by springs 943. A bail 944 cooperates with shoulders in the plates 939 and 940 to raise them to their normal positions, the plates being urged downwardly by spring 945. The bail 944 is fixed to the shaft 711 previously referred to in connection with Fig. 19. The two lower pins 26 control the plate 940, the plate being adapted to descend one, two or three steps, or to be prevented from descending, by the position of the projection 932 which in turn is controlled according to the reading taken by these pins. The plate 939 on the other hand is controlled by the projections 932 on the two upper pins and 938 on the upper dummy bar 933 in accordance with the reading taken by the two upper pins. The combs 941 and 942 will follow the movement of the plates and effect a combinational setup of notches 946 in accordance with the reading taken by the pins. Adjacent to the edges of the combs 941 and 942 and adapted to cooperate with the notches therein are several feeler fingers 947 adapted to rock against the combination combs and to enter the notches, or not, according to the arrangement thereof. According to the present arrangement one or the other of the two lower fingers 947 will rock into the notches in the combs if the card being analyzed belongs to any of the four months of the first group of cards. One or the other of the next two fingers 947 will rock into the notches if the card being analyzed belongs to any one of the four months of the second group and one or the other of the two upper fingers 947 will rock if the card which belongs to any one of the four months of the third group. Adjacent to the combs 941 and 942 is a plate 948 having a projection 949 adapted to be adjusted up and down the edges of the combs to lock out any combination of two of the fingers 947. By adjusting the plate 948 so as to place the projection 949 in position to lock out the two fingers 947 associated with the group of cards being analyzed it will be seen that none of the fingers 947 will rock if the card being analyzed belongs to the correct group. On the other hand, if the card being analyzed belongs to one of the other groups, the combs will be so arranged as to permit one of the other fingers 947 to rock and the projection 949 being out of the way of this finger will permit it to rock. The rocking of any one of the fingers 947 will cause the machine to stop. This is effected in the following manner: Springs 950 are provided to cause the fingers 947 (Fig. 89) to rock against the combs 941 and 942. A bail 951 normally engages shoulder 952 on each of the fingers 947 and holds it, against the action of its spring, in its inoperative position. A lever 953 is connected by a link 954 to a bell crank 955 (Figs. 11 and 19) which in turn is connected to a link 956 connected at its lower end to a lever 957 (see also Fig. 63) operating in a slot 958 in a cam 959 fixed on shaft 720 previously referred to. The action of the cam serves to actuate the bail 89 to release the fingers 947 at the proper time and also to restore them. A bail 960 reaches across the arm 961 of the several fingers 947 and is adapted to rock loosely on shaft 962 upon which the fingers themselves are also loosely mounted. An arm 963 connected to the bail 960 is connected at its other end to a latching arm 964 supported for guidance at 965. The other end of the latch arm 964 is bent into the path of an arm 966 (see Figs. 21, 86). The arm 966 has pin and slot connection with a lever 967 connected by a link 968 to the plate 399 associated with the stop bars 396. The reciprocating motion of the plate has been described. This motion causes the lever 967 to oscillate to move the link 966 to the right as viewed in Fig. 21. If the arm 966 strikes the latch 964, the spring 969 will stretch but if it does not engage the latch, the arm 966 will move to the right. The left hand end of arm 966 is connected through pin and slot to a lever 970 fixed on the shaft 971 (see Figs. 100 and 102). Fixed on this shaft is a lever 972 having a stud 973. An arm 974 attached to a lever 975 fixed on shaft 976 is adapted to be rocked back and forth resting on the pin 973 and pressed into engagement therewith by a spring 977. Normally the amplitude of movement of the arm 974 is not sufficient to cause the notch 978 to fall over the stud 973 but when the arm 966 moves to the right rocking shaft 971, the lever 972 on stud 973 will be rocked to the right so that when the arm 974 moves to the left the notch 978 will cooperate with stud 973 and when the arm 974 moves back toward the right it will actuate the lever 972 an additional distance. Fixed to a shaft 971 is a lever 979 connected to link 980 which has a resilient lost motion spring and slot connection with link 366 so that the rocking clockwise of the shaft 971 in Fig. 100 by reason of the movement toward the right of the arm 966 takes up the lost motion connection between link 980 and link 336. The additional movement imparted to the shaft 971 by the reciprocatory motion of arm 974 raises the link 336 and as shown in Fig. 13 rocks the lever 335 which is connected to lever 334 cooperating with a pin 333 on the link 325 and moves said link toward the right. Such movement as we have already seen causes the machine to stop. Shaft 976 is also shown in Fig. 16 and is caused to oscillate by reason of a lever 981 fixed thereon and connected by a link 982 to a cam follower arm 983 fixed on shaft 984 on which is also fixed a complementary cam arm 985, the two cam arms cooperating with cams 983a and 985a respectively, fixed on shaft 77. After the notch 978 falls into cooperation with the stud 973 and rocks to the right as viewed in Fig. 100, the cam surface 986 engages a stud 987 which causes the arm to rise out of engagement with the stud 973 permitting the lever 972 to return to its normal position under the influence of a spring 988 attached to a lever 989 fixed on the shaft 971. A plate 948 as shown in Figs. 85 and 86 is provided with a chart 990 carrying the month designations shown in three groups representing the three groups of months into which the cards are arranged. The plate may be raised and lowered so that the chart cooperating with an index 991 shows which group of cards the machine is set to operate upon. A notched projection 991 fixed to the plate 948 is adapted to cooperate with a spring pressed detent 993 to be retained in any position to which it may be set.

*Analysis of payment status of the card*

Referring to Fig. 3, the payment status of the policy represented by the card is contained in the quarterly fields 33. The upper central portion of each of these fields contains a small square 994 adapted to receive a perforation indicating that a premium is payable during the quarterly period in which the square is contained. This perforation is ordinarily produced by the notice writing machine. The present or posting machine in analyzing the card senses this particular space to ascertain whether a perforation is there. The presence of a perforation is adapted to permit the setting up of the machine to effect posting by printing above the fields 33 the date upon which the posting is effected and by perforating in the field 33 without the square 994 the combination of perforations representing the printed date. The machine is also adapted to sense these date perforations. If a due perforation is sensed in the square 994 and date or paid perforations are also sensed in the same field the posting mechanism adapted to be set up by the sensing of the due perforation is locked against operation. Thus the mechanism for this particular quarter of the year becomes ineffective. Each of the four quarters of the five years represented upon the card is sensed and analyzed in this manner. All of those in which premiums are payable and in which posting has been effected are according to the operation just described eliminated from any control in the machine. All of the squares 994 having no perforations will, of course, effect no setting up. Where a perforation appears in the square 994, for which quarter there appear no perforations representing the date, the machine will become set for posting by perforating the date within this quarter provided the machine has been set up for posting in that quarter. This setting up will be destroyed, however, and the posting operation prevented if the machine ascertains that there is more than one quarter in which a premium is due and unpaid and also where the machine fails to detect an audit card corresponding to the master card. Also should the machine discover two quarters in which the premium is payable and there is an audit card corresponding to the master card indicating the premium of one of these premiums posting will be deferred to permit an investigation. Where the machine detects a perforation in the square 994 indicating that a premium is payable and there is no audit card indicating that payment has been made the machine is adapted to print upon a sheet of paper the number of the policy along with the date upon which the premium is payable and the amount of the premium. A list of such premiums is shown on the sheet 995, Fig. 6. Some of the items on this list are accompanied by an asterisk. The asterisk indicates that more than one payment is overdue. The absence of an asterisk indicates that but a single payment has become overdue. The mechanism for analyzing the quarterly fields 33 includes the groups 31, 32 of sensing pins shown in the diagram, Fig. 2. These pins are shown in Figs. 63, 64, 69, 71, 73, 75 and 76. For analyzing the fields 33 a pin is provided for sensing in the square 994 and inasmuch as the date will always include at least one perforation in the month columns and at least one perforation in the units columns of the days it will be sufficient to provide mechanisms for sensing in either one of these columns. In order to provide more space for the mechanisms, I prefer to provide mechanism to sense the perforations in the month column in the upper one of the two fields 33 appearing in a vertical row and mechanism for analyzing the units column of the day perforations in the lower one of these two fields. Referring to Fig. 63 the position of the four quarterly fields 33 with respect to the mechanisms is indicated in dot and dash lines. The holes 996 in the plate 680 through which the sensing pins pass will thus assume the arrangement indicated. The pins 31, 32 viewed from the opposite side as in Fig. 64 will assume the arrangement there indicated. Referring to Figs. 69, 71 and 73, each of the pins 31, 32 for analyzing the date perforations is provided with a lug 997 adapted to cooperate with a stepped comb 998 having a spring 999 adapted to move the comb downwardly. A bail 1000 fixed on shaft 711 previously referred to, is adapted when lowered to permit the stepped combs 998 to descend and when raised to return said combs to their normal positions. The relationship of the lugs 997 to the steps of the combs 998 is such that the comb is normally adapted to descend a distance which may be arbitrarily termed two steps. Should any one of the date pins 31 advance, however, with its lug 997, the lug will stop the comb 998 after it has descended one step. The comb 998 has fixed thereto a lug 1001 resting in the path of a projection 1002 on an adjacent comb 1003. The comb 1003 also has a projection 1004 adapted to cooperate with a lug 1005 on the pin 31 associated with the payment due square 994 of the card. Should this pin advance it will free the comb 1003 so that the latter will follow, one or two steps, the movement of the rear comb 998 as shown in Figs. 73 and 71, respectively. The comb 998 is shown as having descended one step, being blocked in this position by the second from the top and the bottom pins which have advanced. In Fig. 71 none of the date pins 31 have advanced and the rear comb 998 has descended two steps and the comb 1003 having been freed by the lug 1005 has followed the descent of the comb 998 two steps. Where no perforation appears in the premium due square and the corresponding pin 41 fails to advance, the comb 1003 will remain in its normal upper position irrespective of the position of the rear comb 998. This mechanism is duplicated for each of the twenty quarterly fields 33 represented on the card and all of the fields are analyzed simultaneously. It will thus be seen that the comb 1003 for each field will be set according to the condition of the field, some of the combs remaining in their normal positions, some descending one step and others ascending two steps. The lower ends of the combs 1003 are provided with steps 1006 against which fingers 1007 are adapted to rock. There is one finger for each comb. These fingers are loosely mounted on shaft 1008. Each finger 1007 is actuated by a separate spring 1009 tending to cause the finger to rock into cooperation with the comb. A bail 1010 is adapted to normally hold all of the fingers in their inoperative position. This bail is fixed to shaft 1008 (see Figs. 19, 63 and 66) to which is fixed the arm 957 cooperating with a cam slot 958 to oscillate the shaft. When the fingers 1007 are released by the upward movement of bail 1010 they will rock into cooperation with the steps 1006 of the comb 1003 engaging the outer step as in Fig. 71 where the comb has descended two steps and engaging the inner steps as in Fig. 73 when the comb has descended one step or does not descend at all. Across the backs of all of the fingers 1007 is a bail 1011 actuated by a spring 1012 loose on shaft 1008 and having integral therewith a latch 1013. When all of the fingers 1007 rock to the inner steps of the combs 1003 the bail 1011 will be permitted to rock as in Fig. 73 moving the latch 1013 from its inoperative position shown in Fig. 69 to its operative position shown in Fig. 73 where it cooperates with the arm 1014 fixed on shaft 1015. Also fixed on shaft 1015 is a lever 1016 connected to a link 1017 which is connected at its other end by pin and slot connection to a lever 1018 fixed on shaft 1019. Also pivotally connected to lever 1018 is a link 1020 having a pin 1021 reaching through a slot in link 1017 and connected by a spring 1022 to a fixed bracket 1023 of the machine. The link 1020 is also provided with a projection 1024 cooperating with an arm 1025 fixed on shaft 1026. Also fixed on this shaft is an arm 1027, Fig. 66, having a stud 1028 operating in a cam slot 1029 in the cam 959 previously referred to (see also Fig. 63). The rocking of shaft 1026 counterclockwise as viewed in Fig. 66 and clockwise as viewed in Fig. 71 will rock the arm 1025 away from the projection 1024 and the spring 1022 will then tend to move the link 1020 toward the left to rock the shaft 1015 clockwise. This shaft has fixed thereto a lever 1030 to which is connected the link 1022 previously referred to. After the latch 618 has been rocked out of the path of the lever 619 and the link 622 is pulled to the right as viewed in Fig. 71 then shaft 624 will rock. The shaft 1015, however, will be prevented from rocking by the latch 1013 if all of the fingers 1007 rock into cooperation with the inner steps of the combs 1003 and will thus prevent the movement to the right of the link 622. The movement of this link toward the right may be prevented by still another condition upon the master card. Referring to Figs. 3 and 72, the field 1031 having four vertical hole spaces is employed to indicate when or in which quarters payments are due. A perforation in the lower hole space as in Fig. 81a for instance, indicates that payments are due annually in the first quarter. A perforation in the second from the bottom hole space as in Fig. 81b indicates that premiums are payable annually in the second quarter. Perforations in the third from the bottom and in the top hole spaces indicate that premiums are payable annually in the third and fourth quarters respectively. Perforations in the bottom and third from the bottom hole spaces as in Fig. 81e indicate that premiums are payable twice yearly in the first and third quarters. Perforations in the second from the bottom and in the top hole spaces as in Fig. 81f indicate that premiums are payable twice yearly in the second and fourth quarters. Perforations in the bottom and next to the bottom hole spaces as in Fig. 81g indicate that premiums are payable every quarter. If the machine has been set to post for the first quarter of any year and the machine senses a perforation in the bottom hole space as in Figs. 81a, 81e and 81g the machine will be permitted to print upon the listing sheet 995 (Fig. 6) so far as the control from this column on the card is concerned. Should there be no perforation in the lower hole space the pin associated therewith will fail to advance and will suppress the printing upon this sheet. The pins for sensing in the field 1031 are designated 1032 in Figs. 2, 64, 79 and 80. Each of these pins is provided with a lug 1033. Adjacent to the lugs 1033 are feeler fingers 1034 pivoted at 1035. The fingers are adapted at their lower ends to engage combs 1036 (see also Fig. 83). Springs 1037 on the combs tend to move the combs toward the right as viewed in Fig. 83 or toward the left as viewed in Figs. 64 and 79 and to rock the fingers 1034 into cooperation with the lugs 1033 on the feeler pins 1032 when the fingers are released by the bail 707 which as we have seen in connection with Fig. 64 is adapted to release the feeler fingers 678. Normally the lugs 1033 are out of the path of the fingers 1034 and will permit them to rock their full distances when actuated by the springs 1037. If any one of the feeler pins 1032 advances through a hole in the card its lug 1033 will be brought into the path of its corresponding finger 1034 and will prevent the latter from rocking. This in turn will prevent the corresponding one of the combs 1036 from operating. Associated with the feeler pins 1032 as shown in Fig. 80 is an idler bar 1038 having a projection 1039 engaging pins 1040 in the two lower pins 1032. A spring 1041 is adapted to move the bar 1038 toward the right but the pins 1040 normally hold this bar in its normal position toward the left. If the two lower pins 1032 advance through the card, the bar 1038 will be permitted to advance toward the right. This bar is provided with a lug 1042 adapted to cooperate with the fingers 1034 associated with the two upper of pins 1032, each of these fingers being forked so as to cooperate with its particular feeler pin and with the lug 1042 on the bar 1038 as indicated in Fig. 79. Thus, if the two lower pins 1032 advance through the card all four of the fingers 1034 will be prevented from rocking and all of the combs 1036 will also be prevented from moving. Each of the combs 1036 is provided with a projection 1043 adapted to cooperate with a corresponding lever 1044 loosely mounted on shaft 1045 (see Fig. 82). Normally the projections 1043 on the combs 1036 lie out of the path of the arms 1044 and the latter are free to rock toward the combs. Should any comb advance to the right as viewed in Fig. 82 in response to the rocking of a corresponding one of fingers 1034 its lug 1043 will move into the path of lever 1044 and prevent the latter from rocking. A bail 1046 (Figs. 64, 71 and 73) fixed on the shaft 1045 is adapted to control the position of levers 1044 permitting them to rock into cooperation with the combs 1036 when the bail moves to the right and restoring them when it moves to the left. The bail is rocked by the shaft 1045 which as shown in Figs. 19 and 66 has fixed thereon a lever 1047 having a pin 1048 cooperating with a cam groove 1049 in the cam plate 959 previously described, (see also Fig. 63).

Associated with the four levers 1044 is an arm loose on the shaft 1019 (Fig. 82). The arm is adapted to slide along said shaft but is constrained to rock therewith by means of a bail 1051 fixed with respect to the shaft and along which the arm 1050 is also adapted to slide. A lateral projection 1052 on the arm 1050 will, when the shaft 1019 is rocked, engage the lever 1044 and rock the same toward the combs 1036. The arm 1050 may be moved along the shaft 1019 so as to cooperate with any one of the four levers 1044. This adjustment is effected by means of a rearward projection 1053 of lever 1050 (Figs. 64 and 71) reaching into a slot in the lower edge of the plate 1054 mounted on pins 1055. As shown in Fig. 64 the plate is in its right hand position and cooperates with an index 1056 indicating that the arm 1050 is in position to cooperate with the first of the four levers 1044. By sliding the plate 1054 one notch to the left the arm 1050 will be brought into cooperation with the second of the levers 1044, etc. A spring-pressed arm 1057 cooperates with notches 1058a in the plate 1054 to maintain it in any position to which it may be set. The arm 1050 will be set according to the quarter of the year in which the machine is operating. If, according to the quarter-due field 1031 on the master card, a premium is payable for the current quarter, the corresponding one of the combs 1036 will be prevented from moving. The corresponding lever 1044 will then be permitted to rock toward the comb. The arm 1050 having been set to cooperate with this particular lever will, when an attempt is made to rock the shaft 1019, permit it to rock. Should the card not be perforated for the current quarter that particular comb 1036 will move into position to block the movement of lever 1044 and when the attempt is made to rock shaft 1019 the arm 1052 engaging the blocked lever 1044 can not rock and consequently the shaft 1019 will not rock. Referring to Fig. 71, when the shaft 1019 is permitted to rock it will move the link 1017 to the left rocking shaft 1015 and moving the link 622 to the right to rock shaft 624 provided the latch 618 has been moved to unlatching position as in Fig. 71. Should this latch be in its up or latching position to prevent the shaft 624 from rocking, the movement of link 622 will merely cause the spring 623 to stretch. After the link 1017 has moved to the left it will be latched in this position by a latch 1058 having resilient pin and slot connection with a link 1059. This link is connected to a lever 1060 (Fig. 65) fixed on a shaft 1061. The shaft reaches across the card-analyzing section of the machine as shown in Fig. 63 and has connected at its opposite end a lever 1062. A link 1063 is connected from this lever to a bell crank 1064 which has pin and slot connection to the arm 406 which as we have seen is raised and lowered to control the operation of the bars 396 which restore the stops 390. The raising and lowering of the arm 406 thus moves the latch 1058 (Fig. 71) into and out of locking position with respect to the link 1017. After the link 1017 has been latched in its moved position the arm 1050 and associated parts may be restored by the lever 1025 without affecting the position of the link 1017. The lever 1018 will thus rock clockwise taking up the pin and slot connection with the link 1017 and, through the spring 1065, will tend to restore the link 1017 to the right so that after the latch 1058 has been raised the link will move to such position. Shaft 624 is adapted to control the printing upon the list sheet 995 shown in Fig. 6. The mechanism for printing upon this sheet is as follows:

*List printing mechanism*

Beside each comparing comb 410 is shown a type carrying bar 440 having projections 441 bent as indicated at 442 (see also Figs. 34 and 35) so as to reach into the path of the stop bars 390. As shown in Figs. 32 and 33 the upper eleven stop bars 390 are normally set one step farther away from the comparing combs 410 than are the seven lower bars. It will also be seen that the lateral projections 393 on the upper bars are set one step farther away from the combination combs 371, 372 than are the corresponding projections on the seven lower bars. This arrangement permits the upper bars to take readings from the master card combination combs 367, 368 by cooperating with the notches therein when no notches in the audit card combination combs 371, 372 are presented to the projections 393. Such a condition is shown in Fig. 33 where the second from the top of the stop bars has taken a reading from the master card combs 367, 368 but has been stopped by the audit card combs 371, 372. The stop bar has thus advanced one step to the left. This bar thus has no effect upon the setting of the comparing combs 410 as it does not reach into cooperation with the steps 411 of such comb. It has, however, moved into the path of the projection 441 of the type bar 440 and is thus adapted to control the positioning of the type 443 with respect to the platen 444. It will thus be seen that in some instances where the master card and audit card do not agree in their controlling numbers the type bars 440 may be set under control of the master card only in order that a printed record may be taken from the master card. The seven lower stop bars 390 have to do merely with the comparing of the master and audit cards without controlling the type bars. The lower ends of the type bars are provided with projections 445 having a spring 446 connected thereto and to a fixed portion of the machine for raising the type bars. A bar 447 Figs. 20, 21, 32, 33, is adapted to engage the projection 445 to restore the type bars to their lower or normal position. This bar has pivotally fixed to its opposite ends links 448 which are connected at their lower ends to a bell crank 449 pivoted at 450 and having a cam follower roller 451 cooperating with cam 452. Springs 453 connected at their lower ends to the restoring bar and at the upper ends to a fixed part of the machine serve to maintain the cam follower in contact with its cam. In order that the stop bars 390 may be restored to normal position after the type bars have been set and before the type bars have been restored, means may be provided for holding the type bars in their set position so that they will not jump to their uppermost position upon being released by the stop bars 390. Such locking means are shown in Figs. 20, 32 and 33, and comprise a pawl 454 mounted in a support 455 and adapted to engage in notches 456 in the edge of the type bar 440. A spring actuated lever 457 loose on a shaft 458 is adapted to engage the pawl 454 to remove it from contact with the type bar. There is one of levers 457 for each type bar. Also pivoted at opposite ends of the shaft 458 are end plates 459 provided with a member 460 adapted to engage the lower portion of the lever 457 to rock the same counterclockwise about its pivot and against its spring action for the purpose of removing the pawl. Link 461 connected to plate 459 and to a lever 462 is provided for controlling the position of the member 460. Normally the parts are in the position shown in Fig. 32, the link 461 being locked by a latch 463 cooperating with a pin 464 fixed to the link 461. The latch 463 is pivotally supported at 465 and is held in operative position by a spring 466 connected at one end to a projection 467 on the latch 463 and at the other end to a fixed part of the machine. A roller 468 carried by the latch lies in the path of one of the restoring bar arms 448 so that as the said bar approaches its upper position and after the several type bars have been stopped by the stop bars 390, the restoring arm 448 engages the roller 468 and rocks the latch 463 to inoperative position, releasing the link 461. This permits the pawls 457 to be rocked by their springs in a clockwise direction to move the pawls 454 into locking engagement with the type bars. The parts are shown in this position in Fig. 33. When the bar 447 descends it engages the projection 445 on the several type bars and moves the latter downwardly to their normal positions. Near the end of the downward stroke the restoring bar engages the lever 462 rocking the link 461 downwardly so as to move all of the pawls 454 to their normal positions so that the type bars may be free to rise during the next cycle of operation. The reason for the removal of the locking pawls 454 at the end of the restoration of the type bars instead of at an earlier period is to prevent the type bars from jumping up to meet the descending restoring bar 447. The pawls 454 and notches 456 are so designed that as the type bars descend they will cam the latching pawls out of operative position against the spring action of the levers 457. As the restoring bar 447 descends it will release the latch 463 so that the latter will again move to operative position over the pin 464 when the link 461 is restored.

After the type elements 443 (Fig. 33) have been set in printing position they are adapted to be propelled into engagement with the list sheet which is carried by the platen 444, by a plunger 1066. Back of the plungers 1066 are the hammers 1067 (Fig. 20) loosely mounted on the shaft 976. A spring 1068 tends to actuate the hammer to striking position. The latch 1069 normally holds the hammer against operation, being held in latching position by its spring 1070. A shaft 1071 has fixed thereto depending arms 1072 having a cross-rod 1073 on which are loosely mounted latching levers 1074 held by spring 1075 out of cooperation with the latches 1069. An arm 1076 engaging a sliding plate 1077 which is adapted to be held down by the type bar 440 engages one arm of the lever 1066. When the type bar rises to position any of the type elements in the printing line and thus releases the sliding plate 1077, the lever 1076 will be actuated by its spring to raise the plate 1077. This will permit the lever 1076 to depress the latch 1074 into latching position with respect to the latch 1069 so that when the shaft 1071 rocks clockwise pulling the latch 1074 to the left, the latch 1069 will release the hammer 1067 permitting it to be propelled to actuate the type. The operation of shaft 1071 is controlled by mechanisms which determine whether the printing is to be effected or not. In other words the type bars 440 will be set in accordance with the reading of the information on the master card. If posting is to be effected no printing upon the list sheet takes place but if a premium is payable but the payment has not been made and posting is therefore suppressed the shaft 1071 will rock to release the printing hammers to effect printing upon the list sheet of information concerning the policy. The control of the rocking shaft 1071 is as follows: Referring to Fig. 19, the shaft 1071 has connected thereto a lever 1078 to which is attached a depending link 1079 having at its lower end a roller 1080 adapted to cooperate with a latching arm 1081. Also connected to the lower end of link 1079 is a link 1082 which is connected at its opposite end to a bell crank 1083 having pin and slot connection with the link 508 which as previously described rises when the master card number is greater than that of the opposing audit card. The rising of this link will move the roller 1080 from the position of Fig. 19 or in other words the dotted line position of Fig. 19a to the full line position of Fig. 19a. The roller 1080 will, however, still be in a non-cooperating position with respect to the latching link 1081. The latching link 1081 is connected at its lower end to a lever 1084 fixed with respect to a cam lever 1085 cooperating with a cam pin 1086 fixed to one of the cams 1077. The cam arm 1085 is rocked counterclockwise to its normal position by a spring 1087. Thus once during each revolution of shaft 1077 the latching link 1081 will be pulled downwardly. The latching link is connected by a link 1088 to a lever 1089 fixed on the shaft 624. This shaft as we have seen in connection with Fig. 71 is rocked counterclockwise when a payment is due with respect to the master card being analyzed. Thus the counterclockwise rocking of this shaft 624 or clockwise as viewed in Fig. 19 will move the latching link 1081 from the position shown in Fig. 19 and shown in dotted lines in Fig. 19a to the position shown in full lines in Fig. 19a. The latching link 1081 and the roller 1080 will thus be locked in operative position with respect to each other so that when the link 1081 is pulled downwardly it will pull the link 1079 with it and rock shaft 1071 to release the type hammers to effect printing. After printing, the type hammers are restored to their normal positions by means of a bail 1090 (Fig. 20) fixed on shaft 976 previously referred to. This shaft as we have seen in connection with Fig. 16 is oscillated by cams on shaft 77.

Line spacing of listing sheet

Mechanism is provided to cause line spacing of the sheet only when printing is effected. This mechanism is shown in Fig. 48 and includes a ratchet wheel 1091 fixed with respect to the platen and adapted to be rotated by a pawl 1092 pivotally mounted on a lever 1093. The lever 1093 is pivotally mounted at 1094 and has fixed thereto a lever 1095. The ratchet has pin and slot connection with a link 1096. A spring 1097 tends to pull the link 1096 to the left but is prevented from doing so by means of a latch 1098 cooperating with a pin 1099 fixed on the lever 1078 which as we have seen is mounted on shaft 1071. Also connected to lever 1095 by an ordinary pivot joint is a link 1100 provided with a hooked end 1101 adapted to cooperate with a pin 1102 fixed in a lever 1103 which in turn is fixed to the shaft 976 which shaft as we have seen oscillates constantly during the operation of the machine. A stud 1104 carried by the link 1096 normally holds the link 1100 out of cooperation with the pin 1102 so that the lever rocks idly in the slot 1105 in link 1096. A spring 1106 between the arms 1096 and 1100 tends to rock the link 1100 into cooperation with the pin 1102. When the shaft 1071 rocks to release the printing hammers the pin 1099 releases the latch 1098 and permits the spring 1079 to move the link 1096 to the left. The stud 1104 upon moving to the left permits the link 1100 to be pulled downwardly into cooperation with the pin 1102 so that when the shaft 976 rocks clockwise it will move the link 1100 toward the right, rocking the lever 1095 and pawl 1092 into cooperation with the ratchet 1091, moving the latter a distance corresponding to the space between the printed lines on the report sheet. When pin 1102 moves the link 1100 to the right it also carries the link 1096 back to its normal right hand position. The pin 1099 will have returned by this time to its normal position so that the latch 1098 will step over said pin and hold the link 1096 in position. The counterclockwise movement of shaft 976 through the cooperation of the pin 1102 with the shoulder on link 1100 will then return the link to its left hand position moving the pawl 1092 out of engagement with the ratchet wheel.

Printing of asterisks on listing sheet—one unpaid premium

Referring to Fig. 6, some of the items are accompanied by an asterisk. The purpose of the asterisk is to denote that more than one payable premium remains unpaid. The absence of an asterisk denotes that but one payable premium is unpaid. The printing of the asterisk is controlled by the mechanism which analyzes the quarterly fields 33 on the master card. If this mechanism discovers a single unpaid premium it prints the item upon the listing sheet without an asterisk but if it discovers more than one unpaid premium it brings into operation the setting of the asterisk for printing. We have seen in connection with Fig. 32 that the type bars are positioned under control of stop bars 390. The type bar associated with the column on the listing sheet in which the asterisks is contained is controlled by two special stop bars 390a and 390b Figs. 69 and 71. The springs for actuating these special stops and the bars for restoring them are the same as shown in Fig. 32 and are therefore not disclosed in Figs. 69 and 71. In the normal operation of the machine the upper bar 390a will always move to operative position when the restoring bar releases it. The lower bar 390b, is locked against movement to operative position by a pin 1107 fixed in the bar and cooperating with a sliding bar 1108 connected to a lever 1109 loose on shaft 688 and having pin and slot connection with a link 1110 connected at its lower end to a lever 1111 fixed on shaft 1112 to which is also fixed a bail 1113 adapted to cooperate with feeler arms 1125. Clockwise rotation of shaft 1112 will effect the depression of the bar 1108 against the action of its spring from its operative position as shown in Fig. 69 to inoperative position as shown in Fig. 71 so that when the stop bars are released to move forward the lower bar 390b will move forward and will stop the asterisk type bar in its upward movement before it reaches the position to which it would move to be stopped by the upper bar 390a. When stopped by the lower bar no character is presented in the printing line. If stopped by the upper bar the asterisk will be presented in the printing line to receive the actuating impulse when the hammer is released. The rocking of shaft 1112 is effected by the cam arm 1027 (Fig. 66) previously referred to. The counterclockwise rocking of shaft 1026 will move the link 1114 upwardly. This link has pin and slot connection with a lever 1115 fixed on the shaft 1112. Also fixed on this shaft is a bell crank 1116 the horizontal arm of which is connected by a spring 1117 to a pin 1118 fixed in the frame plate 693 (see also Fig. 64). When the link 1114 moves upwardly the spring 1117 will rock the shaft 1112 unless it is locked against rocking in which case the pin and slot connection between link 1114 and lever 1115 will be taken up. The rocking of shaft 1112 may be suppressed by the positions of the combs 1003. The feeler 1125 is adapted to rock into cooperation with the comb 1003 and is permitted to rock when the comb remains in its upper position as in Fig. 69 but is prevented from rocking by a projection 1119 when the comb drops one step as shown in Fig. 73. Should the comb 1003 drop two steps the finger 1125 will again be free to rock so far as the position of its corresponding comb is concerned. The finger 1007 cooperating with the comb 1003 to the right of the one shown in Fig. 69 may, however, be rocked to the inner step 1006 of its comb, rocking arm 1120 which is integral with the fingers 1007 into the path of the finger 1125 associated with the comb 1003 of Fig. 69 and prevent it from rocking. It may also be stated that only those of the fingers 1125 that are freed from engagement with the projections 1043 on the combs 1036 will be able to rock into cooperation with the combs 1003. The projections 1043 are normally out of the path of the depending portions 1126 of fingers 1125 and, with a perforation appears in the card in the column 1031 as described the corresponding one or ones of the combs 1036 will be prevented from moving to the right as viewed in Fig. 82. Those of combs 1036 that move to the right will block all of the fingers 1125 associated with the quarter fields 33 corresponding to the moved combs 1036. Referring to Fig. 77 it will be seen that four of the quarter fields contain perforations indicating that premiums were payable and that payment has been made. One field contains a perforation in the square 994 indicating that payment is due but no date perforations appear in this field. Should there be no audit card matching this particular master card we would have the condition where a payment is due in this particular quarter but has not been made. There is then one payment due which has not been made and this policy number will be printed on the listing sheet without an asterisk, the setting of the asterisk for printing being suppressed by the rocking of shaft 1112. The rocking of this shaft is permitted by reason of the fact that none of the fingers 1125 rock into the path of movement of the bail 1113.

In Fig. 76 the positions of the parts under control of a card such as disclosed in Fig. 77 is shown. In Fig. 76 the first comb 1003 counting from the left may be regarded as cooperating with the first quarter field 33 to the left and in the lower column designated Jun. The next comb is associated with the upper part of the field designated Sept.; the next comb with the lower field designated Dec.; the next comb with the upper field designated Mar. and in which a premium is payable but has not been paid. The next two combs are associated with the lower field Jun. and the next upper field Sept. The fourth of fields 33 in the upper column on the card has no perforations, indicating that no payment is due and that no payment is made. Its corresponding comb 1003 which, in Fig. 76 is the one farthest to the right, will not have dropped. Its feeler finger 1007 will then have rocked into cooperation with the lower one of steps 1006. This finger being integrally connected through sleeve 1121 to the finger 1120 associated with the finger 1125 which cooperates with the next comb 1003 to the left has moved the said finger 1120 into the path of the next finger 1125 to prevent it from rocking, irrespective of the position of its comb 1003. The second comb 1003, counting from the right, which is associated with the field 33 designated Jun. has also failed to drop by reason of the same condition in that field. The next comb to the left is associated with the Mar. field 33 in which a perforation appears indicating that a payment is due and in which no perforations appear representing the date and indicating that payment has not been made. This particular comb has dropped two steps and has prevented its feeler finger 1007 from rocking. The dropping of this comb its two steps will have freed its particular finger 1125 to rock but the preceding comb to the right having permitted its finger 1007 to rock will have prevented the finger 1125 associated with the Mar. comb 1003 from rocking. The next three combs 1003 toward the left associated with the Jun., Sept. and Dec. fields indicating payments due and payments made have accordingly dropped one step each. Their fingers 1007 will so far as the combs are concerned be free to rock while their fingers 1125 will be prevented by their respective combs from rocking. The result of this is that none of the fingers 1125 has rocked and the bail 1113 (Fig. 69) fixed on shaft 112 is free to rock and lock its shaft resulting in the depression of the bar 1108 to permit the stop bar 390b to advance and prevent the printing of the asterisk.

Two or more unpaid premiums

We have seen in connection with Figs. 69, 71, 73, 76, etc., that when the shaft 1112 rocks clockwise the machine will be prevented from printing the asterisk on the printing sheet and that this takes place when there is one unpaid premium or, of course, also when there are no unpaid premiums. Should there be two or more unpaid premiums the shaft 1112 will be prevented from rocking and the machine will print an asterisk with the printing of an item. This is effected as follows: Referring to Figs. 75 and 76, we have seen in connection with the third from the right of the combs 1003 that this comb drops two steps when a premium is due and has not been paid and that the feeler 1007 associated with this comb will be prevented from rocking. The failure of the finger 1007 to rock results also in the failure of the arm 1120 which is integral with finger 1007 to rock. Also this arm 1120 engages a projection 1122 on the lower edge of the finger 1007 to the left and prevents said finger from rocking. This finger in turn through the same mechanism prevents the next one to the left from rocking and so on with respect to all of the fingers 1007 to the left of the first one which fails to rock. Assuming now that the fourth of the combs 1003 from the left drops two steps by reason of a perforation in the corresponding square 994 and no date perforations in the same quarter field, this fourth comb will also assume a position to stop its finger 1007 from rocking but it will also be in position to permit the finger 1125 on the opposite edge to rock. This is shown in Fig. 75a. Thus while the failure of any one of the fingers 1007 to rock will result in the prevention of all of such fingers to the left from rocking the finger 1125 back of a finger 1007 which has failed to rock will now be permitted to rock into the path of the bail 1046. This will prevent said bail from rocking the shaft 1112, preventing also the movement of stop bar 390b (Figs. 69 and 71) from moving to the left and the asterisk type bar will rise to the stop bar 390a to print the asterisk.

Master card reject control

There are two instances when the master card instead of being fed to the file pocket in the usual manner will be directed to the reject pocket. The first of these conditions is where the master card is maturing. In other words, referring to Fig. 3, when posting is being effected in the fifth of the yearly fields upon the master card designated 44e, after the last posting upon the card has been effected the card will be fed to the reject pocket and thus be removed from the files. A new card relating to that particular policy will be placed in the files with blank year fields so that the next year's record may commence upon the first of these fields, designated 44a. The second condition under which master cards will be fed to the reject pocket is one in which there are according to the record upon the card two premiums payable and unpaid, and there is an audit card corresponding with the master card. In this instance it is not known which of the unpaid premiums is represented by the presence of the audit card. The master card will be rejected for this reason to permit an investigation.

Maturity of master card

Referring to Fig. 76 the third from the left of the combs 1003 has descended two steps having ascertained in connection with the card in Fig. 77 that a payment is due in the Mar. quarter by the presence of the perforation in the square 994. The rear arm of the finger 1007 will thus remain in its normal position out of the path of the arm 1124. The comb 1023 to the right of the one just considered will not have descended at all and its finger 1007 will consequently rock one step rocking also the arm 1120 the rear end of which cooperates with the arm 1124 associated with the Mar. comb 1003. The rear end of this arm 1120 will thus be lifted out of the path of the said arm 1124 and the latter will be free to rock clockwise as viewed in Fig. 76. It will be seen that the failure of the finger 1007 associated with the Mar. comb 1003, to rock, locks the arm 1124 associated with the next comb to the left against rocking holding the rear end of the arm 1120 against the projection 1122 and preventing the corresponding finger 1007 from rocking. This latter finger will in turn in like manner prevent the one to its left from rocking and so on so that none of the fingers 1007 to the left of one which fails to rock will be permitted to rock and consequently none of the arms 1124 to the left of the one which rocked clockwise will be prevented from rocking. In other words only one of the arms 1124 will rock and that is the one associated with the latest of the unpaid premiums. The four arms 1124 associated with the four quarters of the last year on the master card are provided with an extra projection 1127 reaching laterally as shown in Figs. 82 and 83. This projection normally serves to maintain the sliding rack 1128 in its normal or upper position. Should any one of the arms 1124 rock clockwise as viewed in Figs. 82 and 83 the projection 1127 will move toward the left hand end of the rack 1128 but not far enough to release it. This rack is carried by a depending lever 1129 actuated by spring 1130 tending to rock the lever counterclockwise as viewed in Fig. 82 on the shaft 1045 upon which the lever is loosely mounted. The bail 1046 (Fig. 69) previously referred to serves to restore the levers 1129 to their normal positions. When these four levers 1129 are released one, depending upon which of the combs 1036 will have moved to the right, will rock counterclockwise moving its rack 1128 toward the right. Should one of these racks be moved to the right and its supporting projection 1127 at the same time move to the left the rack will be released from said projection and will drop under the influence of its spring 1131 as shown in Fig. 83. Extending across the lower edges of the racks 1128 is a bail 1132 loose on the shaft 1026. The bail is normally held up by a spring 1133. The dropping of any one of the racks 1128 causes the bail to rock downwardly. A latching arm 1134 integral with the bail 1132 is normally in the path of a lever 1135 (see Fig. 69).

In Fig. 84 I have shown the fragment of a card in which according to field 1031, premiums are payable once annually and in the first quarter. Thus according to the perforations in this card the first of the four quarterly fields 33 for each year field has a perforation in the square 994. The other portion of these same quarterly fields contain perforations indicating the payment of the premiums. The last of the year fields shows that a premium is payable but the posting for this period has not been effected. The set up of the mechanism in Fig. 83 represents the position of the parts when posting is being effected in this particular field. As this will be the last posting effected upon this particular card before a new card is substituted this card will be fed to the reject pocket. In this instance the rack 1128 farthest to the left as in Fig. 83 will drop as shown to rock the bail 1132. Presuming now that premium payments are due twice yearly in the first and third quarters this information will, of course, be contained in the form of perforations in the fields 1031 and will in turn result in the movement to the right of the corresponding combs 1036. This in turn will permit the movement toward the right of the first and third of the racks 1128 counting from the left. If posting is being effected in the first quarter arm 1124 will rock toward the left and the first rack 1128 will be released to drop. The movement of the third rack 1128 toward the right, however, will carry with it a projecting arm 1136 reaching under the first rack 1128. As seen in Fig. 82 the arm 1136 engages the lower edge of the racks 1128 to the left of the one to which the arm is fixed. Here it will be seen that if the first rack 1128 is released to fall it will be prevented from doing so by the arm 1136 carried by the third rack. Where the first rack only, moves back, its notch 1137 will be brought into register with the arm 1136 so that the rack will be free to drop but should the third rack also move to the right with its arm 1136 the relative positions of the parts shown in Fig. 82 will be retained and the first rack can not drop unless the third one also drops. Thus when posting in the first quarter, while the first and third racks 1128 may slide to the right the third one is not released by its supporting arm 1124 since there will at that time not be any perforation in the square 994 representing the third quarter. The third rack 1128 then being unable to drop will also prevent the first of these racks from dropping. Thus none of the racks will drop and the bail 1132 will not operate. When posting is effected for the third quarter, however, there will then be a perforation in the corresponding square 994 as well as in the square for the first quarter. The third rack 1128 will now be released by its arm 1124 and will drop and actuate the bail 1132. Should the payments be due in the second and fourth quarters the second and fourth of the racks 1128 counting from the left will control. In this instance when posting is being effected in the second quarter the second rack will move to the right but as the field 1031 indicates that a payment will also become due in the fourth quarter the combs 1036 will permit the fourth rack 1128 to move to the right also. The arm 1136 fixed to the fourth rack will thus move to the right also and prevent the second rack from dropping although the latter will have been released by its arm 1127. When posting is being effected in the fourth quarter, however, the fourth rack will drop and rock the bail 1132. Where payments are due annually in the second quarter, only the second rack 1128 will move to the right and the perforation in the square 994 of the second quarter will result in the releasing of the bracket 1138 by its arm 1124 and this bracket will be free to drop, the notches 1137 being provided to permit the rack to drop over the arms 1136. Similarly should payments be due annually in the third quarter the third rack 1128 moving to the right can be released but its arm 1124 will be free to drop over the arm 1136 associated with rack 1128 to its rack. Presuming that payments are due quarterly the control of field 1031 will permit any of the combs 1136 to move to the right and all four of the racks 1128 will be free to move to the right. If the machine is working in the first of the four quarters only the first rack 1128 will be released by its arm 1124 but it will be prevented from rocking by the bracket 1136 carried by the third rack 1128. Also when posting is being effected for the second quarter the second rack 1128 will be free to drop so far as its arm 1124 is concerned but it will be prevented from doing so by the bracket 1136 carried by the fourth rack 1126. The first rack 1128 in this instance being held up not only by the bracket 1136 on the third rack but also by its arm 1124 since as we have seen only one of these arms will rock clockwise, that one being the one associated with the comb 1003 which in turn is associated with the latest quarterly payment due, which in the instance now being assumed is the second quarter. Should the machine be working in the third quarter the third rack 1128 will be released by its arm 1124 but it will be prevented from rocking by the bracket 1136 on the fourth rack. When the machine is posting in the fourth quarter, however, the fourth rack 1128 having moved with all of the other racks to the right and having been released by its arm 1124 will now be free to drop to rock the bail 1132. Thus it will be seen that if only one payment is due in the last year field when posting is being effected in connection with this payment one of the racks 1128 will drop and rock the bail 1132 but where more than one payment is due in the last year none of the racks 1128 will drop unless the posting being effected is associated with the last of the several payments due. Thus the bail 1132 is rocked after posting has been effected for the last possible time upon the card. After the bail 1132 has been rocked clockwise as viewed in Figs. 83 and 69 lifting the latch 1134 out of the path of the arm 1135 the latter will be rocked counterclockwise. The racks 1128 may then be restored to their upper or normal positions. This is effected by means of a lever 1138 having a laterally projecting stud 1139, reaching under the four racks 1128. The lever 1138 is fixed on the shaft 1026 which as we have seen in connection with Fig. 66 is oscillated by the cam plate 959. The arms 1124 are restored by a bail 1140 (Fig. 69) fixed on shaft 1141 which as shown in Fig. 66 has fixed thereto a lever 1142 connected by a link 1143 to a lever 1144 fixed on shaft 1045 which as we have seen is also oscillated by the cam plate 959.

Referring to Fig. 69, the arm 1135 is fixed on the shaft 1145 along which is also fixed a lever 1146 (see Figs. 63 and 65) to which is connected a spring 1147 tending to turn the shaft counterclockwise as viewed in Fig. 65. Also fixed on the shaft 1145 is a lever 1148 (see also Fig. 22). The lever 1148 has connected thereto a link 1149 the lower end of which has pin and slot connection with a lever 1150. The lever 1150 is fixed on a shaft 1151 (Fig. 90). On this shaft is also fixed a lever 1152 (Fig. 115) having a spring 1153 tending to rock the shaft counterclockwise. This will cause the pin 1154 to seek the upper end of the slot in the arm 1149. A latching arm 1155, however, pivoted at 1156 to the link 1149 and actuated by spring 1157 prevents the pin from moving to the upper end of the slot as shown in Fig. 90. This is the normal position of these parts. The arm 1149 is normally held in its depressed position by an arm 1158 cooperating with a stud 1159 fixed on link 1149. The arm 1158 is fixed on a shaft 1160 (see also Fig. 91). Also fixed on this shaft is a lever 1161 connected by a link 1162 to an arm 1163 fixed on shaft 899, previously referred to. As described this shaft is oscillated by a cam 901 (Fig. 29). The spring 1164 (Fig. 91) rocks the follower 900 into cooperation with the cam. When the arm 1158 (Fig. 90) is rocked upwardly the arm 1149 will fall provided the latch 1134 (Fig. 69) has moved out of the path of the arm 1135. When the link 1149 moves upwardly the lever 1150 tends to follow but will not be permitted to do so unless the master card and audit card in the comparing station are of the same number.

Referring to Fig. 22, we have seen that when these two cards are of the same number a link 522 is depressed. This link as shown in Fig. 90 has connected at its lower end a plate 1165 having a stud 1166 cooperating with an arm 1167 fixed on shaft 1151 and normally preventing the arm 1167 from rocking and thus also preventing said shaft from rocking. When by reason of the master and audit cards being of the same number the link 522 is depressed with the stud 1166 the arm 1167 will be released and the shaft 1151 will be permitted to rock. The outer end of arm 1167 is connected through a slot to a stud 1168 fixed in a link 1169 connected to a lever 1170 fixed on shaft 293. This shaft as we have seen in connection with Fig. 54 is constantly oscillated by the cam shaft 74. This in turn raises the stud 1168 (Fig. 90) to permit the arm 1167 to rock after the cards have been sensed. Thus should the cards be of the same number and should the master card be maturing by reason of the posting for the last possible payment in connection therewith and the arm 1149 should rise, the shaft 1151 will be permitted to rock and will set up the machine to cause the master card then at the comparing station to be received by the reject pocket. It is necessary that the setup be stored for the current cycle of the machine because there is then a master card in the posting station which during the current cycle of the machine is to be fed to one or the other of the pockets and the pockets must be set to receive the card which is at the comparing station after the card which is at the posting station has been received by the pockets. The mechanism then which is controlled by the master card at the comparing station and which receives and stores the reading is as follows:

When the shaft 1151 (Fig. 90) rocks counterclockwise it will stretch a spring 1171 (Fig. 115) and tend to rock a lever 1172 loose on the shaft 1151. The arm 1172 has pin and slot connection with the link 246 which at this time may be latched in its lower position by a latch 1173 cooperating with the upper one of two notches 1174 in the edge of the link 246. The link 246 as we have seen, is connected through lever 245 to a cam 243 which is normally to the right of the position shown in Fig. 115 and out of the path of the roller 247 on dog 248 and when in this position permits the master card to be fed to the file pocket but when it is moved to the left which position it now occupies in Fig. 115, it will by actuating the dog 248 cause the card to be fed to the reject pocket. Presuming the link 246 to be locked in its lower position, the rocking of shaft 1151 will tend to move said link to its upper position but the latch 1173 will prevent it from so moving during the current cycle of operation of the machine. After the roller 247 has passed the position of the cam 243, however, the latch 1173 will be rocked counterclockwise to release the link 246 and it will then move to its upper position under the influence of spring 171. The latch 1173 is actuated as follows:

Referring to Fig. 29 we have seen that whenever a master card is to be fed, the shaft 557 rocks. Fixed to this shaft is a lever 1175 connected by a link 1176 to a bell crank 1177 having an up-turned end 1178 connected by pin and slot to the latch 1173 as shown in Figs. 29, 115 and 116. The movement of link 1176 to the left as viewed in Fig. 29 or to the right as viewed in Fig. 115 removes the latch 1173 from the link 246 and permits it to move upwardly, moving the cam 243 into the path of the roller 247. When the roller again sweeps around through this position it will engage the cam 243 and cause the card which is then moving to the pockets to be fed to the reject pocket and this card will be the one which when it was in the sensing station caused the setting up to be effected. The movement of latch 1173 in releasing the arm 246 is a rapid movement and the arm returns quickly to its latching position and will latch the link 246 in its upper position as shown in Fig. 115. During the continuation of the machine, the shaft 1151 will be rocked back to its normal position stretching the spring 1179. If the card now being sensed is also to be fed to the reject pocket the shaft 1151 will again rock and when the latch 1171 releases link 246 the link will remain in its upper position. But if the card being sensed is not to be fed to the reject pocket the shaft 1151 will not rock and the spring 1179 will remain stretched so that when the latch 1173 releases the link 246 the spring 1179 will return link 246 to its lower position in moving the cam 243 from the path of the roller 247.

*Two unpaid items*

Should the machine detect two premiums payable and the master and audit card are of the same number, the master card will be fed to the reject pocket, posting will be suppressed and the audit card will be fed to the audit card reject pocket. The mechanism for causing the master card to be fed to the reject pocket is as follows:

Referring to Fig. 69, we have seen that when the machine detects two premiums payable the shaft 1112 is prevented from rocking. Referring to Fig. 65, the shaft 1112 has loose thereon a latching arm 1180 having a pin 1181 engaging a lever 1182 fixed on the shaft. A spring 1183 holds the pin 1181 normally in engagement with the arm 1182. Should the shaft 1112 rock clockwise it will rock the arm 1181 into the path of a lever 1184 to prevent the latter from rocking as indicated by the position of the parts in Fig. 22. The arm 1180 will then be latched in this position by the lever 1184 so that when the shaft 1112 rocks counterclockwise the arm 1180 will remain in latching position. Referring to Figs. 90 and 91 the plate 1165 has on its opposite side a pin 1166a cooperating with an arm 1167a similar to the arm 1167 previously described. The arm 1167a cooperates with the stud 1168 and is controlled by the movements of shaft 293 as described in connection with the arm 1167. Also shaft 1160 carries an arm 1158a (Fig. 91) similar to the arm 1159a fixed to the link 1185. The link 1185 as shown in Fig. 65 is connected at its upper end to a lever 1186 fixed on stud shaft 1187 (Fig. 65) to which is also fixed the latching lever 1184. When the shaft 1160 rocks counterclockwise as in Fig. 90 releasing the link 1185 the spring 1188 (Fig. 65) will rock the arm 1184 if it has not been latched and thus cause the link 1185 to rise. The link 1185 as shown in Fig. 90 has a projection 1189 cooperating with the latch arm 1155. Thus when arm 1185 rises it will rock the arm 1155 about its pivot 1156 out of the path of the stud 1154. This will permit shaft 1151 to rock counterclockwise and this as we have seen in connection with Fig. 115 will raise the lever 1172 so that the link 246 may be moved to its upper position in time to cause the card then being sensed to be fed to the file pocket during the second succeeding cycle of operation of the machine.

*The audit card reject*

When the link 1185 rises it also causes the audit card to be fed to the reject pocket. The link 1185 has pin and slot connection at its lower end with the lever 1150a fixed on shaft 1151a (see Figs. 58 and 93) which shaft is co-axial with shaft 1150 previously considered. Also fixed on the shaft 1151a is a lever 1190 actuated by a spring 1191 tending to rock the shaft when the link 1185 rises. A lever 1192 fixed on the shaft is connected by a link 1193 to a lever 1194 pivoted at 1195. The latter lever is adapted to actuate the lever 526. Referring to Figs. 53 and 54 it will be remembered that when either of the links 503, 508 rises the lever 524 will be rocked and through the spring 528 will rock the bell crank 526 to move the projection 529 under the pin 530 to prevent the lever 302 from rocking downwardly. The downward rocking of lever 302 it will be remembered permits the rocking of shaft 292 and causes the audit card to be fed to the reject pocket. When one of the links 503, 508 rises it normally prevents the shaft 292 from rocking and the audit card will be fed to the file pocket. Under the present condition where the machine detects two unpaid premiums the rocking of the lever 1194 will rock the bell crank 526 counterclockwise as viewed in Figs. 53 and 54 to overcome the action of spring 528 and remove the projection 529 from under the pin 530 so that the shaft 292 will be permitted to rock during the current cycle of the machine. Thus while the master and audit cards may be of the same number and the link 503 may have set the audit card feed mechanism to feed the card to the file pocket the mechanism controlled by the two unpaid premiums resets the card feed mechanism to cause the audit card to be fed to the reject pocket.

*Prevention of posting*

Fixed on the shaft 1151a is also a lever 1196 (Fig. 93) cooperating with a pin 1197 fixed on the link 765. Thus when the said shaft rocks it will move the link 765 to the right. The right hand end of this link has pin and slot connection with the lever 766 as previously described (see Fig. 99). The rocking of the lever 766 counterclockwise will, through the lever 768, actuate the bail 748 and through mechanisms previously described prevents the type and punch bars from rising to perform posting operations.

*Advanced notice condition*

Referring to Fig. 118D, I have shown a fragment of a master card wherein the data contained in the field 1031 indicates that premiums are payable quarterly. This card also shows that the payments for the first and second quarters have been made and posting has been effected. The third or Sept. quarter is the current quarter and the card is being run through the machine for posting in this quarter. There also appears a perforation in the square 994 for the fourth or Dec. quarter. This perforation it will be recognized has been made in the card prior to the time in which posting is effected in the third quarter. The reason for this is that the master cards may be analyzed for the purpose of making out notices to the effect that premiums are due, in advance, so that before the posting is effected for one payment period a notice may have been prepared in connection with the next succeeding payment period and the notice machine will have noted this by the perforation in the advance square 994. Thus when the card is analyzed by the machine for posting in the third quarter the machine will detect along with the current perforation indicating a payment due, the perforation for the next payment period and this will set up in the machine a condition where there are two unpaid premiums. This condition will ordinarily as we have seen cause the master and audit cards to be fed to their reject pockets and it will also set up mechanism to prevent posting in either of the fields and also causes the printing of an asterisk along with the printing of other data relating to the policy. I have provided mechanism adapted upon discovering two unpaid premiums to suppress the operation of the previously explained two unpaid premium mechanism when one of the unpaid premiums is not yet due, or in other words where there has been an advanced notice in connection with the policy. This mechanism is shown in Figs. 69, 118A, 118B and 118C. We have seen that when there are two unpaid premiums, one of the fingers 1125 rocks counterclockwise (Fig. 69) and prevents the rocking of the bail 1113 on the shaft 1112. The prevention of the rocking of shaft 1112 under the conditions described causes the master and audit cards to be fed to their reject pockets. By providing mechanism to prevent the rocking of the finger 1125 which would otherwise be free to rock because of the two unpaid premium condition I may permit shaft 1112 to rock in its usual manner so that the cards will be fed to their pockets under the normal feed control. To this end I have shown a latching plate 1198 having lateral projections 1199 adapted to cooperate with the rear arm of finger 1125. There are five of the projections 1199 and the plate is slidable laterally with respect to the fingers 1125 as shown in Fig. 118B, the plate being mounted in guides 1200 for this purpose. By sliding the plate laterally the five projections 1199 may be brought into cooperation with the fingers 1125 representing any five corresponding quarters of the five years. The plate 1198 has a lower lateral projection 1201 cooperating with a notch in an arm 1202 pivotally attached at 1203 to the sliding plate 1054 previously referred to. As already described the plate 1054 is moved laterally with respect to the fixed index point 1056 to set up the machine for posting in any of the four quarters of a year. The setting of this plate then will adjust the position of the arm 1202 and with it the position of the plate 1198. The plate 1198 will thus be adjusted to position the projections 1199 adjacent to the fingers 1125 for the quarter in which the machine is set to operate. The rear edge of each of the combs 1136 referred to in connection with Figs. 69 and 82 is provided with a projection 1204 (see Figs. 118A, 118B and 118C). Corresponding with each comb is a three arm lever 1205 loose on shaft 1206. The projections 1204 are normally out of the path of movement of the levers 1205. Springs 1207 tend to rock the levers 1205 towards the combs 1036. Bail 1208 cooperating with the lower arm of lever 1205 normally holds the levers in their inoperative positions. An arm 1209 cooperating with an arm 1210 fixed on shaft 720 is adapted upon rocking of said shaft clockwise as viewed in Fig. 118A to release the levers 1205 permitting them to rock toward the combs 1036. The movement of any of the combs 1036 will move the corresponding projections 1204 into position to prevent the corresponding levers 1205 from rocking. The combs 1036 corresponding to the quarter in which payments are due will not move and the corresponding levers 1205 will be free to rock. The levers 1205 have projections 1211 adapted to cooperate with a pin or roller 1212 carried by one of the arms of lever 1202 so that when the plate 1054 is moved to set the machine to operate for a particular quarter the roller 1212 will be moved under the projection 1211 of the lever 1205 for the same quarter. Thus when the lever 1205 rocks by reason of the position of the comb 1136 for the quarter in which the machine is set to operate the roller 1212 will be permitted to follow the movement of the lever by reason of the action of spring 1213 tending to rock the arm 1202. The rocking of this arm will slide the plate 1198 from the position shown in Fig. 118B to that shown in Fig. 118C, where the projections 1199 will move over the rear projection of the fingers 1125 as indicated in Fig. 69 and latch the fingers against operation. Thus, when by reason of the two unpaid premium condition one of these fingers is free to operate as has been described the projection 1199 will prevent it from rocking. The shaft 1112 will thus be permitted to rock and the rejection of the master and audit cards will be prevented. The rocking of the shaft also depresses the stop plate 1108 (Fig. 69) permitting the stop bar 390b to advance to prevent the printing of the asterisk on the listing sheet. The rocking of shaft 1112 will also permit the machine to perform posting operations provided the other conditions necessary exist, as for instance, the presence of a corresponding audit card. When the plate 1054 is moved to its farthest left hand position so that the designation "L" registers with the index 1056 the roller 1212 will be brought under a fixed stop 1214 so that during the operation of the machine the arm 1202 will not be rocked to shift the position of the plate 1198 and none of the projections 1199 can be brought into locking relation with the fingers 1125. The condition under which the plate 1025 will be moved to its "L" position will be described later.

*Prevention of listing in connection with an advanced notice*

In operating the machine the cards may be run through for posting several times during a quarter, first, to post upon cards where premiums are payable at an early period in the quarter and, again to post upon cards where premiums are payable at a later period in the same quarter. Thus, the card of Fig. 118D may be run through the machine after posting has been effected in the third quarter, and yet the machine is still set to post in that quarter. The machine will detect a payment due and posting effected, and also the master card number will be greater than the opposing audit card number so that the master will ordinarily be fed to the file pocket. The presence of the advance notice in the fourth quarter, however, would appear as an unpaid premium and would ordinarily cause the policy to be listed. But I have provided means for suppressing the listing where the unpaid premium condition is due to the advance notice perforation. The mechanism for effecting this is as follows:

Referring to Fig. 69, each of the combs 1003 is provided with a pin 1215 reaching through a slot 1216 in the comb 998 and adapted to cooperate with a lever 1217 loose on a shaft 1218. Each of the levers 1217 is provided with a spring 1219 tending to rock the lever 1217 clockwise to cause it to follow the downward movement of the corresponding comb 1003. One of the arms of the lever 1217 engages the underside of a bail 1220 and another arm cooperates with a sliding comb 1221 (see Figs. 123 and 124). This comb is provided with notches 1222 into which the upper arm of lever 1217 may rock depending upon the setting of the comb. The comb is mounted in the frame 1223 and has at its left hand end pin and slot connection with a lever 1224 pivoted at 1225 and cooperating at its upper end with a scale 1226. By rocking the lever 1224 the comb 1221 may be moved to any of four positions where it will be held by a spring pressed detent 1227 cooperating with notches 1228 in the comb, the scale 1226 indicating with respect to the arm 1224 the position to which the comb is set; the four positions representing the four quarters of the year. When the comb is set for the first quarter as in Figs. 123 and 125 the notches 1222 will be so arranged with respect to the levers 1217 that the lever associated with the comb 1003 (Fig. 69) of the quarter in which posting is being effected will be free to rock. The levers 1217 associated with the combs 1003 for the next two succeeding quarters will be locked against operation.

Thus if the machine is set to operate in the third quarter and it is found that a premium is payable in that quarter and also that payment has been made as indicated by date perforations also in that quarter, the corresponding comb 1003 (Fig. 69) will drop one step. This will rock the corresponding lever 1217 a slight distance which, however, is insufficient to be effective. One of the next two succeeding combs 1003, or in other words those associated with the two quarters following the quarter in which the machine is operating may drop two steps by reason of a payment due perforation in the corresponding quarter. As the quarter in question is later in time than the quarter in which the machine is set to operate the perforation is, of course, an advance notice perforation and while the corresponding comb may drop two steps its lever 1217 is not free to rock with respect to the comb 1221 and it therefore does not follow the downward movement of the pin 1215, and it therefore also does not rock the bail 1220. The bail 1220 is connected to a depending link 1229 (Fig. 65) having a spring 1230 tending to raise it. This spring is weaker than the spring 1219 so that when any one of the levers 1217 rocks under action of its spring it may overcome the action of spring 1230 to raise the link 1229. The lower end of link 1229 has spring-pressed pin and slot connection with a latching lever 1231 cooperating with an arm 1232 fixed upon the shaft 1015 (see also Fig. 63). When the current quarter comb 1003 drops its one step and its lever 1217 rocks the slight distance and depresses the link 1229 slightly it does not rock the latch 1231 a sufficient distance to release the lever 1232 and the shaft 1005 is thus prevented from rocking. Where on the other hand the current quarter shows a payment due but no payment made, the appropriate comb 1003 would drop its full two steps and the rocking of its lever 1217 and the consequent movement of latch 1231 would be sufficient to release the shaft 1015 to permit the proper operation of the machine. Where the comb 1003 associated with an advance notice in one of the quarters operates, the failure of its lever 1217 to rock with respect to the set up comb 1221 will prevent the unlatching of shaft 1015 so that said shaft can not rock and the printing of that particular policy upon the listing sheet will thus be suppressed.

Locking out list prevention device

In operating the machine under certain conditions still to be described it is desired to render inoperative the mechanism just described to prevent the rocking of shaft 1015. This mechanism comprises a link 1233 (Fig. 65) having pin and slot connection with a lever 1234 fixed with respect to the latching lever 1231. This link is connected to a lever 1235 pivoted at 1236 having at its outer end a roller 1237 resting in the path of a cam 1238 (see also Fig. 64). This cam is an integral part of the sliding plate 1054. When the plate 1054 is moved to the left to its "L" position the cam 1238 will engage the roller 1237, rocking the lever 1235 and through the link 1233 will raise the latch 1231 out of cooperation with the lever 1232 and hold it in this inoperative position. The pin and slot connection between the latch 1231 and the link 1229 will permit the movement of the latch without interfering with the positions of mechanisms connected with the link 1229. On the other hand the pin and slot connection between the link 1233 and lever 1234 will permit the operation of latch 1231 through the link 1229 without being affected by or in any way affecting the lever 1235 and its associated parts.

Indication of card misfiled numerically

In the operation of the machine the cards are taken from their file stacks in groups and placed into the machine. The cards in the files are arranged numerically and when placed in the machine and fed therethrough they are taken in their higher order first so that each card fed through the machine is of a number lower than the preceding card. In the present machine should a card having a number higher than that of the preceding number be fed into the sensing mechanism, the machine is adapted to be automatically stopped, as the card is obviously out of its proper place in the file stacks. By stopping the machine and taking this card out of its improper place it may then be placed where it belongs. The mechanism for detecting a card thus misfiled is as follows: Referring to Fig. 11 the eight type bars 440 which are associated with the policy number on the card have associated therewith mechanism for ascertaining when a number is higher than the preceding number set up in the type. Referring to Fig. 20 this mechanism is shown as mounted on a fixed portion 1239 of the machine frame. Associated with each of the policy number type bars 440 are two combs 1240 (see also Figs. 100 and 101). The bracket 445 of the type bars upon which the restoring bar 447 operates has at its end a lateral projection 1241 cooperating with the shoulders 1242 of two of the combs 1240. The opposite edge of each of the combs 1240 is provided with notches 1243. Adjacent to the edges of the combs are fingers 1244 adapted to engage in these notches. The fingers 1244 are loosely mounted on a shaft 1245 carried by a frame 1246 (see also Figs. 101, 102 and 103) slidably mounted in the fixed frame 1239. In Figs. 100 and 106 the movable frame 1246 is shown in its right hand position where the fingers 1244 cooperate with the notches 1243 in their respective combs 1240. In Fig. 108 this frame is shown in its left hand position where the fingers 1244 are removed from the notches 1243. In the operation of the machine, as the type bars 440 rise upon taking a reading from a card and are positioned according to the number sensed, they will also raise the combs 1240 to a corresponding position. The fingers 1244 are then moved to the right as in Fig. 100 to engage in the notches 1243. When the type bars descend the combs 1240 engaged by the fingers 1244 will remain in the positions in which they were set by the type bars. When the type bars again rise upon reading the next card, if any one of them rises above the position to which it rose for the previous reading it will pick up the set comb and carry it to a higher position. The operation of the bar carrying the comb to the higher position is utilized to bring about stoppage of the machine. Some of the digits in a number may, of course, be higher than the corresponding orders of a preceding number while the number as a whole may still be lower than the preceding number as a whole by reason of the condition of the digits of the higher orders. It is therefore necessary that the operation of some of the fingers 1244 shall not serve to stop the machine unless the number as a whole is higher than the preceding number. The construction of the mechanism for ascertaining this status is as follows:

Loose on the shaft 1245 with the fingers 1244 are several levers 1247, one for each of the fingers 1244. Each of these levers has a bent-over portion 1248 reaching over the top of its corresponding finger 1244 and is adapted at its lower end to cooperate with a bail 1249 loose on shaft 1250. There is also another lever 1251 for each of the fingers 1244 these fingers being mounted on shaft 1245 and having bentover portions 1252 engaging over the tops of their corresponding fingers 1244. A bail 1253 loose on shaft 1245 engages the bent-over portions of the levers 1247 and 1251 to press them into engagement with the fingers 1244. To operate the bail 1253 one of its side arms 1254 has a projection 1255 adapted to engage an adjustable stop 1256 fixed with respect to the stationary frame 1239 when the movable frame 1246 moves to the left as viewed in Fig. 107. This will cause the bail plate 1253 to press down upon the projections 1248 and 1252. There is also a restoring bail 1257 loose on the shaft 1245 and engaging the lower edges of all of the fingers 1244. This bail has a projection 1258 (see Fig. 103) adapted when the slidable frame 1246 moves to the left, to engage a pin 1259 in the fixed frame to rock the bail counterclockwise to raise all of the fingers 1244. Thus when the movable frame 1246 moves to the left as in Fig. 108 the parts become restored to their normal or central position. A spring-pressed latch 1260 carried by the arm 1254 will then latch over the bail 1257 and hold the two bails in their home position. A spring 1261 (Fig. 107) attached to the arm 1254 then tends to rock the entire unit counterclockwise about the shaft 1245. A rearwardly extending arm 1262 at each end of the bail 1257 is adapted to engage a pin 1263 on each side of the fixed frame 1239 to limit the counterclockwise turning of the parts, to the position shown in Fig. 108. Presuming the machine to have taken a reading from a card and the type bars to have risen to their positions accordingly, they will have raised their combs 1240 corresponding distances. At this time the frame 1246 will be thrust to the right from the position shown in Fig. 108 so that the fingers 1244 will engage in the notches in the combs 1240. The mechanism for sliding the frame 1246 comprises a pair of slotted arms 1264 (Figs. 104, 102) cooperating with pins 1254 fixed in each side of the movable frame 1246. The levers 1264 are fixed to a shaft 1265. Fixed to the outer end of this shaft is a lever 1266 (Figs. 102 and 16) connected by a link 1267 to a lever 1268 fixed on a shaft 1269 mounted in a bracket 1270. Also fixed on this shaft is a bell crank follower arm 1271 cooperating with cams 1272, 1273 carried by the shaft 77. A spring 1274 holds the parts in the position shown in Fig. 16, the upper arm of bell crank 1271 being maintained slightly out of engagement with its cam while the lower arm is held in engagement with its cam. By this arrangement the cam will serve to move the fingers 1244 up to the combs 1240. The spring 1274, by rocking the follower arm to the position of Fig. 16, will then resiliently move the fingers into the notches 1243 in the combs. Fig. 108 shows the position of the fingers 1244 and associated parts just before they move into cooperation with the combs 1240. After they move into cooperation with the combs the type bars then descend, leaving the combs in their upper positions. The type bar restoring bar 447 carries with it a bail 1275 (Fig. 100) attached thereto by brackets 1275a (Figs. 101, 103), at each end of which is attached a plate 1276 adapted to move up and down in the frame 1239. As the restoring bar 447 descends it will thus carry with it the end plates 1276 so that a shoulder 1277

(Fig. 107) on one of these plates will engage a lever 1278 loose on shaft 445 and engaging the upper edge of bail 1257. This rocks the entire unit including the fingers 1244 slightly downward to the position of Fig. 100. It will be noted that in Fig. 100 the unit including the fingers 1244 is rocked slightly clockwise from the normal horizontal position of these parts as shown in Fig. 108. Also, as the end plate 1276 is rocking the lever 1278 as in Fig. 103, the latch 1260 being depressed with respect to the fixed pin 1279 will be rocked to the position shown in Fig. 103 out of cooperation with the bail 1257. While the unit is being thus rocked slightly clockwise the latch 1260 is being removed from cooperation with the bail 1257 but does not completely release the latter until after the parts have reached their new position. The type bars will at this point reach their normal downward position. Presuming now that the machine senses the next master card and the type bars 440 again rise, if the number being sensed is the same in all of its digits as the preceding number, all of the type bars will rise to the same positions to which they rose during the preceding reading. They will then all engage their corresponding combs 1240 which have been slightly depressed by the slight clockwise rotation of the fingers 1244 and will therefore be raised this slight distance back to the same position to which they were raised on the previous reading. Thus each of the fingers 1244 will be raised individually from the position shown in Fig. 100. This slight rocking of these fingers will raise the corresponding projections 1248 and 1252 on levers 1247 and 1251, respectively, rocking said levers counterclockwise as viewed in Fig. 100. This slight rotation of the levers 1247 will cause them to disengage the bail 1249. The bail is thus released by all of the levers 1247 but will continue to be held against clockwise rotation by an end latch 1280 (Figs. 103 and 107). The bail 1249 will thus be prevented from rocking counterclockwise. Presuming now a condition where the card being sensed is of a lower number than that of the preceding card in the units order, all of the type bars except the units type bar will now rise to the preceding position, raising their corresponding combs 1240 from their slightly depressed position to their previous position. This in turn will rock the corresponding fingers 1244 from their slightly depressed positions to their horizontal positions rocking the corresponding levers 1247 out of rocking position with respect to the bail 1249. The units bar, however, will not rise to the same height that it did on the previous reading. It therefore will not raise its comb 1240 from its slightly depressed position. The corresponding finger 1244 will then also remain in its slightly depressed position permitting its lever 1247 to remain in cooperation with the bail 1249. The bail will then be locked against counterclockwise rotation by the units lever 1247 as well as by the end latch 1280. Presuming on the other hand that the card being sensed is of a higher number in the units order than that previously sensed, the type bars will all rise to their former positions without moving their corresponding latch levers 1247. The units type bar will rise to a position higher than that to which it rose during the preceding operation. It will thus raise its corresponding comb 1240 higher than on the previous operation. This condition of the parts is shown in Fig. 106. The raising of the comb 1240 to the position of the preceding reading raised the finger 1244 to a substantially horizontal position. The continued upward movement of the comb 1240 by reason of a higher digit will then continue to raise the fingers 1244 to the position shown in this figure. The further turning of the fingers 1244 will rock the lever 1251 to the position shown in Fig. 106 where a carry-over projection 1281 will engage and rock the end latch 1280 out of cooperation with the bail 1249. Referring to Fig. 101 the carry-over projection 1281 associated with the units lever 1251 reaches across the end latch 1280. Viewing the parts in Fig. 103 it will be seen that the movement toward the right of this carry-over projection will move the latch 1280 away from the bail 1249. This bail will now be entirely released by all of the latch levers 1249 and 1247 and the end latch 1280 and will be actuated by its spring 1282 (Fig. 103) rocking a rearwardly extending and integral arm 1283. The outer end of this arm carries a pin 1284 (Figs. 101, 193) engaging under a lever 1285 fixed by means of a sleeve 1286 with respect to a lever 1287 mounted to rock upon a stud 1288. The lever 1287 is connected by a link 1289 to a bail 1290 (see Figs. 100 and 102) loose on shaft 971. The opposite side of the bail has connected thereto a link 1291 (Figs. 19 and 102) having spring-pressed slot connection at its lower end with the lever 1084 previously described as actuated by the cam pin 1086. Each downward rocking of the arm 1084 tends through its spring 1292 to depress the link 1291. Ordinarily the spring will yield but when the bail 1249 is released the spring 1292 will be free to cause the link 1291 to rock downwardly rocking its bail 1290 clockwise as viewed in Fig. 100. The bail 1290 carries a laterally projecting bail 1293 engaging a lever 1294 fixed on the shaft 971 with the lever 972 so that the clockwise rotation of the bail will rock the lever 972 clockwise, bringing the pin 973 into the notch 978 of the arm 974. As previously stated when the arm 974 thereafter moves to the right it will cause the machine to stop.

As each cycle of operation of the machine is a card sensing cycle, it will be seen that when the type bars 440 rise during a cycle, setting one of the combs 1240 (Fig. 100) and leaving this comb in its set position to be compared with the reading taken on the next cycle, this particular comb will not be available for storing the reading of the type bar for the following cycle. It is for this reason that two combs 1240 are provided for each of the type bars. When one of these combs takes a reading from the type bar and holds it for comparison with the next reading, the other comb comes into operation to take a reading from the same type bar when its companion comb is holding a previous reading. Thus these combs alternate, one taking a reading on each alternate cycle holding the reading for the following cycle while the other takes readings during such intervening cycles and holds them for the cycles then following. The alternating operation of the combs 1240 is effected as follows:

The movable frame 1246 (Figs. 100 to 108, inclusive) is adapted not only to move toward and away from the type bars but also to move at right angles to such movement. Referring to Fig. 101, the movable frame 1026 is mounted in the fixed frame 1239 by means of projection lugs 1295 (as viewed in this figure). The frame 1246 may move forward and backward and also from the left to the right. The forward and backward movement has already been described. Fixed on either side of the frame 1246 is a cam block 1296 adapted to cooperate with rollers 1297 carried by rocking frames 1298 pivoted at 1299 (see also Figs. 104 and 105) and adapted to be held in the upper or operative position as in Fig. 104, or the lower or inoperative position as in Fig. 105 by an impositive latch 1300. Each of the rocking frames 1298 has an upper arm 1301 and a lower arm 1302, the rocking frame being supported by the fixed frame. The sliding frame carries at each side an upper pin 1303 fixed directly to the frame and a lower pin 1304 fixed to a bracket 1304a on the frame. As seen in Fig. 101 with the movable frame 1246 toward the right the upper right hand pin 1303 is in alignment with the upper arm 1301 of the right hand rocking frame 1298 so that when the frame 1246 moves away from the type bars this pin will engage said arm and rock the frame 1298 from its inoperative position of Fig. 105 to its operative position as in Fig. 104. When the frame moves forward again toward the type bars the cam block 1296 will engage the cam roller 1297 and the entire frame 1246 will be forced to the left. Also as seen in Fig. 101, while the frame 1246 is toward the right the left hand pin 1304 is aligned with the lower arm 1302 of the left hand rocking frame 1298 so that the backward movement of the frame 1246 which raised the right hand roller 1297 to operative postion, will engage the left hand frame 1298 and rock the left hand roller 1297 from its operative position as in Fig. 104 to its inoperative position as in Fig. 105 so that when the frame moves forward and is cammed to the left the left hand roller 1297 will be out of the path of the left hand cam block 1296. As the frame 1246 is cammed to the left during the forward movement the right hand upper pin 1303 will also move to the left out of alignment with the arm 1301 while the lower right hand pin 1304 will move into alignment with the lower arm 1302 so that when on the next cycle the frame 1246 moves back, this pin will engage said arm and rock the frame 1298 to operative position. On the left hand side of the frame 1246 the lower pin 1304 will move out of alignment with arm 1302 while the upper pin 1303 moves into alignment with arms 1301 so that now when the frame 1246 moves back, the left hand roller 1297 will be raised to its operative postion and on the next forward movement of the frame toward the type bars, the frame will be moved back to the right. From this it is seen that the frame while moving forward toward the type bars each cycle, occupies its right hand position as in Fig. 101 for one cylce and the left hand position for the next cycle, etc. The bar 1275 which as we have seen rises and lowers with the rising and lowering of the type bars, is provided with stops 1305 which as shown in Fig. 101 cooperate with half of the combs 1240 when the frame 1246 is to the right. When the frame is moved to the left the stops 1305 will be moved to the left also, to cooperate with the other half of the combs 1240. In other words during one cycle of operation of the machine a stop 1305 cooperates with one of the two combs 1240 associated with a type bar. During the next cycle of operation the stop cooperates with the other one of these combs so that one comb is free to operate while the other one is holding a reading of the previous cycle. It has been stated that the bar 1275 (Fig. 101) is raised and lowered by the type restoring bar 447 through brackets 1275a. The bar 1275 is slidable laterally in these brackets but is fixed with respect to the side plates 1276 which are constrained to move from side to side with the frame 1246, the side plates 1276 being disposed between brackets 1306 fixed to the movable frame 1246. The side plates 1276 will thus be free to move up and down wilthout interference from the frame 1246. Also the frame 1246 may move toward or away from the type bars without affecting the positions of the plates 1276 but when the frame 1246 moves to the right or to the left it carries the plates 1276 with it, thus also moving the bar 1275 and stops 1305 laterally. When the type bar is restored by the restoring bar 447 the stops 1305 will thus also move downwardly engaging half of the combs 1240 on their shoulders 1307 and carrying them down to their downward positions. The other half of the combs 1240 will be held up by the fingers 1244 as described. The lower ends of all of the combs 1240 are provided with notches 1308 with which a spring pressed detent 1309 (see Fig. 20) cooperates to hold the combs in any position to which they may be moved.

As seen in Fig. 101 the fingers 1244 are in cooperation with the half of the combs 1240 that are free of engagement with the stops 1305. It will be recognized that when the frame 1246 is moved to the left it will carry with it the fingers 1244 so that they will then cooperate with the other half of the combs 1240. The stops 1305 at the same time will be brought into cooperation with the combs 1240 that are then free from the fingers 1244. By this arrangement it will be seen that when a type bar rises and descends it will raise the combs 1240. One of these combs will then be retained in the raised position by its finger 1244 while the other comb will be caused to descend by the stop 1305. On the next cycle the depressed combs 1240 will be raised to the new reading position where they will be held by the fingers 1244, and the combs 1240 previously held up will be brought down by the fingers 1305. Thus for each type bar there will be one comb 1240 which may be raised for each cycle of operation and retained for comparison during the succeeding cycle. When the frame 1245 is moved from one of its lateral positions to the other, it will be held by means of a spring-pressed roller 1310 cooperating with grooves 1311 in a member 1312 carried by said frame (see also Figs. 20, 102), the roller 1310 being carried by a bracket 1313 mounted on the fixed frame 1239. After the bail 1241 has operated by rocking counterclockwise as viewed in Fig. 103, it will be returned to its normal position when the movable frame 1246 moves toward the left, by means of an upwardly extending arm 1314 integral with the bail engaging a set pin 1315 carried by the fixed frame as shown in Fig. 107. At the same time that this happens the upper arm 1316 of the end latch 1280 will engage a set pin 1317 and be rocked into the position of Fig. 107 where it will again cooperate with the bail 1249 as the movable frame again moves toward the right. The bail will then be held in position by the end latch 1280. When the fingers 1244 are reset to their normal positions as in Fig. 108 the latches 1247 will be out of cooperation with the bail 1249 and will maintain such position with respect to the bail until they have been brought into cooperation with the comb 1240. When the combs descend one step as has been described, rocking the fingers 1244 slightly downward, the latches 1247 will be brought into cooperation with the bail 1249. On the next reading when the combs 1240 are raised the one step presuming that the reading in each order is the same as the previous reading the latches 1247 will again be rocked out of cooperation with the bail 1249. The arm 1251 associated with each finger 1244 has a carry-over projection 1281 (see Figs. 101, 106 and 108) reaching across the edge of the latch 1247 associated with the finger 1244 belonging to the next lower order in a number represented in the type carriers, so that when, by reason of a digit in a given order being of a greater value for the current reading than for the previous reading, the corresponding finger 1244 is raised more than the one step, its carry-over projection 1281 will reach over to the latch 1247 of the next lower order and remove it from cooperation with the bail 1249 should it have remained in cooperation therewith. A latch 1247 thus removed will in turn, by raising its finger 1244, also rock its carry-over projection 1281 to remove the next lower latch 1247 from the bail and so on, the carry-over projection 1281 of the lowest order in turn removing the end latch 1280 from the bail. This will permit the bail to operate to stop the machine. Should this carry-over releasing operation take place under control of an intermediate order and should the digit in one of the orders to the left thereof be lower for the current reading than for the previous reading, the finger 1244 associated with that order will not rise the one step back to its horizontal position and its latch 1247 will remain in cooperation with the bail 1249, preventing it from operating and the machine will not be caused to stop as the number as a whole is not greater than that of the previous reading. Presuming the digits in the orders to the left of the one assumed, to be the same for the current reading as for the previous reading, their corresponding fingers 1244 upon rising the one step will rock their carry-over projections 1281 toward the latches 1247 of the next lower orders but not far enough to remove the one which is in cooperation with the bail, to its inoperative position.

*Itemized list of premiums payable*

The machine may be set up to analyze the master cards and to make a list of all policies in connection with which premiums are indicated as being payable but have not yet been paid. In printing this list each item may be accompanied by the date upon which the unpaid premium became overdue. The list may also include the amount of the premium. A sample of such a list is shown in Fig. 5. In this list it will be noted that the first item relates to a policy which became due or overdue on the tenth day of the third month. The second item relates to a premium which became due or overdue on the eighth day of the sixth month. The year is not considered in connection with this list as it will ordinarily be understood. Along with this second item an asterisk is printed. Heretofore it was seen that an asterisk is printed on a list sheet of Fig. 6 when more than one premium is overdue. The asterisk then on the second line of the list in Fig. 5 indicates that more than one premium is overdue in connection with this policy. The third item in the list is the same policy as the second and relates to a premium which became due or overdue on the eighth day of the third month of the year. No asterisk accompanies this item. The four items included in the dotted line bracket relate to a policy having a master card such as shown in Fig. 7. Here it will be noted that according to the quarterly fields 33, premiums are payable and unpaid in four quarters of the year. In printing the list the machine ascertains that these four premiums are due and unpaid and prints first, data relating to the last unpaid premium. This is shown as having become overdue on the twenty-first day of the twelfth month. The card will then be retained in the machine to be analyzed during the next cycle of operation and the same data relating to the same policy will be printed again with the date which is the twenty-first of the ninth month. The card is again retained and the data again printed for the next preceding unpaid item which became due on the twenty-first day of the sixth month. With each of these three items there is printed an asterisk since when each item is printed there was still at least one premium which became payable at an earlier date but was unpaid. When the printing of the last item, representing a premium which became overdue on the twenty-first day of the third month, as this was the earliest unpaid item the data was printed without an asterisk. The machine then fed out the master card, feeding in the next master card and continuing the listing operations. In the printing of the list of Fig. 6 it will be noted that the same policy as that included in the brackets in Fig. 5 was printed during posting operations. This item is the fourth and is indicated by a dotted arrow. In listing while posting, the machine prints the item but once, an asterisk being also printed when there is also a previously unpaid premium but the machine does not print any data concerning such previous premium as it does in the list sheet of Fig. 5.

When using the machine for listing, master cards only are employed. It therefore becomes necessary to suppress some of the controls which operate in connection with the audit card. For instance, mechanism was described by which the machine is stopped if two audit cards are fed successively to the reject pocket. The machine normally operates to feed audit cards to the reject pocket but when it detects a condition where a master card number is higher than the audit card number which it will do, in effect, where there is a master card and no audit card, the machine will operate to prevent the audit card feeding mechanism from operating to reject. Then if the machine detects two unpaid premiums it again alters the control to cause the machine to operate to reject the audit card. Thus conditions may frequently arise in ordinary listing where, by reason of more than one unpaid premium, the machine will operate to reject the audit card, and wherever this happens twice in succession the machine would be caused to stop. In the present instance, however, it is not desired to stop the machine under this condition and therefore the mechanism for stopping the machine when two audit cards are fed successively to the reject pocket is suppressed.

*Manual setup controls*

Referring to Figs. 11, 49, 50 and 54 the mechanism for suppressing the control whereby the rejection of two audit cards will cause stoppage of the machine is shown. This mechanism comprises a link 1318 having resilient pin and slot connection with a lever 1319 adapted to be rocked clockwise by a handle 1320 to raise the link. The link carries at its lower end a pin 1321 normally out of the path of a lever 1322 fixed on shaft 292. Normally the shaft is free to rock clockwise as viewed in Fig. 50 but when the link is raised the pin 1321 will be brought into the path of the lever 1322 to prevent the shaft 292 from rocking. Referring to Fig. 54 it will be remembered that when the shaft 292 rocks, the audit card will be fed to the reject pocket. The prevention of rocking of said shaft by the pin 1321 will thus prevent the reject mechanism from operating and will also prevent the movement of link 570 which is connected to the bars 338 and 580 included in the mechanism for stopping the machine. Operation of this mechanism is thus prevented and the machine will not be stopped by detection of two unpaid items upon the master card.

As there will be no audit card in the machine when operating for listing the audit card sensing pins would normally be free to advance and this would in turn produce a false reading which would result in an improper setting of the audit card combination combs 371, 372 of Fig. 32 and would prevent the stop bars 390 from properly cooperating with the master card combination combs 367, 368 and this would affect the proper positioning of the type bars. For this reason the audit card sensing pins 340 are prevented from operating when the machine is being used for listing. Referring to Fig. 49 the handle 1320 is fixed on a shaft 1323 rotatably mounted in the two side plates 1324 (see also Fig. 11) slidably supported by a fixed shaft 1325. The side plates 1324 are united by a cooperating plate 1326 provided with short pins 1327 resting in the perforations 1328 in the die plate 1329 (see also Fig. 49a) into which the audit card sensing pins reach when they pass through the card. Fixed on the ends of the shaft 1323 are cams 1330 cooperating with the fixed shaft 1325 so that when the handle 1320 is rocked, the plate 1326 will be moved to the right as viewed in Figs. 49 and 49a to cause the pins 1327 to reach through the perforations 1328. When the machine operates and the pins 340 are released to take their readings, the pins 1327 will now intercept them and prevent them from advancing so that they will exert no controlling influence upon the combination combs and stop bars.

The pins 20 and 23 shown diagrammatically in Fig. 2 which operate in connection with the perforations 21 and 24 of the audit card (Fig. 4) are also suppressed by the operation of the plate 1326 as shown in Fig. 49. This prevents the machine when listing from operating under control of these pins to perforate in the fields 22 and 25 on the master card.

It will be remembered that the feeding of master cards takes place under control of the comparison between the master and audit cards. In this comparison, in order to feed master cards, one of the comparing bails 483 shown diagrammatically in Fig. 10 must rock. In order that these bails may be free to rock it is necessary that the district combs 410 shall rise one step and this takes place only when the sensing pins read the same district designation on the master and audit card sides. As the audit card district pins have been locked against operation the district pins on the master card side unless similarly locked would read a designation on the master card which would have the effect of being greater than that on the audit card side and this would prevent the combs from rising. Means is therefore provided for preventing the district pins from taking a reading from the master card. The reading then will be the same on the master and audit card sides and the combs will rise their one step to permit the comparing bails to operate. For locking these pins against operation a device similar to that shown in Figs. 49 and 49a may be employed. This is shown in Fig. 20 and comprises a plate 1331 carrying pins 1332 adapted to reach into the perforations in the die plate 1333. The plate 1331 is supported by rods 1334 actuated by springs 1335 normally holding the pins 1332 in their inoperative positions. A cam lever 1336 is provided to move the pins 1332 to the left where they will be in position to intercept the district pins when the latter are released to take a reading. By rocking the cam lever 1336 counterclockwise the district sensing mechanism will be set for listing purposes. This will free the comparing bails so that they may rock to permit the feeding of the master cards.

In the sensing of the policy number where the audit card pins are locked against operation, the master card pins will always sense a number which in effect is higher than the reading taken by the audit card pins as the latter take no reading at all. This will permit one of the comparing combs to rock. In the present instance it will always be the comparing comb corresponding to the highest order in the master card number. Thus with respect to the policy number the comparing combs and bails we find that at least one of the bails will be free to rock which is a necessary condition for the feeding of master cards.

It is also necessary that the month comparing combs 410 (see Fig. 10) be controlled by a reading on the master and audit card sides which is the same. In order to obtain this similar reading on both sides the month sensing pins on the audit and master card sides are permitted to take a reading of 19. The reason for this arbitrary number will be brought out later. It will be recognized for the present purpose that by reading 19 on both sides the month combs 410 will be permitted to rise one step and will thus be in position to permit any of the comparing combs to rock to permit card feeding. The device for causing the master card sensing pins 339 to read the number 19 is disclosed in Fig. 46, and comprises the perforated plate 596 previously referred to in connection with the setting up of the month in connection with posting. By setting this plate so that its index 598 will register with the designation LIST at the top of the scale plate 599 a perforation 1337 in the plate will register with the lowermost units column sensing pin representing 1 while the two perforations 1338 will register with the two upper sensing pins of the tens column representing 9. When the pins advance to take a reading these pins will then pass through the plate 596 and control their respective combination combs accordingly. On the audit card side the plate 1326 which as previously stated is provided with pins 1327 to intercept the sensing pins 340 may be left devoid of pins in the positions corresponding to the month sensing pins employed for sensing the designation 19. The reading on both sides then will be the same and the month comparing combs 410 will rise one step and free the comparing bails to operate.

Referring to Figs. 85 and 86, the machine may be set to analyze cards belonging to any of the three file groups previously referred to in connection with the scale 990. As shown in Fig. 86 the machine is set to operate upon cards belonging in the second, fifth, eighth and eleventh months of the year. As long as cards belonging to these months are passed through the machine it will continue to operate but if cards belonging to one of the other months are sensed the machine will reject the card as described in connection with the posting operations of the machine.

It has been seen that one of the conditions necessary for printing is the rocking of shaft 624 (see Fig. 69). The several elements contributing to the control of this shaft include analyzing of the day on the master card and the day set up on the audit card side. In order to release the shaft 624 to rock, the day sensed on the master card must be the same as or less than the day set up on the audit card side. For this reason it is simply necessary when listing, to set up the mechanism shown in Figs. 43 and 44 to permit the sensing pins 340 adapted to read the day on the audit card side to read 31. This is done by adjusting the links 612 with respect to the scale 614 which in turn sets the combs 606 so that when the sensing pins are released those representing 31 will advance. Thus whatever day perforations control the sensing pins on the master card side, the reading will be the same as on the audit card side if the day is the thirty-first, and will always be less when any other day of the month is indicated on the card. When the day on both sides is the same the comparing combs 410a (see Fig. 69) will rise one step. If the day reading on the master card side is less than the audit card side these combs will rise two steps. These combs will thus always rock the latches 618 out of the path of the projection 620 on lever 619. Thus so far as the day reading is concerned the shaft 624 will always be free to rock.

Another element contributing to the rocking of shaft 624 to permit printing is the mechanism which controls the quarter in which the machine shall operate for posting. Referring to Figs. 64 and 65 this mechanism includes a plate 1054 which is set by being moved laterally in connection with the index 1056. For listing purposes this plate may be moved to its extreme left hand position where the index 1056 will register with the designation L on the plate. This will move the lever 1050 in the dotted line position out of cooperation with the levers 1044. As previously described, when the lever 1050 is in register with one of the levers 1044, the latter may or may not permit the lever 1050 to rock. In order to print this lever must rock. Thus by moving it to its dotted line position, out of cooperation with the lever 1044 it will always be free to rock. The rocking of this lever then will permit the shaft 1019 to rock counterclockwise as viewed in Fig. 65 to rock the shaft 1015 provided other conditions do not intervene. The movement of the plate 1054 to the left also causes depression of the lever 1235 which as we have already seen raises the latch 1231 out of cooperation with the arm 1232 on shaft 1015 where it will be held during listing operations.

The only mechanism now remaining for controlling the operation or non-operation of shaft 624 is the latch 1013 (see Figs. 69 and 73). It has already been pointed out that if the master card contains perforations indicating a premium due but unpaid, the latch 1013 will release the lever 1014 and permit shaft 1015 to rock. If there are no unpaid premium perforations in the card then this latch will cooperate with the lever 1014 as in Fig. 73 to prevent the shaft 1015 from rocking. The clockwise rocking of shaft 1015 as seen in Figs. 69 and 71 will cause the shaft 1024 to rock counterclockwise when the day combs 410a have moved the latches 618 to the inoperative positions shown in Fig. 71. Thus if the card shows a premium due but unpaid the shaft 624 will rock, causing the printing hammers to be released to actuate the printing type which will have been set according to the reading of the master card being sensed. In Figs. 19 and 19a it will be remembered that the clockwise rocking of shaft 624, moved the latch 1081 toward the roller 1080, the latter being in turn moved toward the latch when the number on the master card is greater than that on the audit card and as the number on the master card will always be greater than the reading on the audit card side due to the locking of the audit card pins, the roller 1080 will always be moved to the left to cooperate with the latch 1081 whenever the master card shows a premium due and unpaid. Thus as the master cards are fed one by one through the sensing position the pins associated with the date in the quarters 33 will take their readings and set their type to print such readings upon the listing sheet of Fig. 5. The policy number pins, the class pins and the premium pins will take their readings and set their type elements for printing. Then if the machine senses an unpaid premium condition the type hammers will be released to print the data thus set up. If no unpaid premium condition is sensed the parts will be restored without printing and the master card will be fed on toward the file pocket.

*Progressive control of printing from quarter fields*

In printing the list of unpaid premiums of Fig. 5, the machine upon detecting the due and unpaid premiums on the card of Fig. 7 is controlled to analyze and print under control of the last unpaid item first and to take each of the other items in succession reading backward. Thus the unpaid item for DEC is printed first and that for the preceding quarter or SEPT next, followed by JUN and then by MAR. It will be remembered that when posting if the machine detects more than one due but unpaid item the mechanism shown in Figs. 75, 75a, etc. causes the field 33 showing the latest due but unpaid item to control the printing by carryover mechanism which reaches over to the preceding field mechanism and renders it inoperative. Thus when in printing the listing sheet of Fig. 5 the machine detects several fields 33 having due and unpaid items. The latest of these items controls the printing and suppresses the control for that particular cycle from the other fields. In order to then print the items from the other fields it is necessary after the current cycle to suppress the control of the latest item so that the next to the latest will come into control, etc. back to the earlier items. Also it will be necessary to suppress the feeding of cards so that the master card will remain in the sensing station until all of the items have been printed in connection therewith. The mechanism for successively suppressing the control by the quarter field which has already controlled printing operations is as follows: In Figs. 69, 71 and 73 it will be remembered that upon analyzing a master card the pins 31 and 32 control the positions of combs 998 and 1003. The combs 1003 in turn control the operation of fingers 1007 and through this mechanism the comb 1003 of the latest due and unpaid item controls the printing. By locking the comb 1003 against operation after it has controlled the printing it will be recognized that the next preceding comb will then act as representing the latest unpaid item. Adjacent to the lower ends of the combs 1003 are latches 1339 loose on shaft 1340 and actuated by spring 1341 tending to rock the latch to a position under the comb which would prevent the comb from descending. A bail 1342 fixed on shaft 1340 is adapted to restore the latches to their inoperative position. Shaft 1340 has fixed thereto a lever 1343 (Figs. 66 and 68) having a pin 1344 adapted to be actuated by a link 1345 which is reciprocated up and down by the oscillatory movement of shaft 1008, being connected thereto through a link 1346. Fixed on shaft 1045 is a link 1347 having pin and slot connection with a link 1348 connected to the link 1345. A spring 1349 normally pulls the links 1345 into cooperation with the pin 1344 so that as said link moves down it will rock shaft 1340 clockwise as viewed in Fig. 68, and counterclockwise as viewed in Figs. 69 and 71. This will rock the bail 1342 to move the latches 1339 to inoperative position where they will be latched by an arm 1350. When the link 1345 moves upwardly releasing the pin 1344 the shaft 1340 will be permitted to rock counterclockwise as in Fig. 68 or clockwise as in Figs. 69 and 71, being actuated in this direction by the spring 1341 acting upon the latch 1339 which in turn acts upon the bail 1342. Thus during the normal operation of the machine the latches 1339 are released during each cycle so as to move from the position of Fig. 69 to that of Fig. 71. The rocking of shaft 1340 then restores the latches to the position of Fig. 69.

When the machine is set for listing, the shaft 1340 will not be rocked counterclockwise as viewed in Fig. 71 until printing has been effected from all of the due and unpaid quarters 33. Thus instead of returning from the position of Fig. 71 after controlling the printing of the first of several items the latch 1339 remains in engagement with the lower portion of comb 1003 and as this comb rises from the position of Fig. 71 to that of Fig. 69 the latch will snap under the comb to prevent it from descending during the next cycle of operation. The setting of the machine for this purpose is effected by the plate 1054 previously referred to. Resting on the upper edge of this plate when in any one of the four quarter positions is a roller 1351 carried by an arm 1352 (Figs. 64, 66, 67 and 68). When the plate 1054 is moved from the position of Fig. 64 to the listing position as in Fig. 67 the arm 1352 is actuated by its spring 1353 to the position of Figs. 67 and 68. Besides moving up and down the link 1345 will when the shaft 1045 oscillates be actuated toward the left as seen in Fig. 68 after which it will be released by the counterclockwise movement of shaft 1045 and will be pulled back to the right by spring 1349, so that on each downward movement it will be in position to actuate the pin 1344. Now with the arm 1352 in listing position when the link 1348 moves to the left it will be latched in this position by the arm 1352 as shown in Fig. 68. Then when the link 1345 descends it will fail to cooperate with pin 1344 and will not rock the shaft 1340 to actuate the bail 1342 to restore the latches 1339. Thus when the comb 1003 representing the latest unpaid item descends during one cycle of operation to control the printing and then rises to normal position the latch 1339 will snap under the comb and by being permitted to remain there for the next cycle of operation will prevent this comb from descending during said next cycle. This comb then for such next cycle can not operate to control its finger 1007 to render the next preceding finger 1007 and associated mechanism inoperative. Thus said next preceding finger 1007 with its mechanism will be free to operate as the latest unpaid item and will control the printing of the data taken from the next to the last unpaid item quarter 33. The latch 1339 associated with such next comb 1003 will then operate to latch such comb in its upper position so that on the next cycle of operation this comb too is prevented from acting as the latest unpaid item comb and the one next preceding will act as the latest unpaid item and so on until all of the unpaid items have been listed. When premiums are due semi-annually the carry-over mechanism reaches over a blank field 33 to the next preceding due and unpaid field. The latches 1339 are controlled by latches 1350 which in turn are controlled by the fingers 1124 through the depending portions 1354 cooperating with a pin 1355 on the latch 1350. It will be remembered that only the fingers 1124 corresponding to the latest due and unpaid quarter will rock clockwise as viewed in Fig. 71 by reason of the position of fingers 1007 and associated mechanisms. Thus when several unpaid items are sensed only the latest one will through its finger 1124 and corresponding latch 1350 release the latch 1339. All other latches 1339 will be held out of cooperation with their combs 1003 and only one at a time will be released to latch its corresponding comb against operation during a succeeding cycle. When it locks its comb against descending and the next adjacent comb then acts as representing the latest unpaid item and the corresponding finger 1124 then rocks as also representing the latest unpaid item it will in turn release its corresponding latch 1339 to cooperate with the comb 1003 then controlling the operation of the machine so that during the next cycle that comb in turn will be latched up, etc. It will also be recalled that when there is more than one unpaid item the bail 1113 of Figs. 69 and 71 will be prevented from rocking clockwise from the position of Fig. 69 to that of Fig. 71. This in turn will prevent the operation of the stop bar 390b and the asterisk type bar will be permitted to rise under control of the stop 390a and the asterisk will be printed. Thus when printing the list of Fig. 5 as long as there are more than one unpaid items as represented by the positions of the combs 1003 the asterisk will be printed along with the item. After all of the items except the earliest have been printed and the combs 1003 are all locked against descending except one the bail 1113 will then be permitted to rock to the position of Fig. 71 depressing the bail 1108 and permitting the stop bar 390b to advance to operative position where it will control the asterisk type bar by preventing it from rising to the position where the asterisk will be printed. In this way the asterisk is prevented from being printed with the earliest unpaid item of a particular insurance policy or as shown in Fig. 5 the last of the items printed. Also when bail 1113 rocks for the last unpaid item to be printed and rocks the shaft 1112 counterclockwise as viewed in Fig. 68 the lower arm of bell crank 1116 will engage a pin 1356 on the arm 1352, rocking the latter clockwise out of cooperation with the link 1348 and the link 1345 will then move back into cooperation with pin 1344 and will restore all of the latches 1339 to their inoperative positions as seen in Fig. 69. All of the combs 1003 will then be free to operate in connection with the next master card.

*Suspension of master card feeding*

When the machine detects several unpaid items on the master card and proceeds to list these items on the sheet of Fig. 5 it is necessary to suspend the master card feeding operation while the machine operates through successive cycles to print the several unpaid items. The mechanism for suppressing the feeding of cards is as follows: It will be recalled in connection with Figs. 51 and 52 that during the ordinary operation of the machine for posting, when a master card appears having a higher number than that on the opposing audit card, the link 547 which is constantly reciprocated toward the right and back toward the left will be raised by the operation of the bell crank 546 connected by link 545 to the control mechanism. Thus as the link 547 moves to the right the arm 553 carried thereby will engage a lever 556 fixed on shaft 557 and will thus rock this shaft. The rocking of the shaft will cause the card clips to close upon the master cards in their several stations and carry them on to the next station. This same mechanism operates when listing by reason of the fact that the number of the master card is always in effect larger than the number sensed by the audit card pins inasmuch as the latter are locked against reading. Mechanism is provided for depressing the arm 553 whenever the machine detects more than one unpaid item. Referring to Figs. 20, 39 and 40 an arm 1357 may be set in any of its three listing positions designated by the numerals carried thereby with respect to the spring pressed latch 1358 depending upon which of the three file groups is being run through the machine. Normally when posting, the arm 1357 is in the position where the designation P is in register with the arm 1358. A stepped stop 1359 then normally cooperates with projection 1360 on a comb 1361 and prevents the latter from descending. When set for operating on cards from any of the three files the comb 1361 will be free to drop one, two or three steps when the bail 383 (see also Fig. 20) descends. For the present the number of steps through which this comb descends is of no importance; the mere act of descending being sufficient to perform the functions under consideration. Connected to the lower end of the comb is a link 1362 (see also Fig. 22) having a pin 1363 resting under a link 1364. Thus when the comb 1361 descends, it will permit the link 1364 to be lowered from its dotted line position of Fig. 55 to its full line position. Fixed on the shaft 1151a is a lever 1365 carrying a pin 1366 cooperating with a slot 1367 in the link 1364. This slot is narrow at its upper end and wide at its lower end so that when the link 1364 is in its dotted line position the lever 1365 may oscillate between its full line and dotted line positions without affecting the link 1364. But when the latter link drops to its full line position so that pin 1366 engages in the narrow portion of the slot, movement of the lever 1365 to the right will produce a similar movement of link 1364. It has been pointed out that when the machine detects two unpaid items the shaft 1151a rocks counterclockwise as viewed in Fig. 55. The right hand end of link 1364 as seen in Fig. 55 is attached to a bell crank 1368 (see also Fig. 29). This bell crank is provided with a cam member 1369 which is normally in the position shown in Fig. 56. When the link 1364 is moved to the right as shown in Fig. 55, the cam 1369 moves from the position of Fig. 56 to that shown in Fig. 57 and by engaging a projection 1370 on the arm 553, cams said arm down to the position of Fig. 57 so that when the link 547 moves to the right the arm 553 will not actuate the lever 556. The card clips will then not grip the cards and no master cards will be fed for that cycle of the machine. This happens for each cycle of operation as long as the machine continues to detect more than one unpaid item. When printing the last of the several unpaid items, however, and the mechanisms operate as under the control of only one unpaid item, the shaft 1151a (Figs. 29, 54 and 55) does not rock and during that cycle the cam 1369 remains in the position of Fig. 56 so that when the link 547 moves to the right, the arm 553 will actuate the lever 556, causing the clips to close upon the card to feed it from the sensing position to the next station; the cards from all other positions being fed simultaneously. The control of the shaft 1151a it will be remembered was described in connection with Figs. 92 and 93. There it was shown that when the shaft 624 (see Fig. 22) rocks counterclockwise it causes depression of the link 522 which as shown in Fig. 93 moves the pin 1166 to its lower position to permit the arm 1167a to rock counterclockwise permitting the shaft 1151a upon which this arm is mounted to rock in the same direction. It was also stated in connection with Fig. 92 that when there is more than one unpaid item the arm 1189 is actuated to permit shaft 1151a to rock. As in posting operations, the operation of link 1185 and associated mechanisms causes the card being sensed to be fed to the reject pocket.

*Printing to date on listing sheet*

Referring to Fig. 6, the month in the date appearing with each unpaid item is taken from a set-up in the machine on the master card side of the sensing station as described. The day on the other hand is taken from the master card directly. In printing the list of Fig. 5 where several items relating to a particular policy may be printed, the day for each item will be the same and is taken directly from the master card but the month will change for each item and must be computed according to the quarter which controls the printing of the particular item.

Referring to Figs. 36 and 37 the two type bars 440 which print the month under control of the setup in the machine will rise and be restored as already described. It has also been stated that in setting the machine for listing the month pins on both the audit and master card sides are adapted to sense set up readings of 19. The corresponding stop bars 390 will then advance to stop the month type bars 440 at 19. For listing purposes, however, the units month type bar 440 is rigidly secured to an idler bar 440a by means of a stud 1371 reaching through slots in the tens type bar and comparing combs and through the units comparing comb as indicated in Fig. 37. The tens type bar 440 is similarly fixed to an idler bar 440b by a stud 1372 reaching through a slot in the idler bar 440a and a slot in the tens comparing comb associated with the tens type bar 440. The idlers 440a and 440b are controlled by stop bars 390c in a manner similar to the control of the type bars by the stops 390. The stop bars 390a are controlled by the comb 1361 (see also Figs. 39 and 40) and also by combs 1373 and 1374. The comb 1361 is connected to the comb 1374 by means of a pin 1375 fixed to the comb 1361 and reaching into a hole 1376 in the comb 1374. The pin 1375 reaches through a slot 1377 in the comb 1373, this slot being wide enough to permit the comb 1373 to move up or down relatively to the other two combs a distance of one step. The comb 1373, however, is normally latched to the comb 1361 by a spring pressed latch 1378 carried by comb 1361 and adapted to engage in a slot 1379 in the comb 1373. When the comb 1373 is released by the restoring bar 383 (Fig. 39) and descends a distance corresponding to the setting of the stepped stop member 1359, it will thus carry with it the other two combs. When the arm 1357 is set to operate upon cards of the third file as in Fig. 40, the comb 1361 will be free to drop its full distance of three steps, carrying with it the other two combs. This will set up a combination of the notches 395a with respect to the lateral projections 392a on the stops 390c so that certain of these stops corresponding to the months belonging to the third file, will be free to advance to the left as viewed in Figs. 39 and 42. In Fig. 42 the three combs are shown in development arrangement so that they may be readily seen, the lateral projections 392a being in this instance duplicated to cooperate with the several combs.

Referring to Fig. 38 the stop bars 390c which are free to advance when the machine is set to operate upon cards belonging to file No. 3 are shown in table form as being the 3rd, 6th, 9th and 12th months. If the machine is set to operate upon cards of file 2, the 2nd, 5th, 8th and 11th month stops 390 will be freed to advance to the left. If it is set to operate upon file 1 the 1st, 4th, 7th and 10th month stop bars 390c will be free to advance. The releasing of the stops 390c for the four months of each of the three file groups is in a measure dependent upon the position of the middle comb 1373. Normally when the three combs descend, the middle comb descending the same distance as the two outer combs will prevent the stop 390c for the fourth month of each file group from advancing. If the middle comb is released to drop an additional step it will then be free to stop 390c associated with the fourth month of the group on which the machine is operated. Having set the machine to select which group of four months may be printed it is then necessary to select, under control of the card itself, one of the four months for printing. This is controlled in accordance with which of the four quarter fields upon the card is controlling the printing for that cycle. Thus if the printing is being controlled from the first quarter the first month stop 390 will be selected, and if the machine is set to operate on cards of file 1 the first month will be January, while if the machine is set to operate on cards of file 2 the first month of that file will be February or the second month of the year. On the other hand if the second quarter field 33 is controlling the printing, the stop bar for the fourth month of the year will be released if the machine is set to operate upon file 1; the fifth month if set to operate for file 2, etc.

The mechanism for selecting the one of the four months of a file group includes three combs 1380, 1381 and 1382 (Figs. 39, 40 and 42). Pivotally connected to the lower ends of these combs are links 1383, 1384 and 1385. These links are normally adapted to rest on a fixed bar 1386. Each of the links 1383 has a projection 1387 cooperating with one of three bails 1388 reaching across all of the fingers 1124. All of the fingers 1124 associated with the first quarter fields 33 are provided with a projection 1389 cooperating with the upper one of the three bails 1388. All of the fingers 1124 associated with the second quarter field 33 are provided with similar projections 1389 cooperating with the middle one of bails 1388. All of the fingers 1124 associated with the four of the quarters 33 are provided with projections 1389 cooperating with the lower bail 1388. The fingers 1124 associated with the third quarters 33 do not cooperate with any bail (see Figs. 39, 75 and 76). It will be recalled that when the machine detects several due and unpaid items in several of the quarters 33, the finger 1124 associated with the latest of such quarters rocks clockwise as viewed in Fig. 39. This will rock the upper one of the bails 1388. This in turn will rock the link 1383 out of contact with the bar 1386 so that when the shaft 1061 rocks counterclockwise, the bail 1390 upon releasing the combs 1380, 1381 and 1382, will permit the comb 1380 to descend also. The notches 1391 in this comb will then release one of the four month stop bars 390a to advance to the left. The stop bar thus permitted to advance will control the distance to which the idler bar 440a controlling the units column of the month designation rises. Similarly if the finger 1124 associated with the third quarter field 33 operates, it will actuate the middle one of the bails 1388 releasing the comb 1381 to permit the stop bar 390c associated with the second month of the particular file group to advance. Also a finger 1124 associated with the lower bail 1388 will rock if the fourth field 33 is to control the operation and the proper one of the bars 390c will be released to advance. If a field 33 representing the third quarter is controlling then none of the combs 1380, 1381 and 1382 will descend and a bar 390c associated with the third month of the particular group will advance.

We have now described the manner in which the type bar operating to designate in the units column of the month is controlled. In the fourth quarter of each of the file groups it is necessary to employ the tens type bar to print the 1 for the 10th, 11th and 12th months. This is effected by causing the middle comb 1373 to drop an additional step when the combs 1380, 1381 and 1382 are controlled to operate for the fourth quarter. Thus when the comb 1382 is released to drop, it will through a pin 1392 rock a bell crank 1393 against a pin 1394 on the latch 1378 which latches the comb 1373 to the outer comb 1361. The inner comb is thus released and drops the additional step permitted by the width of the slot 1377 cooperating with the pin 1375. This inner comb controls the units type bar when two columns are used to designate the month and thus releases the stop necessary to position the type bar to print 0 for the first file, 1 for the second and 2 for the third.

In this connection when operating upon cards of the second file and listing for the fourth quarter, the comb 1382 will drop and its notch 1395 will register with a lateral projection 1396 on the tens column stop bar 390d permitting the latter to advance to stop the type bar in the 1 position. Also a notch 1397 will drop and the stop bar 390e which normally stops the tens type bar in blank position is now prevented from advancing and thus permits the type bar to rise to be stopped at 1. Also the link 1385 on comb 1382 rests back of a carry over projection 1398 on the link 1383 connected to comb 1380 so that when link 1385 is moved to let its comb drop it also moves link 1383 to let comb 1380 drop. This releases the stop bar 390c to stop the units type bar at the 1 position. Thus the two type bars will rise to print 11. When working on the third file the bar 390c for stopping the units type bar in the 2 position will be released and the type bars will be positioned to print 12. In the arrangement of the notches in the several combs controlling the stop bars 390a, there are instances where more than one of the stop bars will advance when only one is to function to stop a type bar. Where the extra advancing stop bar is too high in position to affect the type bar its advance is of no consequence. In other words, referring to Fig. 33 it will be seen that there are two projections 441 on each type bar. The lower one of these projections cooperates with the lower half or approximately half of the stop bars, the upper projection cooperating with the other stop bars. If a stop advances into the path of the lower projection 441 and another stop advances into the path of the upper projection 441 and the lower projection will reach its stop before the upper projection reaches the upper stop, the reaching out of the upper stop is thus of no consequence. The arrangement therefore of the notches in the combs 1361 etc., is such that the type bars for printing the month designation will not be affected by the projection of additional stops 390c.

Timing diagram

Figs. 126 and 127 constitute timing diagrams of the machine when operating for posting, Fig. 126 showing the times of operation of the more important parts of the machine associated with the comparing station during one cycle of operation of the machine. Fig. 127 shows the times of operation of parts associated with the posting station of the machine during the cycle of operation. Thus referring to the timing of the parts in Fig. 126 it will be seen that the card feeding carriage or shuttle starts to advance at the zero position in the operation of the machine. These carriages or shuttles reach the end of their advance stroke at a point 180 degrees from the zero position. During this same period the pickers which start the card from the supply magazines, return from their advance position to their normal or home position ready to start forward again to advance the next card. From a point 180 degrees from the zero positions the shuttles commence to return and reach the normal or home position at 360 degrees. During this period of time the pickers are advancing with their cards from the supply magazines. It will also be seen that the type bars start to rise at a point approximately 267 degrees from the zero position and reach their upper or set positions at a point approximately 9 degrees from the zero position during the next cycle of operation; the type bars being restored during a period beginning approximately at 141 degrees from zero and reaching their normal restored positions at a point approximately 232 degrees from the zero position. In connection with the timing of the type bars it will be recognized that the operation of the parts is spread out over the two operating cycles. In other words, there is no zero position in the cycle of operation of the machine common to all of the operations, and wherever the machine may be started some of the parts will be in operating positions of varying stages; others may not have commenced to move from their normal positions, and when the machine stops whatever may be the chosen stopping position, numerous operations will be in the midst of their performances. In the comparing timing diagram it will be seen that the feeler pins designated "feelers" are restored from a point approximately 111 degrees from zero to a point approximately 149 degrees. Referring to the posting diagram in Fig. 127 it will be seen that the type bars which print for posting, would in connection with the posting quarters 33, commence to rise at a point approximately 70 degrees from the zero position and reach their upper position at approximately 180 degrees, and are restored from a position approximately 271 degrees to approximately 5 degrees in the next succeeding cycle. It is thought not to be necessary to describe in detail all of the items contained in these timing diagrams as from the brief description given it is believed that the other items will be readily understood. It should also be understood that no attempt is made to show on these timing diagrams the times of operation of all of the parts of the machine. The timing diagram merely contains the times of operation of the more important parts of the machine. By timing these important parts according to these diagrams the timing of the subsidiary parts may be readily ascertained.

Having described my invention what I claim and desire to secure by Letters Patent is:

1. In a posting machine, means for analyzing a plurality of record sheets, means controlled in accordance with the analysis of the sheets for effecting an entry upon one of the sheets and means also controlled in accordance with the analysis of the records for printing items upon a separate record.

2. In a machine of the character described, means for analyzing a plurality of companion record sheets and means controlled by said analyzing means for entering an item upon another record sheet.

3. In a posting machine, means for analyzing a plurality of record sheets and means controlled by said analyzing means and by the machine for making a posting entry upon one of the record sheets by entering a date indication upon such record.

4. In a posting machine, means for analyzing a plurality of record sheets and means controlled by said analyzing means for effecting an entry upon one of the record sheets by perforating and printing a date upon such record sheet.

5. In a posting machine, means for analyzing a plurality of record sheets and means controlled by said analyzing means for effecting a perforated and a printed entry upon one of the record sheets.

6. In a posting machine, means for analyzing a plurality of record sheets, means controlled by said analyzing means for posting an entry upon one of the record sheets and means controlled by a setup in the machine for determining the character of such entry.

7. In a machine of the character described, means for analyzing records, means controlled by the analyzing means for effecting an entry upon a record analyzed and settable means for determining the character of such entry.

8. In a machine of the character described, means for analyzing a plurality of opposing records, means controlled by said analyzing means for printing a date upon one of the records and means adapted to be set in accordance with the current date for controlling said printing.

9. In a machine of the character described, means for analyzing a record for determining the status thereof and means controlled by said analyzing means for alternatively effecting a posting entry upon said record or for listing the record upon a separate record sheet.

10. In a machine of the character described, means for analyzing a record card containing an entry indicating whether or not a payment is due in connection with such record, means controlled by said card when a payment is due for effecting a printed posting date entry upon the card.

11. In a machine of the character described, means for analyzing record cards adapted to contain entries indicating whether or not payments are due in connection therewith and whether or not such payments have been made and means controlled by said analyzing means for effecting a posting entry upon one of said records by perforating said record and printing thereon.

12. In a machine of the character described, means for analyzing a plurality of record cards adapted to contain entries indicating whether payments are due in connection therewith and whether payments have been made and means controlled by said analyzing means for alternatively effecting a posting entry upon one of the records or for effecting an entry upon a separate record.

13. In a machine of the character described, means for analyzing record cards adapted to contain entries indicating whether payments are due in connection therewith and whether such payments have been made and means controlled by said analyzing means for effecting an entry upon one of said records when payments due have been made and for listing the records upon a separate sheet when payments due have not been made.

14. In a machine of the character described, means for analyzing record cards adapted to contain entries indicating whether payments are due in connection therewith and whether such payments have been made and means controlled by said analyzing means for alternatively entering a posting date upon the record card when a payment due has been made and for listing the record upon a separate sheet when a payment due has not been made.

15. In a machine of the character described, means for analyzing record cards adapted to contain entries indicating when payments in connection therewith are due and whether such payments have been made and means controlled by said analyzing means for effecting a perforated and printed entry of a date upon the record card when due payments have been made.

16. In a machine of the character described, means for analyzing record cards adapted to contain entries indicating when payments are due in connection therewith and whether such payments have been made and means controlled by said analyzing means for alternatively effecting a perforated and a printed entry of a date upon a record when a due payment has been made and for listing the record upon a separate sheet when a due payment has not been made.

17. In a machine of the character described, means for analyzing a record adapted to contain entries indicating a plurality of conditions and means controlled by said analyzing means for alternatively effecting an entry upon said record or for listing the record upon a separate sheet.

18. In a machine of the character described, means for analyzing a record card adapted to contain entries indicating a plurality of conditions, means for effecting an entry upon said record, means for listing said record upon a separate sheet, means controlled by said analyzing means for selectively controlling said entry effecting and said listing means and for differentially disposing of said record.

19. In a machine of the character described, means for analyzing opposing records adapted to contain entries, means for effecting an entry upon one of said records, means for listing such record upon a separate sheet, means controlled by said analyzing means for selectively controlling said entry effecting and said listing means and means also controlled by said analyzing means for differentially disposing of the opposing records.

20. In a machine of the character described, means for analyzing opposing records adapted to contain entries indicating various conditions, means controlled by said analyzing means for alternatively effecting an entry upon one of the records or for listing such record upon a separate sheet and feeding means also controlled by said analyzing means for differentially disposing of the records.

21. In a machine of the character described, means for analyzing opposing records, means controlled by said analyzing means for disposing of such records and means for effecting a cancellation entry upon one of the records.

22. In a machine of the character described, means for analyzing opposing records, means controlled by said analyzing means for effecting an entry upon one of the records and means for effecting a cancellation entry upon the other of said records.

23. In a machine of the character described, means for analyzing opposing records, means controlled by said analyzing means for alternatively effecting an entry upon one of said records or for disposing of such record without effecting an entry, means also controlled by said analyzing means for determining the disposition of the other of said records and means controlled in accordance with such disposition for effecting a cancellation entry upon said other of said records.

24. In a machine of the character described, means for analyzing opposing records, means controlled by said analyzing means for differentially disposing of one of said records and means controlled in accordance with the disposition of such record for effecting a cancellation entry upon the record.

25. In a machine of the character described, means for analyzing opposing records, a plurality of receiving pockets for one of said records, means controlled by said analyzing means for feeding such record into one or the other of said pockets and means associated with one of the pockets for effecting a cancellation entry upon records entered therein.

26. In a machine of the character described, means for analyzing a record card, a plurality of pockets, means controlled by said analyzing means for feeding a card analyzed into one or another of said pockets and means for effecting a cancellation record upon all of the cards entering one of said pockets.

27. In a machine of the character described, means for analyzing opposing record cards, means controlled by said analyzing means for effecting an entry upon one of the cards and means for effecting a cancellation entry upon the other of said cards.

28. In a machine of the character described, means for analyzing opposing record cards, means controlled by said analyzing means for alternatively effecting a posting entry upon one of said records or for listing said record upon a separate sheet and means operative when such entry is effected upon said record for effecting a cancellation entry upon the other of said records.

29. In a machine of the character described, means for analyzing opposing records, means controlled by said analyzing means for determining whether an entry shall be effected upon one of the records and means controlled in accordance with said determining means for determining whether a cancellation entry shall be effected upon the other record.

30. In a machine of the character described, means for analyzing a plurality of records, means controlled by said analyzing means for determining the disposition of one of the records and means controlled by said disposing means for effecting a cancellation entry upon such one of said records.

31. In a machine of the character described, means for analyzing opposing records, means controlled by said analyzing means for determining whether an entry shall be effected upon one of the records, means also controlled by said analyzing means for differentially disposing of the other of such records and means controlled by said disposing means for effecting a cancellation entry upon said other of said records.

32. In a machine of the character described, means for analyzing a record card adapted to contain entries indicating differential conditions, means controlled by said analyzing means for effecting one form of entry when a predetermined condition is sensed and for effecting a different form of entry when another predetermined condition exists and means controlled in accordance with the form of entry effected for determining the differential disposition of the record.

33. In a machine of the character described, means for analyzing a record for determining the status thereof, means controlled by said analyzing means for alternatively effecting an entry upon said record or for listing the record upon a separate sheet and means controlled in accordance with the entry effecting for differentially disposing of the record.

34. In a machine of the character described, means for analyzing a plurality of opposing records, means controlled by said analyzing means for determining whether an entry shall be effected upon one of the records, a plurality of receiving pockets, means also controlled by said analyzing means for differentially disposing of the other of said records into said pockets and means adapted to effect a cancellation entry upon said other of said records in accordance with the entry upon said first named record.

35. In a machine of the character described, means for analyzing identifying data on opposing records, means operative when the data on the opposing records is similar for effecting an entry upon one of said records and means operative when said identifying data is dissimilar for effecting an entry upon a separate sheet.

36. In a machine of the character described, means for analyzing identifying data on opposing records, means controlled when the identifying data upon said records is similar and under control of an additional entry upon one of the records for effecting an entry upon said one of said records and means operative when the identifying data on said records is dissimilar and in accordance with said additional entry upon said one of said records for effecting an entry upon a separate sheet.

37. In a posting machine, means for analyzing an account record adapted to contain entries indicating whether or not a payment is due, means for analyzing a payment record adapted to indicate whether or not a payment has been made, means controlled by said analyzing means adapted when a payment is due and a payment has been made to effect an entry upon said account record and adapted when a payment is due and has not been made to effect an entry upon a separate record.

38. In a machine of the character described, means for analyzing an account record adapted to indicate whether one or more payments are due, means for analyzing a payment record adapted to indicate whether a payment has been made, means controlled by said analyzing means adapted when a payment is due and a payment has been made to effect an entry upon said account record and adapted when several payments are due and a payment has been made to suppress the making of such entry upon the account record.

39. In a machine of the character described, means for analyzing an account record adapted to indicate whether one or more payments are due, means for analyzing a payment record adapted to indicate whether the payment has been made, file and reject pockets for each of said records, means adapted when a payment is due and a payment is made for effecting an entry upon said account record and for feeding said records to their file pockets and adapted when more than one payment is due and a payment is made to feed said records to their reject pockets.

40. In a machine of the character described, means for analyzing a plurality of fields upon a record card, printing means controlled by said analyzing means, and means for rendering said printing means operative when any one of said fields contains perforations of a predetermined arrangement.

41. In a machine of the character described, means for analyzing a plurality of item fields on a record card, listing means controlled by said analyzing means for listing the account upon a separate record sheet when any of the said fields bears predetermined characteristics, irrespective of which field contains such characteristics.

42. In a machine of the character described, means for analyzing a plurality of fields upon a record card, means controlled by perforations in said fields for printing a record upon a separate sheet and means controlled by perforations in said fields for indicating whether one or more of said fields controls said printing.

43. In a card analyzing machine, means for sensing perforations in record cards, means for feeding cards in predetermined ordinal succession to said sensing means and means operative when such order of succession changes for stopping the machine.

44. In a record-controlled machine, means for successively analyzing records in ordinal succession, means controlled by said analyzing means for controlling the operation of the machine and means operative when the order of succession changes for changing the control of the machine.

45. In a record-controlled machine, means for feeding records, means for analyzing such records and means controlled in accordance with the progressive order of succession of such records for controlling the operation of the machine.

46. In a record-controlled machine, means for feeding records in ordinal succession, means for analyzing such records and means for controlling the operation of the machine, said controlling means being adapted to permit continued operation of the machine as long as the cards are fed in such ordinal succession and adapted to cause a change in the operation of the machine when the order of succession changes.

47. In a record-controlled machine, means for analyzing a plurality of records simultaneously, means for feeding such records into the machine and means controlled in accordance with the progressive order in which said records are fed for controlling the operation of the machine.

48. In a record-controlled machine, means for feeding records having numerical indicia thereon into the machine, means for analyzing such indicia and means controlled by said analyzing means for stopping said feeding means when the ordinal succession of such indicia changes.

49. In a record-controlled machine, means for analyzing opposing records and for comparing such analysis, means for feeding records to be analyzed in predetermined ordinal succession into the machine and means controlled by said analyzing means for altering the operation of the machine when the order of progression changes.

50. In a record-controlled machine, means for feeding opposing records in ordinal succession into the machine, means for analyzing and comparing the data on such records and means for causing stoppage of said feeding means when one of the opposing records analyzed is out of numerical order of succession.

51. In a record-controlled machine, means for feeding records in ordinal succession into the machine, means for analyzing numerical indicia on said records and means for causing stoppage of the operation of the machine when a record is analyzed having numerical indicia of a higher order than that of the preceding record.

52. In a record-analyzing machine, means for feeding records in succession into the machine, means for analyzing numerical indicia on said records, said means being adapted to permit continued operation of the machine when a record being analyzed contains numerical indicia of the same order as or of a lower order than that of the preceding record and also being adapted to cause stoppage of the machine when a record being analyzed contains numerical indicia of a higher order than that of the preceding record.

53. In a machine of the character described, a type carrier differentially movable to a plurality of printing lines, means for predetermining the line in which printing is to be effected and record-controlled means for differentially controlling the setting of said type carrier with respect to such printing lines.

54. In a machine of the character described, a type carrier, means for differentially setting said type carrier from a common position for printing in a plurality of fields upon a record.

55. In a machine of the character described, means for effecting perforations in any of a plurality of fields upon a record, means for automatically determining which field such perforating shall be effected in and means for controlling the character of such perforations.

56. In a machine of the character described, printing and perforating devices adapted to print and perforate in any of a plurality of fields upon a record and means for determining which field shall be printed and perforated in.

57. In a machine of the character described, type elements, means for moving said elements to print in any of a plurality of printing lines and type actuating hammers adapted to actuate said elements for printing in any of said printing lines.

58. In a record analyzing machine, means for analyzing identifying data upon records, adjustable means for controlling the operation of the machine adapted to permit continued operation thereof when records of predetermined groups are analyzed and adapted to cause stoppage of the machine when records of other groups are analyzed.

59. In a machine of the character described, means for analyzing group designations on records, means controlled by said analyzing means for controlling the operation of the machine, said means being adapted to permit continued operation of the machine when records belonging to a predetermined plurality of groups are analyzed and means for causing stoppage of the machine when a record from some other group is analyzed.

60. In a machine of the character described, means for analyzing records containing major and minor group indicia, means controlled by said analyzing means for permitting operation of the machine when records being analyzed contain any of a plurality of minor group indicia contained within a predetermined major group and adapted to cause stoppage of the machine when a record being analyzed contains minor group indicia of another major group.

61. In a record-controlled machine, means for feeding opposing records, means for differentially controlling the operation of said feeding means and means for causing stoppage of said feeding means when a predetermined number of one of the records is fed without the feeding of any of the other records.

62. In a record-controlled machine, means for simultaneously analyzing opposing records, means controlled by said analyzing means for separately controlling the feeding of the opposing records and means adapted to cause stoppage of the machine when a predetermined number of one of the records is fed without the feeding of any of the other of said records.

63. In a record-controlled machine, means for feeding opposing records into the machine, means for causing stoppage of the machine when a predetermined number of one of the opposing records is fed into the machine without the feeding of any of the opposing records and means for rendering said stopping mechanism ineffective.

64. In a machine of the character described, means for analyzing a master record, means for analyzing an audit record, means controlled by said master record analyzing means for effecting a posting entry upon the master record when the master record contains a predetermined entry and means for suppressing the making of such posting entry whenever the master card contains a plurality of such predetermined entries.

65. In a machine of the character described, means for effecting an entry in any one of a plurality of major fields upon a record, means controlled by the record itself for determining which major field such entry shall be effected in and means for determining which of a plurality of minor fields contained within the major field the entry shall be effected in.

66. In a machine of the character described, means for effecting an entry in any one of a plurality of minor fields within any one of a plurality of major fields upon a record, means controlled by a setup in the machine and by the record itself for determining which of the major fields the entry shall be effected in and additional means controlled by a setup in the machine for determining which minor field within the selected major field shall receive the entry.

67. In a machine of the character described, means for effecting an entry within any one of a plurality of minor fields included in one of a plurality of major fields upon a record, means controlled by setup devices in the machine and by the record itself for determining which major field and which minor field within the major field shall receive the entry.

68. In a machine of the character described, means for analyzing any of a plurality of fields upon a record and means controlled by a setup device in the machine and by the record itself for determining which field shall be analyzed.

69. In a machine of the character described, means for analyzing any one of a plurality of fields upon a record card, means controlled by a setup device in the machine for selectively determining which field shall be analyzed and means controlled by the record for effecting an entry in the field analyzed.

70. In a machine of the character described, means for analyzing a record card for selectively determining which of a plurality of fields contains a record for the current year said means including a device adapted to be set to represent the current year and sensing devices adapted to sense a year designation of the record itself.

71. In a machine of the character described, means for analyzing a plurality of fields upon a record, means controlled by a setup in the machine representing the current year and by a year entry upon the record for determining which year is represented in the first field.

72. In a machine of the character described, means for analyzing a plurality of fields upon a record, means controlled by a setup in the machine representing the current year and by a year entry upon the record for determining which year is represented in the first field, and means controlled by said determining means for further determining which field contains a record for the current year.

73. In a machine of the character described, means for effecting an entry in one of a plurality of separate fields upon a record card, said means including a plurality of groups of type carriers, means for suppressing the operation of some of said groups of carriers and means controlled by a setup in the machine for selectively bringing into operation one or more of the others of said carriers.

74. In a machine of the character described, means for effecting an entry in one of a plurality of separate fields upon a record, said means including groups of type carriers associated with all of said fields, means for suppressing operation of some of said groups of carriers and means for selectively suppressing the operation of others of said carriers.

75. In a machine of the character described, means for effecting an entry in one of a plurality of fields on a record card, said means including printing elements associated with a plurality of fields, means for rendering some of said devices inoperative, means for selectively suppressing the operation of others of said devices and means for determining the operative position of one or more of the others of said devices.

76. In a machine of the character described, means for effecting an entry upon one of a plurality of fields on a record including printing devices associated with a plurality of fields, means for locking some of said devices against operation, means for selectively rendering others of the devices inoperative and means controlled by a setup in the machine for determining the operative position of another of said devices.

77. In a machine of the character described, means for effecting an entry in one of a plurality of fields on a record, said means including a plurality of entry-effecting devices associated with a plurality of fields, means for locking certain of said devices against operation, means controlled by the record itself for rendering others of the devices inoperative and means controlled by a setup in the machine for determining the operative position of others of said devices.

78. In a machine of the character described, means for effecting an entry in one of a plurality of fields upon a record, said means including entry-effecting devices associated with a plurality of fields, means for locking the devices associated with some of said fields against operation, means for selectively rendering others of said devices inoperative and means controlled by the record for selectively determining whether others of said devices shall operate in an upper or a lower operating position.

79. In a machine of the character described, means for effecting an entry in one of a plurality of fields on a record, said means including a plurality of sets of entry-effecting devices automatically movable to an upper or a lower field position, means for selectively determining whether said devices shall move to the upper or lower operating position and perforated card controlled means for selectively causing operation of one of said sets.

80. In a machine of the character described, means for effecting an entry upon a record, said means including a plurality of sets of entry-effecting devices automatically movable to an upper or a lower operating position, means for determining which of said positions said devices shall move to, means common to said positions for controlling the sets of said devices and perforated card controlled means for selectively causing operation of one of said sets.

81. In a machine of the character described, means for effecting an entry in one of a plurality of fields upon a record, said means including printing devices automatically movable into cooperative relation with one or the other of said fields, means for determining which of said fields said devices shall move to and perforated card controlled means for controlling printing in said fields.

82. In a machine of the character described, means for effecting an entry in one of a plurality of fields upon a record, said means including printing devices automatically movable to operative position with respect to one or another of said fields, an operating hammer common to said fields for operating said printing devices and card controlled means for controlling printing in said fields.

83. In a machine of the character described, means for sensing data in a plurality of fields upon a record, means controlled by data contained in one of said fields for controlling a printing operation, means for suppressing the control of such printing-effecting means after the latter has operated and additional means for thereafter controlling a printing operation from another of said fields.

84. In a machine of the character described, means for simultaneously analyzing a plurality of fields upon a record and means separately controlled by such fields for selectively effecting printing under control of some of said fields.

85. In a machine of the character described, means for simultaneously analyzing a plurality of fields upon a record, means for effecting printing under control of several of said fields in succession and means controlled by the record for determining which of said fields shall control such printing.

86. In a machine of the character described, means for effecting printing under control of a plurality of fields in succession upon a record, means adapted to analyze a plurality of columns simultaneously for determining which of said fields shall effect control for the first printing operation and means for thereafter causing another field to effect the control of printing.

87. In a record-controlled machine, means for feeding records into the machine, means for analyzing such records, means controlled by said analyzing means for effecting a printing operation, means also controlled by said analyzing means for suppressing said feeding means for causing the machine to effect an additional analyzing and printing operation in connection with such record.

88. In a record-controlled machine, means for normally feeding a record into and out of the machine during each cycle of operation thereof, means controlled by a single record for suppressing said feeding means and adapted also to determine the number of cycles of operation of the machine during which such feeding is suppressed.

89. In a record-controlled machine, means for feeding records into the machine, means for selectively feeding a record to a plurality of positions without the machine, means for analyzing a record in the machine, printing means controlled by said analyzing means and means also controlled by said analyzing means for determining the disposition of said record when the latter is fed out of the machine.

90. In a record-controlled machine, means for feeding records into the machine, means controlled by a record for effecting a plurality of successive entries and means for selectively disposing of the record after the last of such entries has been made.

91. In a posting machine, means for feeding a record into the machine for effecting a posting entry in one of a plurality of fields thereon, means for disposing of said record after such entry has been made and means for changing the disposition of said record after the last possible entry has been made thereon.

92. In a posting machine, means for effecting posting entries in a plurality of fields upon a record, means controlled by the record for determining which field an entry is to be effected in and means operative when a last possible entry upon a record has been effected for disposing of the record.

93. In a posting machine, means for effecting posting entries in any of a plurality of fields upon a record, means operative under control of the record for determining which of the fields shall receive posting entries and means operative when the last of the fields adapted to receive a posting entry under control of the record has received its entry for selectively disposing of the record.

94. In a posting machine, means for feeding records into the machine, means for effecting a posting entry in one of a plurality of fields upon the record during repeated passages of the record through the machine and means for selectively disposing of the record when an entry is effected in the last of the fields thereon.

95. In a posting machine, means for feeding records into the machine, means for effecting posting entries in some of a plurality of fields upon a record, means controlled by a record for determining which of the fields shall receive posting entries and means controlled by said determining means for selectively disposing of the record when the last of the fields adapted to receive entries has received its entry.

96. In a posting machine, means for effecting posting entries in a plurality of fields upon a record, means controlled by the record for determining which of the fields shall receive entries, means associated with several of the fields each adapted when its field receives an entry to effect selective disposal of the record and means also controlled by the record for rendering some of said disposing means inoperative.

97. In a posting machine, means for analyzing a record, entry-effecting means adapted to be positioned under control of said analyzing means for posting an entry in the record analyzed and means controlled by the record for determining whether said entry-effecting means shall operate to effect an entry.

98. In a record-controlled machine, means for analyzing a record, type, positioning means adapted to position said type for printing under control of said analyzing means and means for determining whether the type shall control printing.

99. In a record-controlled machine, type carrying devices adapted to be automatically set in printing position and record controlled means for determining whether said devices shall operate to print when in printing position.

100. In a record-controlled machine, means for analyzing a plurality of records, type elements adapted to be set at printing position with respect to one of the records and means controlled by said analyzing means for determining whether or not said type shall operate to print.

101. In a record-controlled machine, means for analyzing opposing records, entry-effecting means movable to operative position with respect to one of the records and means controlled by said analyzing means for determining whether or not said entry-effecting devices shall operate to effect an entry.

102. In a machine of the character described, means for analyzing a date indication in the machine, means for analyzing a date indication on a record, means for producing a predetermined operation of the machine when the date on the record is earlier than the setup date in the machine and adapted to produce a different operation if the date on the record is later than that in the setup of the machine.

103. In a machine of the character described, means for analyzing a date indication on a record, means for analyzing a date indication in the machine and means for causing the machine to perform one kind of operation when the date on the record is the same as that in the machine and for causing a different kind of operation when the date on the record is later than that in the machine and for causing a third kind of operation when the date on the record is earlier than the date in the machine.

104. In a machine of the character described, a type carrier, means for normally controlling the setting of said carrier and additional means including a setup device in the machine for alternatively controlling the setting of said carrier.

105. In a posting machine, means for analyzing a plurality of record cards and means controlled by said analyzing means for effecting a posting entry upon one of the record cards by entering a date indication upon such record card.

106. In a machine of the character described means for analyzing a date indication on a record, means for analyzing a date indication in the machine and differentially set printing means controlled by said analyzing means for effecting entries of a plurality of different date indications.

107. In a machine of the character described, means for analyzing a plurality of date indications and differentially set printing means controlled by said analyzing means for printing such date indications and for printing additional date indications.

108. In a machine of the character described, means for analyzing a plurality of opposing record sheets, means controlled by said analyzing means for controlling the operation of the machine and means for controlling the operation of the machine when a series of record sheets is analyzed singly.

109. In a machine of the character described, means for controlling the operation of the machine under the control of readings of a plurality of record sheets analyzed conjointly and means for controlling the operation of the machine under the control of a plurality of record sheets analyzed singly.

110. In a machine of the character described, means for supporting a record in a predetermined position, means for effecting an entry upon such record in any of a plurality of positions and means controlled by the record for determining the position in which an entry shall be effected.

111. In a machine of the character described, means for supporting a record in a predetermined position, means for automatically positioning type elements for printing in any of a plurality of fields on the record, means for determining which field such printing shall be effected in and perforated card controlled means for controlling printing in said fields.

112. A record-controlling accounting machine with comparing mechanism controlled by a plurality of opposed sets of record cards, differentially set recording mechanism controlled thereby for making a special printed list of items upon certain cooperating conditions of the comparing mechanism, and means for suppressing the making of such list upon other conditions of such mechanism.

113. A record-controlled accounting machine with provisions for making a running comparison of a plurality of sets of perforated records and a differentially set individual listing device controlled thereby for making a printed list of selected items only.

114. A recording device with a bank of differentially displaceable type carriers, and means for selectively adjusting the device to provide a plurality of zones or printing positions, said carriers being differentially adjustable with respect to either selected zone and perforated card controlled means for controlling said differential adjustment.

115. A record-controlled apparatus arranged to analyze a plurality of opposed sets of records, and differentially set printing means for making a selected list of data from certain records only.

116. A record-controlled apparatus for analyzing and posting records, and means for listing data from selected records only, said listing means having provision for listing a succession of items derived from certain single records and' means for listing single items from other records.

117. A posting machine with provisions for handling two records, means for posting one record and means for also posting the other record to thereby show that a corresponding and related record has been posted.

118. A recording apparatus with type carriers carrying individual type, means for moving the carriers to and from operative position, means for moving the individual type within the carriers and means for automatically suspending the operation of the apparatus in the event that the type are not properly restored in their carriers.

119. A record-controlled machine with control means, means for analyzing perforated records in a progressively changing sequence and means for calling the control means into operation upon the reversal of the sequence of the records which are analyzed.

120. A record-controlled machine with means for analyzing records to determine their continuity of progression and means controlled thereby for modifying the machine operation upon reversal of the progression in the records which are analyzed.

121. A record-controlled machine with means for posting individual records passing therethrough, each record being adapted to successively receive a plurality of postings, and means for diverting any record which has been completely posted.

122. A record-controlled accounting machine with provisions for posting in one or more positions upon a record, and means for detecting the last possible posting upon a record and for rejecting said record after the last possible posting thereon has been made.

123. A record-controlled machine with means for reading a card, means controlled thereby for selectively listing items from certain cards, and means operative under certain conditions for listing additional data derived from a card from which a single listing is made.

124. A record-controlled accounting machine with differentially set means for listing items representative of unpaid conditions of the controlling records, and means for automatically suppressing listing of items representing a paid up condition.

125. A record-controlled accounting machine with means for analyzing a series or progression of records, and control means controlled by the analyzing means for modifying the operation of the machine upon a reversal of the progression or succession of the controlling records.

126. A record-controlled posting machine with provisions for posting records, and means for rejecting individual records when each said record has been completely posted with its full quota of postings.

127. A record-controlled accounting machine with provisions for analyzing successively presented perforated record cards, means for making a list of items from said record cards, and means for selectively controlling said last mentioned means to list a single item from a record card or a series of items successively derived therefrom.

128. A record-controlled accounting machine with provisions for recording a list of items under perforated record control, and means for selectively controlling said last mentioned recording means for making a single listing from a record and for then passing the record or for making a succession of listed entries from a single record and then passing the record.

129. A record-controlled accounting machine with provisions for analyzing perforated record cards and recording devices controlled by the analyzing means for making up a list of items derived therefrom, and means controlled by certain conditions of the controlling record cards for causing said recording device to derive and list a succession of items or a single item selectively under control of the record.

130. A record-controlled machine with an analyzing means, means for successively presenting perforated records to the analyzing means, means for recording items under control of the analyzing means, means brought into operation upon a certain analysis of a record for suspending the presenting action, and means for thereafter deriving a series of items from a single record.

131. A record-controlled accounting machine with provisions for making a running comparison of opposing perforated record cards, means for also effecting a comparison with machine conditions, and an individual listing device brought into operation or kept out of operation in accordance both with the record card comparison and with the machine condition comparison.

132. A record posting machine with provisions for automatically passing two series of records through the machine, means for posting upon one record under control of another record then in the machine and means for posting upon said other record a notation of the posting upon the first mentioned record.

133. In a record controlled accounting machine, means for comparing opposing records, means for printing a list of items contained on the records and means controlled by said comparing means for selectively causing said printing means to be controlled by certain of said compared records and for passing intervening records without causing printing under control thereof.

134. In a record controlled accounting machine, means for comparing opposing records, printing mechanism adapted to be controlled by certain of the compared records, and means controlled by said comparing mechanism for rendering said printing mechanism operative only when the compared records bear a predetermined relationship to each other and to pass intervening records which do not bear such predetermined relationship.

In testimony whereof I hereto affix my signature.

JOHN ROYDEN PEIRCE.